Dec. 26, 1950 J. E. OSTLINE 2,535,512

TELEPHONE SYSTEM

Original Filed Aug. 6, 1942 56 Sheets-Sheet 1

INVENTOR.
JOHN E. OSTLINE

BY Smith, Olsen & Baird

ATTORNEYS

Dec. 26, 1950 J. E. OSTLINE 2,535,512

TELEPHONE SYSTEM

Original Filed Aug. 6, 1942 56 Sheets-Sheet 2

INVENTOR.
JOHN E. OSTLINE

BY

Smith, Olsen & Baird

ATTORNEYS

Dec. 26, 1950 J. E. OSTLINE 2,535,512

TELEPHONE SYSTEM

Original Filed Aug. 6, 1942 56 Sheets-Sheet 3

INVENTOR.
JOHN E. OSTLINE

BY *Smith, Olsen & Baird*

ATTORNEYS

Dec. 26, 1950 J. E. OSTLINE 2,535,512

TELEPHONE SYSTEM

Original Filed Aug. 6, 1942 56 Sheets-Sheet 4

INVENTOR.
JOHN E. OSTLINE

BY Smith, Olsen & Baird

ATTORNEYS

Dec. 26, 1950 J. E. OSTLINE 2,535,512

TELEPHONE SYSTEM

Original Filed Aug. 6, 1942 56 Sheets-Sheet 5

INVENTOR.
JOHN E. OSTLINE

BY Smith, Olsen & Baird

ATTORNEYS

Dec. 26, 1950 J. E. OSTLINE 2,535,512

TELEPHONE SYSTEM

Original Filed Aug. 6, 1942 56 Sheets-Sheet 6

INVENTOR.
JOHN E. OSTLINE

BY Smith, Olsen & Baird

ATTORNEYS

INVENTOR.
JOHN E. OSTLINE
BY Smith, Olsen & Baird
ATTORNEYS

*INVENTOR.*
JOHN E. OSTLINE
*BY*
Smith, Olsen & Baird
ATTORNEYS

Dec. 26, 1950 J. E. OSTLINE 2,535,512

TELEPHONE SYSTEM

Original Filed Aug. 6, 1942 56 Sheets-Sheet 9

*INVENTOR.*
JOHN E. OSTLINE

BY *Smith, Olsen & Baird*

ATTORNEYS

INVENTOR.
JOHN E. OSTLINE
BY
Smith, Olsen & Baird
ATTORNEYS

Dec. 26, 1950 J. E. OSTLINE 2,535,512

TELEPHONE SYSTEM

Original Filed Aug. 6, 1942 56 Sheets-Sheet 11

*INVENTOR.*
JOHN E. OSTLINE

BY Smith, Olsen & Baird

ATTORNEYS

INVENTOR.
JOHN E. OSTLINE
BY Smith, Olsen & Baird
ATTORNEYS

INVENTOR.
JOHN E. OSTLINE
BY Smith, Olsen & Baird
ATTORNEYS

Dec. 26, 1950 J. E. OSTLINE 2,535,512

TELEPHONE SYSTEM

Original Filed Aug. 6, 1942 56 Sheets-Sheet 14

INVENTOR.
JOHN E. OSTLINE
BY *Smith, Olsen & Baird*
ATTORNEYS

INVENTOR.
JOHN E. OSTLINE
BY *Smith, Olsen & Baird*
ATTORNEYS

Dec. 26, 1950 J. E. OSTLINE 2,535,512

TELEPHONE SYSTEM

Original Filed Aug. 6, 1942 56 Sheets-Sheet 16

INVENTOR.
JOHN E. OSTLINE

BY Smith, Olsen & Baird

ATTORNEYS

REGISTER TRANSLATOR 1700

INVENTOR.
JOHN E. OSTLINE
BY Smith, Olsen & Baird
ATTORNEYS

Dec. 26, 1950 J. E. OSTLINE 2,535,512

TELEPHONE SYSTEM

Original Filed Aug. 6, 1942 56 Sheets-Sheet 18

*INVENTOR.*
JOHN E. OSTLINE

BY *Smith, Olsen + Baird*

ATTORNEYS

Dec. 26, 1950 J. E. OSTLINE 2,535,512

TELEPHONE SYSTEM

Original Filed Aug. 6, 1942 56 Sheets-Sheet 19

INVENTOR.
JOHN E. OSTLINE
BY Smith, Olsen & Baird
ATTORNEYS

INVENTOR.
JOHN E. OSTLINE
BY Smith, Olsen & Baird
ATTORNEYS

Dec. 26, 1950 J. E. OSTLINE 2,535,512

TELEPHONE SYSTEM

Original Filed Aug. 6, 1942 56 Sheets-Sheet 21

INVENTOR.
JOHN E. OSTLINE

BY *Smith, Olsen & Baird*

ATTORNEYS

Dec. 26, 1950 J. E. OSTLINE 2,535,512

TELEPHONE SYSTEM

Original Filed Aug. 6, 1942 56 Sheets-Sheet 22

INVENTOR.
JOHN E. OSTLINE

BY *Smith, Olsen & Baird*

ATTORNEYS

Dec. 26, 1950 J. E. OSTLINE 2,535,512

TELEPHONE SYSTEM

Original Filed Aug. 6, 1942 56 Sheets-Sheet 23

*INVENTOR.*
JOHN E. OSTLINE

BY *Smith, Olsen & Baird*

ATTORNEYS

Dec. 26, 1950 J. E. OSTLINE 2,535,512

TELEPHONE SYSTEM

Original Filed Aug. 6, 1942 56 Sheets-Sheet 24

INVENTOR.
JOHN E. OSTLINE

BY Smith, Olsen & Baird

ATTORNEYS

Dec. 26, 1950 J. E. OSTLINE 2,535,512

TELEPHONE SYSTEM

Original Filed Aug. 6, 1942 56 Sheets-Sheet 25

INVENTOR.
JOHN E. OSTLINE

BY *Smith, Olsen & Baird*

ATTORNEYS

Dec. 26, 1950 J. E. OSTLINE 2,535,512

TELEPHONE SYSTEM

Original Filed Aug. 6, 1942 56 Sheets-Sheet 26

INVENTOR.
JOHN E. OSTLINE

BY *Smith, Olsen & Baird*

ATTORNEYS

INVENTOR.
JOHN E. OSTLINE
BY Smith, Olsen & Baird
ATTORNEYS

Dec. 26, 1950

J. E. OSTLINE 2,535,512

TELEPHONE SYSTEM

Original Filed Aug. 6, 1942

56 Sheets-Sheet 28

INVENTOR.
JOHN E. OSTLINE

BY Smith, Olsen & Baird

ATTORNEYS

Dec. 26, 1950 J. E. OSTLINE 2,535,512

TELEPHONE SYSTEM

Original Filed Aug. 6, 1942 56 Sheets-Sheet 29

INVENTOR.
JOHN E. OSTLINE

BY Smith, Olsen & Baird

ATTORNEYS

Dec. 26, 1950 J. E. OSTLINE 2,535,512

TELEPHONE SYSTEM

Original Filed Aug. 6, 1942 56 Sheets-Sheet 30

INVENTOR.
JOHN E. OSTLINE
BY Smith, Olsen & Baird
ATTORNEYS

Dec. 26, 1950 J. E. OSTLINE 2,535,512

TELEPHONE SYSTEM

Original Filed Aug. 6, 1942 56 Sheets-Sheet 31

INVENTOR.
JOHN E. OSTLINE
BY Smith, Olsen & Baird
ATTORNEYS

Dec. 26, 1950 J. E. OSTLINE 2,535,512

TELEPHONE SYSTEM

Original Filed Aug. 6, 1942 56 Sheets-Sheet 32

INVENTOR.
JOHN E. OSTLINE

BY Smith, Olsen + Baird

ATTORNEYS

Dec. 26, 1950 J. E. OSTLINE 2,535,512

TELEPHONE SYSTEM

Original Filed Aug. 6, 1942 56 Sheets-Sheet 33

INVENTOR.
JOHN E. OSTLINE
BY *Smith, Olsen & Baird*
ATTORNEYS

Dec. 26, 1950 J. E. OSTLINE 2,535,512

TELEPHONE SYSTEM

Original Filed Aug. 6, 1942 56 Sheets-Sheet 34

INVENTOR.
JOHN E. OSTLINE
BY Smith, Olsen & Baird
ATTORNEYS

Dec. 26, 1950 J. E. OSTLINE 2,535,512

TELEPHONE SYSTEM

Original Filed Aug. 6, 1942 56 Sheets-Sheet 35

INVENTOR.
JOHN E. OSTLINE
BY
Smith, Olsen & Baird
ATTORNEYS

INVENTOR.
JOHN E. OSTLINE
BY
Smith, Olsen & Baird
ATTORNEYS

Dec. 26, 1950 J. E. OSTLINE 2,535,512

TELEPHONE SYSTEM

Original Filed Aug. 6, 1942 56 Sheets-Sheet 37

INVENTOR.
JOHN E. OSTLINE
BY Smith, Olsen & Baird
ATTORNEYS

Dec. 26, 1950 J. E. OSTLINE 2,535,512

TELEPHONE SYSTEM

Original Filed Aug. 6, 1942 56 Sheets-Sheet 38

INVENTOR.
JOHN E. OSTLINE
BY Smith, Olsen + Baird
ATTORNEYS

Dec. 26, 1950 J. E. OSTLINE 2,535,512

TELEPHONE SYSTEM

Original Filed Aug. 6, 1942 56 Sheets-Sheet 39

INVENTOR.
JOHN E. OSTLINE

BY *Smith, Olsen & Baird*

ATTORNEYS

Dec. 26, 1950 J. E. OSTLINE 2,535,512

TELEPHONE SYSTEM

Original Filed Aug. 6, 1942 56 Sheets-Sheet 40

INVENTOR.
JOHN E. OSTLINE
BY Smith, Olsen & Baird
ATTORNEYS

Dec. 26, 1950

J. E. OSTLINE

TELEPHONE SYSTEM 2,535,512

Original Filed Aug. 6, 1942

56 Sheets-Sheet 41

INVENTOR.
JOHN E. OSTLINE

BY Smith, Olsen & Baird

ATTORNEYS

Dec. 26, 1950 J. E. OSTLINE 2,535,512

TELEPHONE SYSTEM

Original Filed Aug. 6, 1942 56 Sheets-Sheet 42

INVENTOR.
JOHN E. OSTLINE

BY Smith, Olsen & Baird

ATTORNEYS

PRINTER CONTROLLER 4200

INVENTOR.
JOHN E. OSTLINE
BY
Smith, Olsen & Baird
ATTORNEYS

INVENTOR.
JOHN E. OSTLINE
BY
Smith, Olsen & Baird
ATTORNEYS

Dec. 26, 1950
J. E. OSTLINE
2,535,512
TELEPHONE SYSTEM
Original Filed Aug. 6, 1942
56 Sheets-Sheet 45

PRINTER CONTROLLER 4200

INVENTOR.
JOHN E. OSTLINE
BY
Smith, Olsen & Baird
ATTORNEYS

Dec. 26, 1950 J. E. OSTLINE 2,535,512

TELEPHONE SYSTEM

Original Filed Aug. 6, 1942 56 Sheets-Sheet 46

*INVENTOR.*
JOHN E. OSTLINE

BY *Smith, Olsen & Baird*

ATTORNEYS

Dec. 26, 1950 J. E. OSTLINE 2,535,512

TELEPHONE SYSTEM

Original Filed Aug. 6, 1942 56 Sheets-Sheet 47

INVENTOR.
JOHN E. OSTLINE
BY Smith, Olsen & Baird
ATTORNEYS

INVENTOR.
JOHN E. OSTLINE
BY Smith, Olsen & Baird
ATTORNEYS

Dec. 26, 1950 J. E. OSTLINE 2,535,512

TELEPHONE SYSTEM

Original Filed Aug. 6, 1942 56 Sheets-Sheet 49

INVENTOR.
JOHN E. OSTLINE
BY Smith, Olsen & Baird
ATTORNEYS

Dec. 26, 1950 J. E. OSTLINE 2,535,512

TELEPHONE SYSTEM

Original Filed Aug. 6, 1942 56 Sheets-Sheet 50

INVENTOR.
JOHN E. OSTLINE

BY Smith, Olsen & Baird

ATTORNEYS

INVENTOR.
JOHN E. OSTLINE
BY Smith, Olsen & Baird
ATTORNEYS

Dec. 26, 1950 J. E. OSTLINE 2,535,512

TELEPHONE SYSTEM

Original Filed Aug. 6, 1942 56 Sheets-Sheet 52

INVENTOR.
JOHN E. OSTLINE

BY Smith, Olsen & Baird

ATTORNEYS

Dec. 26, 1950 J. E. OSTLINE 2,535,512

TELEPHONE SYSTEM

Original Filed Aug. 6, 1942 56 Sheets-Sheet 53

*INVENTOR.*
JOHN E. OSTLINE

*BY* Smith, Olsen + Baird

ATTORNEYS

Dec. 26, 1950 J. E. OSTLINE 2,535,512

TELEPHONE SYSTEM

Original Filed Aug. 6, 1942 56 Sheets-Sheet 54

INVENTOR.
JOHN E. OSTLINE
BY
Smith, Olsen & Baird
ATTORNEYS

*INVENTOR.*
JOHN E. OSTLINE
*BY* Smith, Olsen & Baird
ATTORNEYS

Dec. 26, 1950 J. E. OSTLINE 2,535,512

TELEPHONE SYSTEM

Original Filed Aug. 6, 1942 56 Sheets-Sheet 56

*INVENTOR.*
JOHN E. OSTLINE

*BY* Smith, Olsen & Baird

ATTORNEYS

Patented Dec. 26, 1950 2,535,512

UNITED STATES PATENT OFFICE 2,535,512

TELEPHONE SYSTEM

John E. Ostline, Chicago, Ill., assignor to Automatic Electric Laboratories, Inc., Chicago, Ill., a corporation of Delaware Original application August 6, 1942, Serial No. 453,799. Divided and this application September 29, 1948, Serial No. 51,683

7 Claims. (Cl. 179—18)

Figure 1:
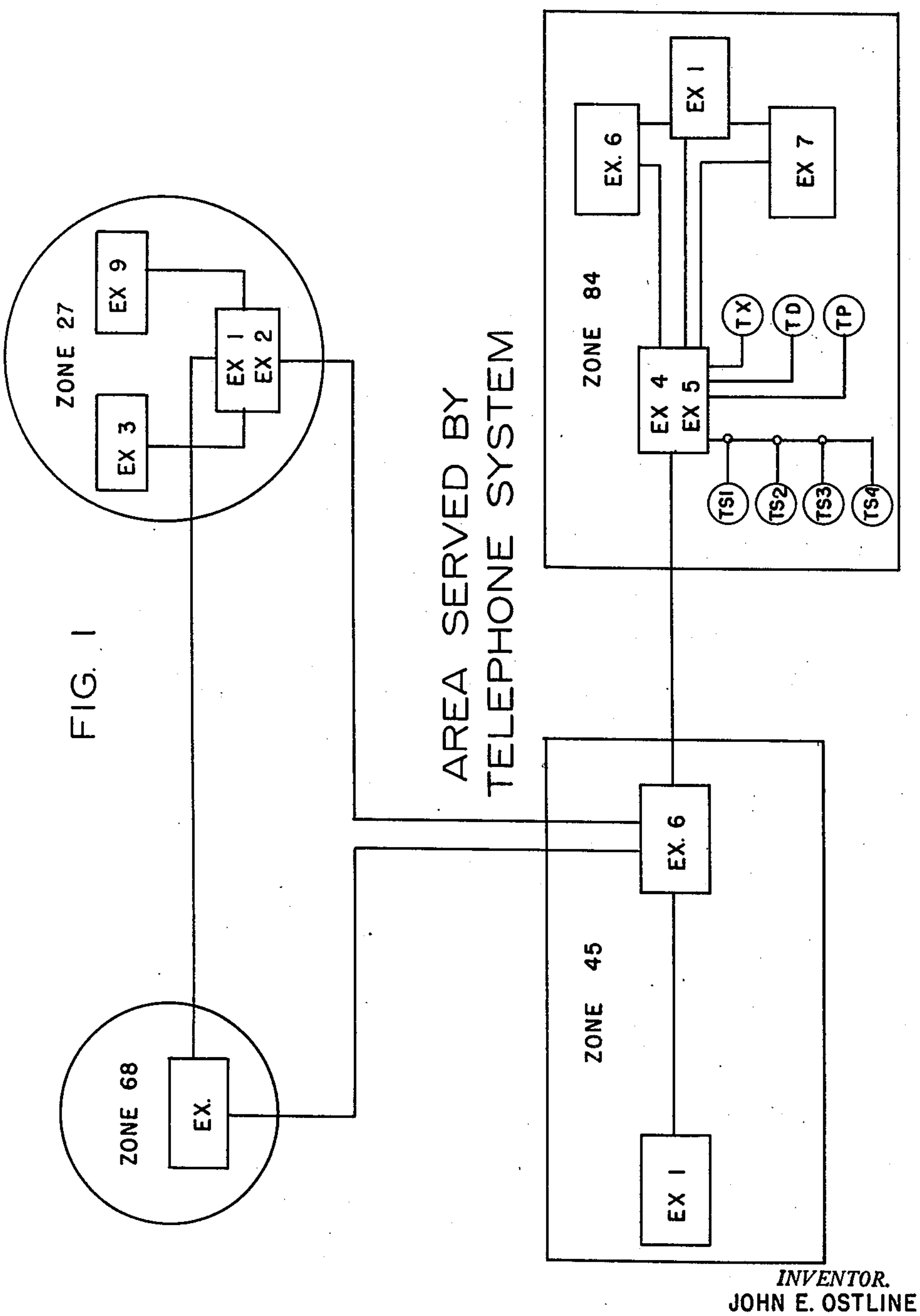

The present invention relates to automatic telephone systems and more particularly to automatic recording apparatus operative to record given particulars of certain calls in the systems. More specifically, the present invention relates to improvements in telephone systems of the character disclosed in the copending application of John E. Ostline, Serial No. 411,350, filed September 18, 1941, now Patent No. 2,409,063, granted October 8, 1946. This application is a division of the copending application of John E. Ostline, Serial No. 453,799 filed August 6, 1942.

In a telephone system serving a large metropolitan area and the adjacent suburban areas, it is usually desirable to divide the system into a plurality of zones and to handle calls between the exchanges in different zones and between certain of the exchanges in the same zone as toll calls, for which special charges are made, depending upon the distances between the zones or the distances between the exchanges in the same zone and the time duration of the call. In accordance with conventional practice, the connections for a call of this type are set up with the aid of an operator, which operator records upon a toll ticket certain particulars concerning the call, including the codes of the calling and called zones, the codes of the calling and called exchanges, the directory numbers of the calling and called lines, the rate applicable to the call, the time duration of the call, and possibly the total charge for or cost of the call.

While a telephone system of the type described is entirely satisfactory in operation, it requires the services of a large number of operators and necessitates some delay in extending a call of the type mentioned while the information concerning the calling and called subscriber substations is being transferred from the calling subscriber to the operator.

Accordingly, it is an object of the present invention to provide in an automatic telephone system including party lines, an improved arrangement for identifying the calling stations on the calling party lines, which is selectively governed by the calling devices at the various calling stations on the calling party lines.

Another object of the invention is to provide in an automatic telephone system including party lines which are arranged on a terminal per station basis, an improved detector which is operated incident to the extension of a connection from a given station on a given party line to detect the terminal of the given party line individually corresponding to the given station, thereby to identify the given party line as the calling line and the given station as the calling station thereon.

A further object of the invention is to provide in an automatic telephone system an improved arrangement for effecting the interception at an operator position of a trunk call initiated on a calling line in the event the detector fails to identify the calling line.

Further features of the invention pertain to the particular arrangement of the circuit elements of the system, whereby the above-outlined and additional operating features are attained.

Figure 2:
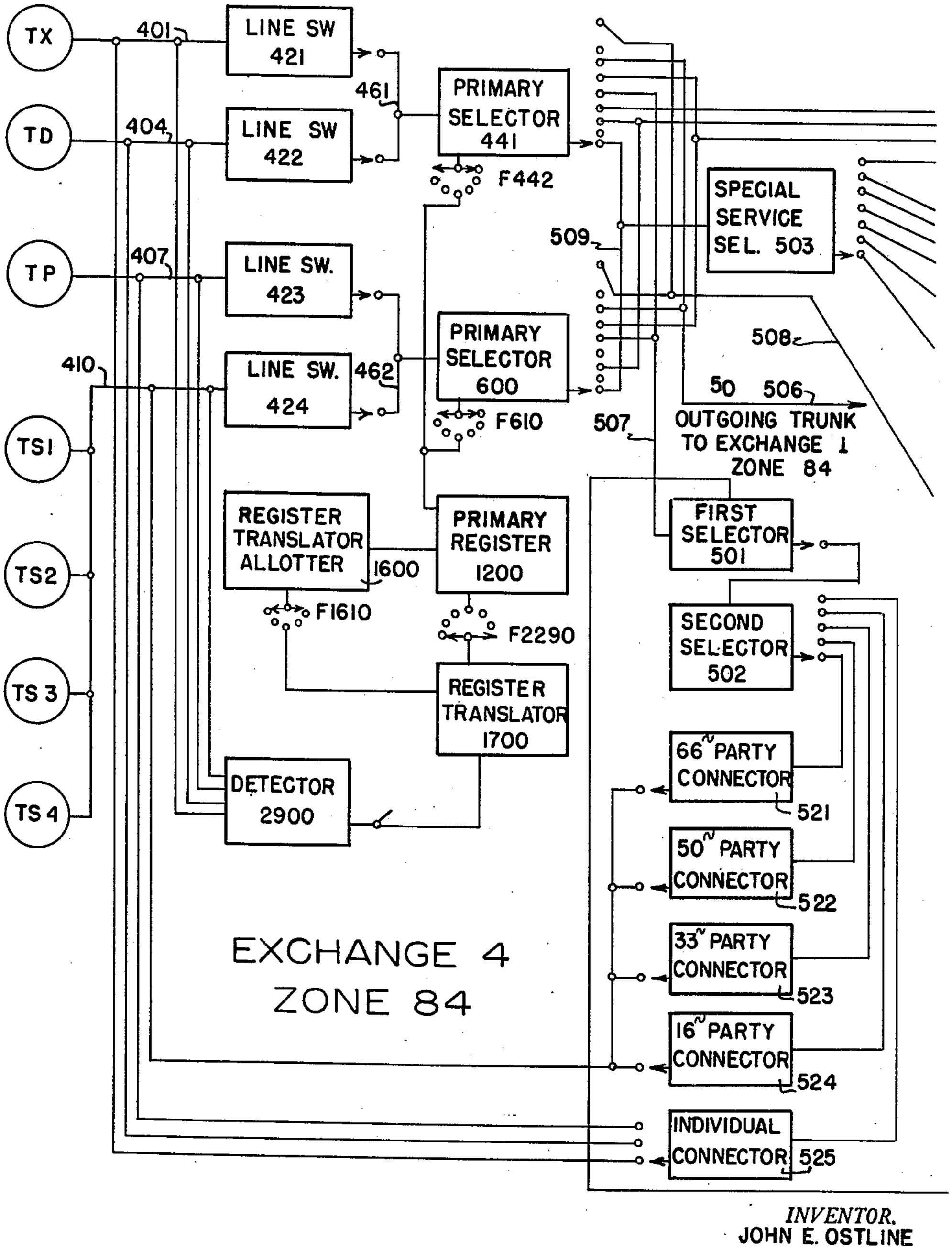
Figure 3:
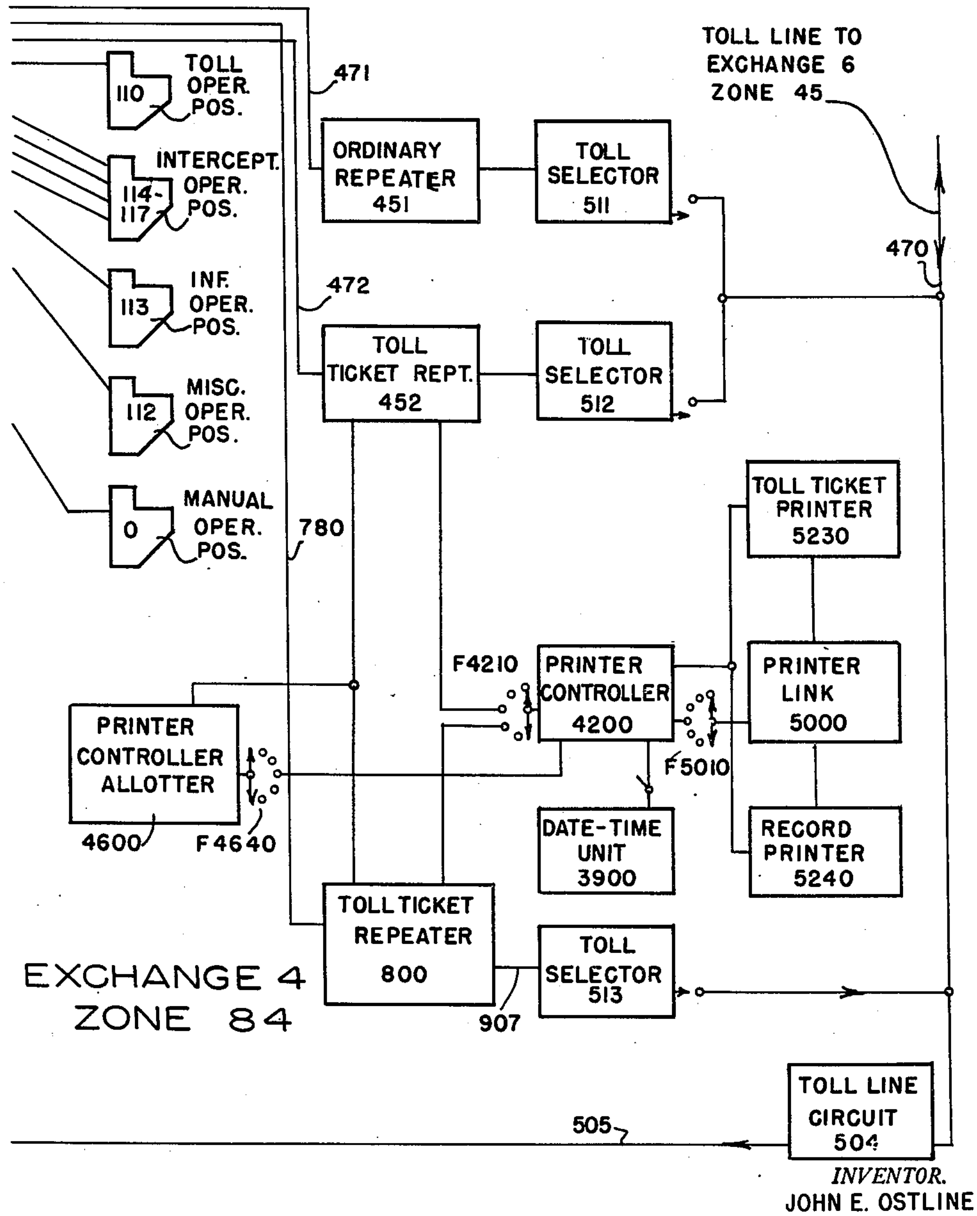
Figure 52:
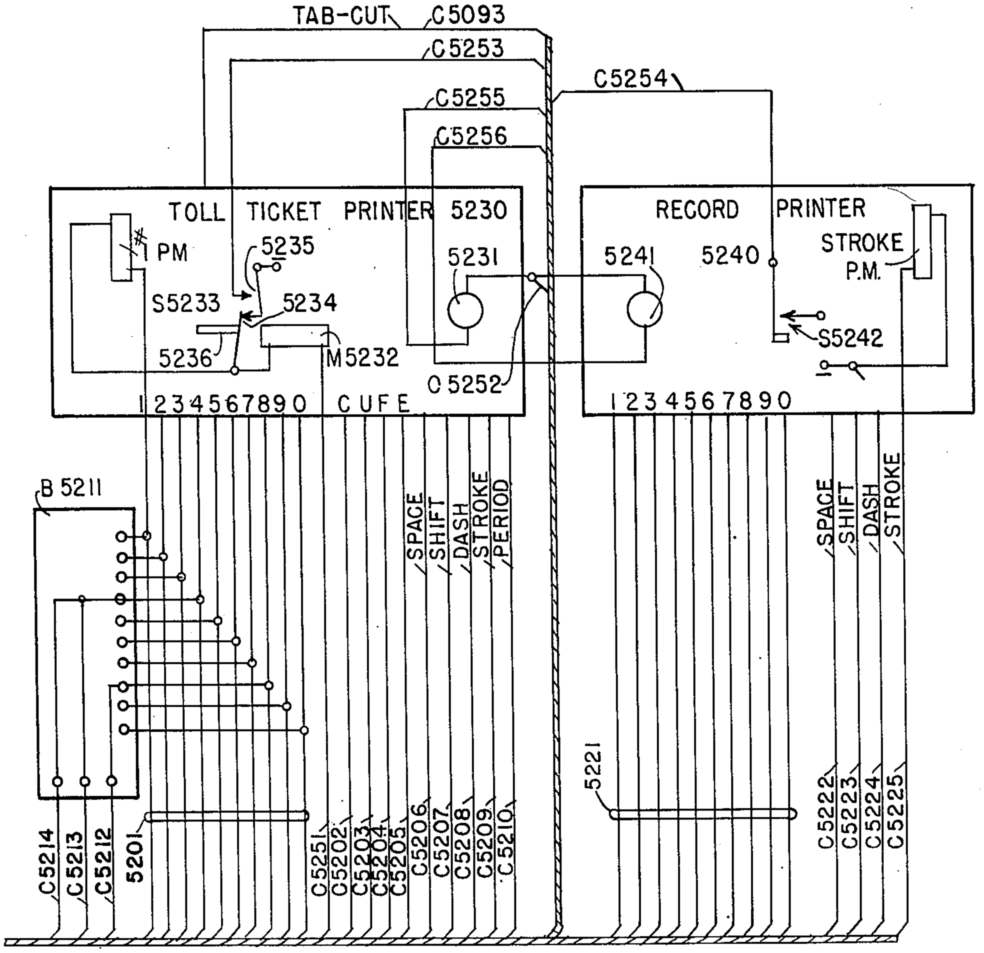
Figure 53:
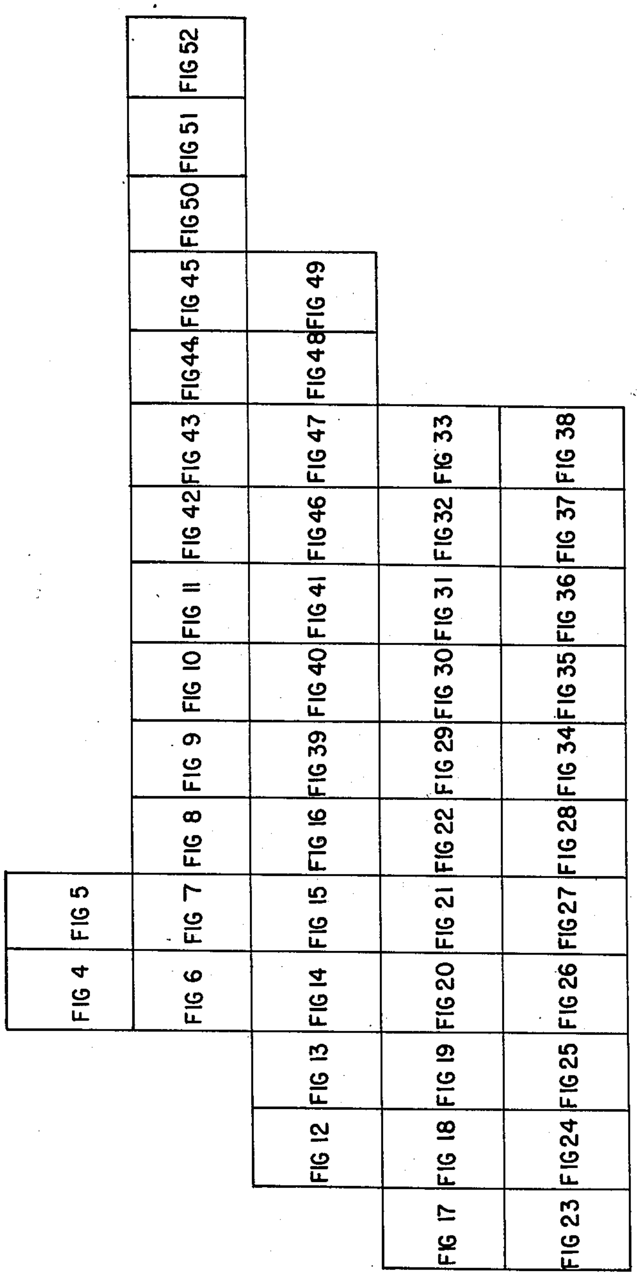
Figure 54:
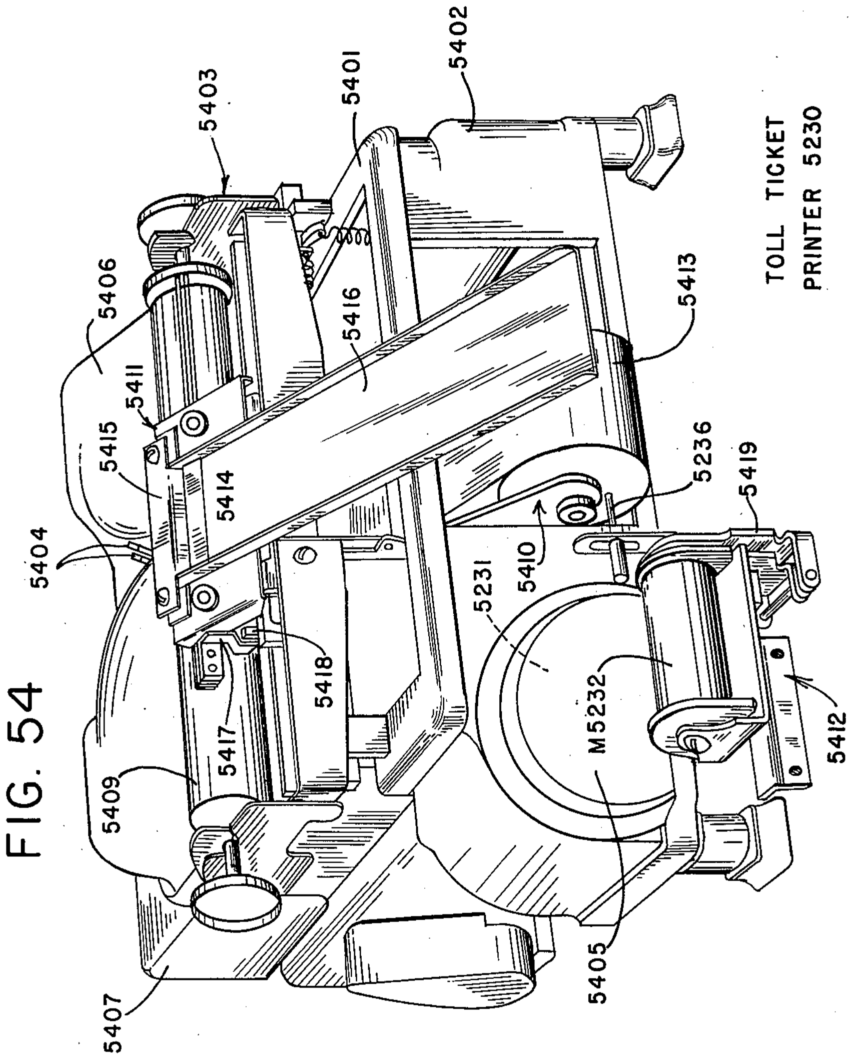
Figure 55:
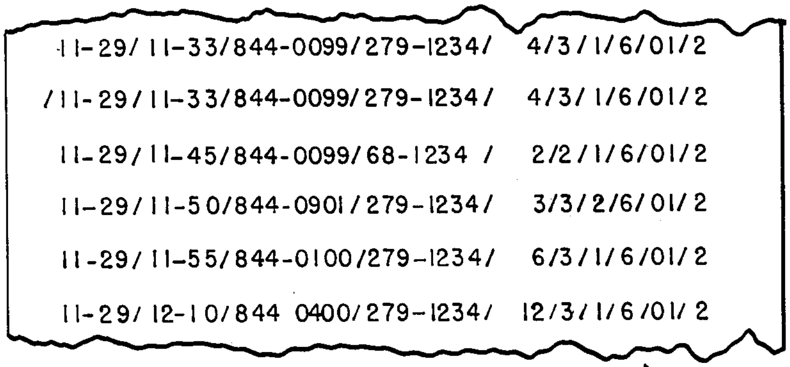
Figure 56:
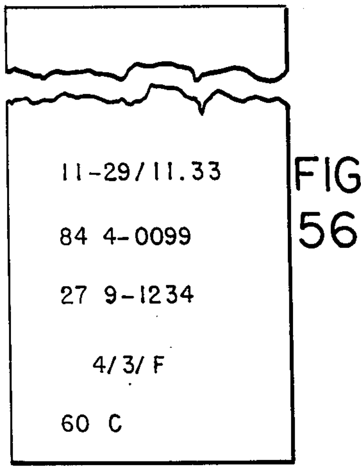
Figure 61:
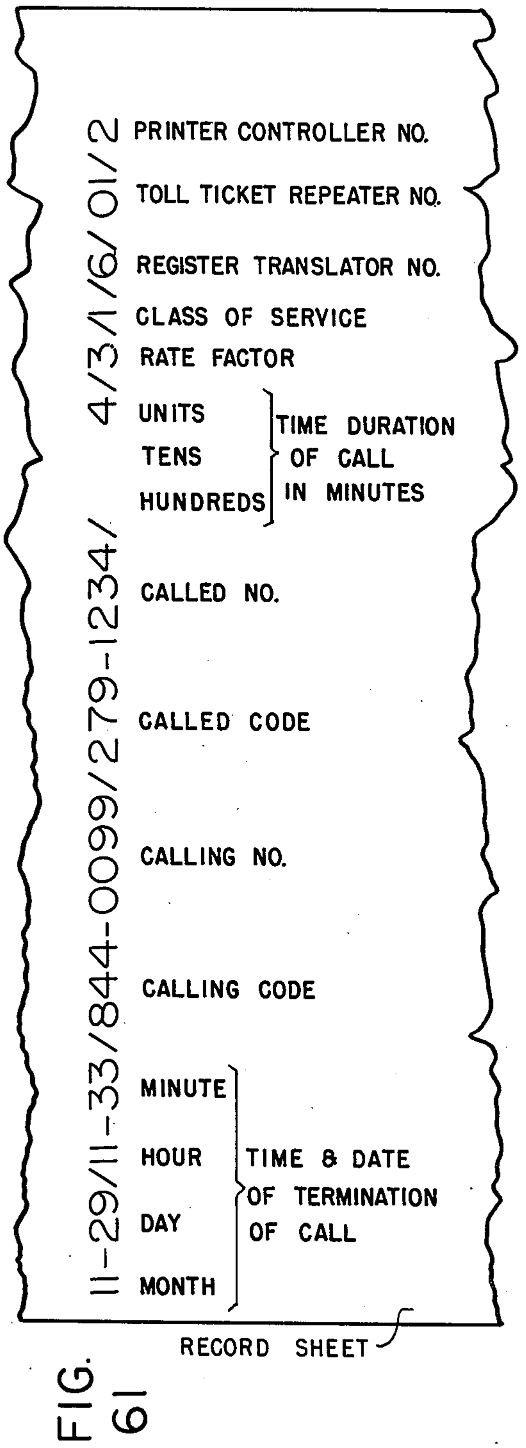
Figure 62:
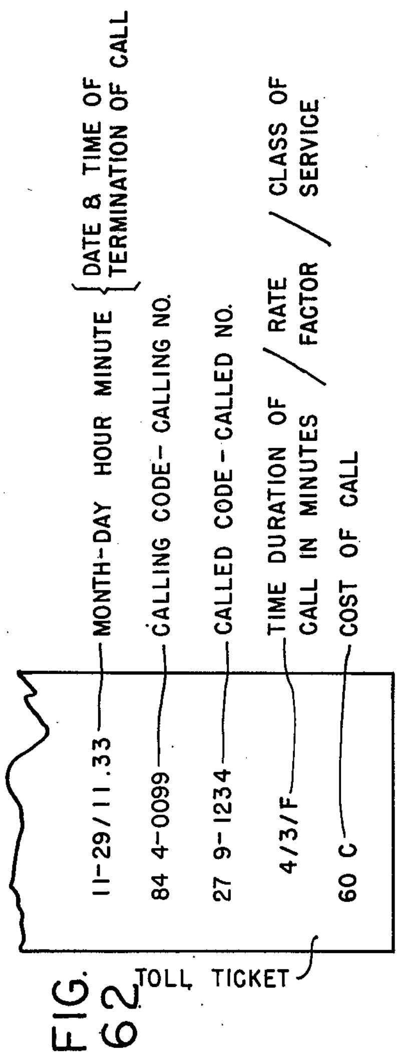

The invention both as to its organization and method of operation, together with further objects and advantages thereof will best be understood by reference to the following specification taken in connection with the accompanying drawings, in which Figure 1 is a schematic diagram of the area served by a telephone system embodying the present invention; Figs. 2 and 3, taken together, illustrate the general arrangement of the apparatus incorporated in exchange 4 zone 84 of the telephone system; Figs. 4 to 52, inclusive, taken together, illustrate the details of the apparatus incorporated in exchange 4 zone 84 of the telephone system, which apparatus has incorporated therein the features of the invention, as briefly outlined above; Fig. 53 illustrates the mode of combining Figs. 4 to 52, inclusive, to form a unified system; Fig. 54 is a rear perspective view of a toll ticket printer incorporated in exchange 4 zone 84 of the telephone system; Fig. 55 illustrates a fragmentary portion of a record sheet produced by a record printer incorporated in exchange 4 zone 84 of the telephone system; Fig. 56 illustrates a toll ticket produced by the toll ticket printer shown in Fig. 54; Figs. 57 to 60, inclusive, illustrate fragmentary portions of other toll tickets produced by this toll ticket printer; Fig. 61 illustrates an enlarged fragmentary portion of the record sheet shown in Fig. 55 in conjunction with explanatory notes; and Fig. 62 illustrates the toll ticket shown in Fig. 56 in conjunction with explanatory notes.

Figure 39:
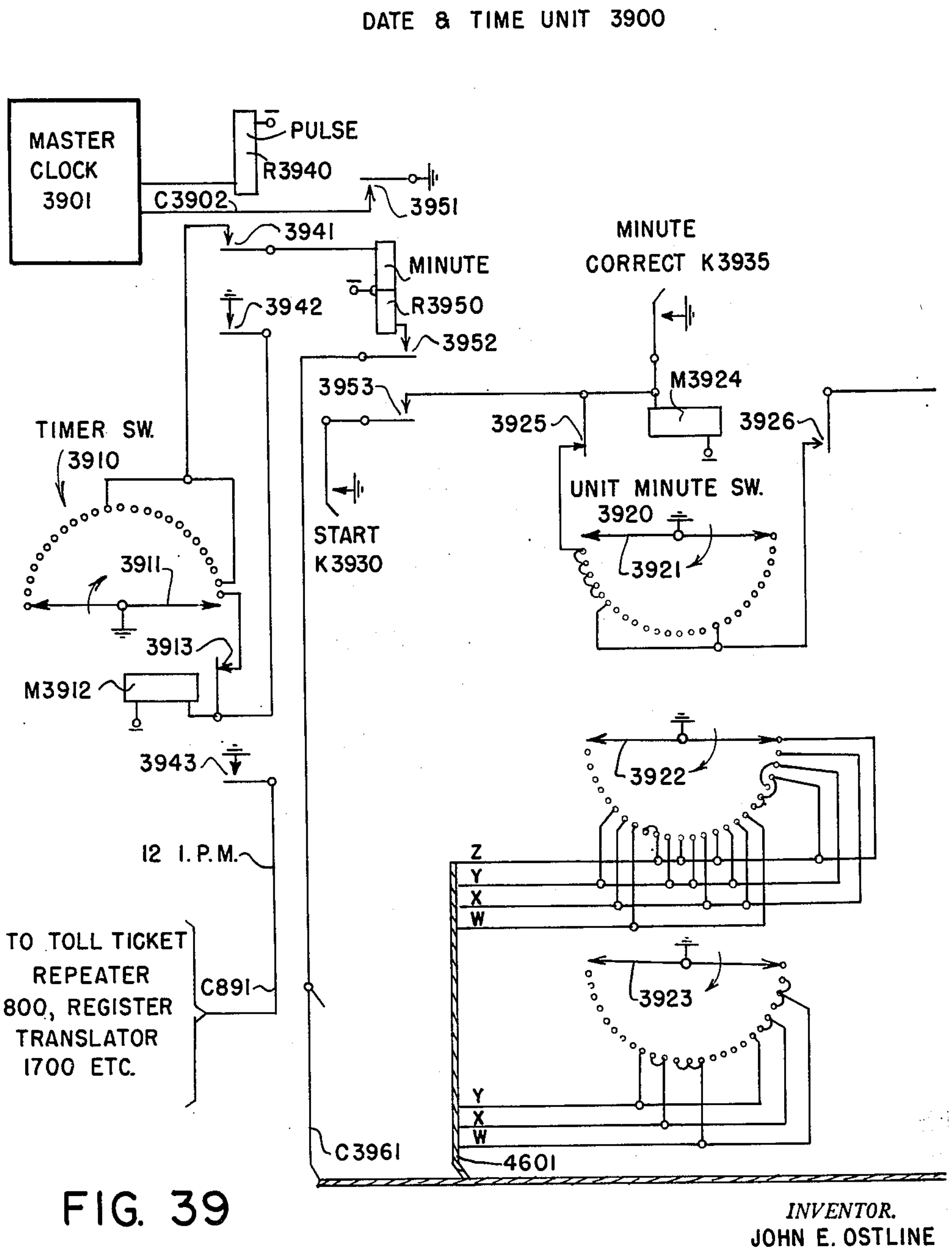
Figure 40:
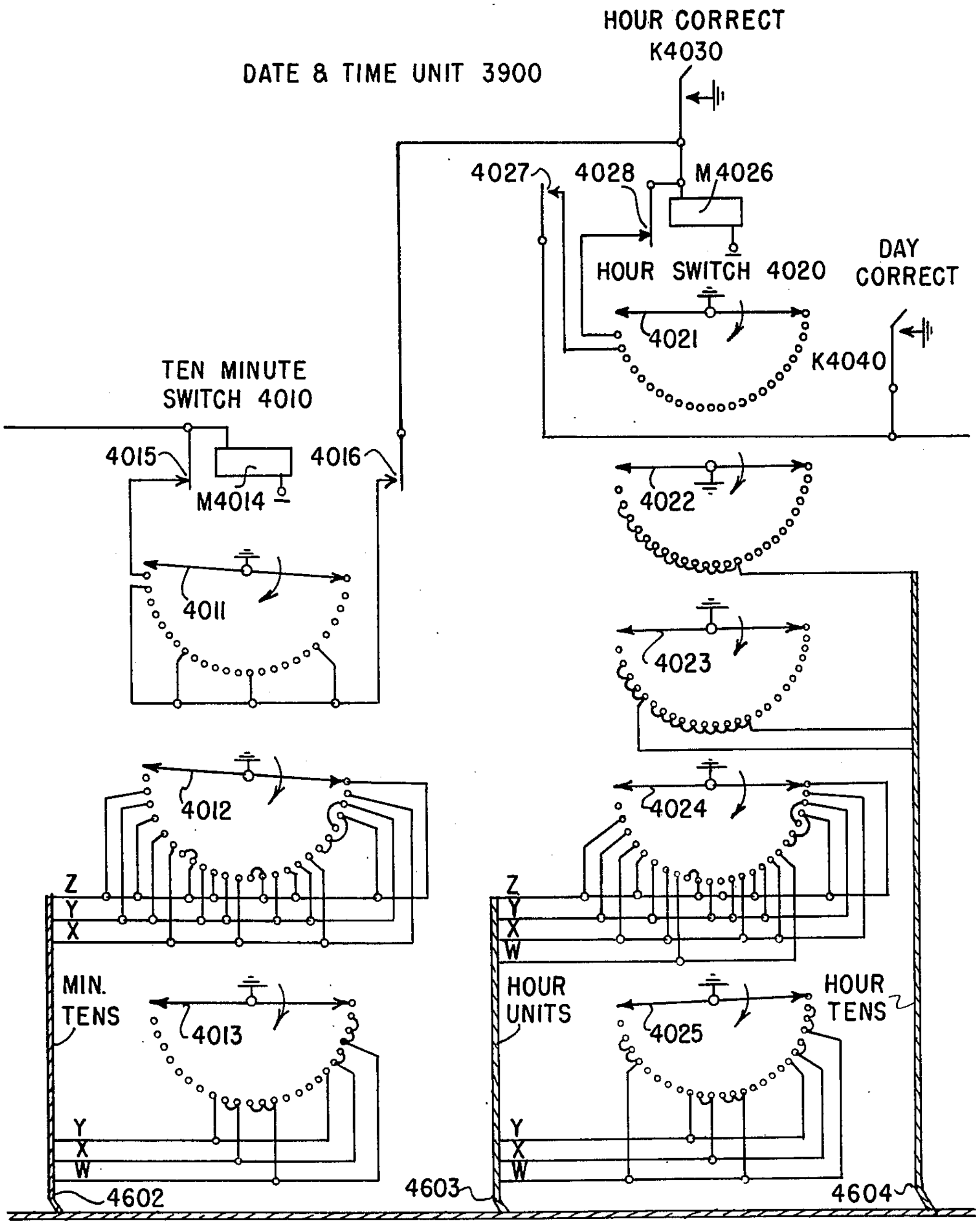
Figure 41:
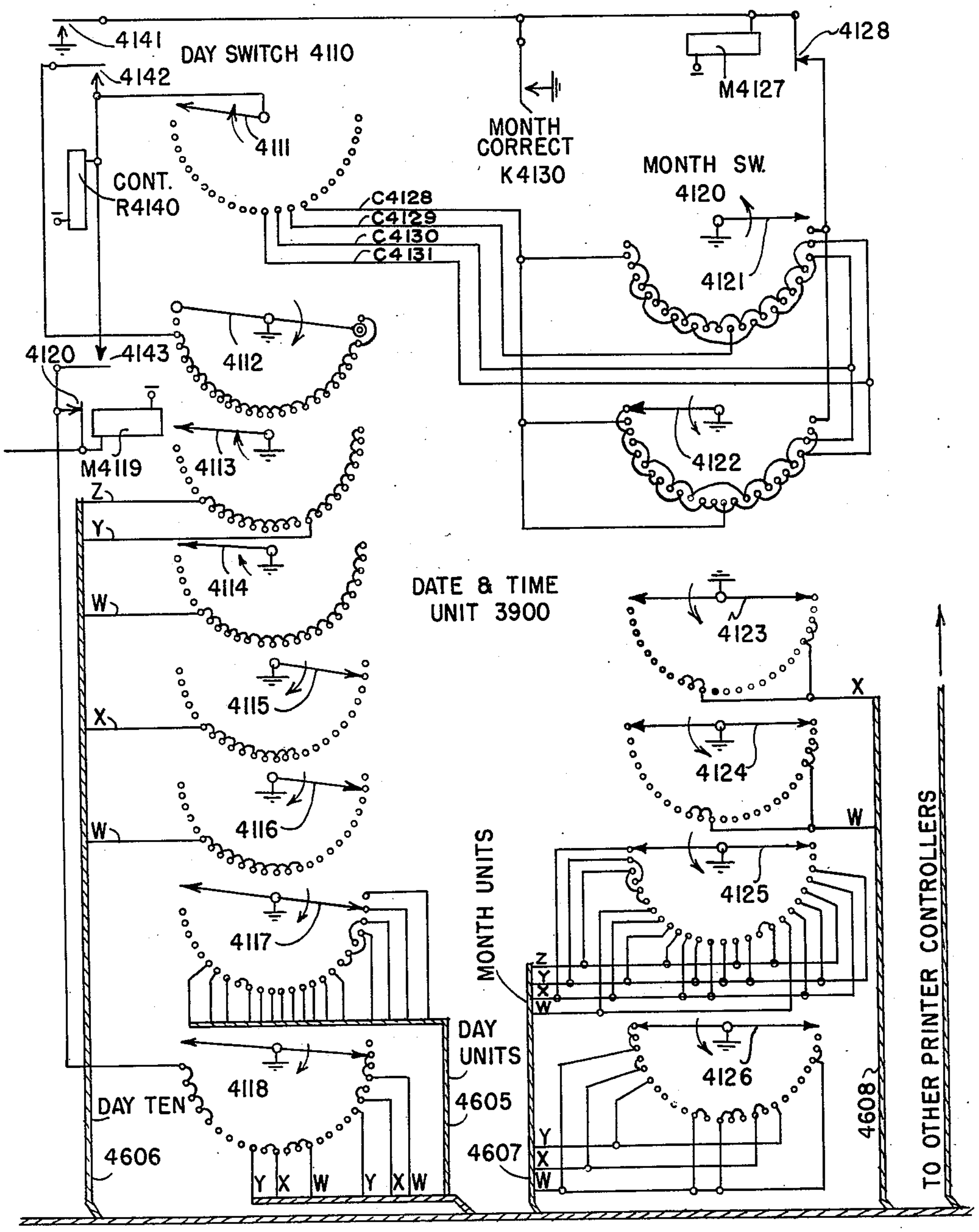
Figure 50:
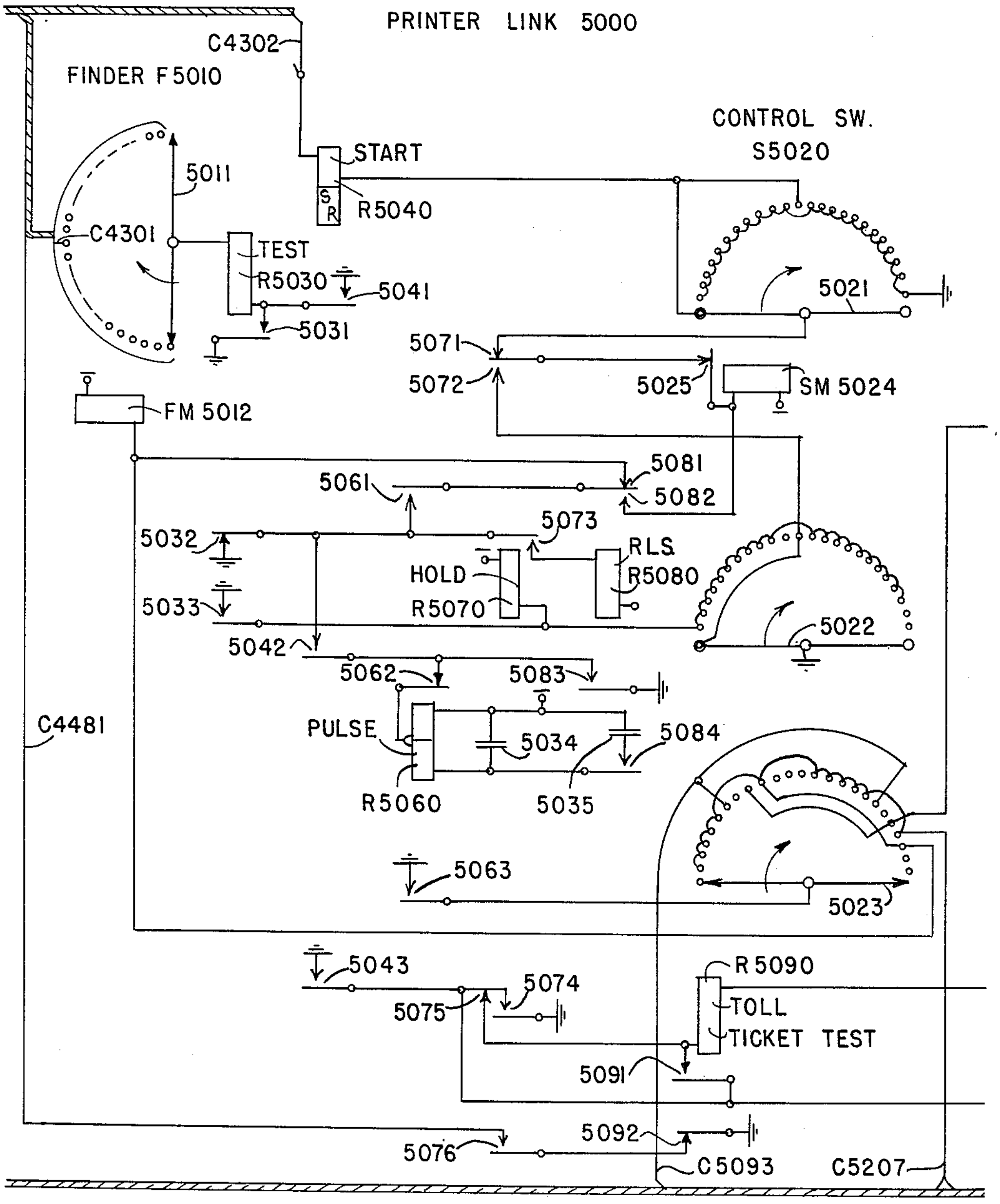
Figure 51:
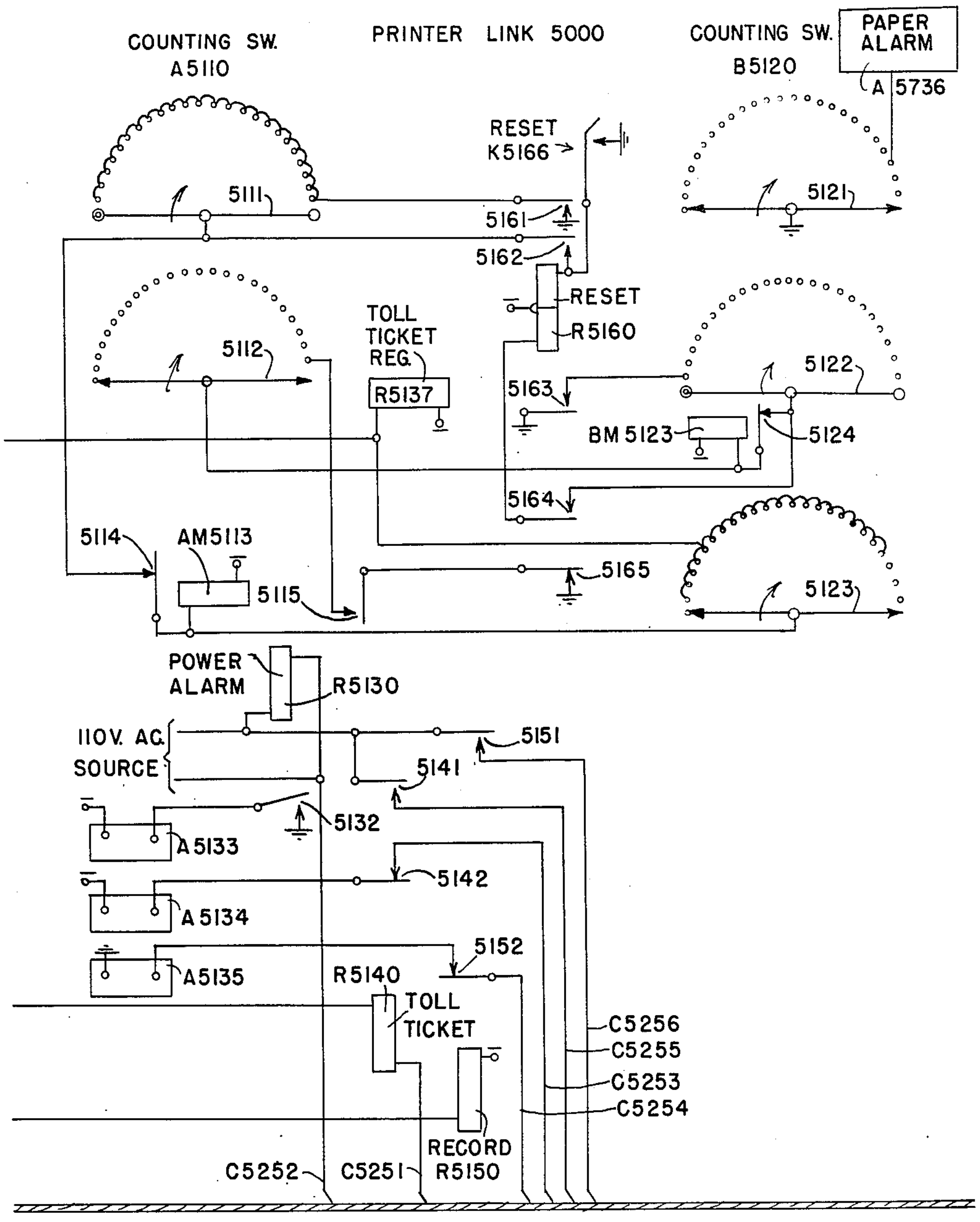

More particularly, Figs. 4 to 7, inclusive, illustrate the details of the switching apparatus and trunking network incorporated in exchange 4 zone 84 of the telephone system; Figs. 8 to 11, inclusive, illustrate the details of one of the toll ticket repeaters provided in exchange 4 zone 84 of the telephone system; Figs. 12 to 16, inclusive, illustrate the details of one of the primary registers provided in exchange 4 zone 84 of the telephone system; Figs. 17 to 28, inclusive, illustrate the details of one of the register translators provided in exchange 4 zone 84 of the telephone system; Figs. 29 to 38, inclusive, illustrate the details of the detector provided in exchange 4 zone 84 of the telephone system; Figs. 39 to 41, inclusive, illustrate the details of the date and time unit provided in exchange 4 zone 84 of the telephone system; Figs. 42 to 49, inclusive, illustrate the details of one of the printer controllers provided in exchange 4 zone 84 of the telephone system; Figs. 50 and 51 illustrate the details of the printer link provided in exchange 4 zone 84 of the telephone system; and Fig. 52 illustrates diagrammatically certain details of the toll ticket printer and the record printer provided in exchange 4 zone 84 of the telephone system.

*The general arrangement of the telephone system*

Referring now more particularly to Fig. 1 of the drawings, it will be observed that the automatic telephone system serves a large metropolitan area and the adjacent suburban areas which are divided into a number of subareas or zones, each of which includes one or more exchanges. More specifically, the area served by the telephone system comprises the zones 27, 45, 68 and 84; the zone 27 includes the exchanges 1, 2, 3 and 9; the zone 45 includes the exchanges 1 and 6 illustrated; the zone 68 includes the single exchange illustrated; and the zone 84 includes the exchanges 1, 4, 5, 6 and 7 illustrated. Further it is noted that in some of the zones two exchanges are housed together. For example, in zone 27, exchanges 1 and 2 are housed together; while in zone 84 exchanges 4 and 5 are housed together. Each exchange in each zone comprises a 10,000 terminal unit; although it may not be initially installed to serve its ultimate terminal capacity. The lines terminating at each exchange in each zone comprise both private subscriber lines and party subscriber lines; the private subscriber lines including ordinary subscriber lines, denied toll service subscriber lines and extended service subscriber lines; and the party subscriber lines being of the four-substation type. The party subscriber lines are arranged on a terminal-per-substation basis, thereby reducing the actual number of lines terminating at each exchange.

The various exchanges in each zone are interconnected by suitable groups of trunk lines; while at least one exchange in each zone is interconnected with at least certain of the exchanges in other zones by suitable groups of toll lines, as clearly indicated.

In the automatic telephone system the various local, trunk and toll calls are set up by automatic switching apparatus under the control of the subscriber substation equipment, including the usual calling device or dial. In order to facilitate the setting up of various connections, a mixed numbering scheme is utilized in the automatic telephone system, whereby all called subscriber substations in the various exchanges in the various zones of the system are dialed as listed in the directory. Accordingly the directory number of each subscriber substation in the telephone system comprises a code portion, including either two or three digits, and a numerical portion, including four digits. More particularly, the directory number of each subscriber substation in zone 68 comprises a code portion, including only the digits 6 and 8, in view of the fact that there is only one exchange in this zone; whereas the directory number of each subscriber substation in zones 27, 45 and 84 comprise a code portion, including three digits, in view of the fact that there are a plurality of exchanges in each of these zones. Thus it will be understood that the directory number of each subscriber substation in zone 84, for example, will comprise a code portion, including the digits 8 and 4 and an additional digit identifying the particular exchange in zone 84, including the subscriber substation. Accordingly the directory number of each subscriber substation in exchange 4 zone 84, for example, will comprise a code portion, including the digits 8, 4 and 4. Further, it is pointed out that in view of the fact that the party subscriber lines are arranged on a terminal-per-substation basis, the directory number of each subscriber substation in each exchange in each zone comprises, in addition to the code portion, a numerical portion, including only four digits; no suffix digits being necessary. In view of the above, it will be understood that the directory numbers of the various subscriber substations in the telephone system comprise different numbers of digits, the number of digits varying between six and seven, depending upon the particular zone of the exchange, including the subscriber substation.

*The apparatus incorporated in exchange 4 zone 84 of the telephone system*

Preferably, each exchange in the telephone system comprises apparatus substantially identical to that provided in exchange 4 zone 84, which apparatus, as best shown in Figs. 2 and 3, includes automatic switching equipment serving a maximum of 10,000 terminals, three of the terminals respectively terminating the private subscriber lines 401, 404 and 407 and four of the terminals commonly terminating the party subscriber line 410. The switching equipment comprises a number of line switches individually associated with the subscriber lines terminating at exchange 4 zone 84, the line switches 421, 422, 423 and 424 being respectively associated with the private subscriber lines 401, 404 and 407 and the party subscriber line 410. At this point it is noted that the private subscriber line 401 has a private subscriber substation TX connected thereto which is rendered extended private subscriber substation service; the private subscriber line 404 has a private subscriber substation TD connected thereto which is rendered denied toll private subscriber substation service; the private subscriber line 407 has a private subscriber substation TP connected thereto which is rendered ordinary private subscriber substation service; while the party subscriber line 410 has four party subscriber substations TS1, TS2, TS3 and TS4 connected thereto, which are rendered party subscriber substation service. More particularly, the ordinary private subscriber substations TP, etc. and the party subscriber substations TS1, TS2, TS3, TS4, etc. are rendered free automatic local service, automatic toll service to the exchanges in the various zones in the metropolitan area for which charges are made on a monetary basis, as well as long distance toll service via a manual toll operator position. The extended service private subscriber substations TX etc. are rendered free automatic local service, free automatic toll service to certain exchanges in adjacent zones in the metropolitan area, automatic toll service to other exchanges in the various zones in the metropolitan area for which charges are made on a unit call basis, as well as long distance toll service via a manual toll operator position. Finally the denied toll service private subscriber substations TD etc. are rendered free automatic local service, toll service to the exchanges in the various zones in the metropolitan area via a manual interceptor operator position, as well as long distance toll service via a manual toll operator position.

Further it is noted that the line switches 421 etc. terminating the extended service private subscriber lines 401 etc., as well as the line switches 422 etc., terminating the denied toll service private subscriber lines 404 etc., are arranged in a first group; while the line switches 423 etc., terminating the ordinary private subscriber lines 407 etc., as well as the line switches 424 etc., terminating the party subscriber lines 410 etc., are arranged in a second group. Also the switching equipment comprises a first group of primary selectors, including the primary selector 441, which is accessible to the various line switches 421, 422, etc., in the first group; as well as a second group of primary selectors, including the primary selector 600, which is accessible to the various line switches 423, 424 etc. in the second group. Each primary selector is provided with an individually associated finder having access to a group of primary registers, the finders F442 and F610 being respectively associated with the primary selectors 441 and 600.

Further, exchange 4 zone 84 is provided with a group of primary registers, including the primary register 1200, which is accessible to the various finders individually associated with the primary selectors in the two groups. Further, exchange 4 zone 84 is provided with a group of register translators, including the register translator 1700, and a register translator allotter 1600. The register translator allotter 1600 comprises a finder F1610 having access to the group of register translators; and each register translator comprises a finder having access to the group of primary registers, the register translator 1700 comprising the finder F2290 having access to the group of primary registers. At this point it is noted that the group of primary registers is larger than the group of register translators in order to effect a saving in equipment, in view of the fact that the connection and arrangement of a primary register is much more simplified than the relatively complex connection and arrangement of a register translator.

Also exchange 4 zone 84 is provided with a local switch train comprising a number of groups of first selectors, one of the groups including the first selector 501, a number of groups of second selectors, one of the groups including the second selector 502, a number of groups of individual connectors, one of the groups including the individual connector 525, a number of special service selectors, including the special service selector 503, and a number of groups of party connectors, four of the groups respectively including the party connectors 521, 522, 523 and 524. A switchboard is also provided in exchange 4 zone 84 which includes a manual operator position 0, a toll operator position 110, a miscellaneous operator position 112, an information operator position 113 and an interceptor operator position 114—117. At this point it is noted that four groups of trunks terminate at the interceptor operator position 114—117; and calls are routed over the trunks in the various ones of these groups to the interceptor operator position 114—117 in order to indicate to the operator thereat the particular origin of the intercepted call, in a manner more fully explained hereinafter.

In addition to the apparatus described above, exchange 4 zone 84 is provided with toll ticketing apparatus comprising, in addition to the number of register translators, including the register translator 1700, a number of groups of toll ticket repeaters, one of the groups including the toll ticket repeater 452 and another of the groups including the toll ticket repeater 800, a detector 2900, a number of printer controllers, including the printer controller 4200, a printer controller allotter 4600, a date and time unit 3900, a printer link 5000, a toll ticket printer 5230 and a record printer 5240. The printer controller allotter 4600 comprises a finder F4640 having access to the printer controllers; and each printer controller comprises a finder having access to the toll ticket repeaters, the printer controller 4200 comprising the finder F4210 having access to the toll ticket repeaters. The printer link 5000 comprises a finder F5010 having access to the printer controllers and is directly connected to the toll ticket printer 5230 and the record printer 5240. The date and time unit 3900 is commonly associated with the printer controllers.

Further, exchange 4 zone 84 comprises a number of groups of ordinary repeaters, one of the groups including the ordinary repeater 451, and a number of groups of toll selectors individually associated with the various groups of toll ticket repeaters and ordinary repeaters. For example, the toll selectors 511, 512 and 513 are respectively individually associated with the ordinary repeater 451 and the toll ticket repeaters 452 and 800. Also extending from exchange 4 zone 84 are a number of groups of outgoing trunks to other exchanges in zone 84, one of the groups including the outgoing trunk 506 extending to exchange 1 zone 84, and a number of groups of incoming trunks from the other exchanges in zone 84, not shown. Finally a number of groups of two-way toll lines extend between exchange 4 zone 84 and certain exchanges in the other zones. For example, the group of two-way toll lines, including the toll line 470, extends between exchange 4 zone 84 and exchange 6 zone 45. Each toll line is provided with a toll line circuit comprising a trunk incoming to one of the groups of incoming first selectors; for example, the toll line 470 is provided with a toll line circuit 504 comprising a trunk 505 incoming to a first selector, similar to the first selector 501 in the local switch train.

In exchange 4 zone 84 the various primary selectors have access to the first selectors in the local switch train, to the special service selectors, to the outgoing trunks extending to the other exchanges in zone 84, to the manual operator position 0, to the ordinary repeaters and to the toll ticket repeaters; while the various special service selectors have access to the toll operator position 110, to the miscellaneous operator position 112, to the information operator position 113 and to the interceptor operator position 114—117. Also the various first selectors in the local switch train have access to the different groups of second selectors; while the various groups of second selectors have access to a corresponding number of the groups of individual connectors and to a corresponding number of the groups of party connectors. For example, the group of second selectors, including the second selector 502, has access to the group of individual connectors, including the individual connector 525, and to the four groups of party connectors, respectively including the party connectors 521, 522, 523 and 524. Further each individual connector has access to an associated group of the private subscriber lines; and each party connector in each related group of four has access to an associated group of the party subscriber lines. For example, the individual connector 525 has access to a group of 100 private subscriber lines, including the private subscriber lines 401, 404 and 407; while the four party connectors 521, 522, 523 and 524 each have access to 100 party subscriber lines, including the party subscriber line 410. At this point it is noted that each of the party connectors 521, 522, 523 and 524 is adapted to seize the party subscriber line 410 and respectively to project ringing current thereover, having the respective frequencies in cycles per second of 66, 50, 33 and 16. Also, incoming selectors are provided, similar to the various first selectors 501 in the local switch train, each of which is individual to the trunk lines in the groups of incoming trunks from the other exchanges in zone 84 and to the toll lines in the groups of toll lines from the other zones. Finally it is noted that the various toll selectors have access to the various groups of toll lines extending to the exchanges in other zones.

Further it is noted that the detector 2900 has access to each subscriber line terminating at exchange 4 zone 84 and is commonly associated with the various register translators in exchange 4 zone 84. Further each printer controller in exchange 4 zone 84 is accessible to the printer controller allotter 4600 therein and has access to each toll ticket repeater therein. Finally each printer controller is accessible to the printer link 5000; while the printer link 5000 is directly connected to the toll ticket printer 5230 and to the record printer 5240. Moreover, the date and time unit 3900 in exchange 4 zone 84 is commonly associated with each printer controller therein.

Each subscriber substation in exchange 4 zone 84 is provided with substation apparatus including a telephone instrument, a ringer and a calling device or dial. The calling devices disposed at each ordinary private subscriber substation, at each extended service private subscriber substation and at each first party subscriber substation are of conventional construction and arrangement; while the calling devices disposed at each denied toll service private subscriber substation and at each second, third and fourth party subscriber substation are of special construction. More particularly, the calling device disposed at each denied toll service private subscriber substation is of the construction and arrangement of that disclosed in U. S. Patent No. 1,858,863, John E. Ostline, granted May 17, 1932; while the calling device disposed at each second, third and fourth party subscriber substation is of the construction and arrangement of that disclosed in the copending application of John E. Ostline, Serial No. 404,103, filed July 26, 1941, now Patent No. 2,410,520, granted November 5, 1946.

Figure 4:
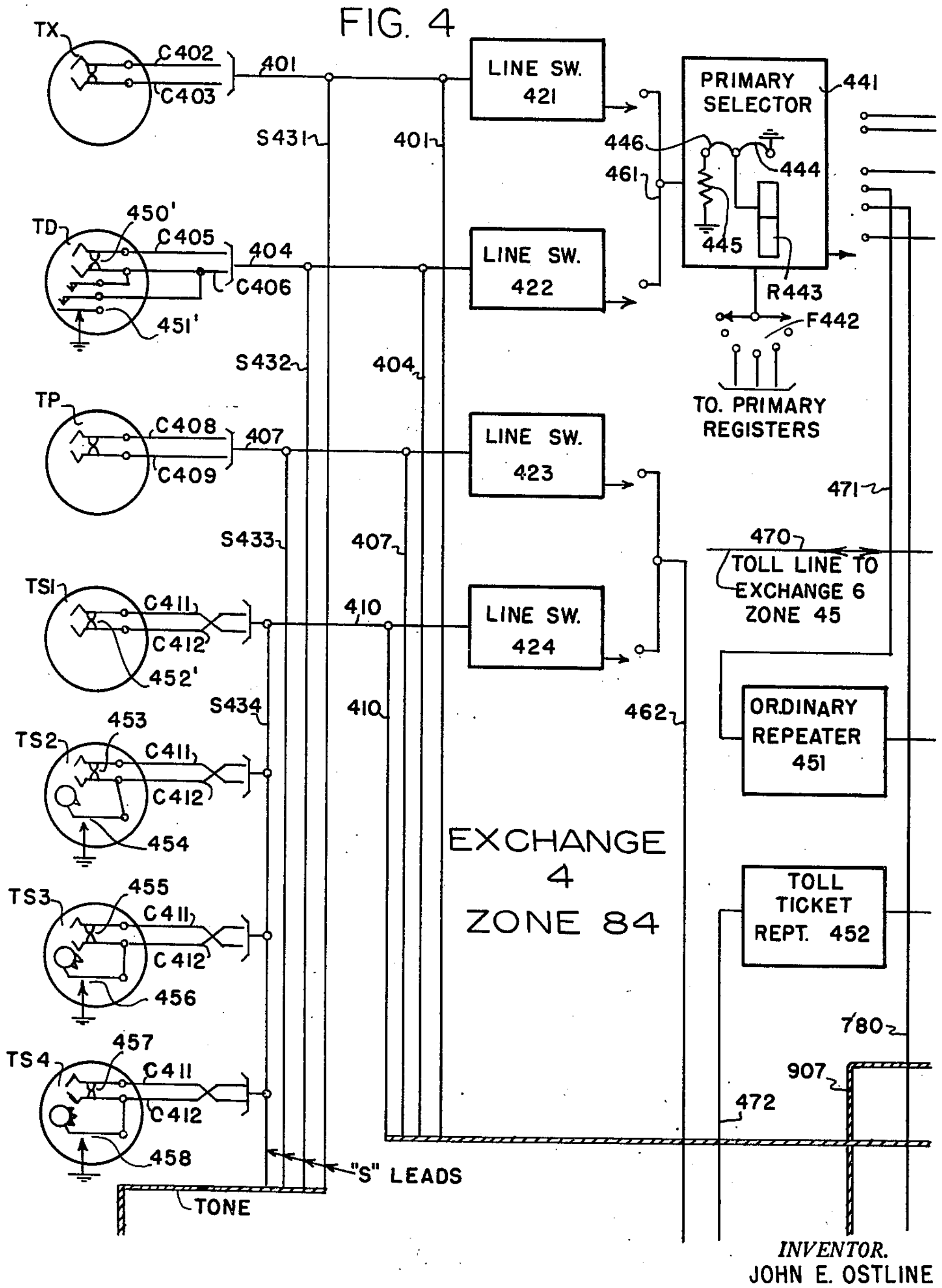

For example, the calling device disposed at the denied toll service private subscriber substation TD is of the special construction mentioned, comprising, as best shown in Fig. 4, in addition to a set of impulse springs, a set of cam springs. In this calling device, the set of impulse springs is operated in accordance with the pull of the associated finger wheel in order to transmit a corresponding variable series of switch control impulses; while a set of cam springs is operated by an associated cam governed by the associated finger wheel in order to transmit a first ground impulse when the finger wheel is moved away from its home position and then to transmit a second ground impulse when the finger wheel is returned to its home position. More specifically, each time the finger wheel of the calling device at the denied toll service private subscriber substation TD is pulled in accordance with any digit the associated cam operates the set of cam springs to transmit two ground impulses over the associated private subscriber line 404.

Also the calling devices respectively disposed at the second party subscriber substation TS2, at the third party subscriber substation TS3 and at the fourth party subscriber substation TS4, connected to the party subscriber line 410, are of the special construction mentioned; each comprising, as best shown in Fig. 4, in addition to a set of impulse springs, a set of cam springs. In each of these calling devices the set of impulse springs is operated in accordance with the pull of the associated finger wheel in order to transmit a corresponding variable series of switch control impulses; while the set of cam springs is operated by an associated cam governed by the associated finger wheel in order to transmit a fixed number of substation identifying ground impulses. More specifically, when the finger wheel of the calling device at the second party subscriber substation TS2 is pulled in accordance with a digit two or more, the associated cam operates the set of cam springs to transmit one substation identifying ground impulse over the associated party subscriber line 410. Similarly, when the finger wheel of the calling device at the third party subscriber substation TS3 is pulled in accordance with a digit two or more, the associated cam operates the set of cam springs to transmit two substation identifying ground impulses over the associated party subscriber line 410. Finally, when the finger wheel of the calling device at the fourth party subscriber substation TS4 is pulled in accordance with a digit two or more, the associated cam operates the set of cam springs to transmit three substation identifying ground impulses over the associated party subscriber line 410.

Preferably, in exchange 4 zone 84, the line switches 421, 422, 423, 424 etc., diagrammatically illustrated in Fig. 4 are of conventional connection and arrangement.

Figure 6:
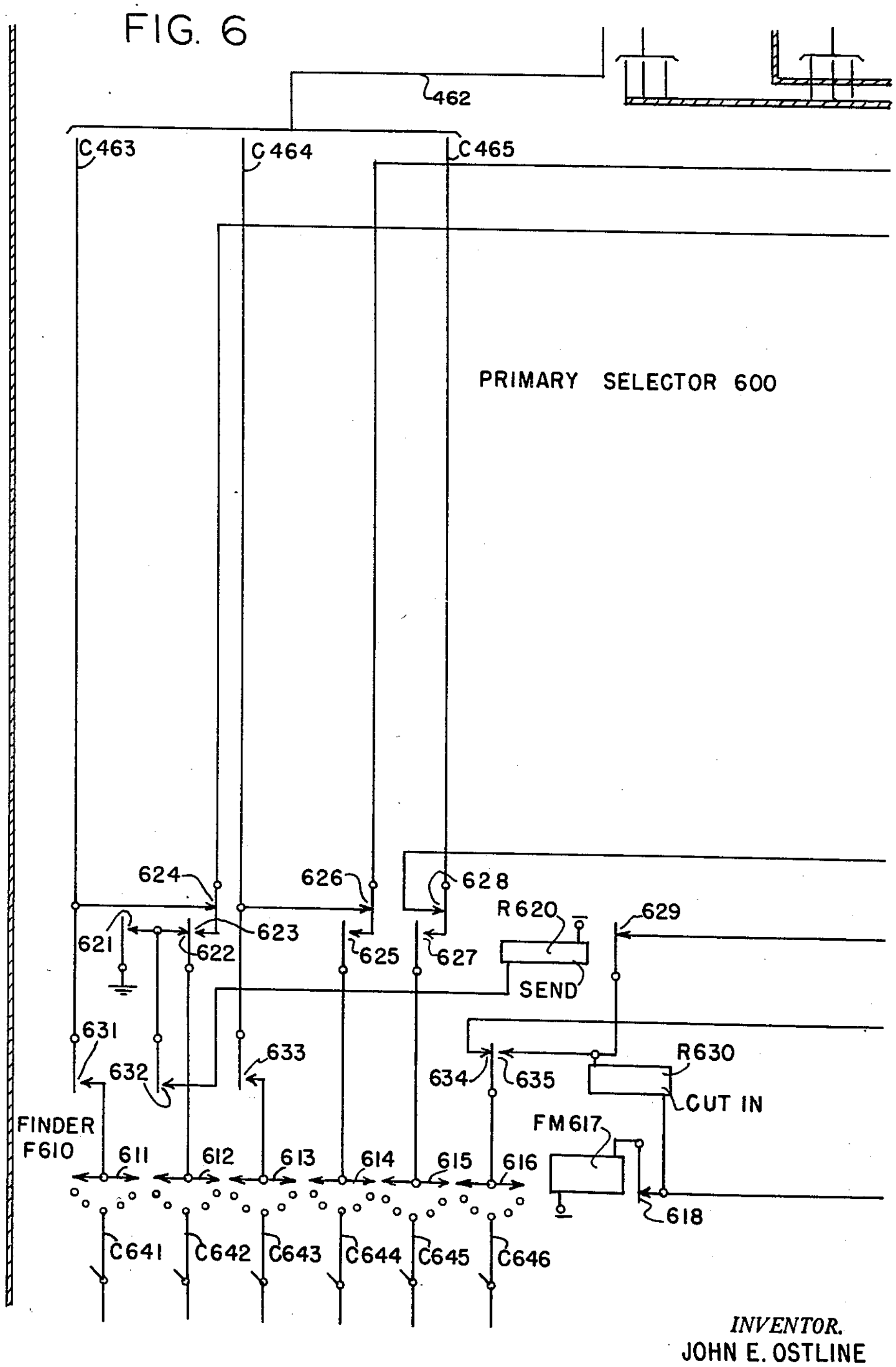
Figure 7:
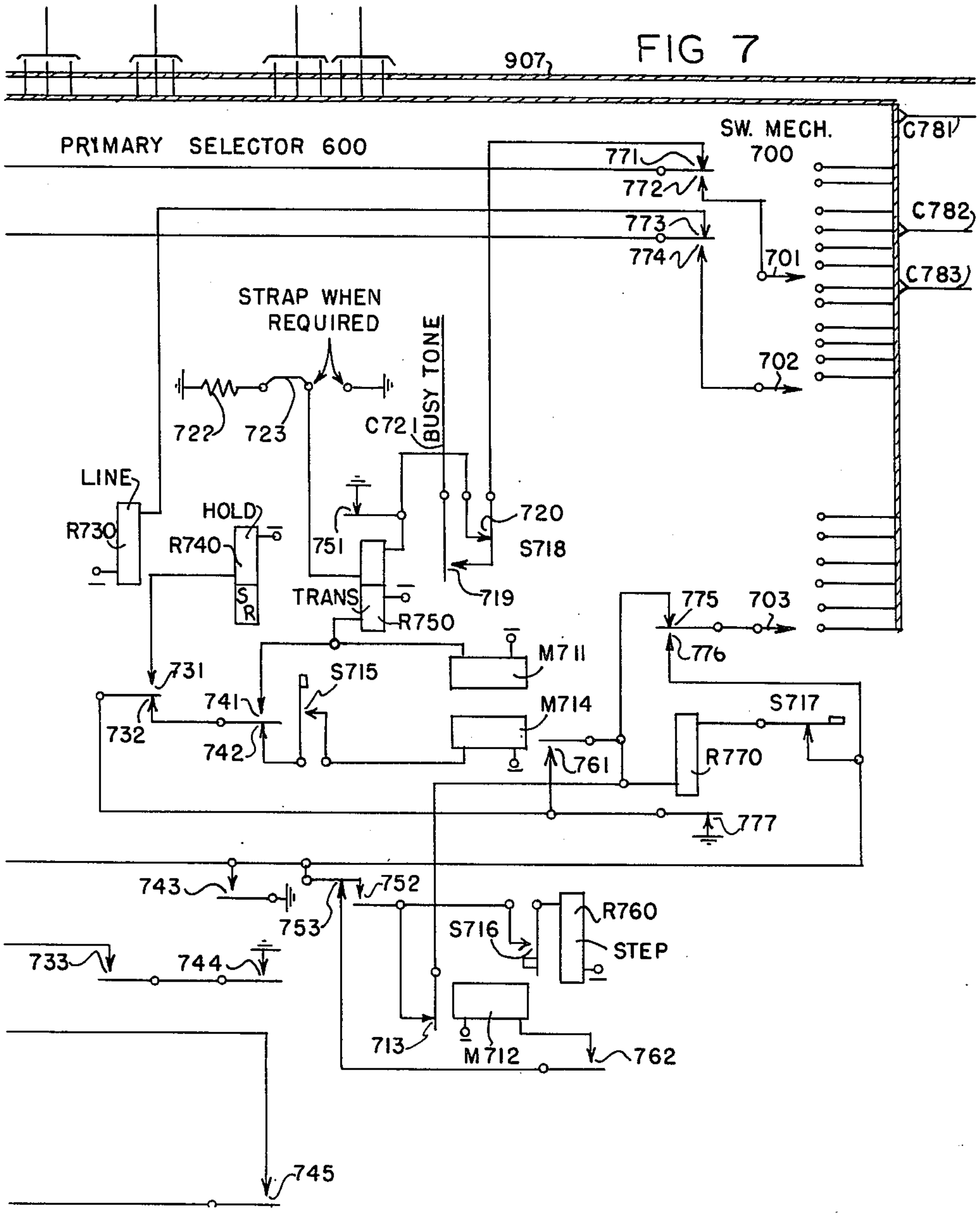
Figure 8:
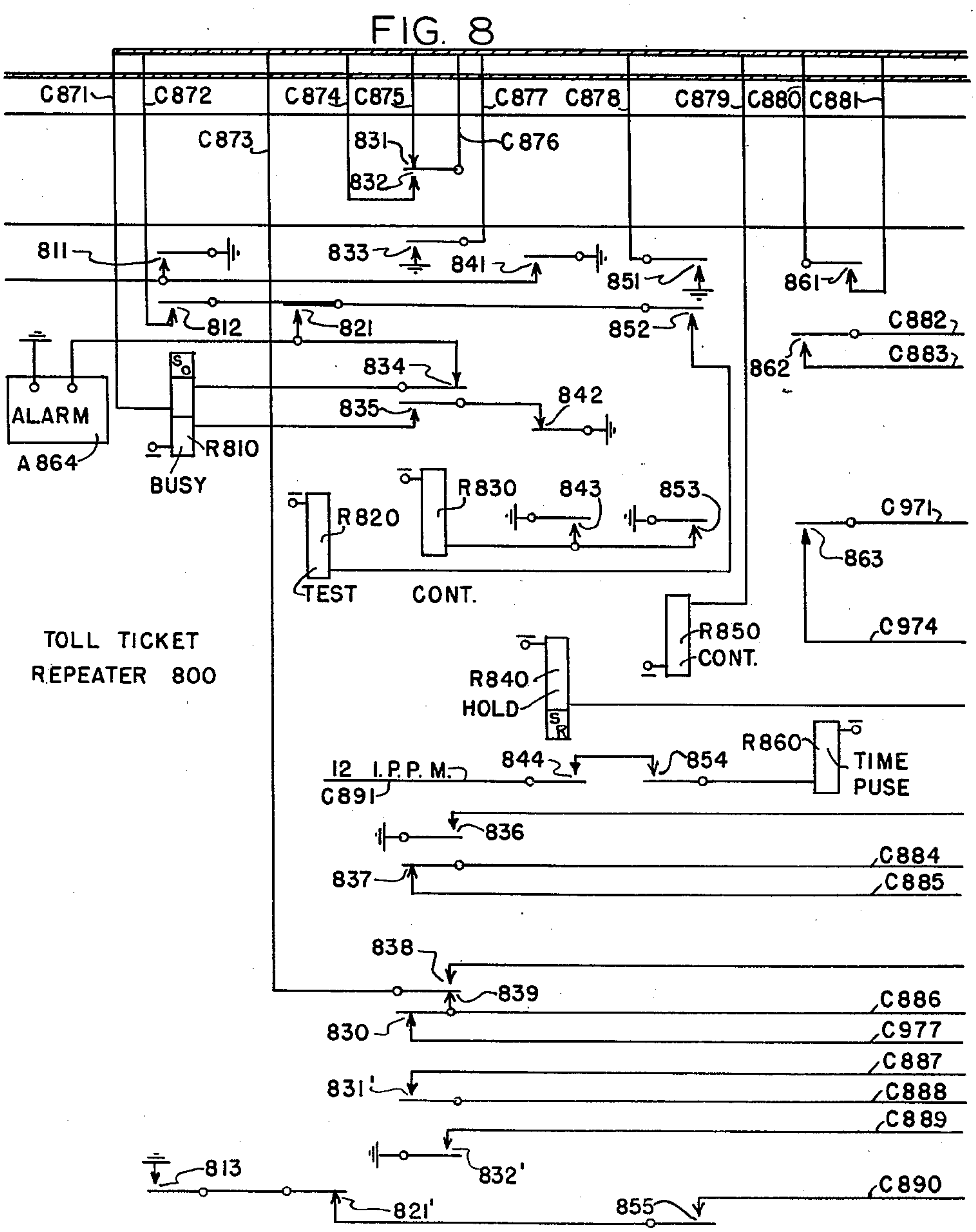
Figure 9:
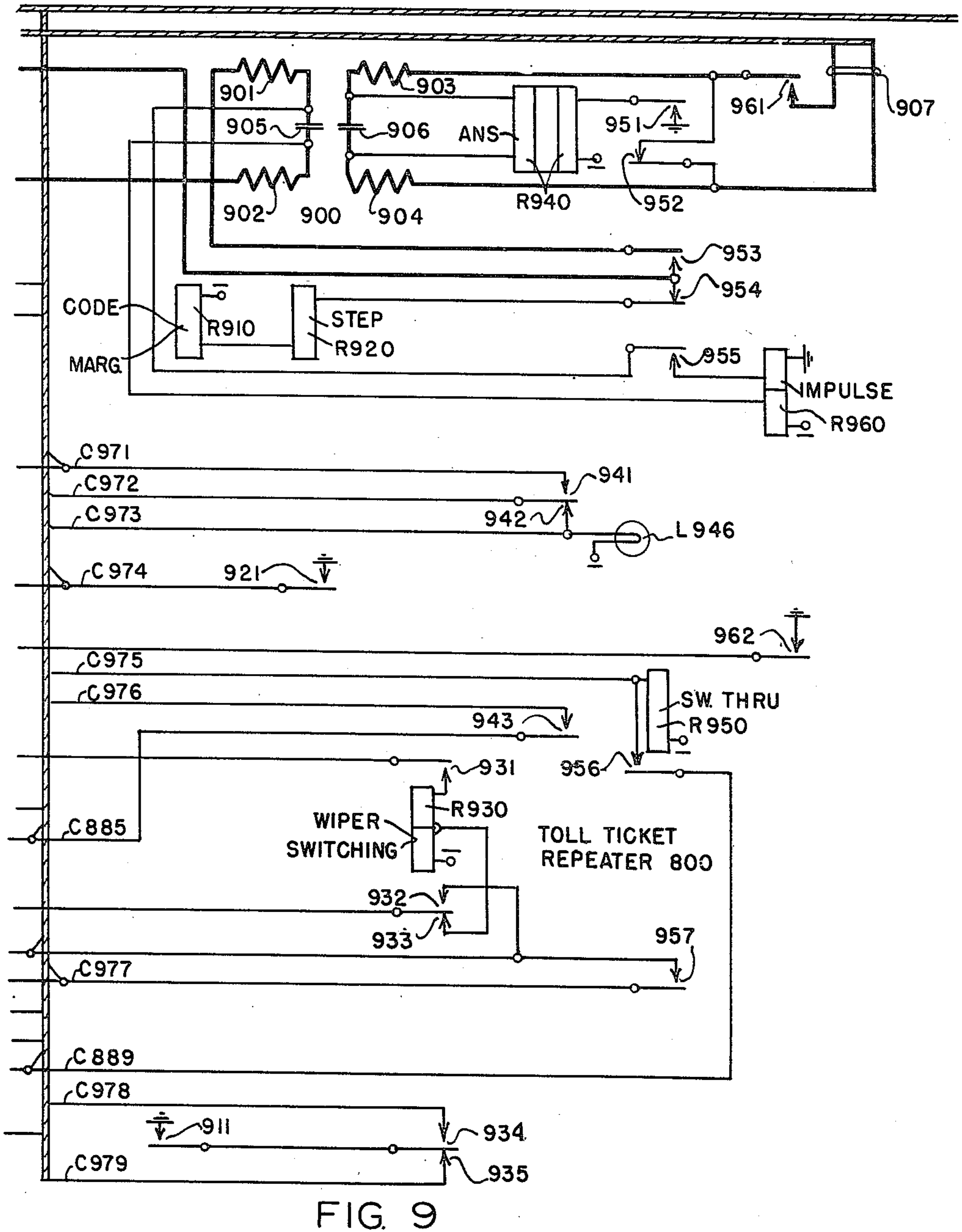
Figure 10:
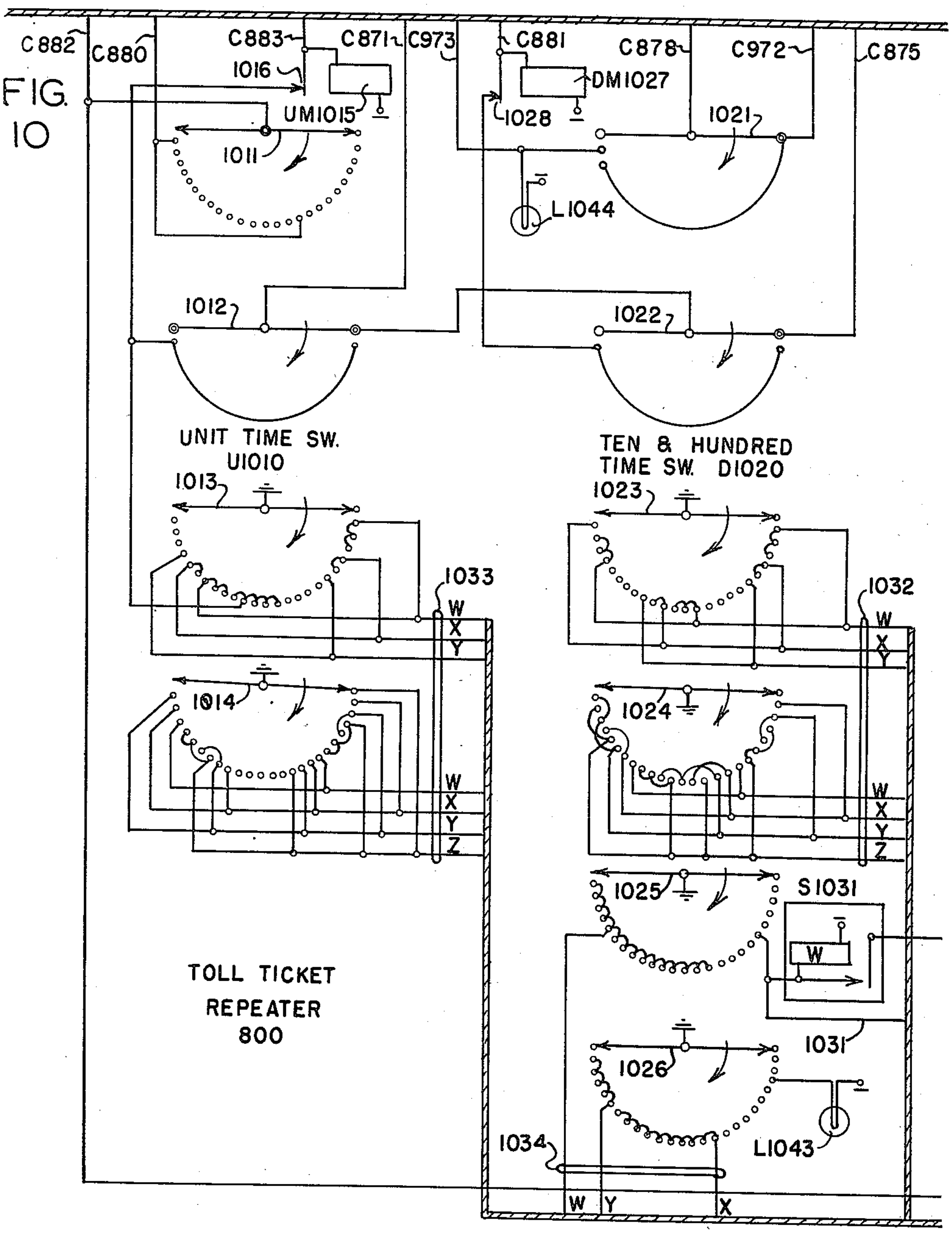
Figure 11:
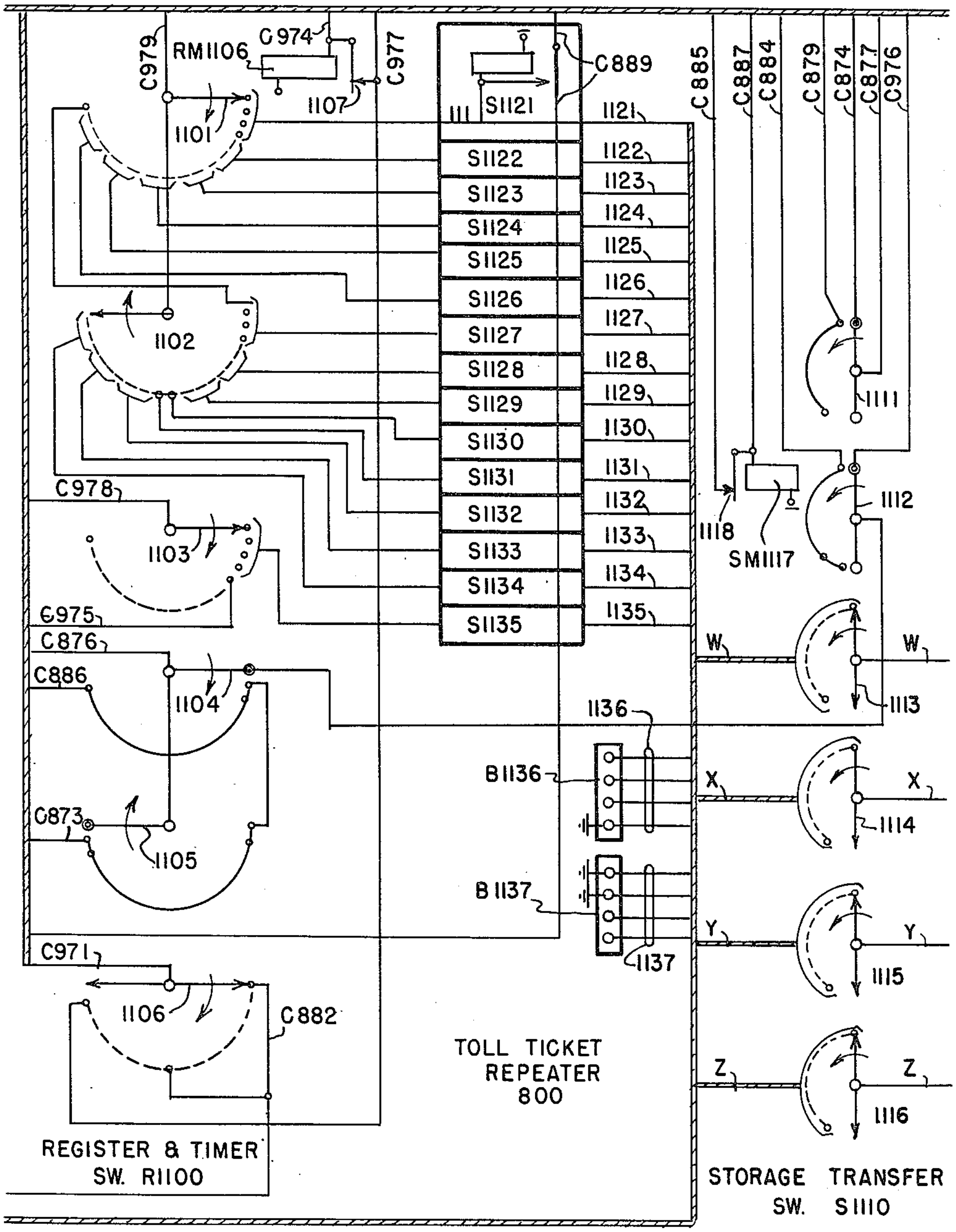
Figure 12:
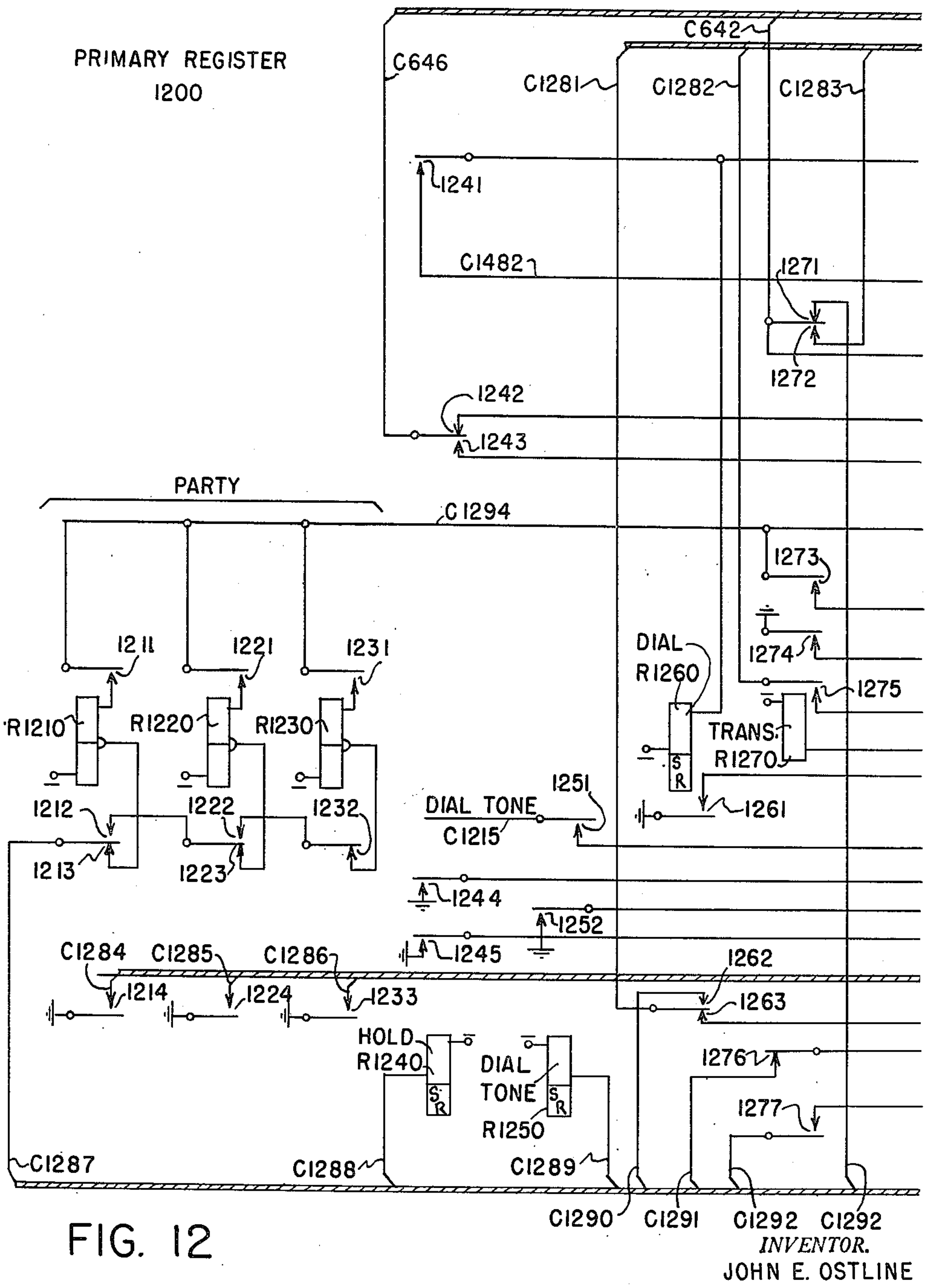
Figure 13:
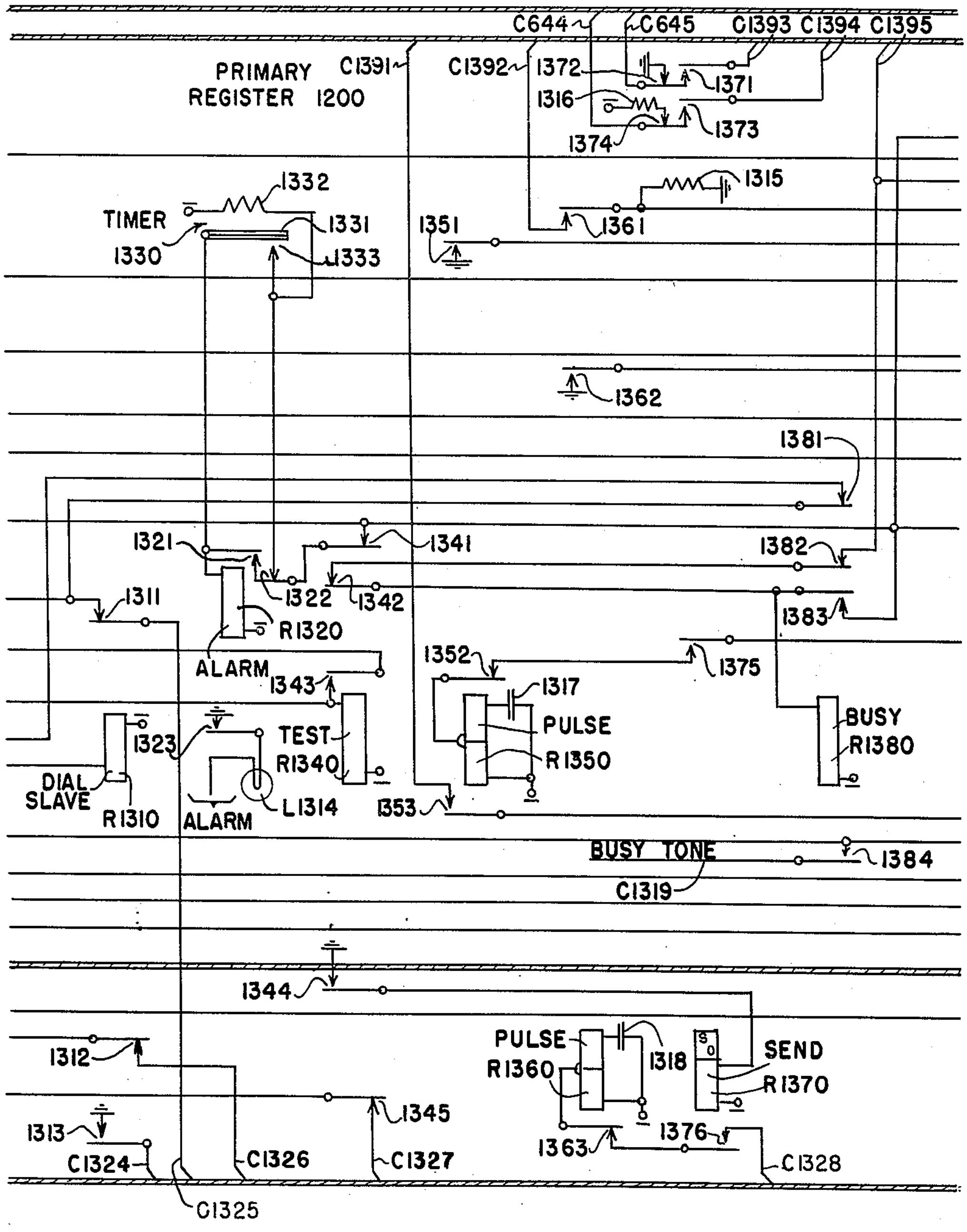
Figure 14:
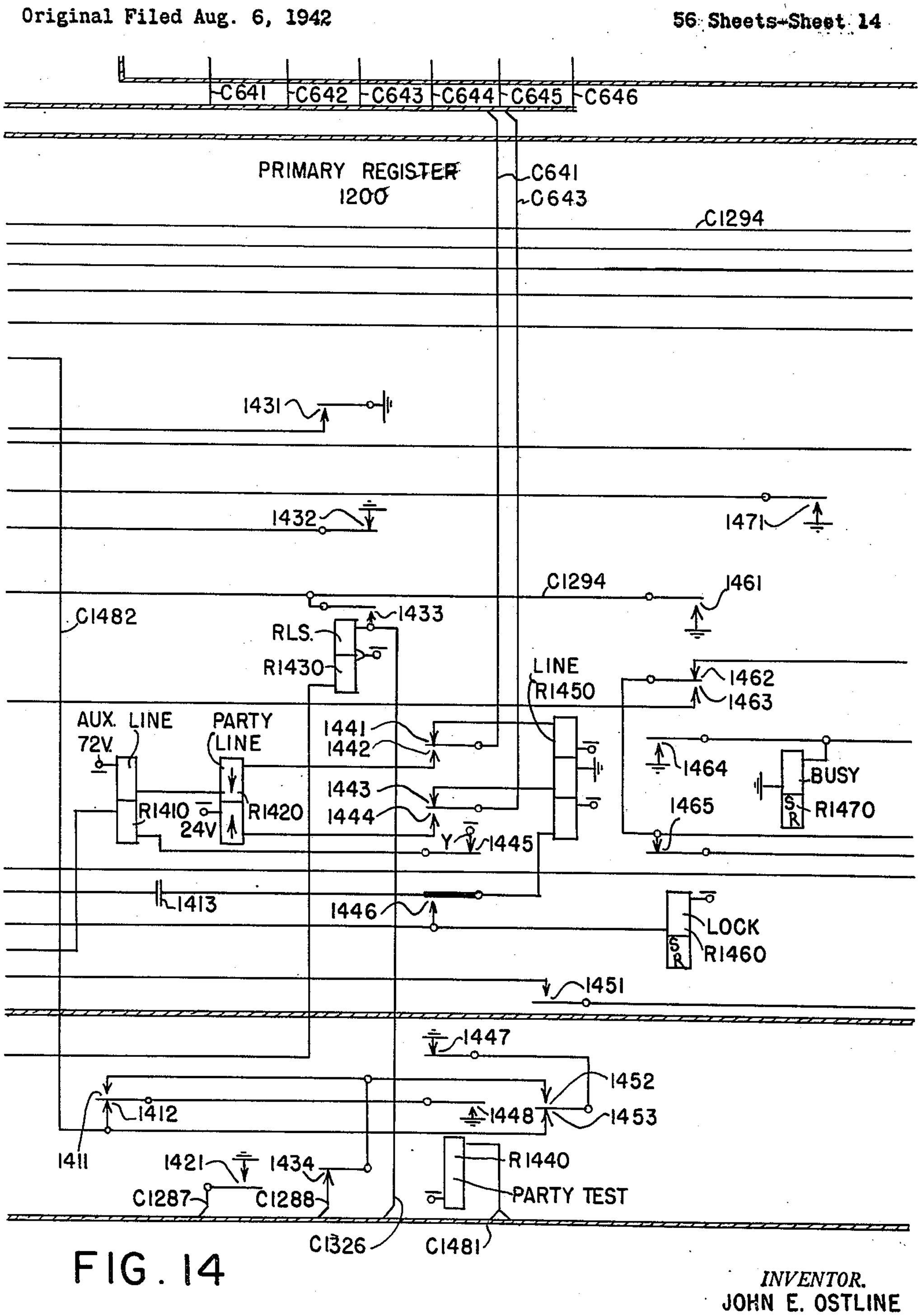
Figure 15:
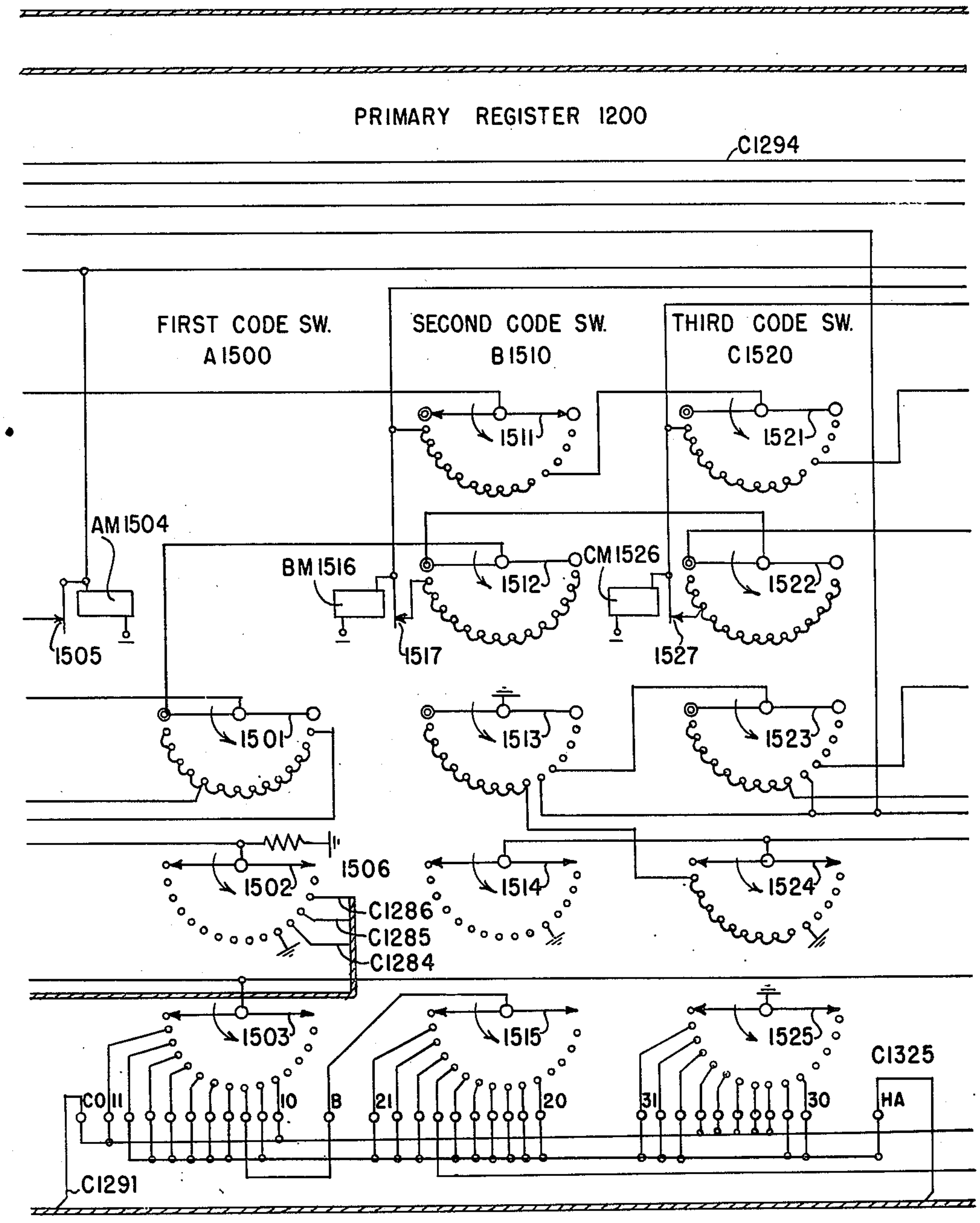

Preferably, in exchange 4 zone 84, each of the primary selectors included in the first group is identical to the primary selector 441, shown in Fig. 4; while each of the primary selectors included in the second group is identical to the primary selector 600, shown in Figs. 6 and 7.

The primary selector 600, shown in Figs. 6 and 7, comprises a switching mechanism 700 of the Strowger type, including a wiper set provided with the wipers 701, 702 and 703 and an associated contact bank; the contact bank including ten vertically spaced-apart rows or levels of contact sets arranged in circumferentially spaced-apart relation. Also the switching mechanism 700 comprises a vertical magnet M711 for driving the wiper set step by step in the vertical direction, a rotary magnet M712 for driving the wiper set step by step in the rotary direction and a release magnet M714 for releasing the wiper set and for causing it to be returned to its normal vertical and rotary positions. Further there are associated with the switching mechanism 700 two sets of switch springs S715 and S716 which are actuated when the wiper set is moved in the vertical direction away from its normal vertical position and two sets of switch springs S717 and S718 which are actuated when the wiper set is moved in the rotary direction eleven steps away from its normal rotary position.

Also the primary selector 600 comprises a relay group including a send relay R620, a cut-in relay R630, a line relay R730, a hold relay R740, a transfer relay R750, a step relay R760 and a switch-through relay R770. Also it is noted that the primary selector 600 comprises a circuit network which is connected and arranged in a manner more fully described hereinafter and which includes a circuit for energizing the upper winding of the transfer relay R750; the last-mentioned circuit comprising a ground connection including the resistor 722 and the strap 723. Accordingly, high resistance ground potential is connected by way of the resistor 722 and the strap 723 to one terminal of the upper winding of the transfer relay R750, for a purpose more fully explained hereinafter.

The primary selector 441, shown in Fig. 4, is connected and arranged in a manner substantially identical to that of the primary selector 600, except that in the primary selector 441 the circuit for energizing the upper winding of the transfer relay R443 includes the strap 444 arranged in multiple with the series connected resistor 445 and the strap 446. Accordingly, direct ground potential is connected by way of the strap 444 to one terminal of the upper winding of the transfer relay R443, for a purpose more fully explained hereinafter.

Preferably, the finders in exchange zone 84 which are individually associated with the primary selectors are identical. For example, the finder F610 individually associated with the primary selector 600 comprises, as best shown in Fig. 6, a rotary switch including six wipers 611 to 616, inclusive, provided with individually associated contact banks, and a magnet FM617 for driving the wipers noted.

Preferably, each of the primary registers in exchange 4 zone 84 is identical to the primary register 1200 which comprises, as best shown in Figs. 12 to 16, inclusive, a first code switch A1500 of the rotary type, including three wipers 1501 to 1503, inclusive, provided with individually associated contact banks, and a magnet AM1504 for driving the wipers noted; a second code switch B1510 of the rotary type, including five wipers 1511 to 1515, inclusive, provided with individually associated contact banks, and a magnet BM1516 for driving the wipers noted; a third code switch C1520 of the rotary type, including five wipers 1521 to 1525, inclusive, provided with individually associated contact banks, and a magnet CM1526 for driving the wipers noted; and a first numerical switch D1620 of the rotary type, including four wipers 1621 to 1624, inclusive, provided with individually associated contact banks, and a magnet DM1625 for driving the wipers noted. Also the primary register 1200 comprises a sequence switch S1630 of the rotary type, including five wipers 1631 to 1635, inclusive, provided with individually associated contact banks, and a magnet SM1636 for driving the wipers noted.

Further the primary register 1200 comprises a relay group including three party relays R1210, R1220 and R1230, a hold relay R1240, a dial tone relay R1250, a dial relay R1260, a translate relay R1270, a dial slave relay R1310, an alarm relay R1320, a test relay R1340, two pulse relays R1350 and R1360, a send relay R1370, a busy relay R1380, an auxiliary line relay R1410, a party line relay R1420, a release relay R1430, a party test relay R1440, a line relay R1450, a lock relay R1460 and a busy relay R1470. Also the primary register 1200 comprises a timer 1330 of the thermostatic type, an alarm lamp L1314, and a control network connected and arranged in a manner more fully described hereinafter In the primary register 1200 the code switches A1500, B1510 and C1520 are adapted, respectively, to register the first, second, and third code digits of a called directory number; the first numerical switch D1620 is adapted to register the first numerical digit of a called directory number; while sequence switch S1630 is arranged to select the code switches A1500, B1510 and C1520 and the first numerical switch D1620 in sequence for purpose of registration. Each of the code switches A1500, B1510 and C1520 is arranged to determine as far as possible, in accordance with the code digit registered therein, whether the call may be completed under the direct control of the calling device at the calling subscriber substation or must be translated by a register translator. Finally, by the time the third code digit is registered in the third code switch C1520, the code switches mentioned have determined whether the call may be completed under the direct control of the calling device at the calling subscriber substation or must be translated by a register translator. In the event the call may be completed under the direct control of the calling device at the calling subscriber substation, the code switches mentioned effect the release of the primary register 1200; on the other hand, in the event the call must be translated by a register translator, the code switches mentioned effect the association of an idle register translator with the primary register.

The pulse relay R1350 is adapted to be controlled by the first code switch A1500 and by the three party relays R1210, R1220 and R1230 to send to the associated register translator the first code digit registered in the first code switch A1500 and the party subscriber substation marking, as determined by the operated positions of the three party relays R1210, R1220 and R1230. The pulse relay R1360 is adapted to be controlled by the second code switch B1510, the third code switch C1520 and the first numerical switch D1620 to send to the associated register translator the second and third code digits and the first numerical digit respectively registered in the second code switch B1510, the third code switch C1520 and the first numerical switch D1620. Finally the line relay R1450 is arranged to send directly to the associated register translator the second, third and fourth numerical digits of the called directory number received from the calling device at the calling subscriber substation.

Figure 16:
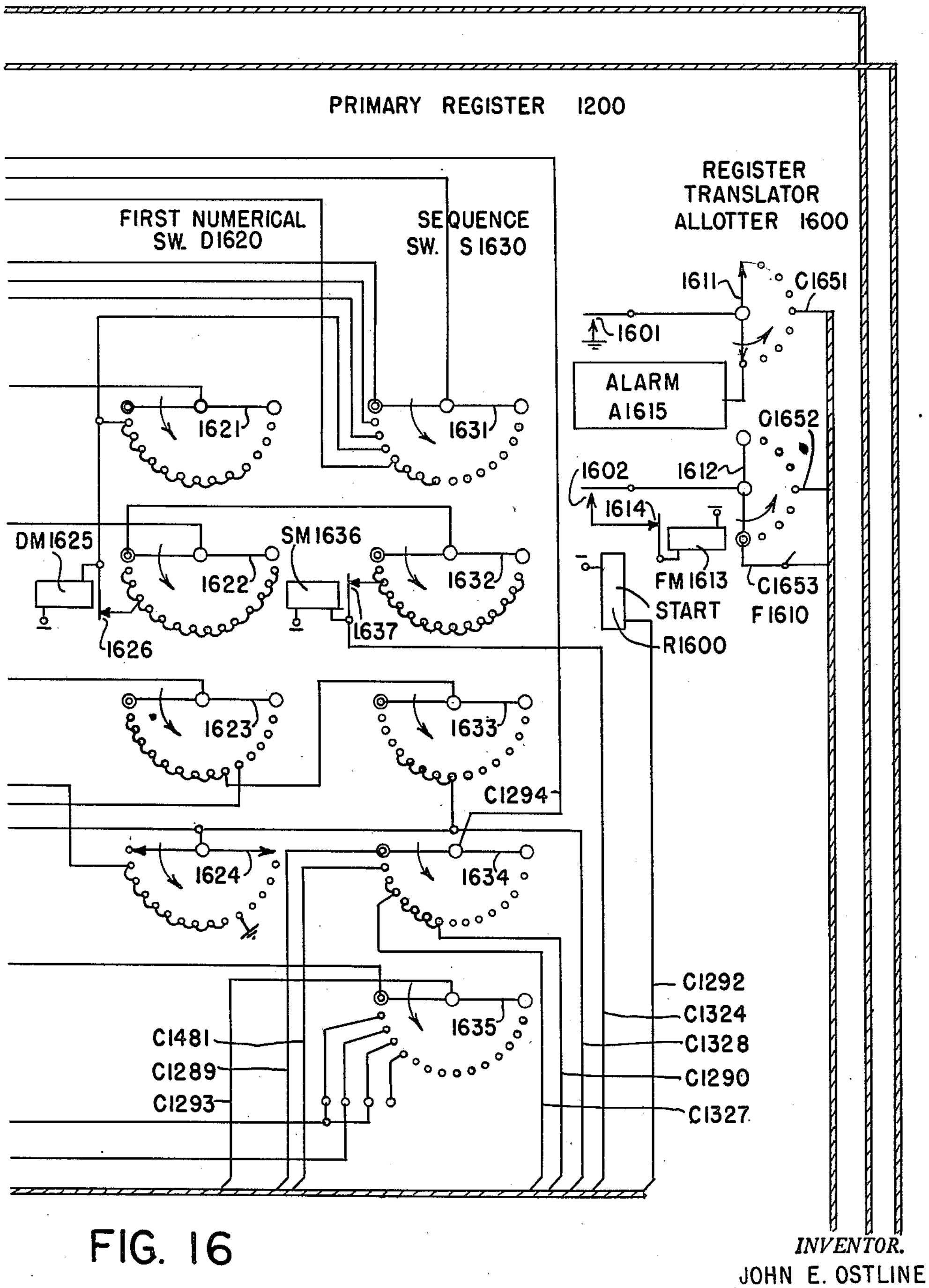
Figure 17:
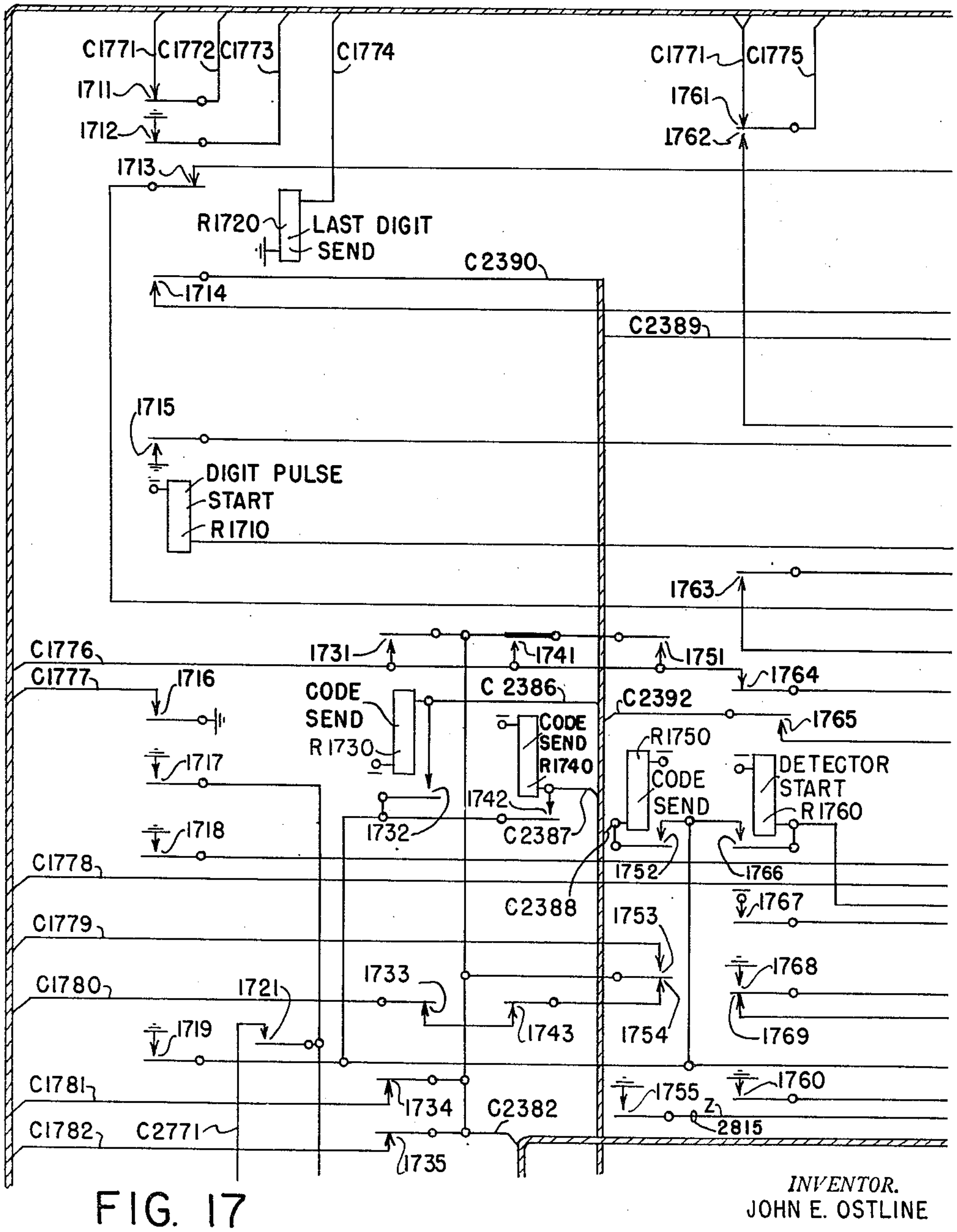
Figure 18:
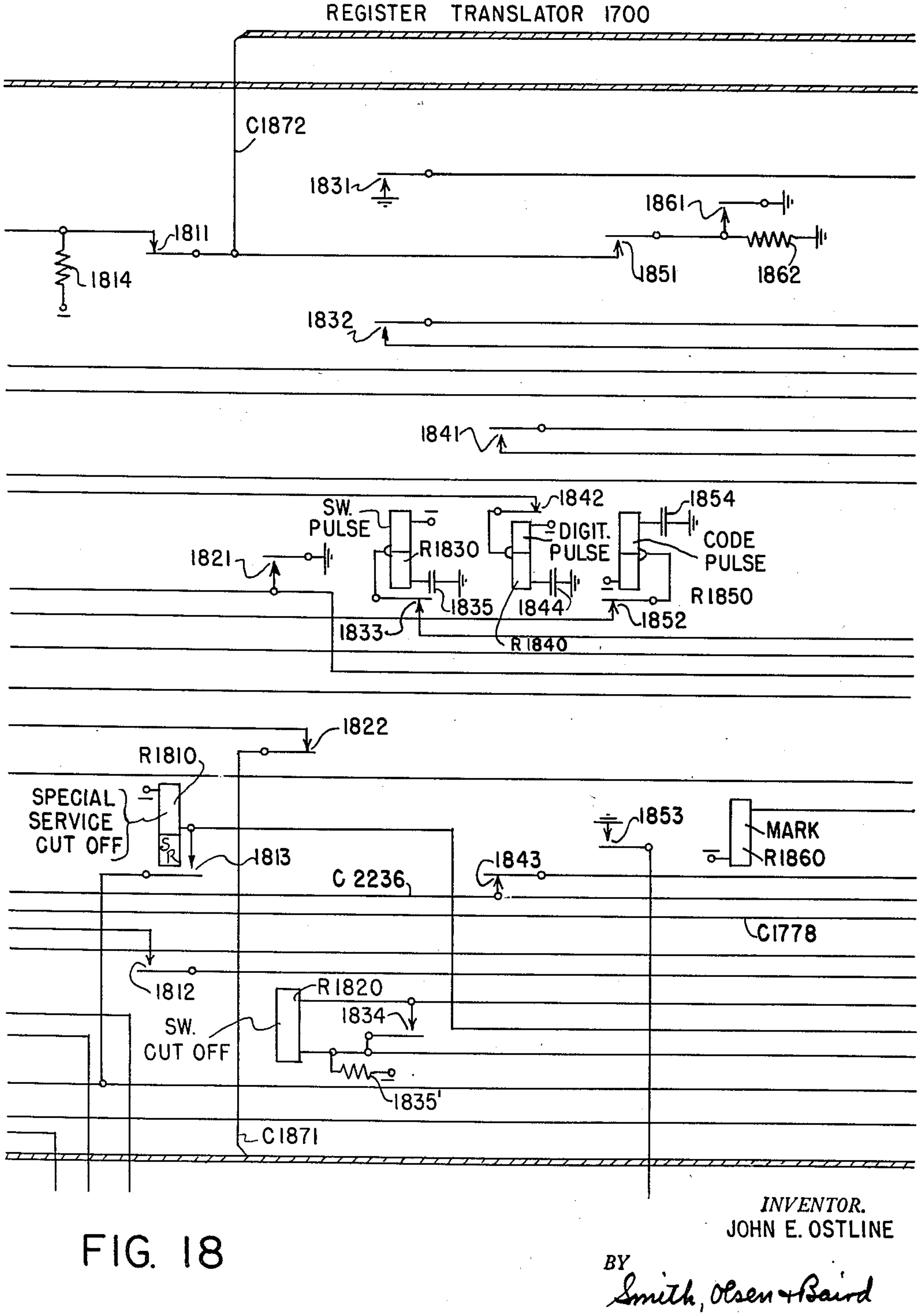
Figure 19:
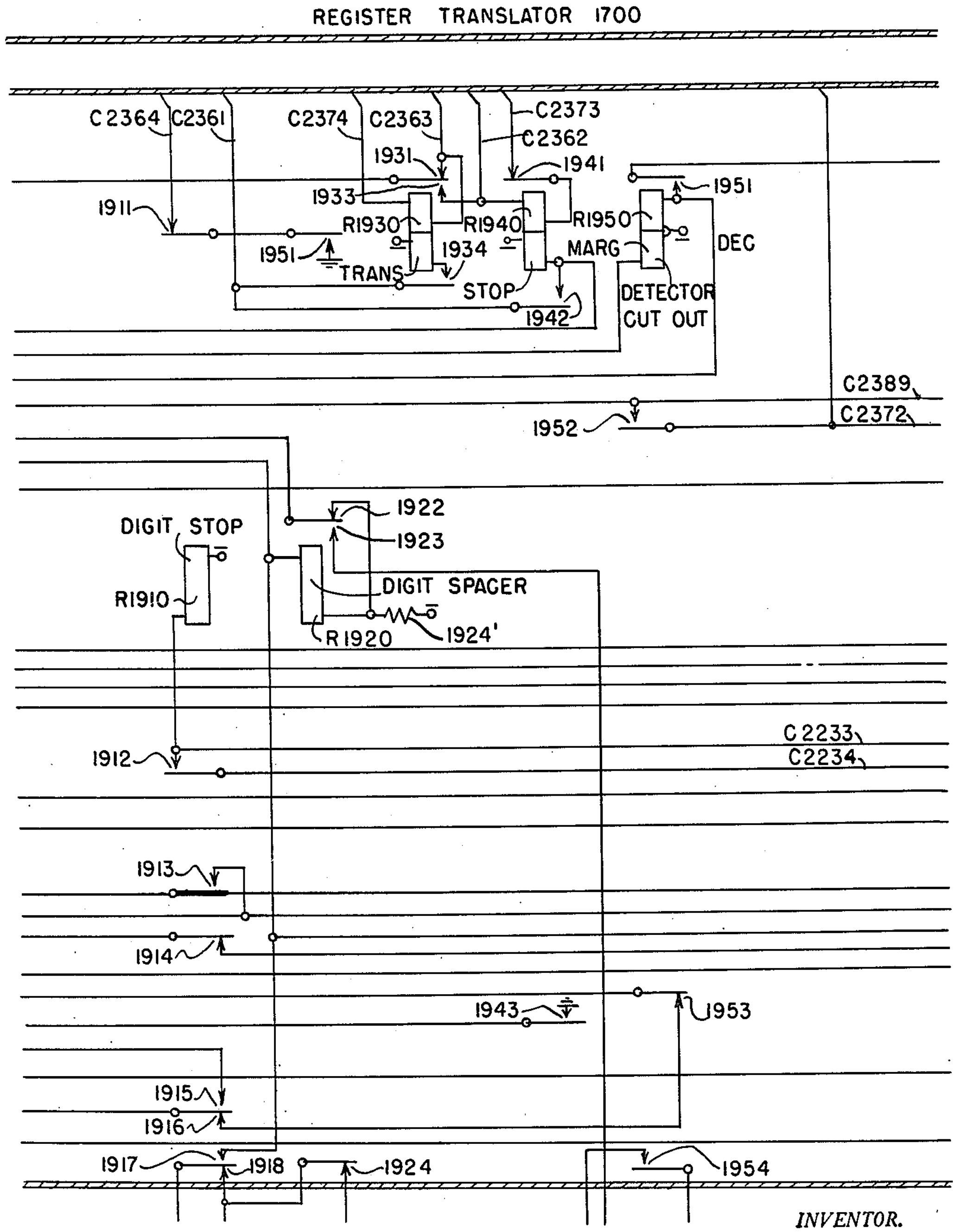
Figure 20:
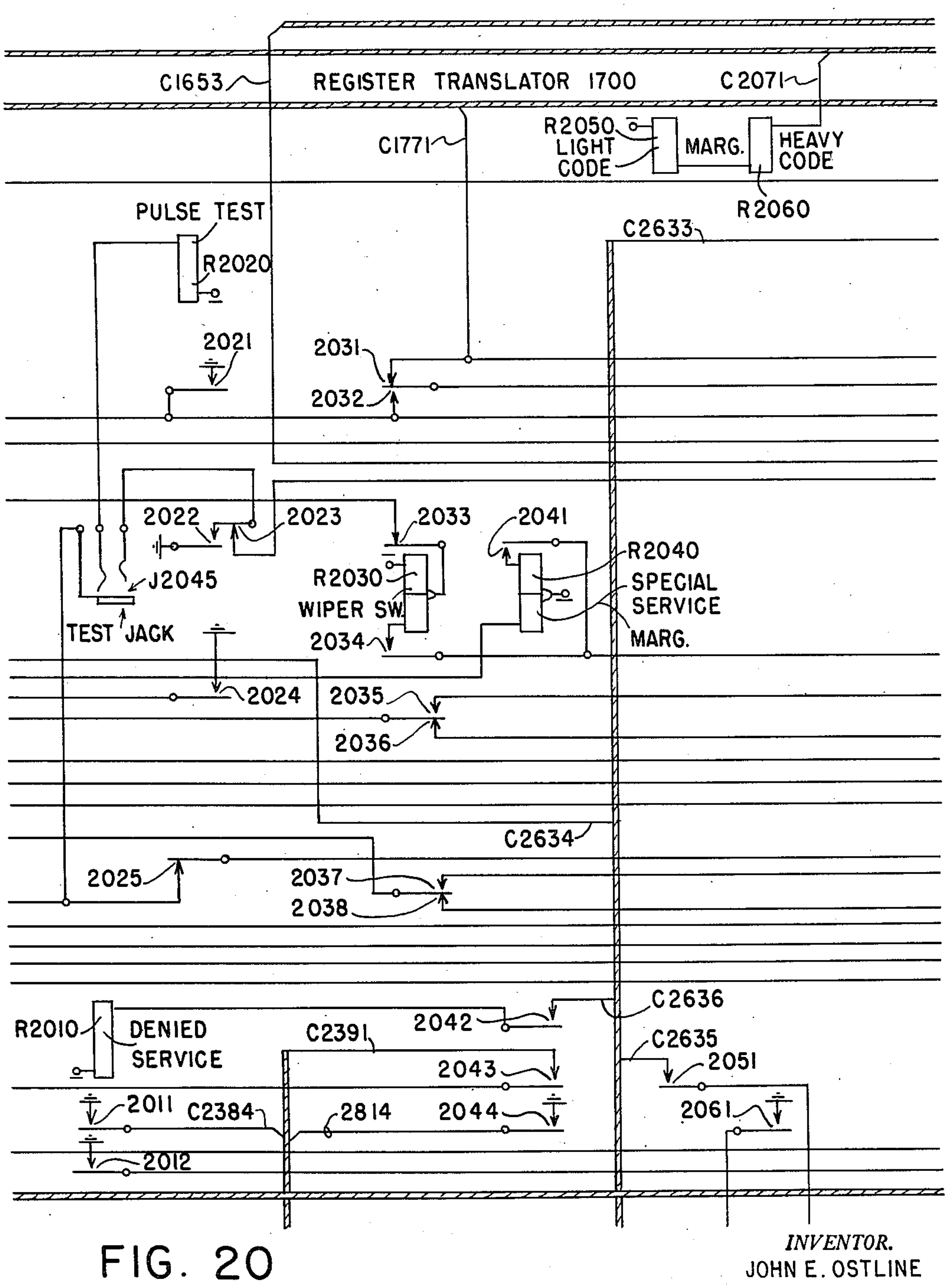
Figure 21:
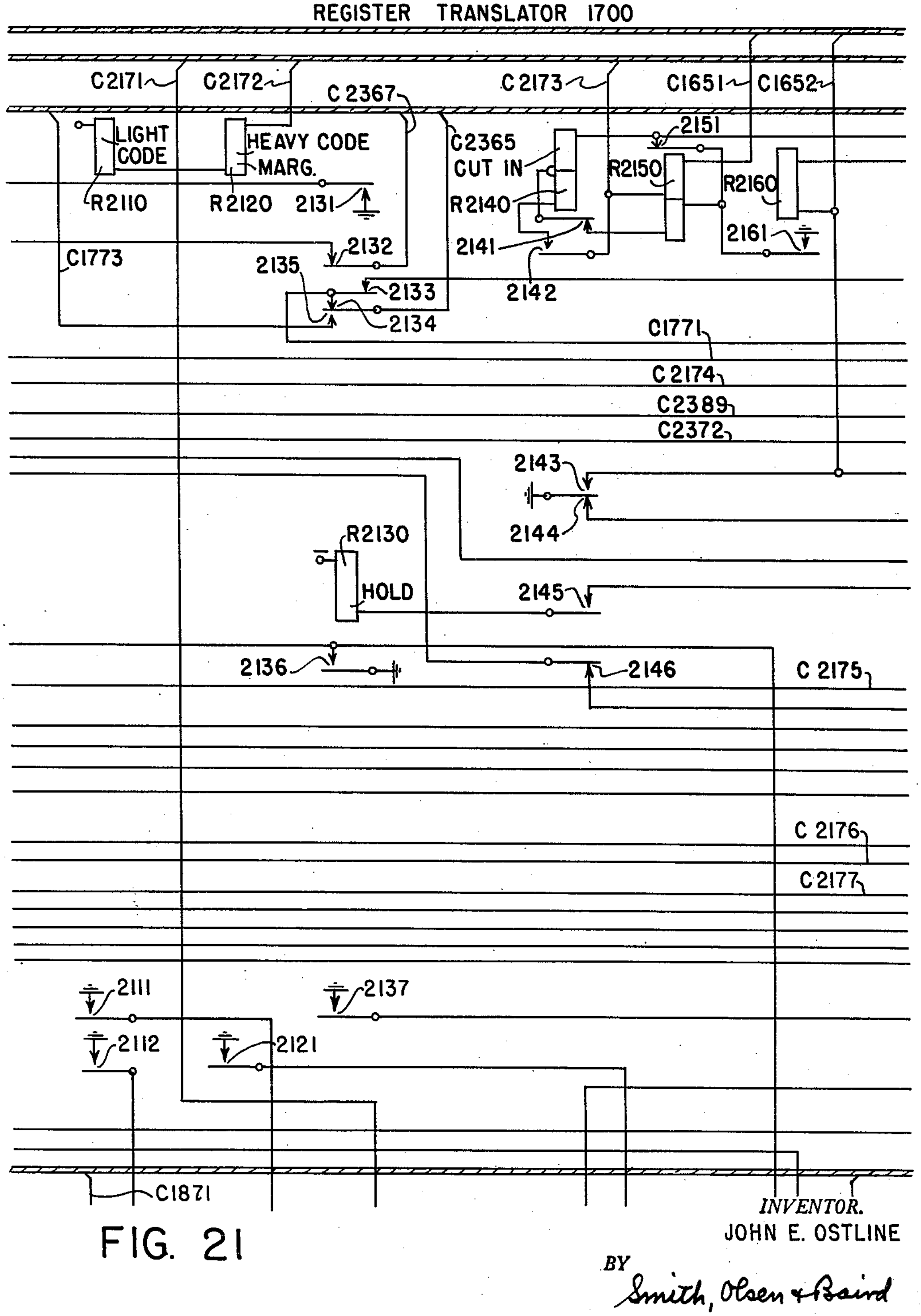

The register translator allotter 1600 provided in exchange 4 zone 84 comprises, as best shown in Fig. 16, a finder F1610 of the rotary switch type, including two wipers 1611 and 1612 provided with individually associated contact banks, and a magnet FM1613 for driving the wipers noted. Also the register translator allotter 1600 comprises a start relay R1600, an alarm A1615 and a control network connected and arranged in a manner more fully explained hereinafter.

Figure 22:
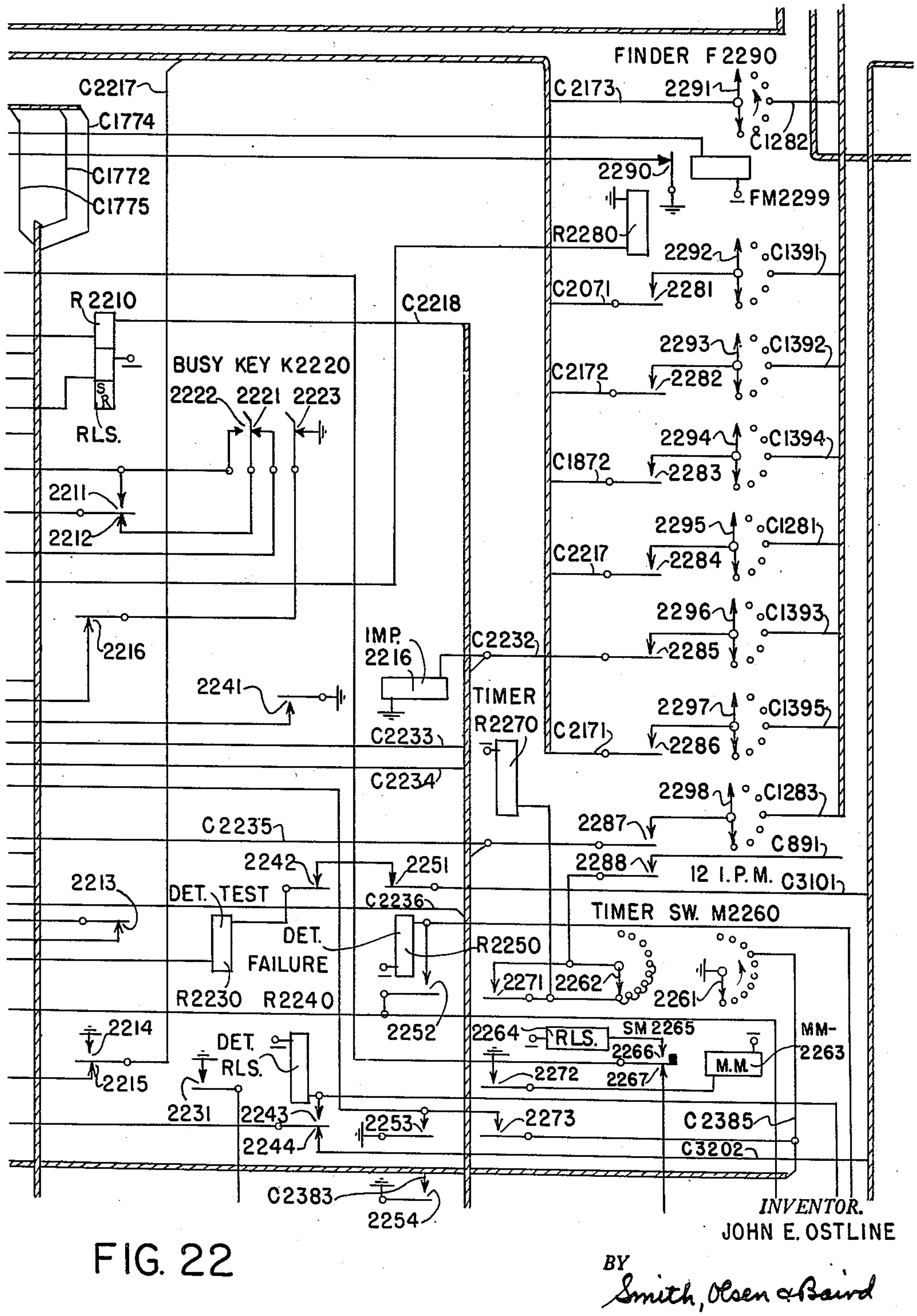
Figure 23:
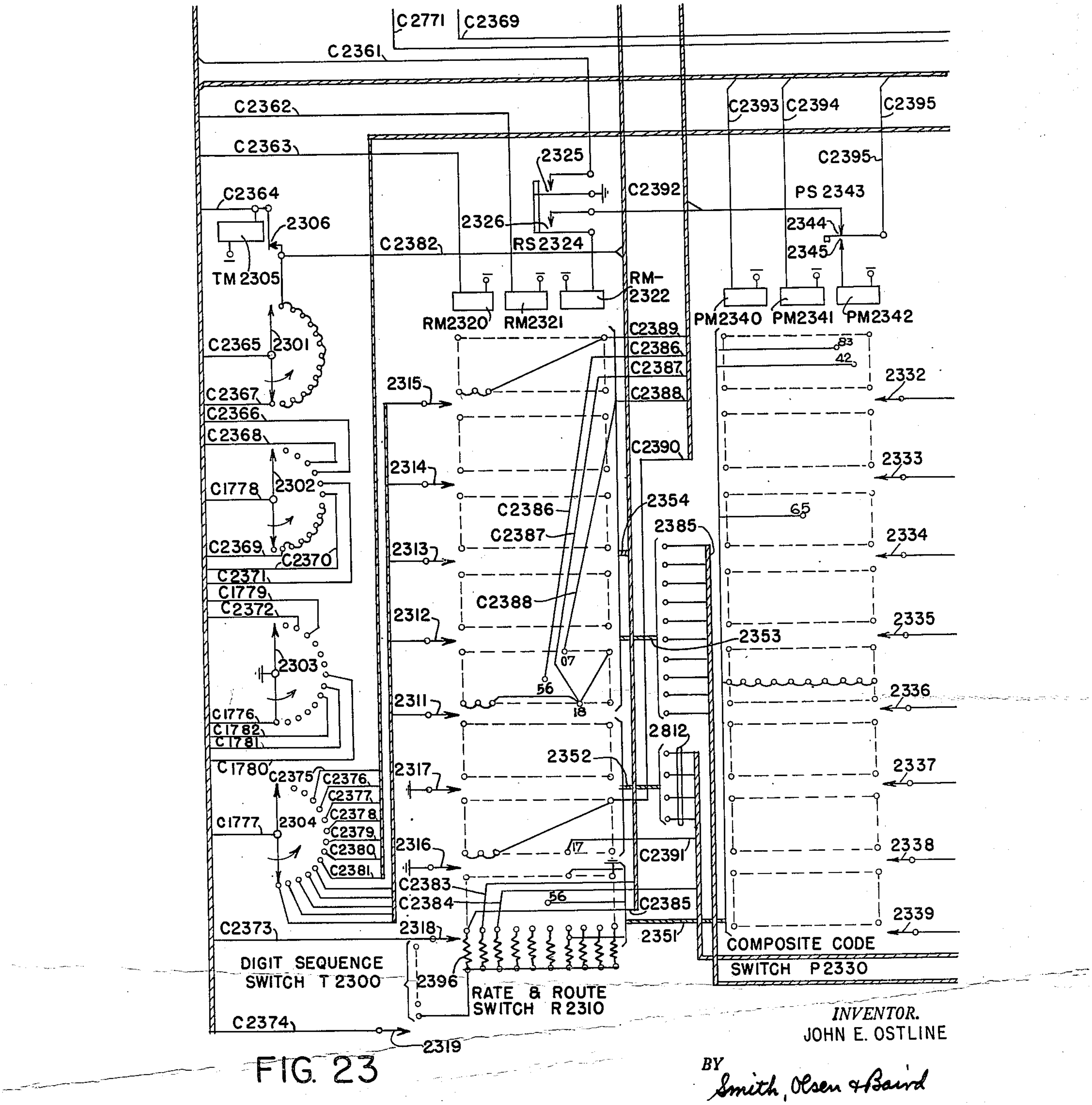
Figure 24:
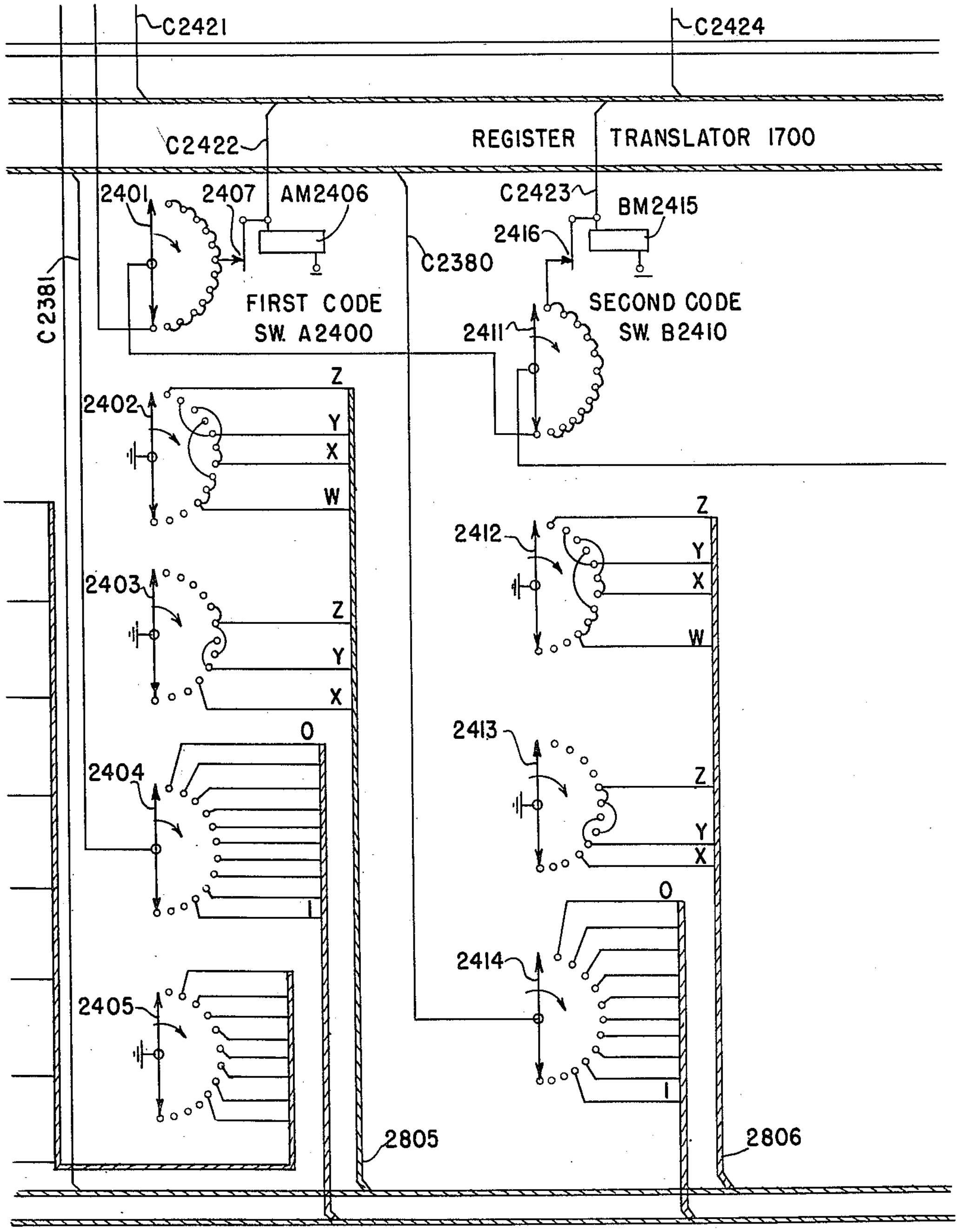
Figure 25:
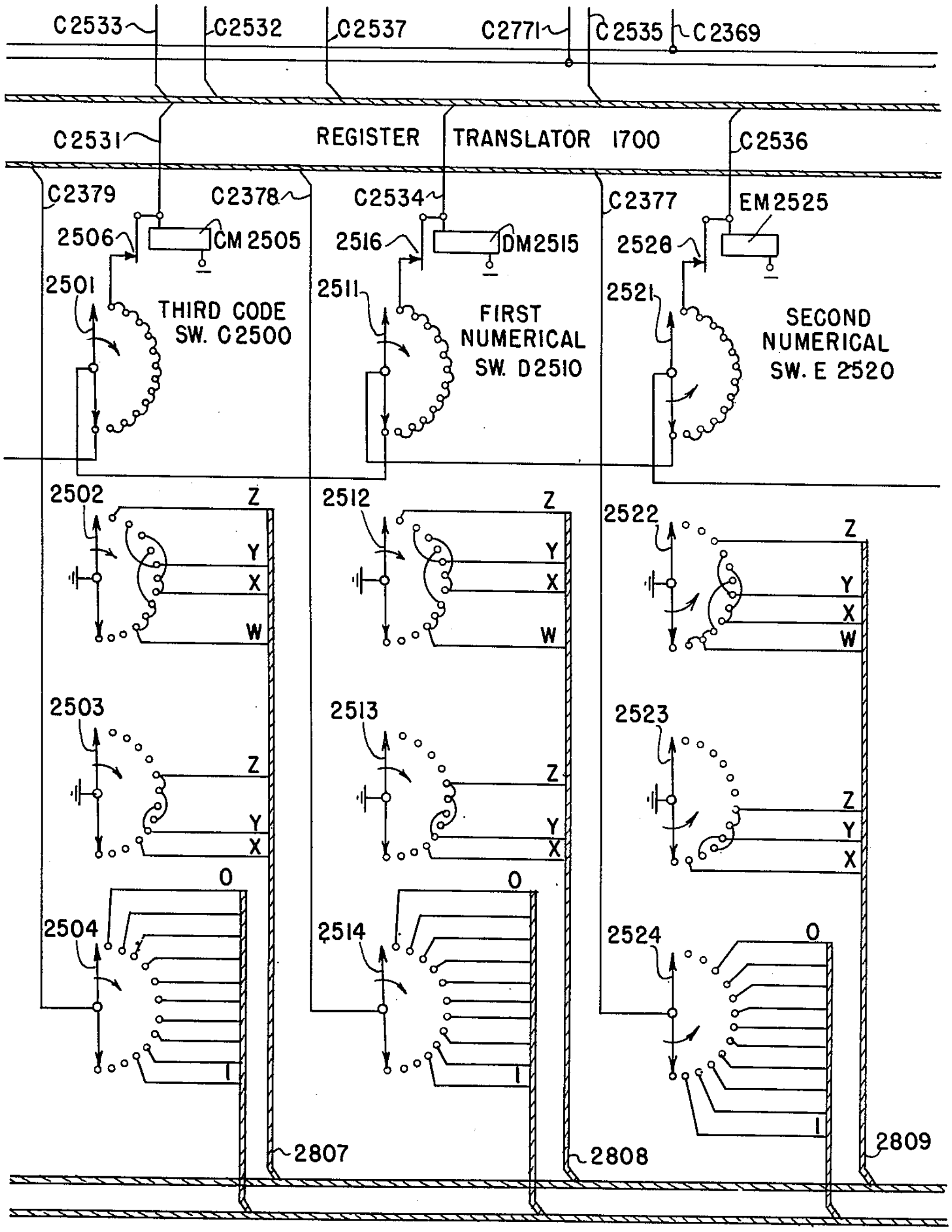
Figure 26:
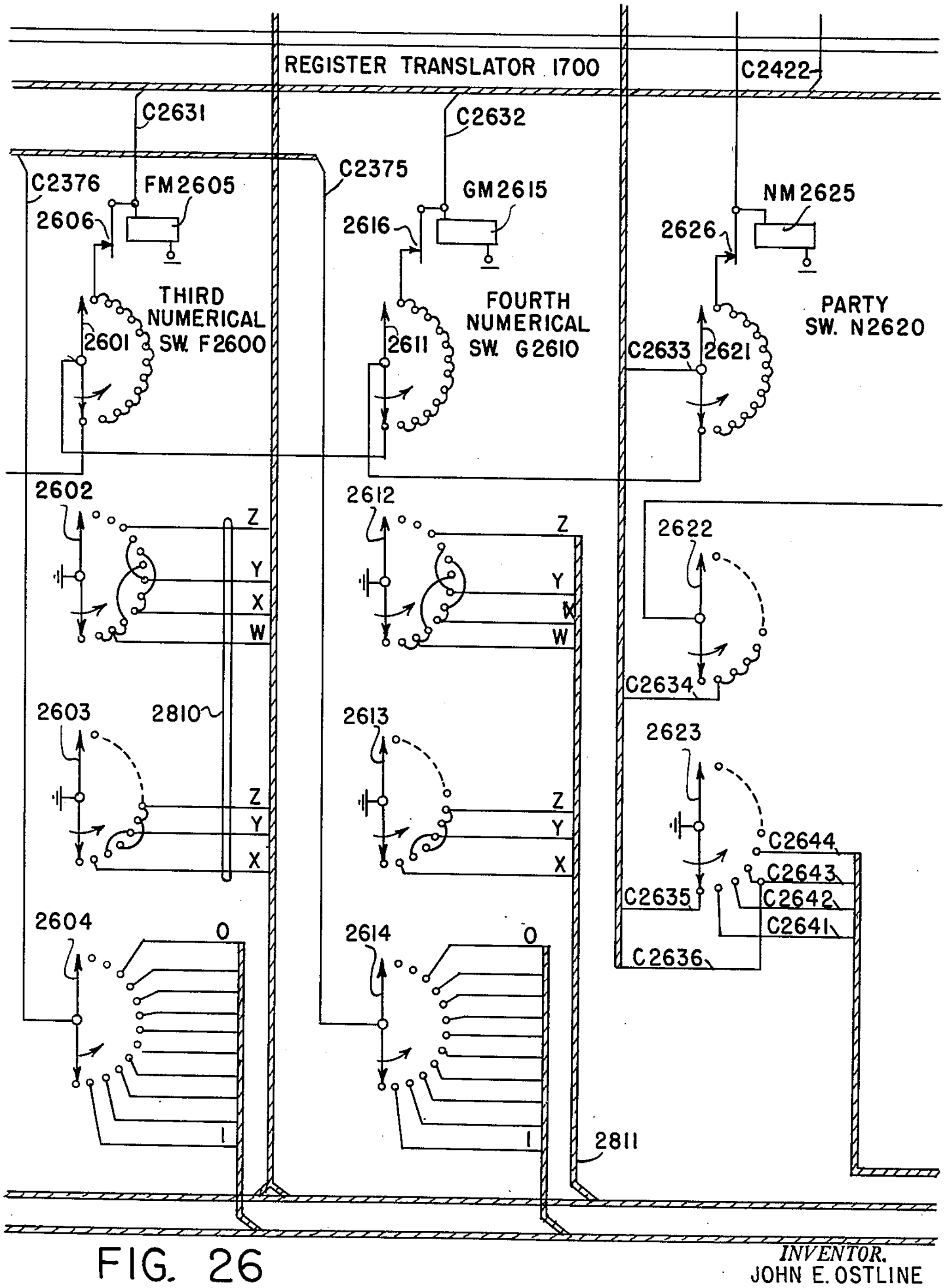
Figure 27:
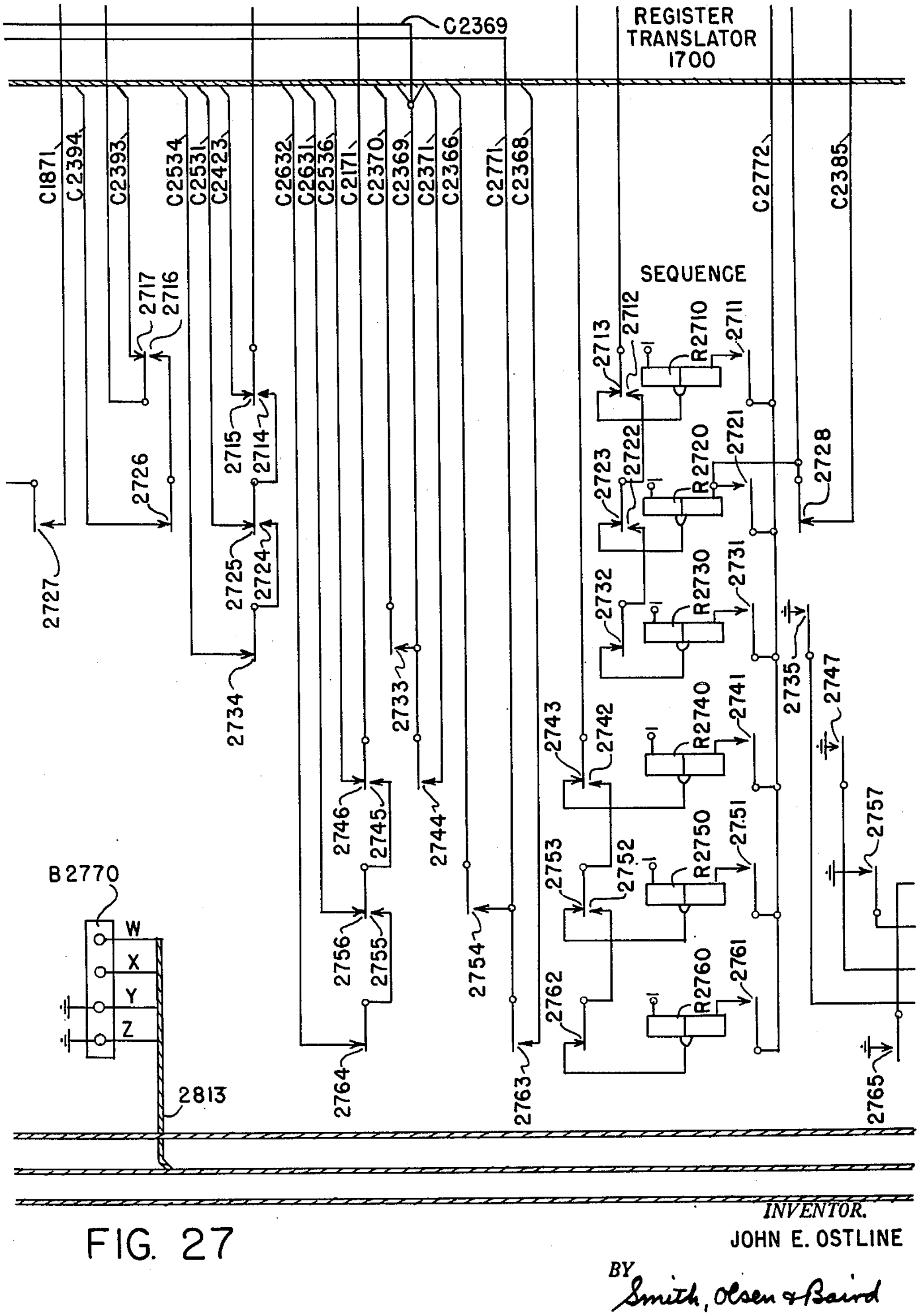
Figure 28:
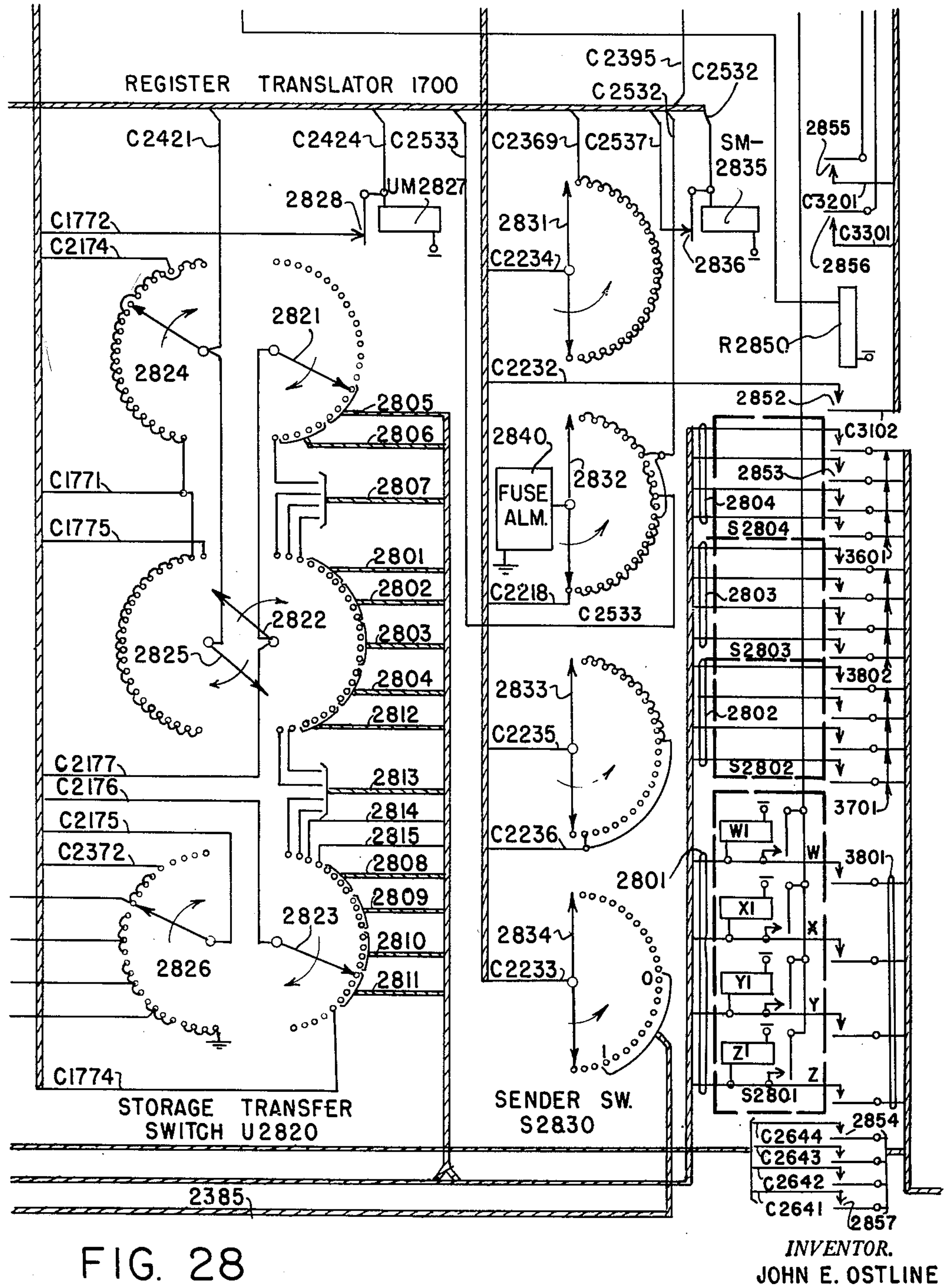
Figure 29:
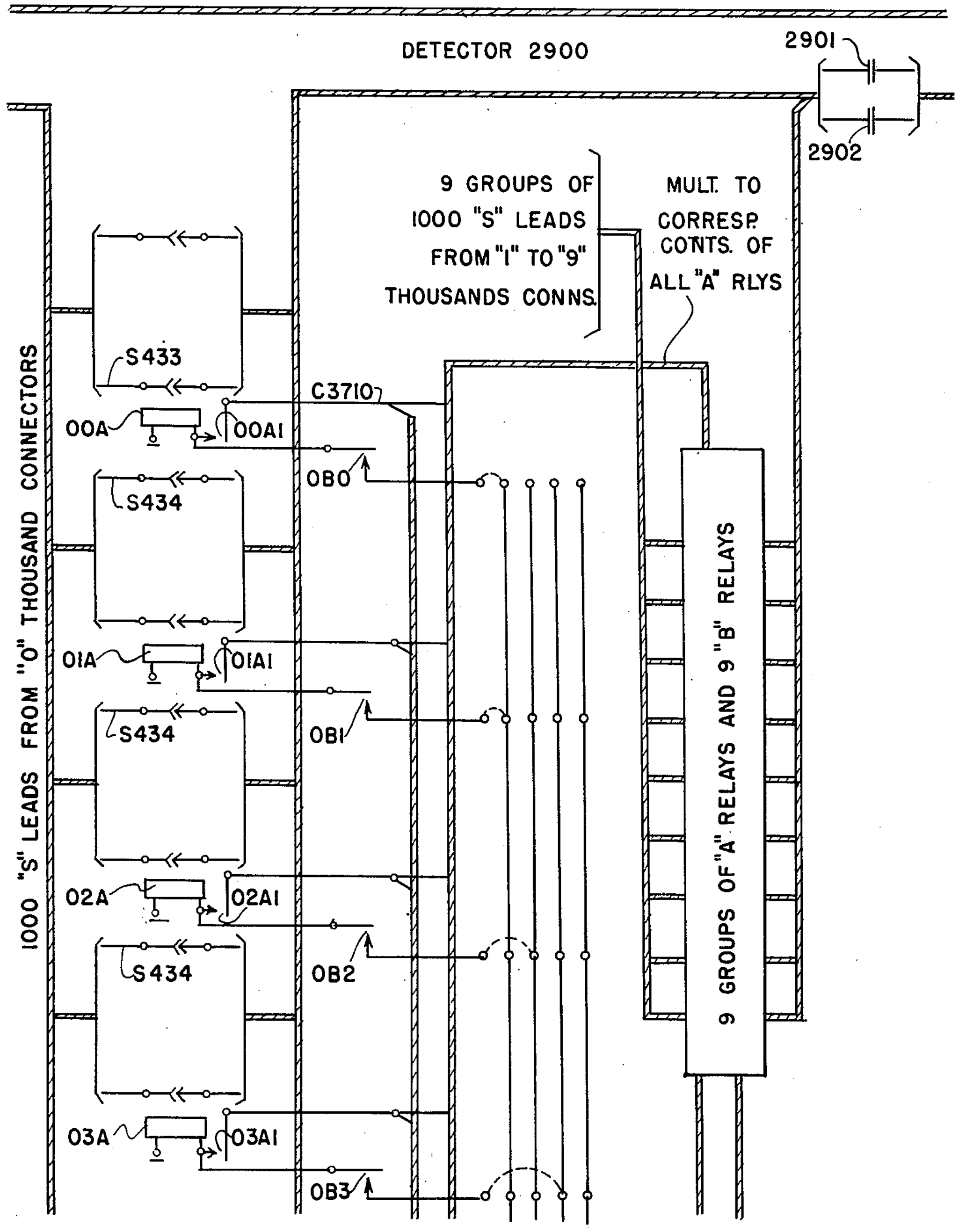
Figure 30:
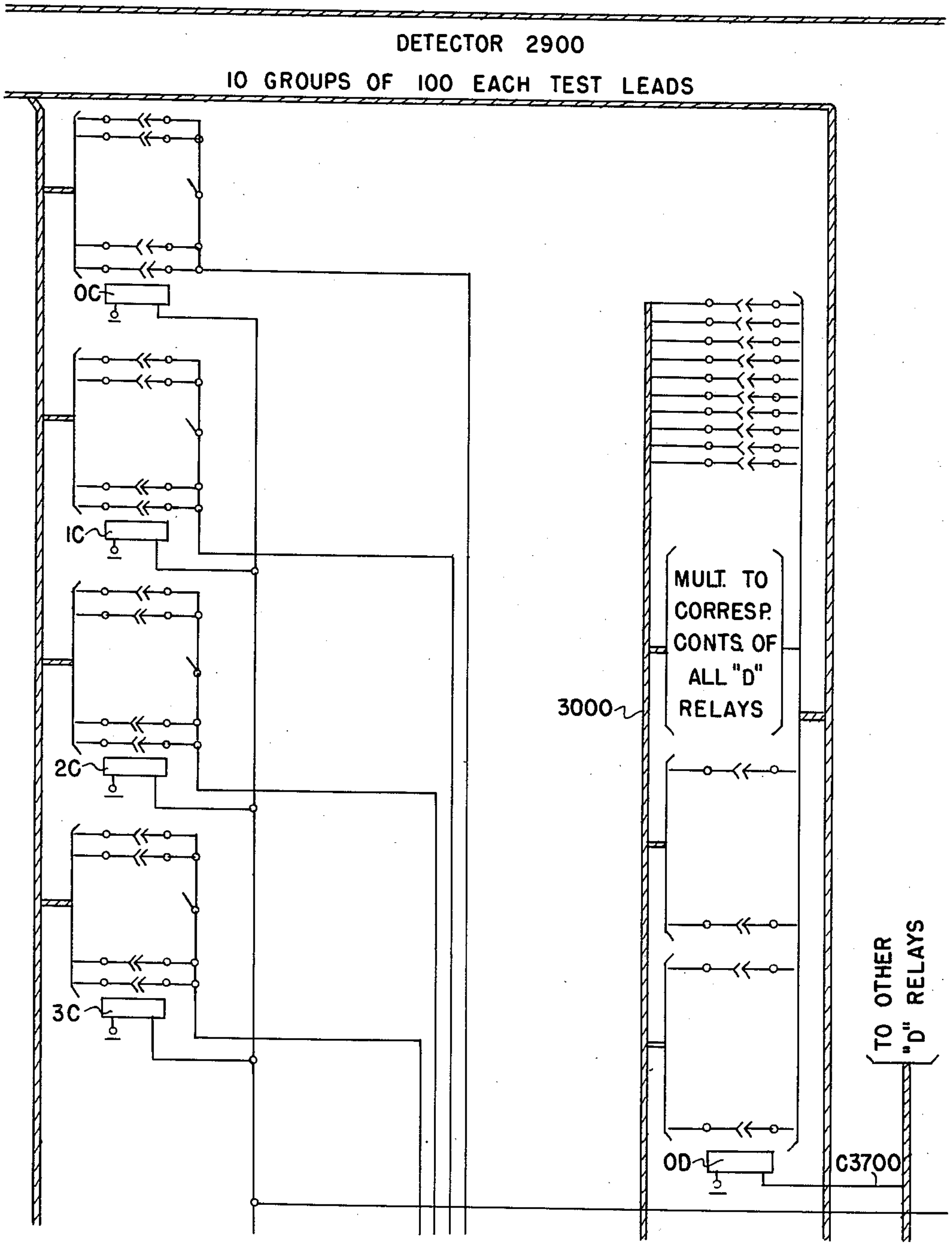
Figure 31:
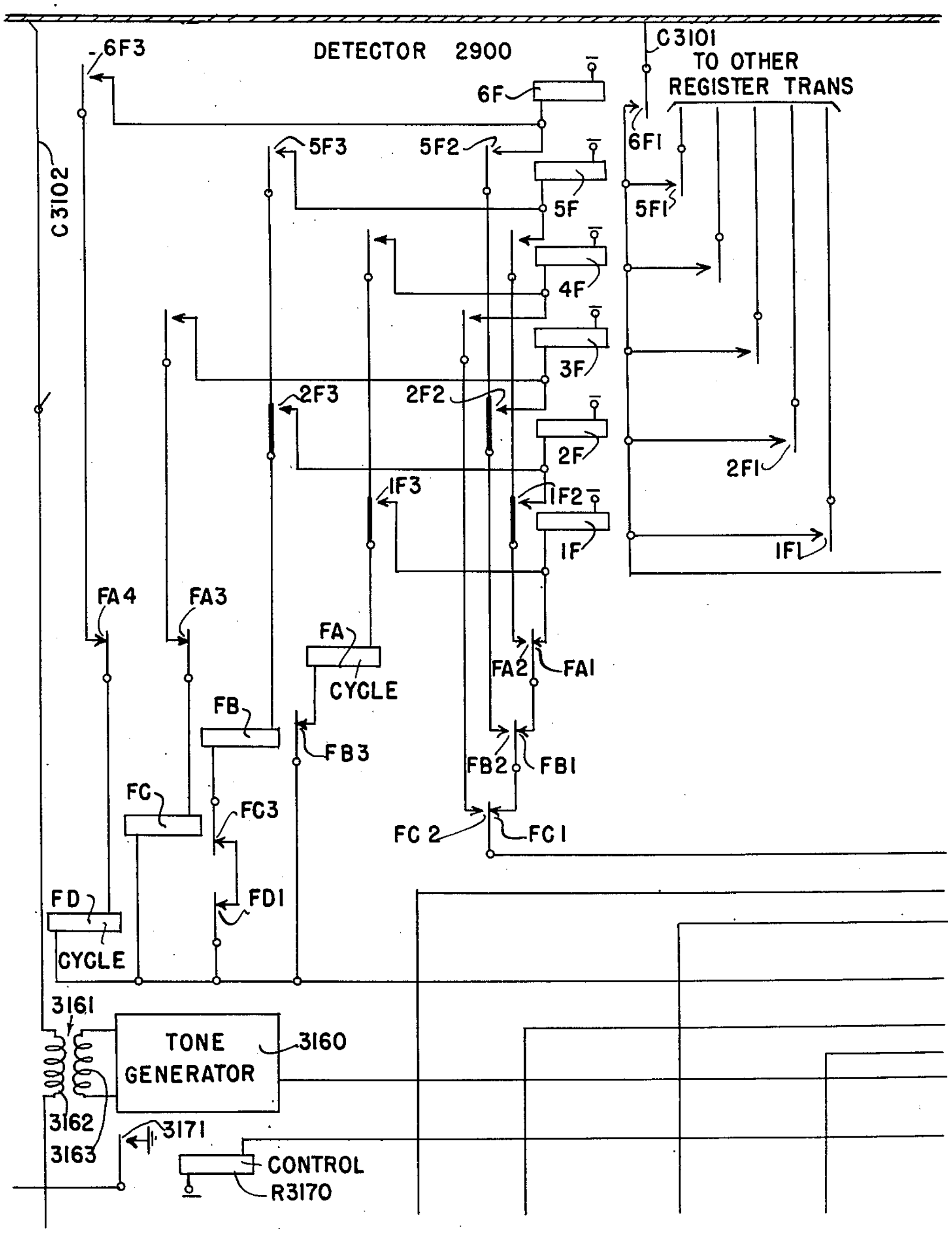
Figure 32:
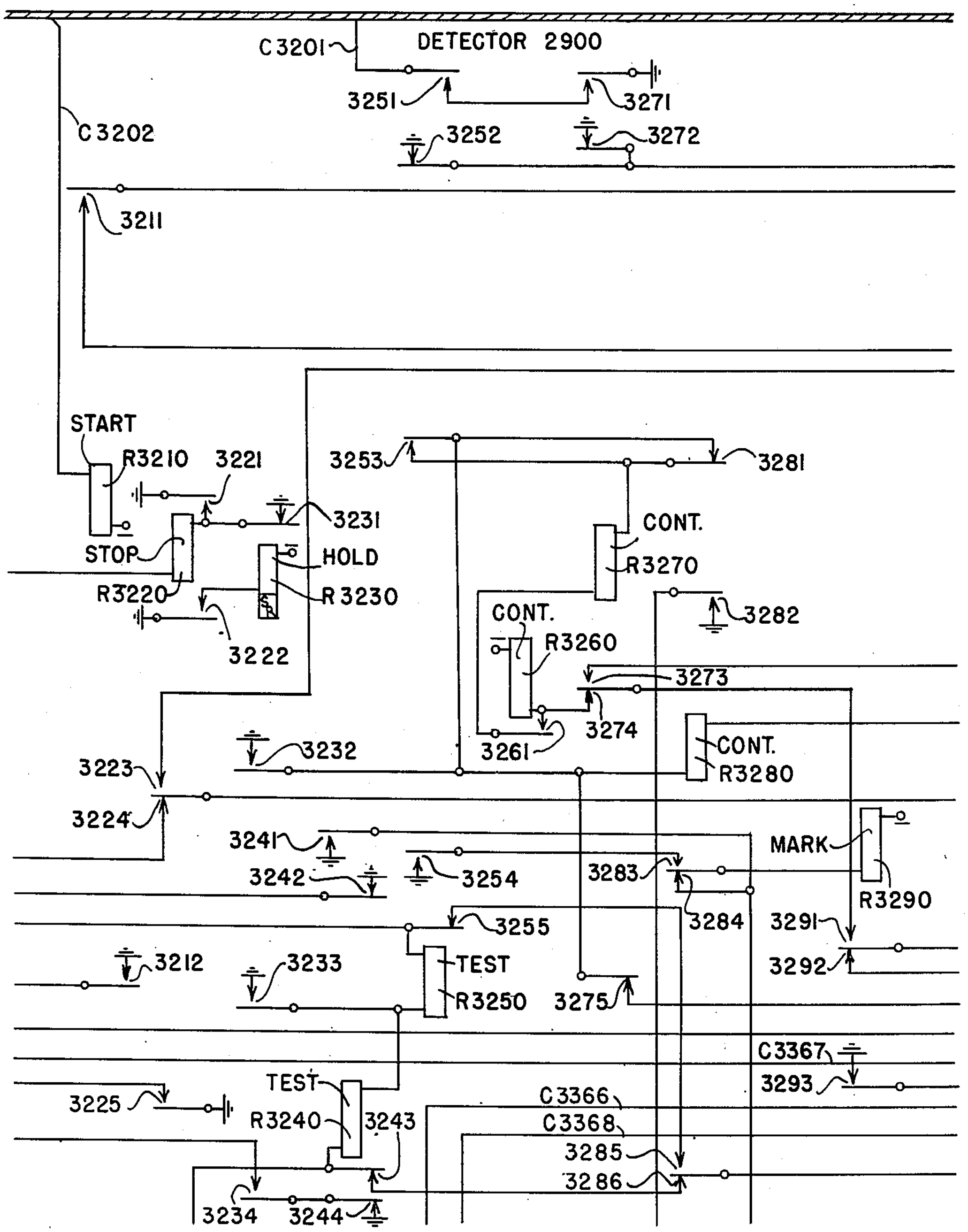
Figure 33:
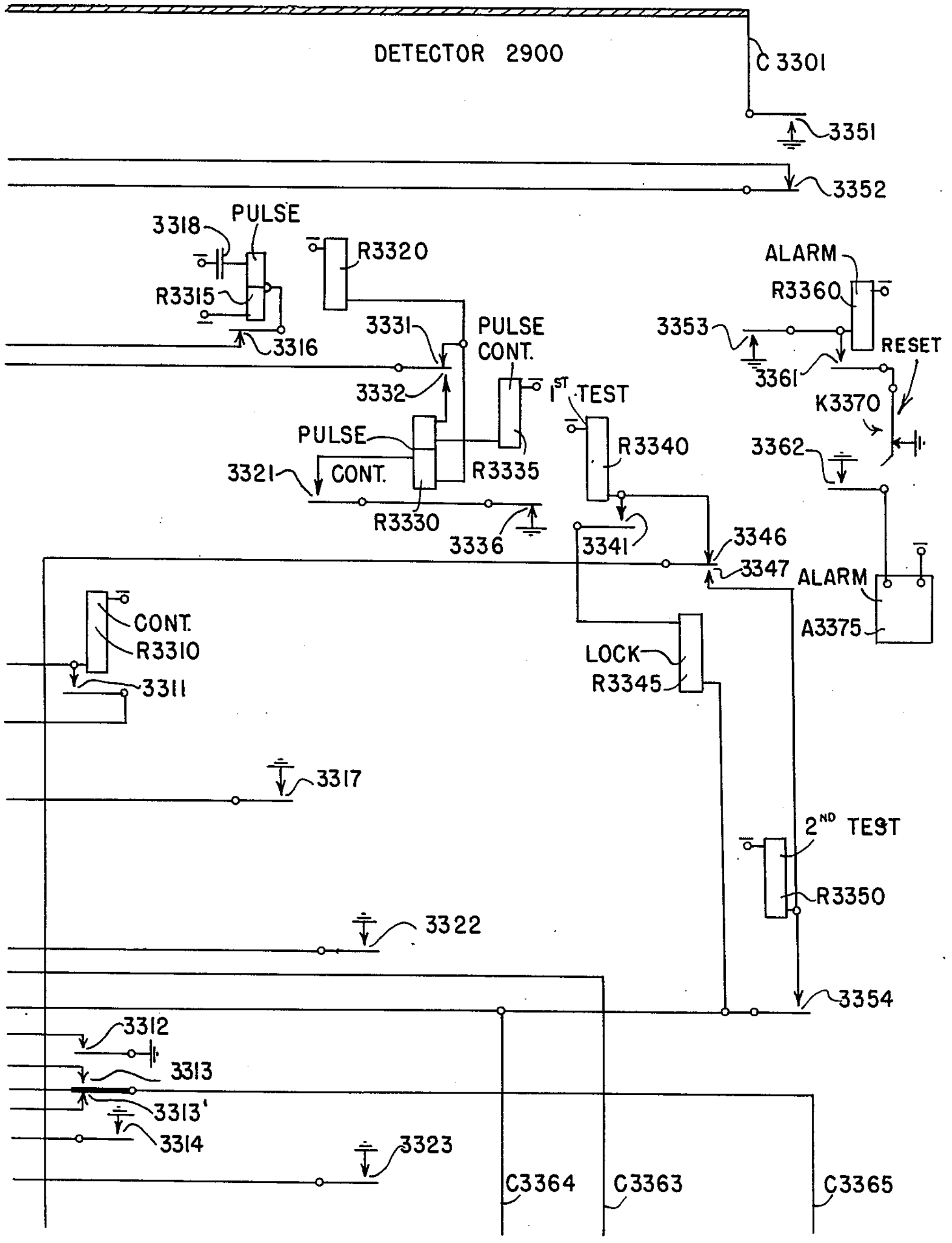
Figure 34:
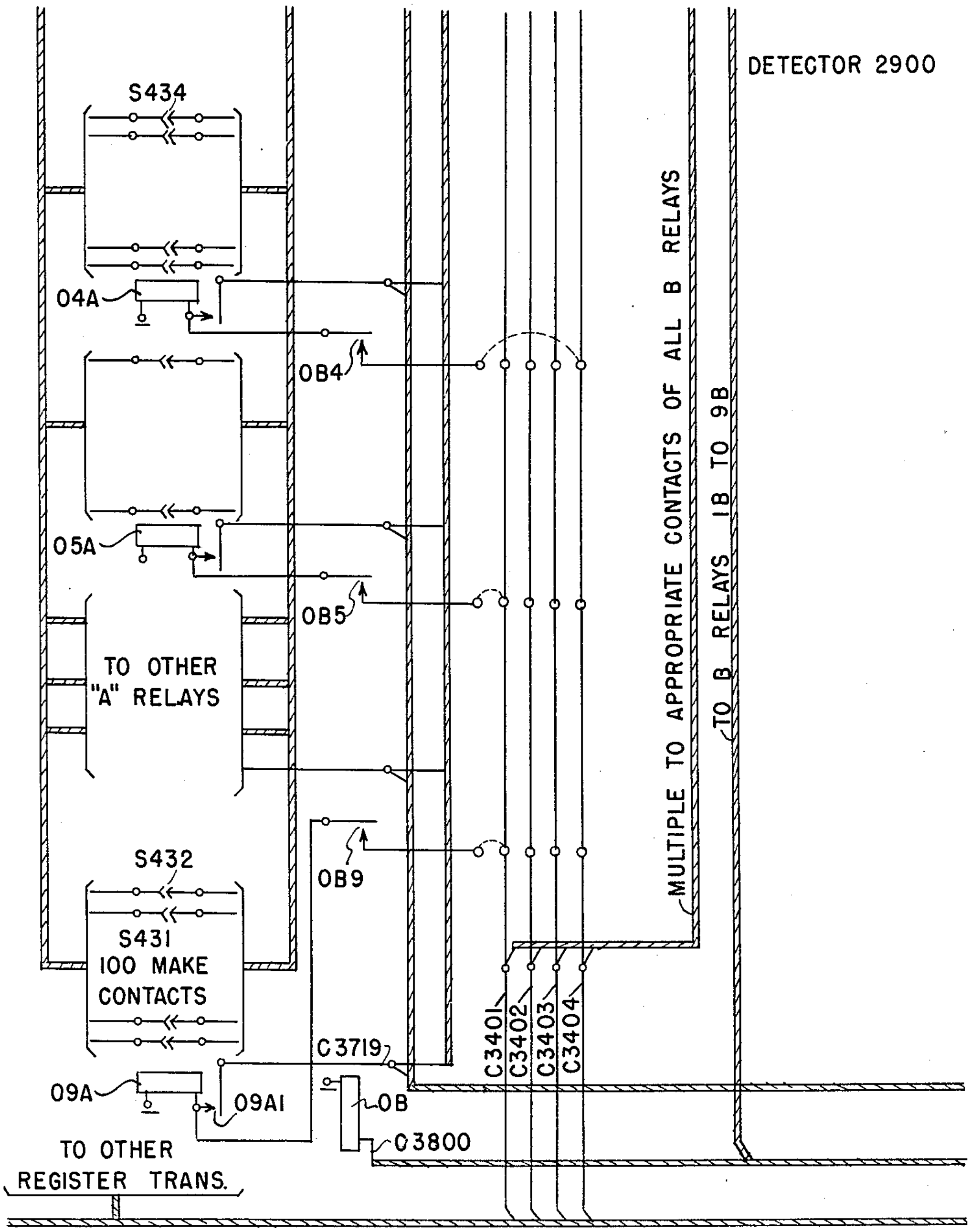
Figure 35:
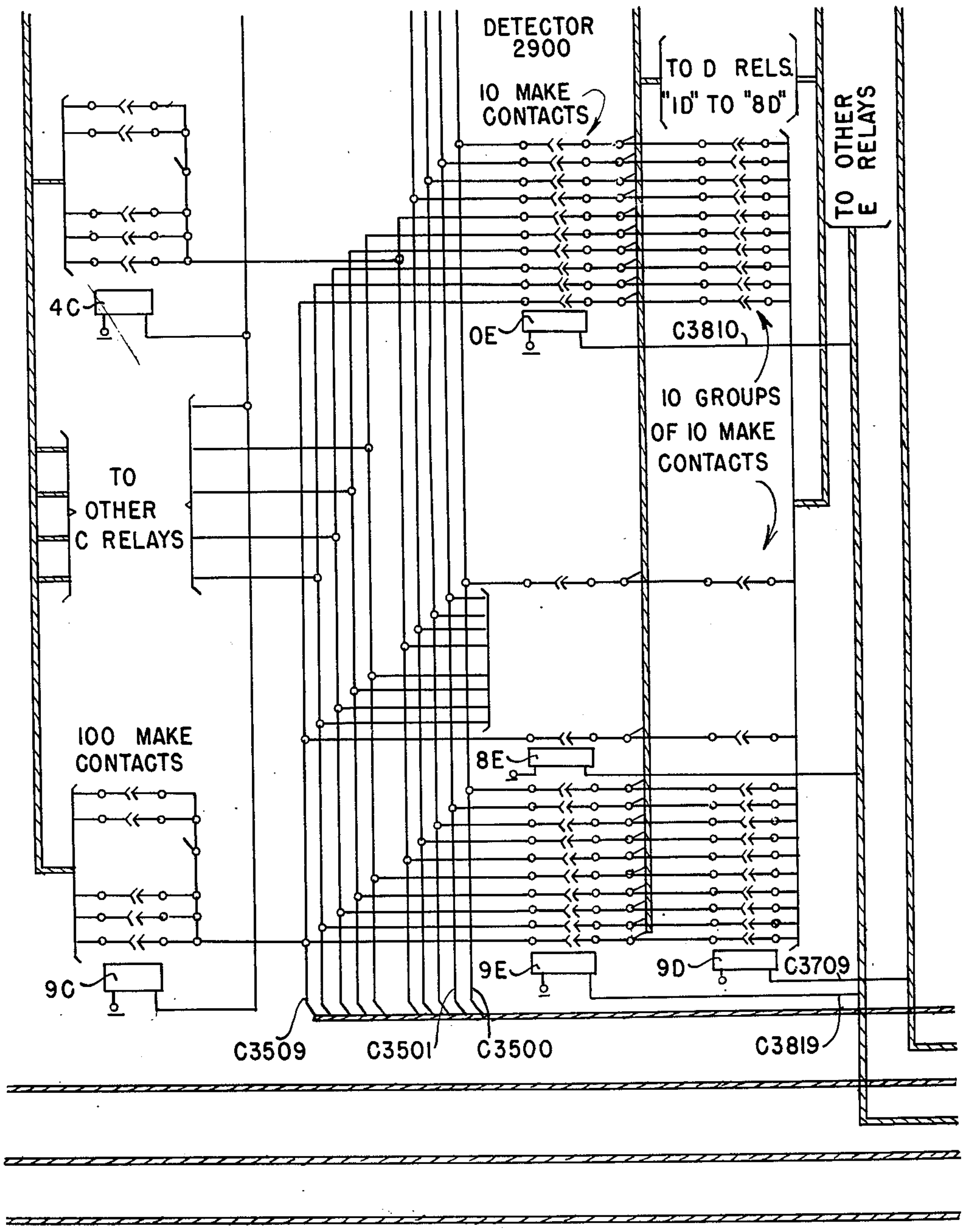
Figure 36:
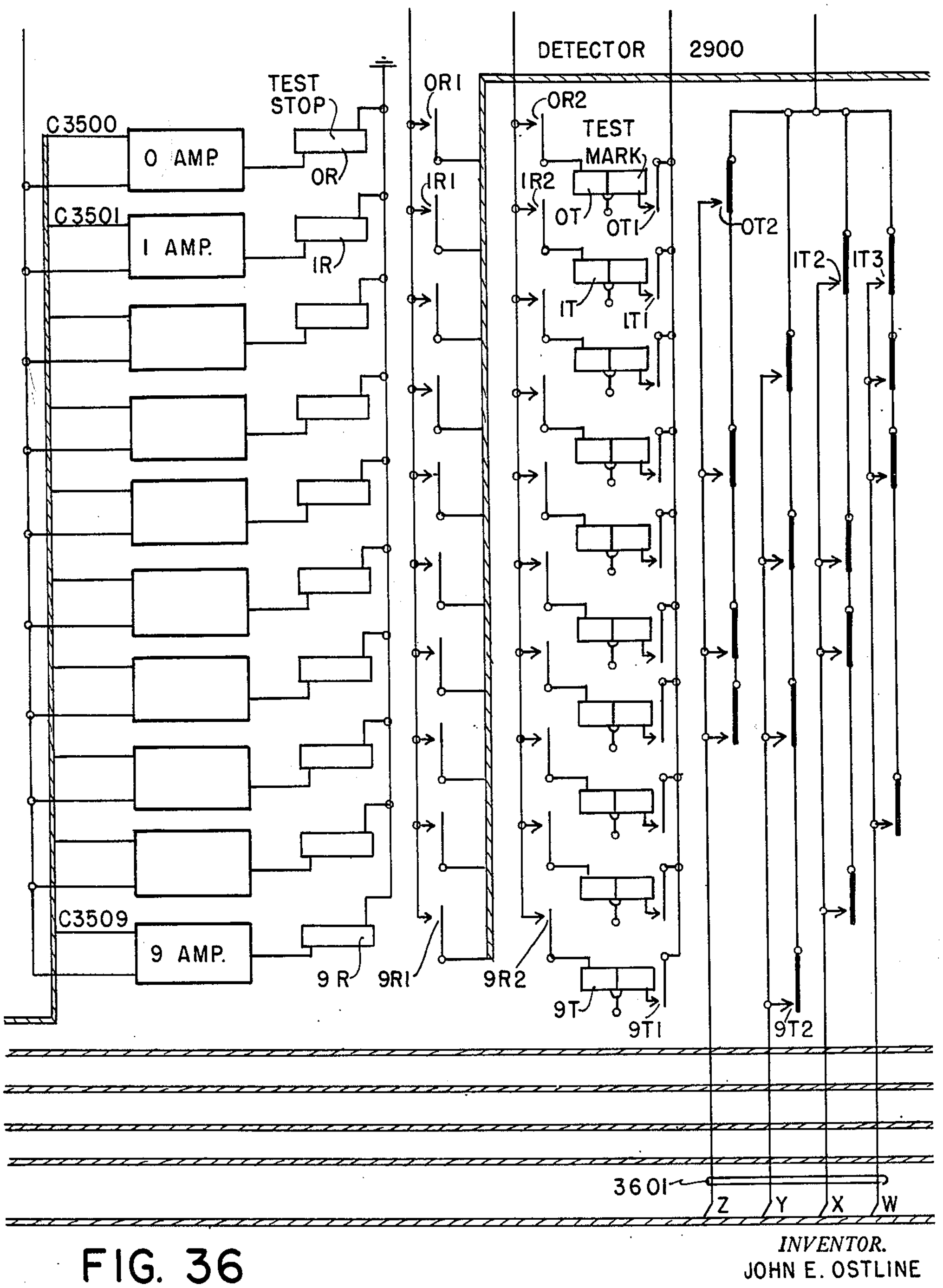
Figure 37:
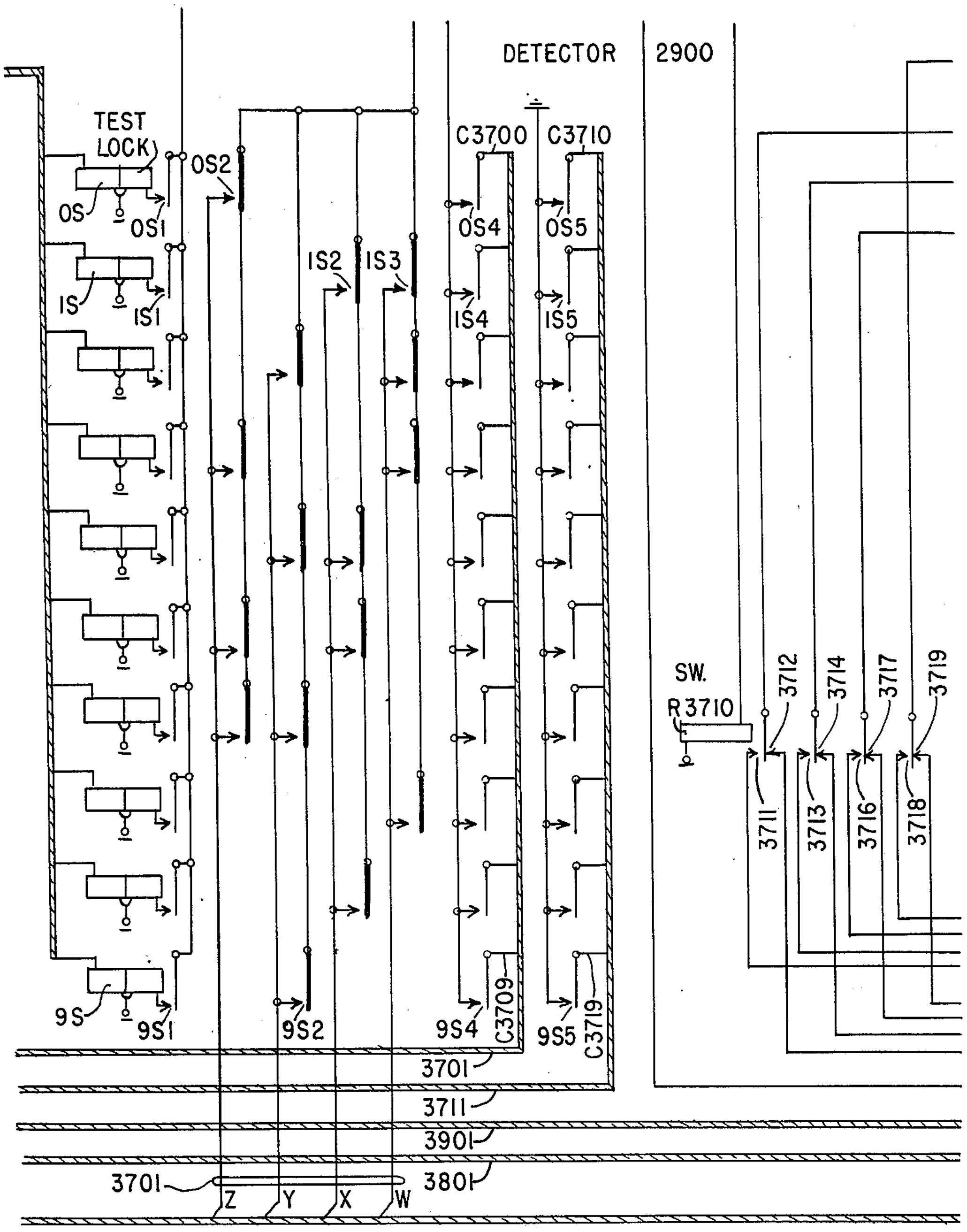
Figure 38:
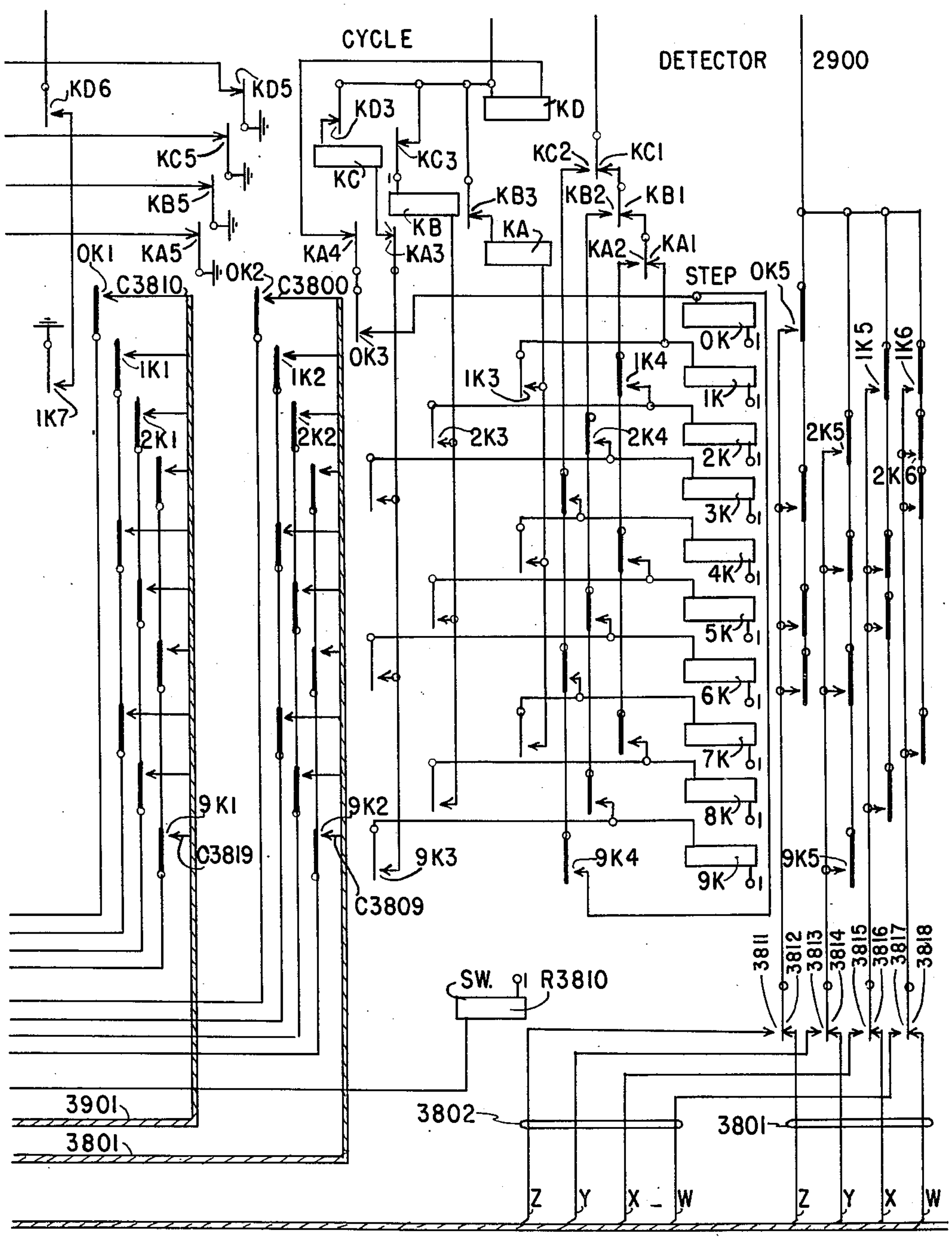

Preferably, the finders in exchange 4 zone 84 which are individually associated with the register translators are identical. For example, the finder F2290 individually associated with the register translator 1700 is of the rotary switch type and includes, as best shown in Fig. 22, eight wipers 2291 to 2298, inclusive, provided with individually associated contact banks, and a magnet FM2299 for driving the wipers noted.

Preferably, each of the register translators included in exchange 4 zone 84 is identical to the register translator 1700 which comprises, as best shown in Figs. 17 to 28, inclusive, a first code switch A2400 of the rotary type, including five wipers 2401 to 2405, inclusive, provided with individually associated contact banks, and a magnet AM2406 for driving the wipers noted; a second code switch B2410 of the rotary type, including four wipers 2411 to 2414, inclusive, provided with individually associated contact banks, and a magnet BM2415 for driving the wipers noted; and a third code switch C2500 of the rotary type, including four wipers 2501 to 2504, inclusive, provided with individually associated contact banks, and a magnet CM2505 for driving the wipers noted. Also the register translator 1700 comprises a first numerical switch D2510 of the rotary type, including four wipers 2511 to 2514, inclusive, provided with individually associated contact banks, and a magnet DM2515 for driving the wipers noted; a second numerical switch E2520 of the rotary type, including four wipers 2521 to 2524, inclusive, provided with individually associated contact banks, and a magnet EM2525 for driving the wipers noted; a third numerical switch F2600 of the rotary type, including four wipers 2601 to 2604, inclusive, provided with individually associtaed contact banks, and a magnet FM2605 for driving the wipers noted; and a fourth numerical switch G2610 of the rotary type, including four wipers 2611 to 2614, inclusive, provided with individually associated contact banks, and a magnet GM2615 for driving the wipers noted.

Further the register translator 1700 comprises a party switch N2620 of the rotary type, including three wipers 2621 to 2623, inclusive, provided with individually associated contact banks, and a magnet NM2625 for driving the wipers noted; a storage transfer switch U2820 of the rotary type, including six wipers 2821 to 2826, inclusive, provided with individually associated contact banks, and a magnet UM2827 for driving the wipers noted; a sender switch S2830 of the rotary type, including four wipers 2831 to 2834, inclusive, provided with individually associated contact banks, and a magnet SM2835 for driving the wipers noted; a digit sequence switch T2300 of the rotary type, including four wipers 2301 to 2304, inclusive, provided with individually associated contact banks, and a magnet TM2305 for driving the wipers noted; and a timer switch M2260 of the minor type, including two wipers 2261 and 2262 provided with individually associated contact banks, a rotary magnet MM2263 for driving the wipers noted in the rotary direction away from their home positions a release magnet MM2264 for releasing the wipers noted and for causing them to be returned to their home positions, and a set of switch springs SM2265 which is actuated when the wipers noted are moved away from their home positions.

Also the register translator 1700 comprises a composite code switch P2330 of the Strowger type provided with a wiper set including eight wipers 2332 to 2339, inclusive, and an associated contact bank; the associated contact bank comprising ten vertically spaced-apart rows or levels of contact sets, each level of contact sets including ten circumferentially spaced-apart individual contact sets. Also the Strowger mechanism comprises a vertical magnet PM2340 for driving the wiper set step by step in the vertical direction away from its normal vertical position, a rotary magnet PM2341 for driving the wiper set step by step away from its normal rotary position, and a release magnet PM2342 for releasing the wiper set and for causing it to be returned to its normal vertical and rotary positions. Further there is associated with the Strowger mechanism a set of switch springs PS2343 which is actuated when the wiper set is moved in the vertical direction away from its normal vertical position. Further, the register translator 1700 comprises a rate and route switch R2310 of the Strowger type including a wiper set provided with eight wipers 2311 to 2318, inclusive, and an associated contact bank; the associated contact bank comprising ten vertically spaced-apart rows or levels of contact sets, each level of contact sets including ten circumferentially spaced-apart individual contact sets. Also the Strowger mechanism comprises a vertical test wiper 2319 which is moved only in the vertical direction by the wiper set, and an associated vertical test contact bank. Further, the Strowger mechanism comprises a vertical magnet RM2320 for driving the wiper set step by step in the vertical direction away from its normal vertical position, a rotary magnet RM2321 for driving the wiper set step by step in the rotary direction away from its normal rotary position, and a release magnet RM2322 for releasing the wiper set and for causing it to be returned to its normal vertical and rotary positions. Further, there is associated with the Strowger mechanism a set of switch springs RS2324 which is actuated when the wiper set is moved in the vertical direction away from its normal vertical position. Also it is noted that a jumper field is arranged between the contact banks of the composite code switch P2330 and the rate and route switch R2310, for a purpose more fully explained hereinafter.

Further the register translator 1700 comprises four code storage devices S2801 to S2804, inclusive; each of the code storage devices including four marking or WXYZ magnets.

Finally the register translator 1700 comprises a relay group including a digit pulse start relay R1710, a last digit send relay R1720, three code send relays R1730, R1740 and R1750, a detector start relay R1760, a special service cutoff relay R1810, a switch cutoff relay R1820, a switch pulse relay R1830, a digit pulse relay R1840, a code pulse relay R1850, a mark relay R1860, a digit stop relay R1910, a digit spacer relay R1920, a transfer relay R1930, a stop relay R1940, a detector cut-out relay R1950, a denied service relay R2010, a pulse test relay R2020, a wiper switching relay R2030, a special service relay R2040, two light code relays R2050 and R2110, two heavy code relays R2060 and R2120, a hold relay R2130, a cut-in relay R2140, a test relay R2150, a start relay R2160, a release relay R2210, a detector test relay R2230, a detector release relay R2240, a detector failure relay R2250, a timer relay R2270, a switching relay R2280, a first set of three sequence relays R2710, R2720 and R2730, a second set of three sequence relays R2740, R2750 and R2760, and a storage relay R2850. Also the register translator 1700 comprises a control network connected and arranged in a manner more fully described hereinafter and including a test jack J2045, a busy key K2220, an impedance 2216, a fuse alarm 2840 and a terminal block B2770.

In the register translator 1700, the code switches A2400, B2410 and C2500 are adapted respectively to register the first, second and third code digits of a called directory number; and the numerical switches D2510, E2520, F2600 and G2610 are adapted respectively to register the first, second, third and fourth numerical digits of a called directory number. Thus the code switches A2400, B2410 and C2500, taken together, comprise a first code register adapted to register a code comprising N digits, wherein N=3; while the numerical switches D2510, E2520, F2600 and G2610, taken together, comprise a second numerical register adapted to register a number comprising M digits, where M=4.

The party switch N2620 is arranged to control the registration in the first code switch A2400 and to mark one of the four party conductors C2641 to C2644, inclusive, for a purpose more fully explained hereinafter. The first set of sequence relays R2710, 2720 and R2730 is adapted to control the setting of the wiper set of the composite code switch P2330 in the vertical and rotary directions and to select the second code switch B2410, the third code switch C2500 and the first numerical switch D2510 in sequence for registration purposes. Also the first code switch A2400 is adapted to control the selection of one of the wipers of the wiper set of the composite code switch P2330, for a purpose more fully explained hereinafter. The second set of sequence relays R2740, R2750 and R2760 is arranged to select the second numerical switch E2520, the third numerical switch F2600 and the fourth numerical switch G2610 in sequence for purposes of registration. The composite code switch P2330 governs the setting of the wiper set of the rate and route switch R2310 in the vertical and rotary directions, in a manner more fully explained hereinafter; while the digit sequence switch T2300 is arranged to control the sequence of transmitting the digits from the register translator 1700, some of these digits being registered in the rate and route switch R2310 and other of these digits being registered in the code switches A2400, B2410 and C2500 and in the numerical switches B2510, E2520, F2600 and G2610. The sender switch S2830 is arranged to control the actual number of impulses transmitted in each numerical digit transmitted from the register translator 1700; while the storage transfer switch U2830 is arranged to transmit code digits from the register translator 1700, these code digits being registered in the rate and route switch R2310, the code switches A2400, B2410 and C2500, the numerical switches D2510, E2520, F2600 and G2610, the code send relay F1750, the special service relay R2040, the terminal block B2770 and the code storage devices S2801 to S2804, inclusive. Finally the timer switch M2260 is arranged to time the interval during which the register translator 1700 is retained in use, for a purpose more fully explained hereinafter.

At this point it is again noted that each of the code storage devices S2801 to S2804, inclusive, comprises four unit or WXYZ magnets which are operated in accordance with the following combinations in order to register numerical digits in code form, as indicated by the table below:

| Numerical Digit Registered | Operated Magnets in the Code Storage Device |
|---|---|
| 1 | W and X |
| 2 | W and Y |
| 3 | W and Z |
| 4 | X and Y |
| 5 | X and Z |
| 6 | Y and Z |
| 7 | W |
| 8 | X |
| 9 | Y |
| 0 | Z |

Also it is noted that an individual number is assigned to each register translator; which number is set up in code form on the terminal block thereof. For example, the individual number 6 is assigned to the register translator 1700 and is set up on the terminal block B2770 in code form; the Y and Z leads in the group of marking leads 2813 being connected to ground potential as indicated.

The detector 2900 included in exchange 4 zone 84 has access to 10,000 terminals and comprises, as best shown in Figs. 29 to 38, inclusive, ten groups of A relays, each group of A relays including ten individual A relays. The tenth group of A relays mentioned is illustrated and comprises the individual A relays 00A to 09A, inclusive, and is associated with the 1000 S leads from the 0 thousand connectors. Each A relay comprises 100 make contacts, whereby a given A relay in the tenth group is operative to connect the corresponding 1000 S leads in the 0 thousand group to the detector 2900 for test purposes.

At this point it is noted that the S lead S431 extends to the line switch 421 individually associated with the private subscriber line 401 and is accessible to the 09A relay included in the tenth group of A relays; whereby the directory number of the private subscriber line 401 includes the digits 09 and the directory number of the extended service private subscriber substation TX connected to the private subscriber line 401 may be 0901. Similarly, the S lead S432 extends to the line switch 422 individually associated with the private subscriber line 404 and is accessible to the 09A relay included in the tenth group of A relays; whereby the directory number of the private subscriber line 404 includes the digits 09 and the directory number of the denied toll service private subscriber substation TD connected to the private subscriber line 404 may be 0900. In a like manner, the S lead S433 extends to the line switch 423 individually associated with the private subscriber line 407 and is accessible to the 00A relay included in the tenth group of A relays; whereby the directory number of the private subscriber line 407 includes the digits 00 and the directory number of the ordinary private subscriber substation TP connected to the private subscriber line 407 may be 0099. Finally the S lead S434 extends to the line switch 424 individually associated with the party subscriber line 410 and is accessible to the 01A, 02A, 03A and 04A relays included in the tenth group of A relays; whereby the directory number of the party subscriber line includes the digits 01, 02, 03 or 04 and the directory numbers of the party subscriber substations TS1, TS2, TS3 and TS4 connected to the party subscriber line 410 may be respectively 0100, 0200, 0300 and 0400.

Also the detector 2900 comprises 1000 test leads arranged in ten groups of 100 each, each A relay in each group of ten being operative to connect the associated group of 100 S leads to the associated group of 100 test leads.

Further the detector 2900 comprises ten B relays 0B to 9B, inclusive, individually associated with the corresponding groups of A relays, the tenth B relay 0B being individually associated with the tenth group of A relays 00A to 09A, inclusive. Further the detector 2900 comprises four hold conductors C3401, C3402, C3403 and C3404 which are suitably multipled to make contacts provided on the various B relays. More particularly, the first hold conductor C3401 is multipled via contacts of appropriate ones of the B relays to the windings of the various ones of the A relays in each group corresponding to the private subscriber substations and to the first party subscriber substations; while the second, third and fourth hold conductors C3402, C3403 and C3404, respectively, are multipled via the contacts of appropriate ones of the B relays to the windings of the various ones of the A relays in each group, respectively corresponding to the second, third and fourth party subscriber substations. For example, the first hold conductor C3401 is multipled via the contacts 0B0, 0B5 and 0B9 to the windings of the A relays 00A, 05A and 09A, respectively, corresponding to groups of private subscriber substations respectively including the private subscriber substations TP etc., and TX and TD, and via the contacts 0B1 to the winding of the A relays 01A corresponding to a group of first party subscriber substations, including the first party subscriber substation TS1. Similarly, the second, third and fourth hold conductors C3402, C3403 and C3404, respectively, are multipled via the contacts 0B2, 0B3 and 0B4 to the windings of the A relays 02A, 03A and 04A, respectively, corresponding to groups of second, third and fourth party subscriber substations, respectively including the party subscriber substations TS2, TS3 and TS4.

Further the detector 2900 comprises ten C relays 0C to 9C, inclusive, respectively corresponding to the ten groups of 100 test leads, and ten test conductors C3500 to C3509, inclusive. Each C relay is operative to connect the corresponding group of 100 test leads to the corresponding one of the test conductors. For example, the ninth C relay 9C is operative to connect the ninth group of 100 test leads to the ninth test conductor C3509. Also the detector 2900 comprises ten D relays 0D to 9D, inclusive, respectively corresponding to the ten groups of 100 test leads and ten E relays 0E to 9E, inclusive. Each D relay is operative to connect the corresponding group of 100 test leads to 100 riser conductors included in an associated riser cable 3000; while each E relay is operative to connect a corresponding group of ten riser conductors in the riser cable 3000 to the ten corresponding test conductors C3500 to C3509, inclusive. For example, when the ninth D relay 9D and the ninth E relay 9E are operated the ninth group of 100 test leads are connected to the corresponding 100 riser conductors in the riser cable 3000 and the ninth group of ten riser conductors in the riser cable 3000 are respectively connected to the ten test conductors C3500 to C3509, inclusive.

Further the detector 2900 comprises ten amplifiers 0AMP to 9AMP, inclusive, respectively connected to the ten best conductors C3500 to C3509, inclusive, and ten test stop relays 0R to 9R, inclusive, respectively associated with the ten amplifiers 0AMP to 9AMP, inclusive. Also the detector 2900 comprises ten best mark relays 0T to 9T, inclusive, ten test lock relays 0S to 9S, inclusive, ten step relays 0K to 9K, inclusive, and a first set of four cycle relays KA, KB, KC and KD. Further the detector 2900 comprises a number of finder relays 1F to 6F, inclusive, individually corresponding to the various register translators, the finder relay 6F individually corresponding to the register translator 1700; and a second set of four cycle relays FA, FB, FC and FD. Further the detector 2900 comprises, in addition to the relays mentioned, a relay group including a start relay R3210, a stop relay R3220, a hold relay R3230, two test relays R3240 and R3250, four control relays R3260, R3270, R3280 and R3310, a mark relay R3290, two pulse relays R315 and R3320, two pulse control relays R3330 and R3335, a first test relay R3340, a lock relay R3345, a second test relay R3350, an alarm relay R3360, a control relay R3170 and two switching relays R3710 and R3810. Also the detector 2900 comprises a tone generator 3160, a coupling transformer 3161, a reset key K3370, an alarm A3375, and a control network connected and arranged in a manner more fully described hereinafter.

Finally the detector 2900 comprises four groups of marking leads 3801, 3701, 3802 and 3601 of the WXYZ type, which are respectively utilized for the purpose of marking the first, second, third and fourth digits of a detected directory number. More particularly, the WXYZ conductors in the first and third groups of marking leads 3801 and 3802 are marked by the various step relays 0K to 9K, inclusive, while the WXYZ conductors in the second and fourth groups of marking leads 3701 and 3601 are respectively marked by the various test lock relays 0S to 9S, inclusive, and by the various test mark relays 0T to 9T, inclusive.

More particularly, it is pointed out that the WXYZ conductors in each of the groups of marking leads 3801, 3802, 3701 and 3601 are marked in accordance with a code arrangement. For example, the various step relays 0K to 9K, inclusive, mark the WXYZ conductors in the first group of marking leads 3801 in accordance with the particular thousand digit of the directory number of the calling subscriber line terminating at exchange 4 zone 84 and detected by the detector 2900, and in accordance with the following code:

| Particular Thousand Digit | Marked WXYZ conductors in the First Group of Marking Leads 3801 |
|---|---|
| 1 | W and X |
| 2 | W and Y |
| 3 | W and Z |
| 4 | X and Y |
| 5 | X and Z |
| 6 | Y and Z |
| 7 | W |
| 8 | X |
| 9 | Y |
| 0 | Z |

Preferably each of the toll ticket repeaters included in exchange 4 zone 84 is identical to the toll ticket repeater 800 which comprises, as best shown in Figs. 8 to 11, inclusive, a unit time switch U1010 of the rotary type, including four wipers 1011 to 1014, inclusive, provided with individually associated contact banks, and a magnet UM1015 for driving the wipers noted; a ten and hundred time switch D1020 of the rotary type, including six wipers 1021 to 1026, inclusive, provided with individually associated contact banks, and a magnet DM1027 for driving the wipers noted; a register and timer switch R1100 of the rotary type, including six wipers 1101 to 1106, inclusive, provided with individually associated contact banks, and a magnet RM1106 for driving the wipers noted; and a storage transfer switch S1110 of the rotary type, including six wipers 1111 to 1116, inclusive, provided with individually associated contact banks, and a magnet SM1117 for driving the wipers noted.

Further the toll ticket repeater 800 comprises fifteen code storage devices S1121 to S1135, inclusive, of the WXYZ type and a code storage device S1031 comprising a single W magnet.

Also the toll ticket repeater 800 comprises a relay group including a busy relay R810, a test relay R820, a hold relay R840, two control relays R830 and R850, a time pulse relay R860, a code relay R910, a step relay R920, a wiper switching relay R930, an answer relay R940, a switch-through relay R950 and an impulse relay R960. Further the toll ticket repeater 800 comprises a transformer 900, an alarm A864, a release lamp L946, a four-hour alarm lamp L1044, a thirty-minute alarm lamp L1043 and two terminal blocks B1136 and B1137, and a control network connected and arranged in a manner more fully explained hereinafter.

At this point it is noted that a two-digit number is assigned each individual toll ticket repeater; the number 01 being assigned the toll ticket repeater 800. More particularly, the digits 0 and 1 are respectively set up in WXYZ code on the terminal blocks B1136 and B1137, in the manner previously explained.

In the toll ticket repeater 800 the register and timer switch R1100 is arranged to time the duration of a completed connection as well as to control the registration in the code storage devices S1121 to S1135, inclusive, of the various items of code information registered in an associated register translator. The unit time switch U1010 and the ten and hundred time switch D1020 are respectively arranged to register the unit minute time interval and the ten and hundred minute intervals of the total time duration of a completed connection; while the storage transfer switch S1110 in arranged to control the transfer of the various items of code information registered in the code storage devices S1121 to S1135, inclusive, and S1031, in the unit time switch U1010, in the ten and hundred time switch D1020 and in the terminal blocks B1136 and B1137 to an associated printer controller.

The date and time unit 3900 comprises, as best shown in Figs. 39 to 41, inclusive, a timer switch 3910 of the rotary type, including a single wiper provided with an associated contact bank, and a magnet M3912 for driving the wipers noted; a unit minute switch 3920 of the rotary type, including three wipers 3921 to 3923, inclusive, provided with individually associated contact banks, and a magnet M3924 for driving the wipers noted; a ten minute switch 4010, including three wipers 4011 to 4013, inclusive, provided with individually associated contact banks, and a magnet M4014 for driving the wipers noted; an hour switch 4020, including five wipers 4021 to 4025, inclusive, provided with individually associated contact banks, and a magnet M4026 for driving the wipers noted; a day switch 4110, including eight wipers 4111 to 4118, inclusive, provided with individually associated contact banks, and a magnet M4119 for driving the wipers noted; and a month switch 4120, including six wipers 4121 to 4126, inclusive, provided with individually associated contact banks, and a magnet M4127 for driving the wipers noted. Also the date and time unit 3900 comprises a master clock 3901 of any suitable type and a relay group, including a pulse relay R3940, a minute relay R3950 and a control relay R4140. Further the date and time unit 3900 comprises a start key K3930, a minute correct key K3935, an hour correct key K4030, a day correct key K4040, a month correct key K4130, and a control network connected and arranged in a manner more fully explained hereinafter.

In the date and time unit 3900 the masterclock 3901 is arranged to transmit twelve ground impulses per minute to the pulse relay R3940; and the timer switch 3910 is controlled by the pulse relay R3940 and is arranged to control the unit minute switch 3920. The unit minute switch 3920 controls the ten minute switch 4010 which in turn controls the hour switch 4020. Finally the hour switch 4020 controls the day switch 4110 which in turn controls the month switch 4120. At this point it is noted that the unit minute switch 3920 and the ten minute switch 4010 are adapted, respectively, to register continuously unit and ten minute time intervals; the hour switch 4020 is adapted to register both unit and ten hour intervals; the day switch 4110 is adapted to register both unit and ten day intervals; and the month switch 4120 is adapted to register both unit and ten month intervals.

Figure 42:
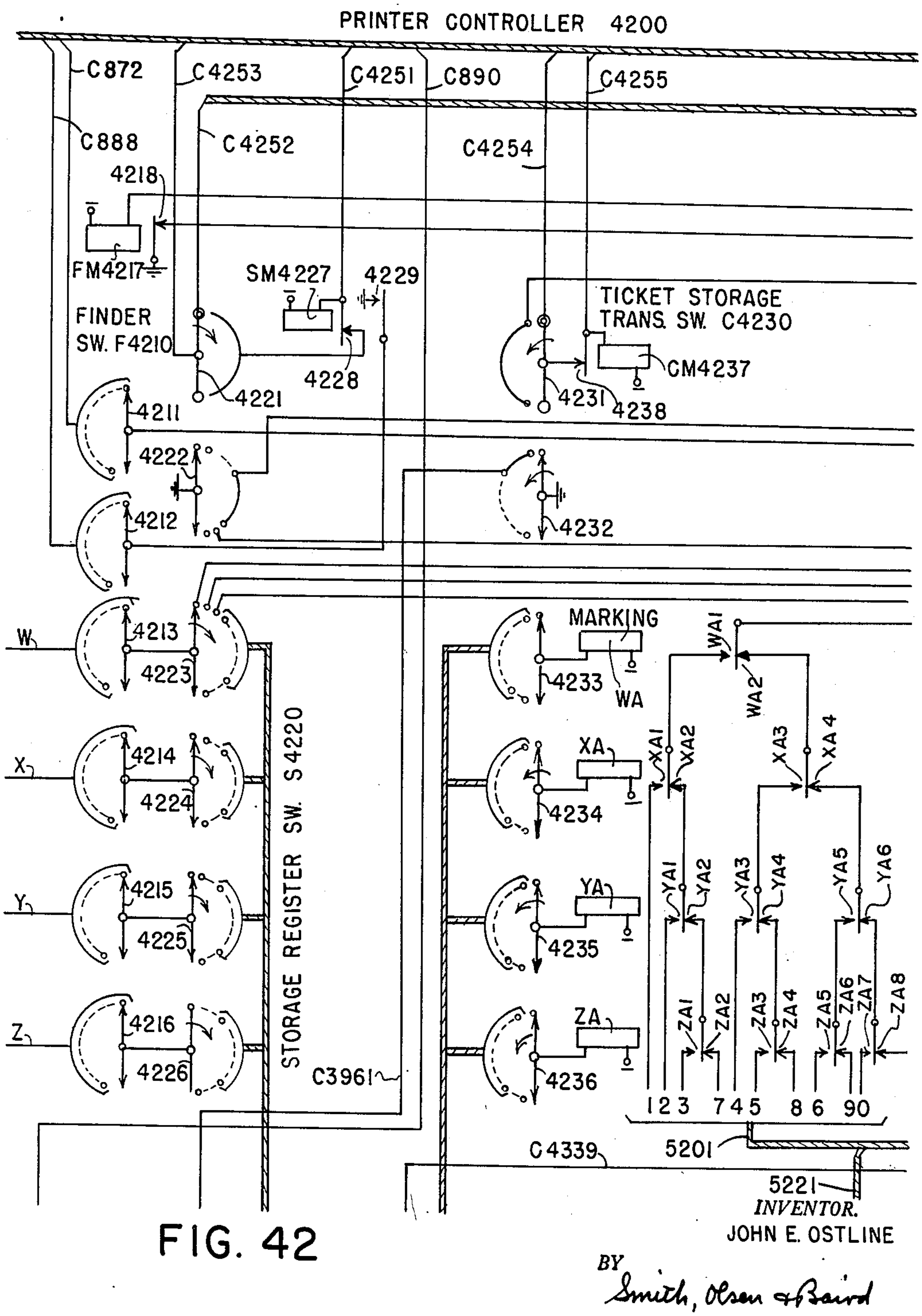
Figure 43:
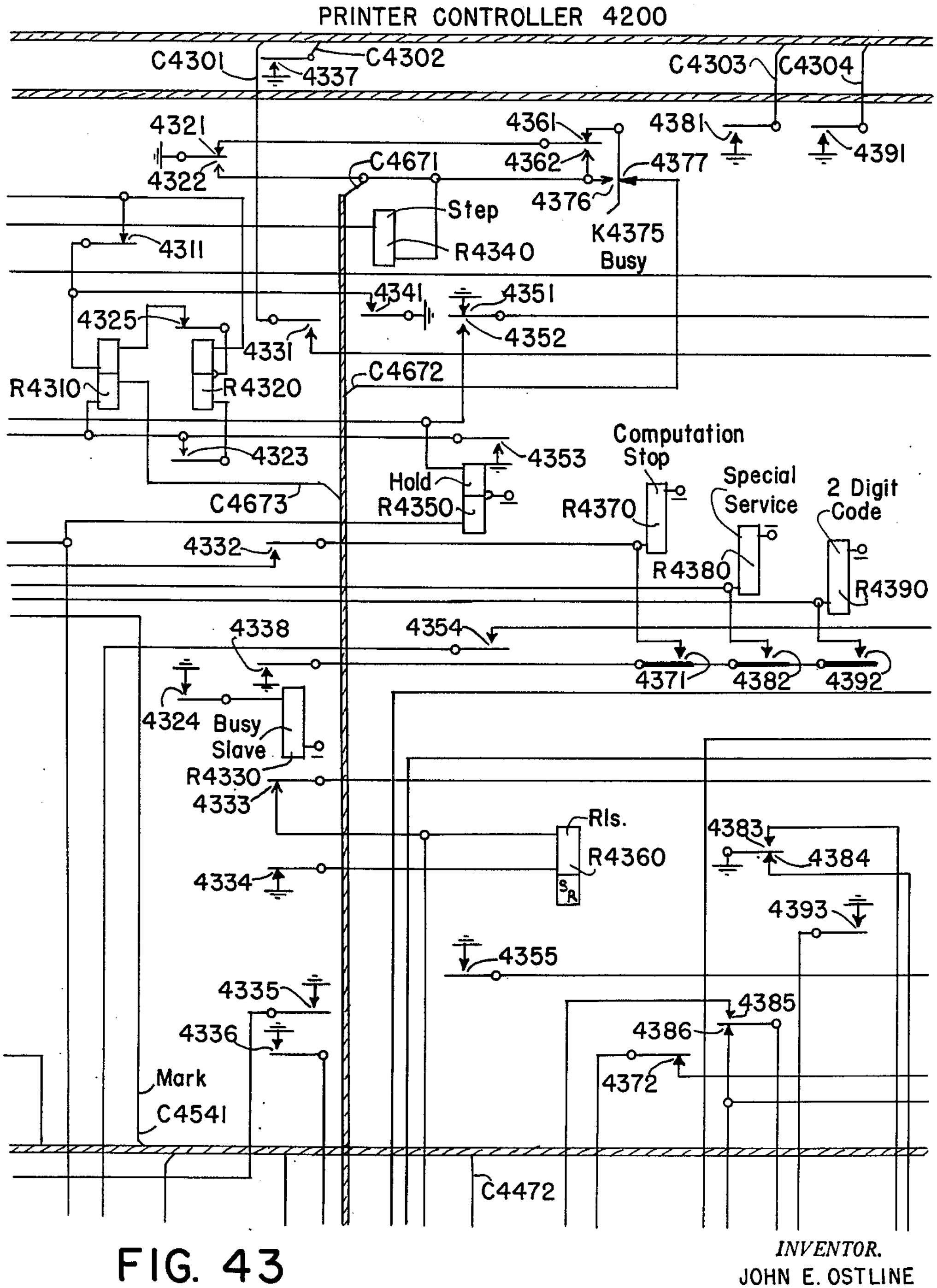
Figure 44:
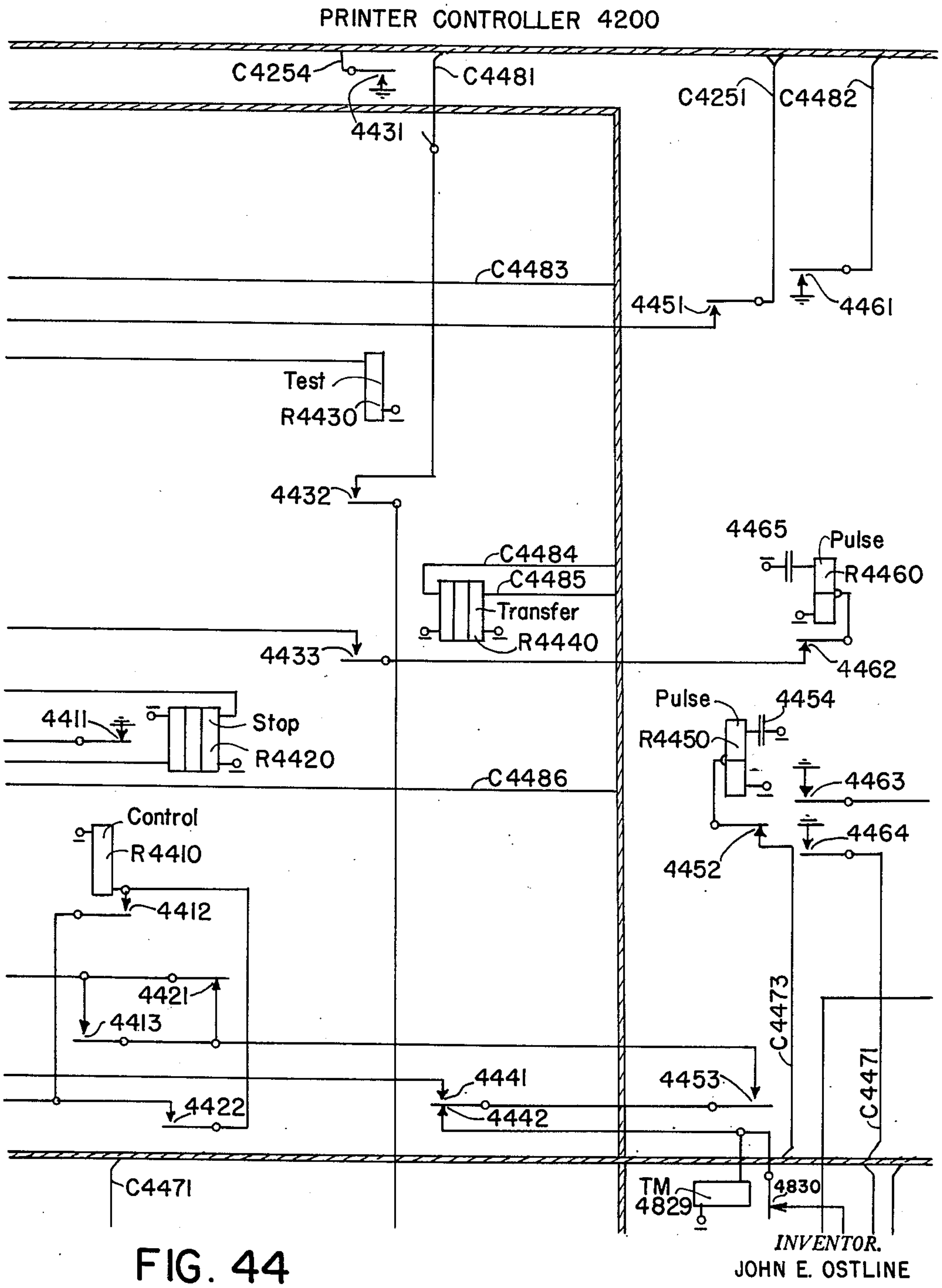
Figure 45:
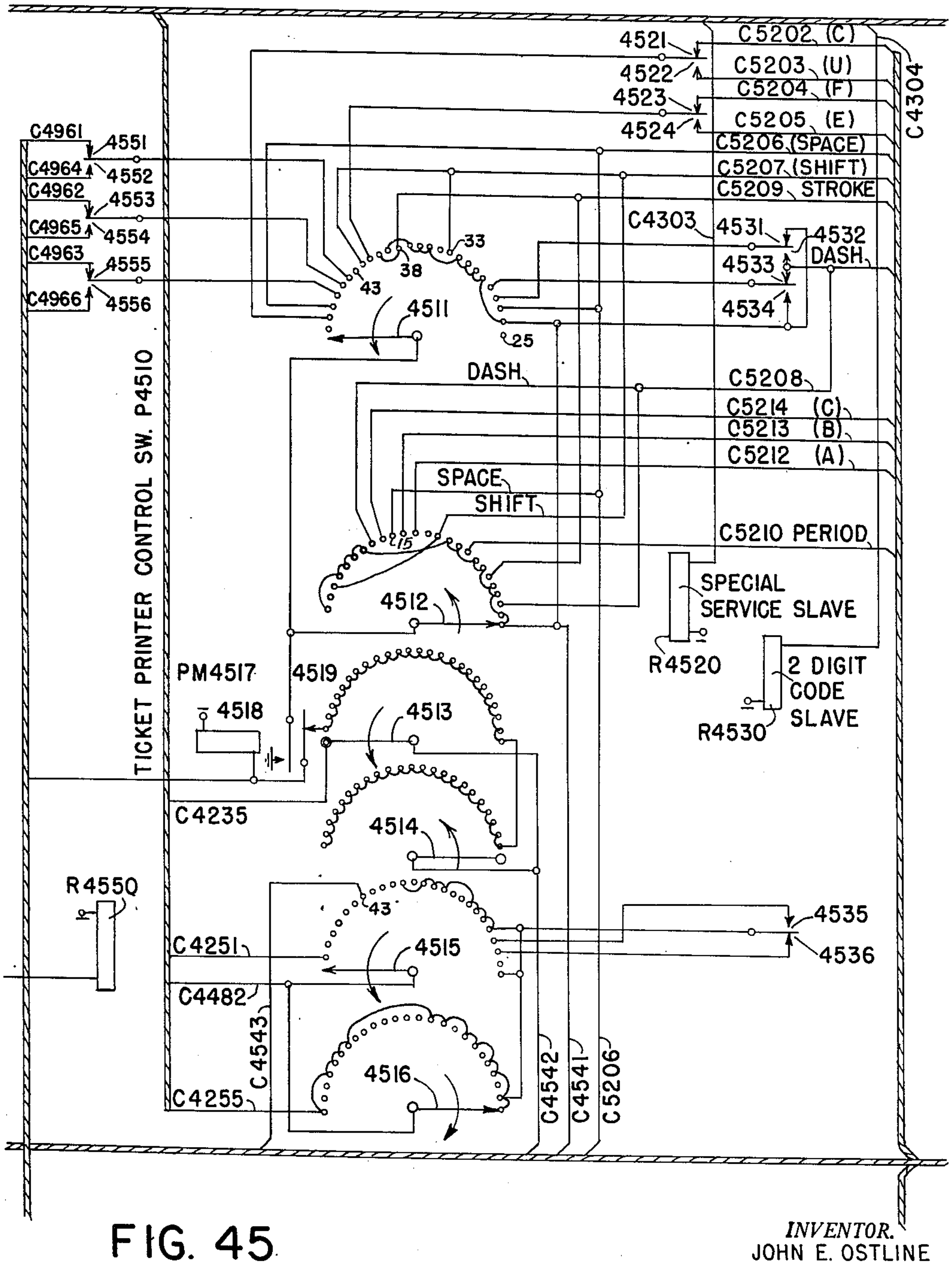

Preferably the finders in exchange 4 zone 84 which are individually associated with the printer controllers are identical. For example, the finder F4210 individually associated with the printer controller 4200 is of the rotary type and includes, as best shown in Fig. 42, six wipers 4211 to 4216, inclusive, provided with individually associated contact banks, and a magnet FM4217 for driving the wipers noted.

Preferably each of the printer controllers included in exchange 4 zone 84 is identical to the printer controller 4200 which comprises, as best shown in Figs. 42 to 49, inclusive, a storage register switch S4220 of the rotary type, including six wipers 4221 to 4226, inclusive, provided with individually associated contact banks, and a magnet SM4227 for driving the wipers noted; a ticket storage transfer switch C4230 of the rotary type, including six wipers 4231 to 4236, inclusive, provided with individually associated contact banks, and a magnet CM4237 for driving the wipers noted; a ticket printer control switch P4510 of the rotary type, including six wipers 4511 to 4516, inclusive, provided with individually associated contact banks, and a magnet PM4517 for driving the wipers noted; a calculator setting switch M4730 of the rotary type, including five wipers 4731 to 4735, inclusive, provided with individually associated contact banks, and a magnet MM4736 for driving the wipers noted; a record storage transfer switch R4810 of the rotary type, including five wipers 4811 to 4815, inclusive, provided with individually associated contact banks, and a magnet RM4816 for driving the wipers noted; and a calculator selector switch T4820 of the rotary type, including eight wipers 4821 to 4828, inclusive, provided with individually associated contact banks, and a magnet TM4829 for driving the wipers noted.

Also the printer controller 4200 comprises three calculating switches C4900, B4920 and A4940 of the Strowger type. The calculating switch C4900 comprises a wiper set, including six wipers 4901 to 4906, inclusive, and an associated contact bank; the associated contact bank comprising ten vertically spaced-apart rows or levels of contact sets, each level of contact sets including ten circumferentially spaced-apart individual contact sets. Also the calculating switch C4900 comprises a vertical magnet CM4907 for driving the wiper set step by step in the vertical direction away from its normal vertical position, a rotary magnet CM4908 for driving the wiper set step by step in the rotary direction away from its normal rotary position, and a release magnet CM4909 for releasing the wiper set and for causing it to be returned to its normal vertical and rotary positions. Further there is associated with the calculating switch C4900 a set of switch springs CS4910 which is actuated when the wiper set is moved in the vertical direction away from its normal vertical position. The calculating switch B4920 comprises a wiper set, including six wipers 4921 to 4926, inclusive, and an associated contact bank; the associated contact bank comprising ten vertically spaced-apart rows or levels of contact sets, each level of contact sets including ten circumferentially spaced-apart individual contact sets. Also the calculating switch B4920 comprises a vertical magnet BM4927 for driving the wiper set step by step in the vertical direction away from its normal vertical position, a rotary magnet BM4928 for driving the wiper set step by step in the rotary direction away from its normal rotary position, and a release magnet BM4929 for releasing the wiper set and for causing it to be returned to its normal vertical and rotary positions. Further there is associated with the calculating switch B4920 a set of switch springs BS4930 which is actuated when the wiper set is moved in the vertical direction away from its normal vertical position. The calculating switch A4940 comprises a wiper set, including six wipers 4941 to 4946, inclusive, and an associated contact bank; the associated contact bank comprising ten vertically spaced-apart rows or levels of contact sets, each level of contact sets including ten circumferentially spaced-apart individual contact sets. Also the calculating switch A4940 comprises a vertical magnet AM4947 for driving the wiper set step by step in the vertical direction away from its normal vertical position, a rotary magnet AM4948 for driving the wiper set step by step in the rotary direction away from its normal rotary position, and a release magnet AM4949 for releasing the wiper set and for causing it to be returned to its normal vertical and rotary positions. Further there is associated with the calculating switch A4940 a set of switch springs AS4950 which is actuated when the wiper set is moved in the vertical direction away from its normal vertical position.

Further the printer controller 4200 comprises a relay group, including a first set of four marking relays WA, XA, YA and ZA, a test relay R4310, a busy relay R4320, a busy slave relay R4330, a step relay R4340, a hold relay R4350, a release relay R4360, a computation stop relay R4360, a special service relay R4380, a two-digit code relay R4390, a control relay R4410, a stop relay R4420, a test relay R4430, a transfer relay R4440, two pulse relays R4450 and R4460, a wiper switching relay R4550, a special service slave relay R4520, a two-digit code slave relay R4530, a second set of four marking relays WB, XB, YB and ZB, a control relay R4710 and a slip relay R4750. Also the printer controller 4200 comprises a busy key K4375, eighteen code storage devices S4621 to S4638, inclusive, of the WXYZ type previously described, two terminal blocks B4640 and B4740 of the WXYZ type, and a control network connected and arranged in a manner more fully explained hereinafter.

At this point it is noted that a number is assigned each individual printer controller and is set up on one of the terminal blocks thereof in WXYZ code; while the identification of the zone and the exchange, including the printer controller, is set upon on the other terminal block thereof in WXYZ code. More particularly, the number 2 is assigned the printer controller 4200 and is set up in WXYZ code on the terminal block B4740 thereof to the associated group of WXYZ marking leads 4701, in the manner previously explained; while the numbers 84 and 4 identifying the zone and the exchange, including the printer controller 4200, is set up on the terminal block B4640 thereof in WXYZ code marking the respective groups of WXYZ marking leads 4611, 4612 and 4613, in the manner previously explained.

In the printer controller 4200 the storage register switch S4220 is arranged to register in the code storage devices S4621 to S4638, inclusive, and in the computation stop relay R4370, the special service relay R4380 and the two-digit code relay R4390, the various items of record information previously stored in the toll ticket repeater selected by the finder F4210; the ticket storage transfer switch C4230 is arranged to transfer the record items stored in various ones of the code storage devices S4621 to S4638, inclusive, in the groups of WXYZ marking leads 4601 to 4608, inclusive, in the terminal block B4640 and in the calculator selector switch T4820 to the toll ticket printer 5230 in order selectively to control the operation thereof to print a toll ticket; the record storage transfer switch R4810 is arranged to transfer the record items stored in various ones of the code storage devices S4621 to S4638, inclusive, in the groups of WXYZ marking leads 4601 to 4608, inclusive, in the terminal blocks B4640 and B4740 and in the calculator selector switch T4820 to the record printer 5240 in order selectively to control the operation thereof to print a record sheet; while the ticket printer control switch P4510 is arranged to control the operation of the toll ticket printer 5230 in order to cause the record items transferred thereto to be printed in appropriate form upon the toll ticket. The calculator selector switch T4820 is arranged to select one of the calculating switches C4900, B4920 or A4940 in accordance with the established rate factor registered in the code storage device S4621, in a manner more fully explained hereinafter; while the calculator setting switch M4730 is adapted selectively to set the selected calculating switch both in accordance with the operated position of the special service relay R4380 and the time duration of the established connection as registered in the code storage devices S4623 and S4624, in a manner more fully explained hereinafter.

Figure 46:
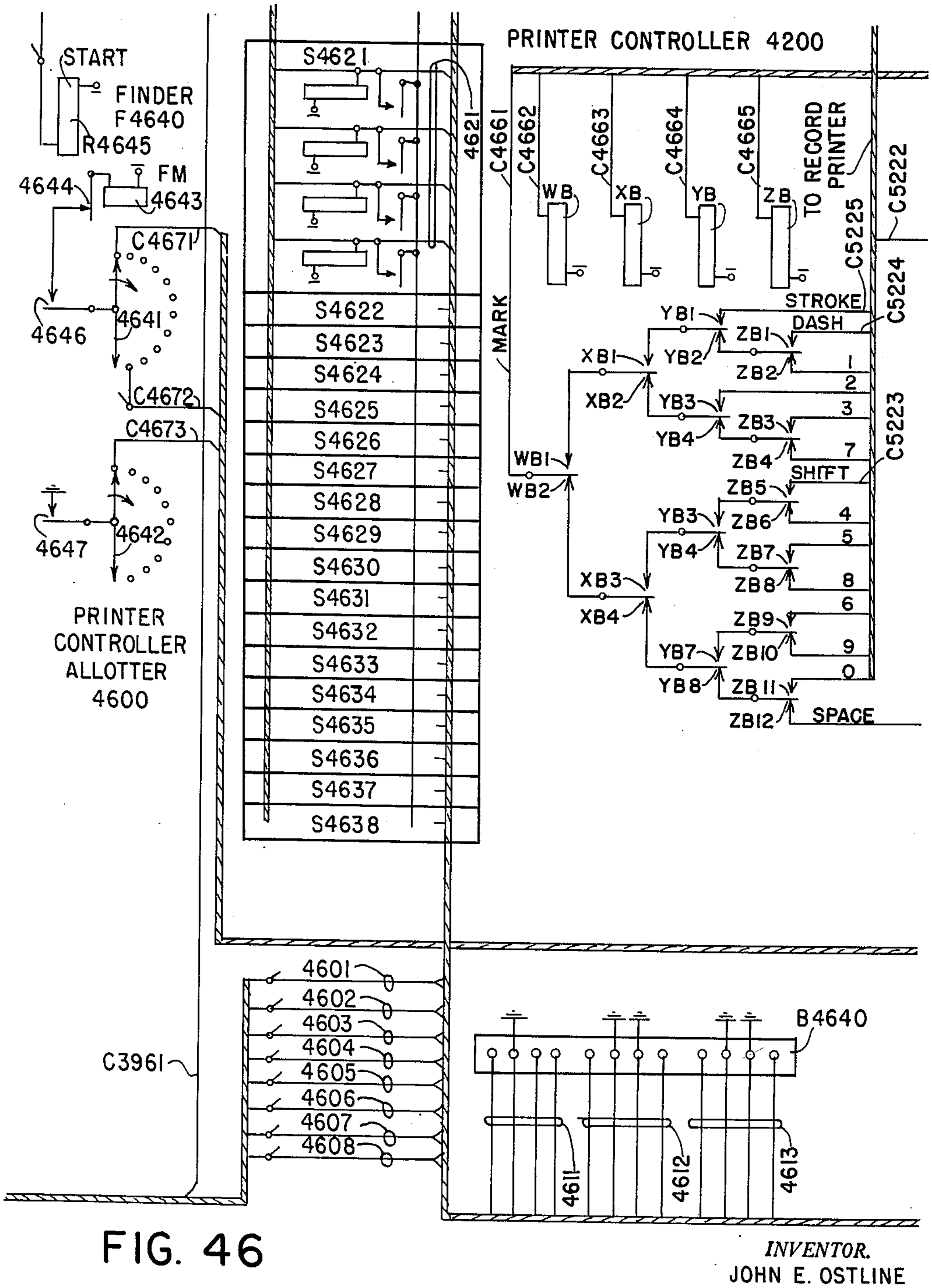
Figure 47:
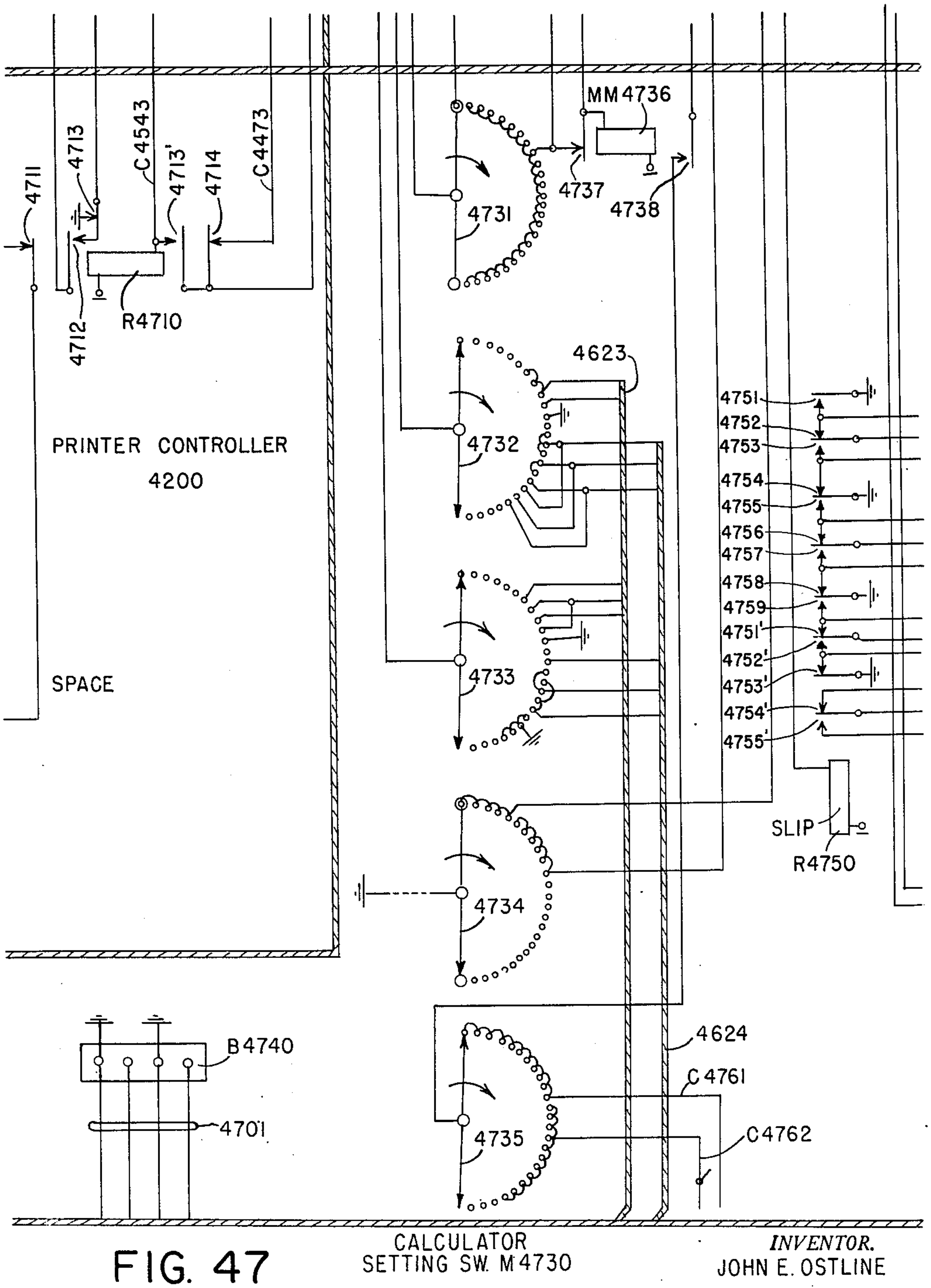
Figure 48:
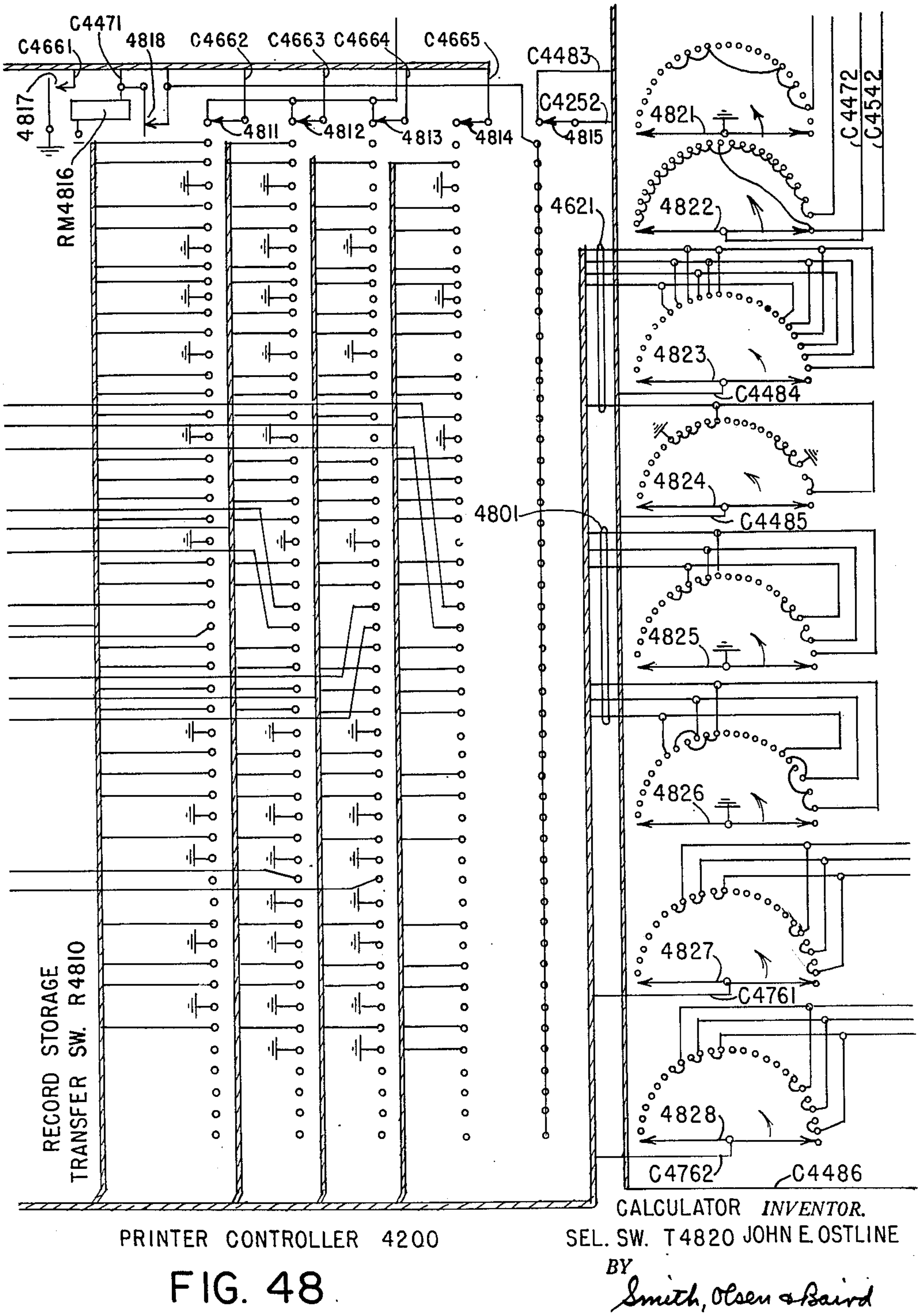
Figure 49:
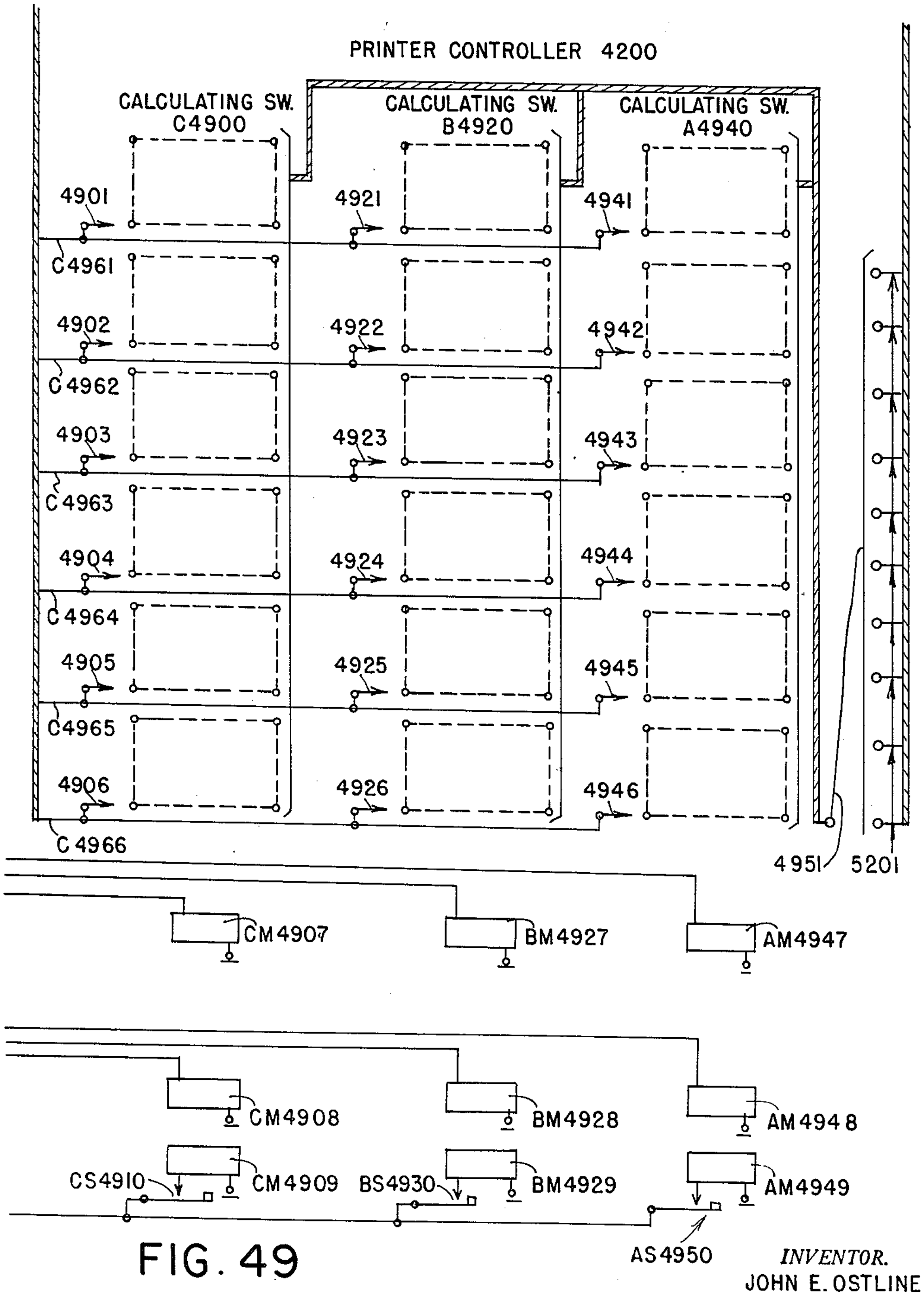

The printer controller allotter 4600 provided in exchange 4 zone 84 comprises, as best shown in Fig. 46, a finder F4640 of the rotary type, including two wipers 4641 and 4642 provided with individually associated contact banks, and a magnet FM4643 for driving the wipers noted. Also the printer controller allotter 4600 comprises a start relay R4645 and a control network connected and arranged in a manner more fully explained hereinafter.

The printer link 5000 provided in exchange 4 zone 84 comprises, as best shown in Figs. 50 and 51, a finder F5010 of the rotary type, including a single wiper 5011 provided with an associated contact bank, and a magnet FM5012 for driving the wiper noted; a control switch S5020 of the rotary type, including three wipers 5021 to 5023, inclusive, provided with individually associated contact banks, and a magnet SM5024 for driving the wipers noted; a counting switch A5110 of the rotary type, including two wipers 5111 and 5112 provided with individually associated contact banks, and a magnet AM5113 for driving the wipers noted; and a counting switch B5120 of the rotary type, including three wipers 5121 to 5123, inclusive, provided with individually associated contact banks, and a magnet BM5123 for driving the wipers noted. Also the printer link 5000 comprises a relay group including a test relay R5030, a start relay R5040, a pulse relay R5060, a hold relay R5070, a release relay R5080, a toll ticket test relay R5090, a power alarm relay R5130, a toll ticket relay R5140, a record relay R5150 and a reset relay R5160. Further the printer link 5000 comprises a reset key K5166, a toll ticket register R5137, a power alarm A5133, a toll ticket alarm A5134, a record alarm A5135, a paper alarm A5136, and a control network connected and arranged in a manner more fully explained hereinafter.

In the printer link 5000 the control switch S5020 is arranged to control the operation of the toll ticket printer 5230 in order to cause the record information to be printed in proper form on the associated toll ticket and to cause the toll ticket thus produced to be cut off of the roll of paper stock upon which it is printed, in a manner more fully explained hereinafter; while the counting switches A5110 and B5120 are arranged to count the actual number of tickets which are issued by the toll ticket printer 5230.

The toll ticket printer 5230 included in exchange 4 zone 84, diagrammatically illustrated in Fig. 52, is of the construction and arrangement of that disclosed in the copending application of John E. Ostline, Serial No. 438,760, filed April 13, 1942, now Patent No. 2,360,789, granted October 17, 1944, and comprises among other elements, an operating motor 5231, a test magnet M5232, a paper engaging rod 5236, a set of switch springs S5233 and a number of operating magnets including the printing magnet #1PM illustrated. Also, the toll ticket printer 5230 comprises a control circuit connected and arranged in a manner more fully explained hereinafter. A terminal block B5211 is associated with the toll ticket printer 5230 and is arranged to convert the control potentials applied to the conductors C5212, C5213 and C5214 to numerical controls, in a manner more fully explained hereinafter.

Referring now more particularly to Fig. 54, the mechanical construction and arrangement of the toll ticket printer 5230 is illustrated in greater detail and comprises an automatic typewriter of the type known as the "Electromatic" typewriter having the general construction and arrangement shown in U. S. Patent No. 1,777,055, Russell G. Thompson, granted September 30, 1930. The toll ticket printer 5230 comprises an upper main frame 5401, a connected lower subframe 5402 housing the power mechanism, a movable carriage 5403 and a plurality of type levers 5404. The power mechanism comprises the usual operating motor 5231, power roll, clutch mechanism between the power roll and the type levers 5404, and a plurality of operating keys. The subframe 5402 comprises casing structure 5405 receiving the operating motor 5231; while the main frame 5401 supports a removable type hood 5406 protecting the type levers 5404. Also the main frame 5401 carries a plurality of operating magnets and a plurality of printing magnets adapted to control the associated operating keys and supports a removable magnet hood 5407 protecting the operating magnets and the printing magnets. The carriage 5403 comprises the usual assembly including a platen roll 5409 cooperating with the type levers 5404.

Further, the toll ticket printer 5230 comprises paper supporting and guiding mechanism 5410 and paper cutting mechanism 5411, both carried by the carriage 5403, and paper position testing mechanism 5412 carried by the subframe 5402. The paper supporting and guiding mechanism 5410 is carried by the carriage 5403 and comprises structure for supporting a roll of ribbon-like paper stock 5413 and for guiding the end of the ribbon of paper stock over the front face of the platen roll 5409. The paper cutting mechanism 5411 is carried by the paper supporting and guiding mechanism 5410 and comprises a base 5414, paper guiding structure 5415 adapted to receive the end of the ribbon of paper stock from the platen roll 5409 and a paper chute 5416. Also the paper cutting mechanism 5411 comprises a knife support 5417 cooperating with tabulating mechanism 5418 incorporated in the toll ticket printer 5230. The paper position testing mechanism 5412 comprises the magnet M5232 which is provided with a movable armature 5419 carrying the paper engaging rod 5236. The paper engaging rod 5236 cooperates with a peripheral band of the adjacent end of the roll of paper stock 5413 and is adjustable both toward and away from the center of the roll of paper stock 5413 and toward and away from the adjacent end thereof, in an obvious manner. Also, the magnet M5232 controls the set of switch springs S5233, in a manner more fully explained hereinafter.

Considering now the general mode of operation of the toll ticket printer 5230 from a mechanical standpoint, the carriage normally occupies its right-hand marginal stop position, as viewed from the front. The printing magnets are selectively energized in order to cause the type levers 5404 to strike the section of the ribbon of paper stock carried by the adjacent portion of the platen roll 5409, whereupon the carriage 5403 is moved step by step toward the left, as viewed from the front, in a well-known manner. After a line of printing has been completed on the ribbon of paper stock the return and line space operating magnet is energized, whereby the carriage 5403 is returned to its right-hand marginal stop position, as viewed from the front, and the ribbon of paper stock is spaced one space in readiness to receive the next line of printing, in a well-known manner. At the conclusion of a complete printing operation the carriage 5403 occupies a position displaced from the right-hand marginal stop position, as viewed from the front, whereupon the return and line space operating magnet is energized a plurality of times in order to cause the carriage 5403 to be returned to its normal right-hand stop position and to cause the platen roll 5409 to be spaced a corresponding plurality of times. At this time the section of paper stock upon which the printing appears is fed through the paper guiding structure 5415 and into the paper chute 5416, and the tabulating operating magnet is energized. When the tabulating operating magnet is thus energized the carriage 5403 is automatically moved from its right-hand marginal stop position to its left-hand marginal stop position, as viewed from the front, and the tabulating mechanism 5418 hangs the knife support 5417. Accordingly, at this time, normal movement of the knife support 5417 with the carriage 5403 is arrested and relative movement between the knife support 5417 and the base 5414 occurs. More particularly, the ribbon of paper stock supported by the carriage 5403 is moved across the knife carried by the knife support 5417 from the right toward the left, as viewed from the front; whereupon the ribbon of paper stock upon which the printing appears is severed from the roll 5413 and constitutes a ticket which slides down the paper chute 5416 due to the action of gravity into a suitable receptacle.

When the carriage 5403 is completely returned to its left-hand marginal stop position, as viewed from the front, the tabulating mechanism 5418 is released; whereupon the knife support 5417 is retracted to its normal position. The return and line space operating magnet is then energized in order to cause the carriage 5403 to be returned to its normal right-hand marginal stop position, as viewed from the front. At this time the toll ticket printer 5230 is completely released and is available for further use for the next printing operation.

During the operation of the toll ticket printer 5230, when the carriage 5403 occupies its normal right-hand marginal stop position, as viewed from the front, and there is ample paper stock upon the paper roll 5413, the rod 5236 is engaged, thereby to move the armature 5419 toward the core of the magnet M5232 incorporated in the paper position testing mechanism 5412. When the toll ticket printer 5230 is seized for use the magnet M5232 is energized, thereby to retain the armature 5419 attracted toward the core. Subsequently, after the complete operation of the toll ticket printer 5230 the carriage 5403 is operated toward its right-hand marginal stop position, as viewed from the front, and the magnet M5232 is deenergized. At this time the armature 5419 remains in its position adjacent the core only in the event that the carriage 5403 is moved fully to its right-hand marginal stop position and in the additional event that there is adequate paper stock upon the roll 5413 in order to engage the end of the rod 5236. Hence it will be understood that, at the conclusion of the operation of the toll ticket printer 5230, in the event the carriage 5403 is not returned completely to its right-hand marginal stop position, as viewed from the front, or there is inadequate paper stock upon the roll 5413, the rod 5236 is not engaged and the armature 5419 is moved away from the core. When the armature 5419 is moved away from the core the set of switch springs S5233 is actuated for signal purposes, in a manner more fully explained hereinafter, in order to indicate that one of the conditions mentioned above exists and that the toll ticket printer 5230 is accordingly not in readiness for subsequent reoperation.

The record printer 5240 included in exchange 4 zone 84, diagrammatically illustrated in Fig. 52, is of conventional construction and arrangement and may take the form of an automatic typewriter of the general character of that known as the "Electromatic" typewriter. The record printer 5240 comprises, among other elements, an operating motor 5241, a set of switch springs S5242 and a number of operating magnets, including the stroke magnet PM illustrated. Also the record printer 5240 comprises a control circuit connected and arranged in a manner more fully explained hereinafter.

The record printer 5240 is so connected and arranged that it is adapted to be controlled from any one of the printer controllers 4200 etc. to print a record sheet of the character of that shown in Figs. 55 and 61 containing all of the necessary record information in conjunction with each metropolitan toll call which is extended from exchange 4 zone 84 and which is to be recorded. Referring to Figs. 55 and 61, it is noted that the record printer 5240 prints one line across the record sheet for each metropolitan toll call which includes the following information illustrated;

1. The month, the day, the hour and the minute of the termination of the call.
2. The zone and the exchange code, as well as the numerical line terminal of the directory number of the calling subscriber substation.
3. The zone and the exchange code, as well as the numerical line terminal of the directory number of the called subscriber substation.
4. The time duration of the call in minutes.
5. The rate factor applicable to the call.
6. The class of service rendered the calling subscriber substation.
7. The identification numbers of the register translator, the toll ticket repeater and the printer controller utilized in setting up the call and in controlling the record printer 5240.

The toll ticket printer 5230 is so connected and arranged that it is adapted to be controlled from any one of the printer controllers 4200 etc. and the printer link 5000 to print and to produce toll tickets of the character of that shown in Figs. 56 to 60, inclusive, and Fig. 62 containing all of the necessary record information in conjunction with each metropolitan toll call which is extended from exchange 4 zone 84 and which is to be recorded. Referring to Figs. 56 to 60, inclusive, and Fig. 62, it is noted that the toll ticket printer 5230 prints a toll ticket individual to each metropolitan toll call which includes the following information illustrated:

1. The month, the day, the hour and the minute of the termination of the call.
2. The zone and the exchange code, as well as the numerical line terminal of the directory number of the calling subscriber substation.
3. The zone and the exchange code, as well as the numerical line terminal of the directory number of the called subscriber substation.
4. The time duration of the call in minutes, the rate factor applicable to the call and the class of service rendered the calling subscriber substation.
5. The cost of the call on the appropriate charge basis (either the monetary basis or the unit call basis).

Figure 5:
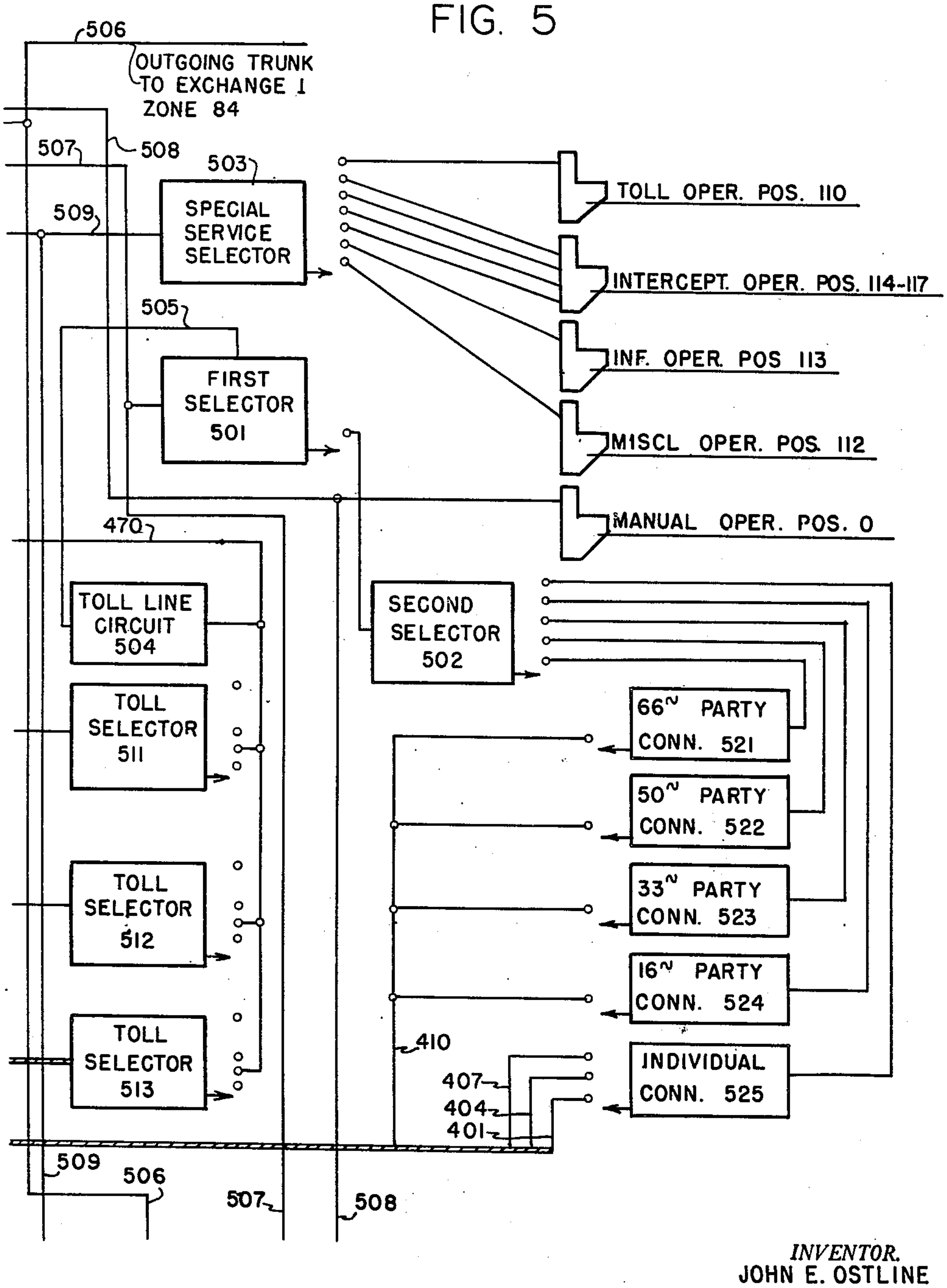

Preferably, in exchange 4 zone 84, each first selector, such as the first selector 501, each second selector, such as the second selector 502, each special service selector, such as the special service selector 503, each toll selector, such as the toll selectors 511, 512 and 513, each individual connector, such as the individual connector 525, and each party connector, such as the party connectors 521, 522, 523 and 524, diagrammatically illustrated in Fig. 5, are of the well-known Strowger type. At this point it is noted that the special service selector 503 is of the well-known drop-back Strowger type. Finally, at the switchboard in exchange 4 zone 84, the manual operator position 0, the toll operator position 110, the miscellaneous operator position 112, the information operator position 113 and the interceptor operator position 114—117, as diagrammatically illustrated in Fig. 5, comprise conventional position apparatus for answering calls and for extending calls, when such is desirable, in a well-known manner.

Preferably, in exchange 4 zone 84, the ordinary repeaters 451 etc., diagrammatically illustrated in Fig. 4, as well as the toll line circuits 504 etc., diagrammatically illustrated in Fig. 5, are of conventional connection and arrangement.

A better understanding of the connection and arrangement of the apparatus incorporated in the telephone system will be facilitated from a consideration of the details of operation of the various pieces of apparatus incident to the extension of various calls from exchange 4 zone 84, as will appear hereinafter.

*The selection of an idle primary selector and an idle primary register*

In exchange 4 zone 84, when a call is initiated at a subscriber substation associated with one of the subscriber lines terminating thereat, an idle primary selector is automatically associated with the calling subscriber line. For example, when a call is initiated at the ordinary private subscriber substation TP by removing the receiver of the telephone instrument thereat from its associated switchhook, a bridge path is completed thereat between the line conductors C408 and C409 of the private subscriber line 407 and operation of the individually associated line switch 423 is initiated. The line switch 423 operates to find an idle primary selector in the second group, including the primary selector 600. Assuming that the primary selector 600 is the first idle primary selector in the second group, the line switch 423 operates to seize the trunk 462 extending thereto, the primary selector 600 being marked as idle by the absence of ground potential upon the control conductor C465 of the trunk 462 extending thereto. Also the line switch 423 operates to mark the private subscriber line 407 as busy to the connectors having access thereto.

When the primary selector 600 is thus seized by the line switch 423 a circuit is completed for energizing the winding of the line relay R730. This circuit extends from ground by way of the contacts 751, the contacts 720 of the set of switch springs S718, the contacts 771 and 626 to the line conductor C464; and from battery by way of the winding of R730, the contacts 773 and 624 to the line conductor C463, the line conductors C464 and C463 of the trunk 462 being connected together by way of the line switch 423, the line conductors C408 and C409 of the private subscriber line 407 and the bridge of the calling private subscriber substation TP. When thus energized the line relay R730 operates to complete, at the contacts 731, an obvious circuit, including the contacts 777, for energizing the winding of the hold relay R740, thereby to cause the latter relay to operate. At this point it is noted that an obvious path, including the contacts 751, the strap 723 and the resistor 722, is normally completed for short-circuiting the upper winding of the transfer relay R750, thereby positively to prevent the latter relay from operating at this time. Upon operating, the hold relay R740 completes, at the contacts 743, an obvious path including the contacts 628 for applying ground potential to the control conductor C465 of the trunk 462, thereby to mark the trunk 462 as busy to the other line switches having access thereto and to complete a holding circuit for retaining the line switch 423 in its operated position. Also the hold relay R740 completes, at the contacts 745, a connection including the contacts 634 and 618 between the test wiper 616 and the magnet FM617 of the finder F610. At this time the wipers 611 to 616, inclusive, of the finder F610 engage the contacts in the associated contact banks terminating the conductors extending to one of the primary registers, which primary register is marked either idle or busy, depending, respectively, upon the absence or presence of ground potential upon the test conductor thereof. Assuming that the primary register mentioned is busy, ground potential appears upon the test conductor thereof which is terminated by the contact engaged by the test wiper 616 of the finder F610, thereby to complete an obvious circuit for energizing the magnet FM617. When thus energized the magnet FM617 operates to condition the wipers noted of the finder F610 to be driven one step in the clockwise direction and to interrupt, at the contacts 618, the previously traced circuit for energizing the magnet FM617. The magnet FM617 then restores, thereby to drive the wipers noted of the finder F610 one step in the clockwise direction and to reprepare, at the contacts 618, a circuit substantially identical to that previously traced and including the test wiper 616 for testing the idle or busy condition of the next primary register.

Assuming that the primary register 1200 is the first idle primary register in the associated group, the magnet FM617 is operated intermittently, thereby to drive the wipers noted of the finder F610 step by step in the clockwise direction until they engage the contacts in the associated contact banks terminating the conductors C641 to C646, inclusive, extending to the primary register 1200; whereupon further operation of the magnet FM617 of the finder F610 is arrested. More particularly, when the wipers noted of the finder F610 engage the contacts in the associated contact banks terminating the conductors C641 to C646, inclusive, extending to the primary register 1200, no ground potential appears upon the test conductor C646, whereupon the previously traced circuit for energizing the magnet FM617 of the finder F610 is interrupted. At this time a series circuit is completed for energizing the winding of the cut-in relay R630 in the primary selector 600 and the magnet FM617 of the finder F610, this circuit extending from ground by way of the contacts 744, 733 and 629, the winding of R630, the contacts 618 and the magnet FM617 to battery. When this series circuit is completed the cut-in relay R630 operates; however, the magnet FM617 does not operate due to the high series resistance of the winding of the cut-in relay R630. At this point it is noted that, as long as the test wiper 616 of the finder F610 engages the contacts in the associated contact bank terminating test conductors having ground potential thereon, a path is completed for short-circuiting the winding of the cut-in relay R630, thereby positively to prevent operation of the latter relay until the finder F610 finds an idle primary register. The path mentioned for short-circuiting the winding of the cut-in relay R630 extends, when completed, from ground by way of the contacts 744, 733 and 629, the winding of R630 and the contacts 745 and 634 to the ground test wiper 616 of the finder F610. Accordingly, at this time, the finder F610 has operated to seize the idle primary register 1200.

Upon operating, the cut-in relay R630 completes, at the contacts 631 and 633, a series loop circuit for energizing the upper and intermediate windings of the line relay R1450 in the primary register 1200. This loop circuit extends from ground by way of the intermediate winding of R1450, the contacts 1443, C643, the wiper 613 of the finder F610 and the contacts 633 to the line conductor C464 of the trunk 462; and from battery by way of the upper winding of R1450, the contacts 1441, C641, the wiper 611 of the finder F610 and the contacts 631 to the line conductor C463 of the trunk 462, the line conductors of the trunk 462 being connected together by way of the bridge at the calling private subscriber substation TP, as previously noted. When this series circuit is completed the line relay R1450 operates to complete, at the contacts 1452, a circuit, including the contacts 1447 and 1434 and C1288, for energizing the winding of the hold relay R1240, thereby to cause the latter relay to operate. Upon operating, the hold relay R1240 completes, at the contacts 1245, a circuit for energizing the winding of the send relay R620 in the primary selector 600; this circuit extending from ground by way of the contacts 1245 and 1451, the wiper 1635 of the sequence switch S1630 and the engaged home contact in the associated contact bank, C1293, the contacts 1271, C642, the wiper 612 of the finder F610, the contacts 622 and 632 and the winding of R620 to battery. When thus energized the send relay R620 operates.

Also, upon operating, the hold relay R1240 in the primary register 1200 completes, at the contacts 1244, an obvious circuit for energizing the winding of the lock relay R1460, thereby to cause the latter relay to operate. Upon operating, the lock relay R1460 completes, at the contacts 1461, an obvious path for applying ground potential to the hold conductor C1294; whereby a circuit, including the wiper 1634 of the sequence switch S1630 and the engaged home contact in the associated contact bank and C1289, is completed for energizing the winding of the dial tone relay R1250 in order to cause the latter relay to operate. Upon operating, the dial tone relay R1250 completes, at the contacts 1252, an obvious circuit including the contacts 1445 for energizing the lower winding of the auxiliary line relay R1410, thereby to cause the latter relay to operate. Also the dial tone relay R1250 completes, at the contacts 1251, an obvious circuit, including the dial tone conductor C1215 and the condenser 1413, for energizing the lower winding of the line relay R1450; whereby dial tone voltage is induced into the upper and intermediate windings thereof in order to cause dial tone current to be returned over the previously traced loop circuit including the finder F610, the primary selector 600, the trunk 462, the line switch 423 and the private subscriber line 407 to the calling private subscriber substation TP, thereby to indicate to the subscriber thereat that he may proceed with the extension of the call by dialing the first digit of the called directory number.

Also the hold relay R1240 completes, at the contacts 1243, an obvious path including the contacts 1432 for applying ground potential to the test conductor C646, thereby to mark the primary register 1200 as busy to the other finders in the group, including the finder F610 having access thereto. Also the application of ground potential to the test conductor C646 completes a holding circuit, including the test wiper 616 of the finder F610 and the contacts 635 and 618, for energizing in series the winding of the cut-in relay R630 and the rotary magnet FM617. Further the lock relay R1460 completes, at the contacts 1464, an obvious path for short-circuiting the winding of the busy relay R1470, thereby positively to prevent operation of the latter relay at this time. Further it is noted that the application of ground potential to the hold conductor C1294 completes a circuit, including the contacts 1341 and 1322, for energizing the heater 1332 of the thermostatic timer 1330, whereby the bimetallic bar 1331 thereof is heated. When the bimetallic bar 1331 of the thermostatic timer 1330 is thus heated it moves toward closure of the associated contacts 1333, for a purpose more fully explained hereinafter.

When the send relay R620 in the primary selector 600 operates it completes, at the contacts 621, an obvious holding circuit, including the contacts 632, for energizing the winding thereof; and completes, at the contacts 623, an alternative circuit for energizing the winding of the line relay R730, this circuit extending from the grounded conductor C642 by way of the wiper 612 of the finder F610, the contacts 623 and 773 and the winding of R730 to battery. Also the send relay R620 completes, at the contacts 625, a circuit through the set of switch springs S718 which is utilized for a purpose more fully explained hereinafter; this circuit extending from ground by way of the contacts 751, the contacts 720 of the set of switch springs S718, the contacts 771 and 625, the wiper 614 of the finder F610, C644, the contacts 1374 and the resistor 1316 to battery. Further the send relay R620 interrupts, at the contacts 624 and 626, the previously traced original loop circuit for energizing the winding of the line relay R730; however, the latter relay remains in its operated position at this time due to the completed alternative circuit above traced for energizing the winding thereof. Further the send relay R620 interrupts, at the contacts 622, the original operating circuit for energizing the winding thereof; and interrupts, at the contacts 628, the previously traced original path for applying ground potential to the control conductor C465 of the trunk 462. Also the send relay R620 completes, at the contacts 627, an alternative path for applying ground potential to the control conductor C465 of the trunk 462, thereby to retain the line switch 423 in its operated position; this path extending from ground by way of the contacts 1372, C645, the wiper 615 of the finder F610 and the contacts 627 to the control conductor C465. Also this application of ground potential to the control conductor C465 of the trunk 462 retains the trunk 462 marked as busy to the other line switches 424, etc., having access thereto. Finally the send relay R620 interrupts, at the contacts 629, the previously traced original operating circuit for energizing the winding of the cut-in relay R630.

At this time the line switch 423 individually associated with the private subscriber line 407 has seized the primary selector 600; and the finder F610 individually associated with the primary selector 600 has seized the primary register 1200; and the primary register 1200 is in readiness to receive the first digit of the called directory number dialed at the calling private subscriber substation TP.

*Call to the manual operator position 0*

Assuming that the call extending from the calling private subscriber substation TP to the primary selector 600 and the primary register 1200 is to be extended to the manual operator position 0 in exchange 4 zone 84, the subscriber at the calling private subscriber substation TP proceeds to dial the directory number of the manual operator position 0, the directory number being the single digit 0.

When the subscriber at the calling private subscriber substation TP dials the single digit 0 a corresponding number of impulses are transmitted over the calling private subscriber line 407 in a well-known manner; whereby the line relay R1450 in the primary register 1200 follows the impulses of the digit 0 in view of the fact that the circuit for energizing the upper and intermediate windings thereof includes the previously traced loop circuit extending to the calling private subscriber substation TP. Hence, the line relay R1450 restores and reoperates intermittently in accordance with the digit 0. Each time the line relay R1450 restores and then reoperates it interrupts and then recompletes, at the contacts 1451, the previously traced circuit including the conductor C642 for energizing the winding of the line relay R730, thereby to cause the line relay R730 in the primary selector 600 to follow the line relay R1450 in the primary register 1200. Also each time the line relay R1450 restores and then reoperates it interrupts and then recompletes, at the contacts 1452, the previously traced circuit for energizing the winding of the hold relay R1240; however, the latter relay does not restore during impulsing as it is of the slow-to-release type. Finally each time the line relay R1450 restores and then reoperates it completes and then interrupts, at the contacts 1453, a circuit for energizing the winding of the dial relay R1260 and a multiple circuit for energizing the magnet AM1504 of the first code switch A1500. The above-mentioned circuit extends, when completed, from ground by way of the contacts 1447, 1453 and C1482 to the contacts 1241; from the contacts 1241 by way of the upper winding of the dial relay R1260 to battery; and from the contacts 1241 by way of the wiper 1631 of the sequence switch S1630 and the engaged home contact in the associated contact bank and the magnet AM1504 to battery. When thus energized the dial relay R1260 operates and remains operated during impulsing as it is of the slow-to-release type. Each time the above-traced circuit is completed the magnet AM1504 is energized and operates in order to condition the wipers noted of the first code switch A1500 to be driven one step in the counterclockwise direction; each time this circuit is interrupted the magnet AM1504 is de-energized and restores in order to drive the wipers noted of the first code switch A1500 one step in the counterclockwise direction.

Upon operating, the dial relay R1260 completes, at the contacts 1261, an obvious circuit for energizing the winding of the dial slave relay R1310, thereby to cause the latter relay to operate. Upon operating, the dial slave relay R1310 completes, at the contacts 1313, a circuit including C1324 for energizing the magnet SM1636 of the sequence switch S1630, thereby to cause the magnet SM1636 to operate in order to condition the wipers noted of the sequence switch S1630 to be driven one step in the counterclockwise direction. Also the dial slave relay R1310 interrupts, at the contacts 1311, a point in a circuit traced hereinafter for energizing the winding of the translate relay R1270; and interrupts, at the contacts 1312, a point in a circuit traced hereinafter for energizing the upper winding of the release relay R1430, thereby positively to prevent operation of either the translate relay R1270 or the release relay R1430 during impulsing.

At the conclusion of the single digit 0 the wipers noted of the first code switch A1500 engage the tenth contacts in the associated contact banks and, shortly thereafter, the dial relay R1260 restores, the latter relay being of the slow-to-release type as previously noted. Upon restoring, the dial relay R1260 interrupts, at the contacts 1261, the previously mentioned circuit for energizing the winding of the dial slave relay R1310, thereby to cause the latter relay to restore. Upon restoring, the dial slave relay R1310 interrupts, at the contacts 1313, the previously traced circuit for energizing the magnet SM1636 of the sequence switch S1630, thereby to cause the magnet mentioned to restore in order to drive the wipers noted of the sequence switch S1630 one step in the counterclockwise direction. When the wipers noted of the sequence switch S1630 are driven one step in the counterclockwise direction away from their home positions, the wiper 1634 thereof disengages the home contact in the associated contact bank, thereby to interrupt the previously traced circuit for energizing the winding of the dial tone relay R1250 in order to cause the latter relay to restore shortly thereafter, the dial tone relay R1250 being of the slow-to-release type. Upon restoring, the dial tone relay R1250 interrupts, at the contacts 1251, the previously traced circuit, including the dial tone conductor C1215, for energizing the lower winding of the line relay R1450; whereby dial tone voltage is no longer induced in the upper and intermediate windings thereof in order to interrupt the return of dial tone current over the previously traced loop circuit to the calling private subscriber substation TP. Also the dial tone relay R1250 interrupts, at the contacts 1252, the previously traced circuit for energizing the lower winding of the auxiliary line relay R1410, thereby to cause the latter relay to restore.

Furthermore, when the wiper 1635 of the sequence switch S1630 disengages the home contact in the associated contact bank, it interrupts the previously traced original circuit for energizing the winding of the line relay R730 in the primary selector 600; however, when the wiper 1635 of the sequence switch S1630 engages the first contact in the associated contact bank it completes an alternative circuit for energizing the winding of the line relay R730 in the primary selector 600; accordingly, the line relay R730 remains in its operated position at this time. The above-mentioned alternative circuit for energizing the winding of the line relay R730 extends from ground by way of the contacts 1245 and 1451, the wiper 1503 of the first code switch A1500 and the engaged tenth contact in the associated contact bank, C1291, the wiper 1635 of the sequence switch S1630 and the engaged first contact in the associated contact bank, C1293, the contacts 1271, C642, the wiper 612 of the finder F610, the contacts 623 and 733 and the winding of R730 to battery.

Also, upon restoring, the dial slave relay R1310 prepares, at the contacts 1311 and 1312, respectively, the previously mentioned circuits for energizing the windings of the translate relay R1270 and the release relay R1430. In the present example, the circuit for energizing the winding of the translate relay R1270 is not completed in view of the fact that the single digit 0 registered in the first code switch A1500 does not indicate that the first digit 0 received from the calling private subscriber substation TP is to be translated; while the circuit for energizing the upper winding of the release relay R1430 is completed in view of the fact that the single digit 0 registered in the first code switch A1500 indicates that no register translator is to be utilized and that the call may be extended to its destination directly under the control of the calling device at the calling private subscriber substation TP. More particularly, the circuit for energizing the upper winding of the release relay R1430 extends from ground by way of the contacts 1245 and 1451, the wiper 1503 of the first code switch A1500 and the engaged tenth contact in the associated contact bank, C1291, the contacts 1276 and 1312, C1326 and the upper winding of R1430 to battery. When thus energized the release relay R1430 operates in order to complete, at the contacts 1433, an obvious holding circuit, including the grounded hold conductor C1294, for energizing the upper winding thereof. Also the release relay R1430 interrupts, at the contacts 1432, the previously traced holding circuit for energizing the winding of the cut-in relay R630 in the primary selector 600 in series with the magnet FM617 of the finder F610. Further the release relay R1430 completes, at the contacts 1431, a multiple holding circuit substantially identical to that previously traced for energizing the winding of the line relay R730 in the primary selector 600. Accordingly, the cut-in relay R630 in the primary selector 600 restores immediately when the release relay R1430 in the primary register 1200 operates; while the line relay R730 in the primary selector 600 is retained in its operated position.

Considering now the operation of the primary selector 600 during the dialing of the single digit 0 and prior to the restoration of the cut-in relay R630, it is again pointed out that the line relay R1450 in the primary register 1200 repeats the impulses of the single digit 0 to the line relay R730 in the primary selector 600. Each time the line relay R730 restores and then reoperates it interrupts and then recompletes, at the contacts 731, the previously traced circuit for energizing the winding of the hold relay R740; however, the latter relay does not restore during impulsing as it is of the slow-to-release type. Also each time the line relay R730 restores and then reoperates it completes and then interrupts, at the contacts 732, an obvious multiple circuit, including the contacts 777 and 741, for energizing the lower winding of the transfer relay R750 and the vertical magnet M711. Each time the vertical magnet M711 is energized it operates to drive the wiper set of the switch mechanism 700 one step in the vertical direction. When the wiper set of the switch mechanism 700 is driven one step in the vertical direction the sets of switch springs S715 and S716 are actuated into engagement. More particularly, the set of switch springs S715 is actuated into engagement in order to prepare a circuit traced hereinafter for energizing the release magnet M714; while the set of switch springs S716 is actuated into engagement in order to prepare a circuit traced hereinafter for energizing the winding of the step relay R760. When thus energized the transfer relay R750 operates to interrupt, at the contacts 751, the previously traced normally completed path for short-circuiting the upper winding thereof, and to interrupt the previously traced original circuit, including the resistor 1316 in the primary register 1200; whereupon a holding circuit is completed for energizing the upper winding of the transfer relay R750. The last-mentioned circuit extends from ground by way of the resistor 722, the strap 723, the upper winding of R750, the contacts 720 of the set of switch springs S718, the contacts 771 and 625, the wiper 614 of the finder F610, C644, the contacts 1374 and the resistor 1316 to battery., Also the transfer relay R750 completes, at the contacts 752, the previously mentioned circuit, including the contacts 743 and the set of switch springs S716, for energizing the winding of the step relay R760, whereupon the latter relay operates.

At the conclusion of the single digit 0 repeated to the line relay R730 in the primary selector 600 by the line relay R1450 in the primary register 1200, the wiper set of the switch mechanism 700 in the primary selector 600 occupies its tenth vertical step. At this time the cut-in relay R630 in the primary selector 600 restores incident to the operation of the release relay R1430 in the primary register 1200, as previously explained. Upon restoring, the cut-in relay R630 interrupts, at the contacts 631 and 633, the previously traced alternative loop circuit for energizing in series the upper and intermediate windings of the line relay R1450 in the primary register 1200, thereby to cause the latter relay to restore. Also the cut-in relay R630 interrupts, at the contacts 632, the previously traced holding circuit for energizing the winding of the send relay R620, thereby to cause the latter relay to restore. Upon restoring, the send relay R620 recompletes, at the contacts 624 and 626, a loop circuit substantially identical to the previously traced original loop for energizing in series the upper winding of the transfer relay R750 and the winding of the line relay R730; this loop circuit including the resistor 722, the strap 723, the upper winding of the transfer relay R750 and the contacts 720 of the set of switch springs S718 in addition to the winding of the line relay R730. Accordingly the resistance of this loop circuit, including the winding of the line relay R730, the upper winding of the transfer relay R750, the resistor 722, in addition to the substation equipment at the calling private subscriber substation TP, is considerably high and of such a value that the transfer relay R750 is not retained in its operated position; although the line relay R730 is retained in its operated position. At this point it is noted that, upon operating, the step relay R760 completed, at the contacts 761, a holding circuit, including the contacts 777 and 713 and the set of switch springs S716, for energizing the winding thereof. Hence, the transfer relay R750 restores, as noted above, in order to complete, at the contacts 753, a circuit, including the contacts 743 and 762, for energizing the rotary magnet M712. When thus energized the rotary magnet M712 operates to drive the wiper set of the switch mechanism 700 one step in the rotary direction and to interrupt, at the contacts 713, the previously traced holding circuit for energizing the winding of the step relay R760, thereby to cause the latter relay to restore. Upon restoring, the step relay R760 interrupts, at the contacts 762, the previously traced circuit for energizing the rotary magnet M712, thereby to cause the latter magnet to restore. Upon restoring, the rotary magnet M712 completes, at the contacts 713, a connection between the test wiper 703 of the wiper set of the switch mechanism 700 and the winding of the step relay R760, this connection including the contacts 775 and the set of switch springs S716. Also the wiper set of the switch mechanism 700 engages the first contact set in the tenth level of the associated contact bank; and further operation of the primary selector 600 is continued in the event the first contact set terminating the first trunk extending to the manual operator position 0 is busy at this time. More particularly, ground potential or absence of any potential respectively appear upon the control conductor of the last-mentioned trunk in the event this trunk is busy or idle. Assuming that the trunk mentioned is busy at this time, ground potential appears upon the control conductor thereof and is applied to the test wiper 703 of the wiper set in order to complete the previously traced alternative circuit for energizing the winding of the step relay R760, thereby to cause the latter relay to reoperate. When the step relay R760 is thus reoperated the rotary magnet M712 is reoperated in order to drive the wiper set of the switch mechanism 700 an additional step in the rotary direction, whereupon the wiper set engages the next trunk extending to the manual operator position 0.

Assuming that the trunk 508 is the first idle trunk in the group extending to the manual operator position 0, when the wiper set of the switch mechanism 700 engages the contact set terminating the trunk 508, battery potential appears upon the control conductor thereof and is applied to the test wiper 703; thereby to complete a path substantially identical to that previously traced for short-circuting the winding of the step relay R760 in order positively to prevent reoperation of the latter relay at this time. Also the application of battery potential to the test wiper 703 completes a circuit for energizing the winding of the switch-through relay R770, this circuit extending from ground by way of the contacts 743, the set of switch springs S717, the winding of R770, the contacts 775 and the test wiper 703 having battery potential thereon. When thus energized the switch-through relay R770 operates to complete, at the contacts 776, a path, including the contacts 743, for applying direct ground potential to the test wiper 703, thereby to cause the trunk circuit, not shown, associated with the seized trunk 508 extending to the manual operator position 0 to operate; whereupon ground potential is returned over the control conductor of the seized trunk 508 to the test wiper 703. The return of ground potential from the trunk circuit associated with the seized trunk 508 to the test wiper 703 completes a holding circuit, including the contacts 776, the set of switch springs S717, the contacts 713 and the set of switch springs S716, for energizing the winding of the switch-through relay R770 in series with the winding of the step relay R760. When this holding circuit is completed the switch-through relay R770 is retained in its operated position; however, the step relay R760 does not operate due to the high series resistance of the winding of the switch-through relay R770. Also the return of ground potential from the trunk circuit associated with the seized trunk 508 to the test wiper 703 completes a path, including the contacts 776 and 628, for applying ground potential to the control conductor C465 of the trunk 462; thereby to retain the line switch 423 in its operated position subsequent to the restoration of the hold relay R470 in the primary selector 600. Also the application of ground potential to the control conductor C465 of the trunk 462 retains the last-mentioned trunk marked as busy to the other line switches 424, etc., having access thereto.

Also, upon operating, the switch-through relay R770 interrupts, at the contacts 771 and 773, the previously traced loop circuit for energizing in series the upper winding of the transfer relay R750 and the winding of the line relay R730; thereby to cause the line relay R730 to restore, the transfer relay R750 already occupying its restored position. Further the switch-through relay R770 interrupts, at the contacts 777, the previously traced circuit for energizing the winding of the hold relay R740; thereby to cause the latter relay to restore shortly thereafter, the hold relay R740 being of the slow-to-release type. Upon restoring, the hold relay R740 interrupts, at the contacts 743, the previously traced original path for applying ground potential to the control conductor C465 of the trunk 462; however, at this time, the previously traced alternative path for applying ground potential to the control conductor C465 of the trunk 462 is completed. Further the switch-through relay R770 completes, at the contacts 772 and 774, a connection between the calling private subscriber substation TP and the manual operator position 0; this connection extending from the line conductor C464 of the trunk 462 by way of the contacts 626 and 772 and the line wiper 701 of the wiper set to one of the line conductors of the seized trunk 508; and from the line conductor C463 of the trunk 462 by way of the contacts 624 and 774 and the line wiper 702 of the wiper set to the other line conductor of the seized trunk 508; the line conductors C463 and C464 of the trunk 462 being connected by way of the line switch 423 and the private subscriber ilne 407 to the calling private subscriber substation TP, and the line conductors of the seized trunk 508 being connected to the position equipment at the manual operator position 0 after the operator at the last-mentioned position answers the call. Accordingly the subscriber at the calling private subscriber substation TP and the operator at the manual operator position 0 may converse at this time.

Returning now to the subsequent operation of the primary register 1200, it is pointed out that, when the release relay R1430 therein operates it also interrupts, at the contacts 1434, the previously traced circuit for energizing the winding of the hold relay R1240; thereby to cause the latter relay to restore shortly thereafter, the hold relay R1240 being of the slow-to-release type. Furthermore, when the cut-in relay R630 in the primary selector 600 restores it interrupts, at the contacts 631 and 633, the previously traced circuit for energizing the upper and intermediate windings of the line relay R1450 in the primary register 1200, thereby to cause the latter relay to restore. Upon restoring, the hold relay R1240 interrupts, at the contacts 1244, the previously mentioned circuit for energizing the winding of the lock relay R1460; thereby to cause the latter relay to restore shortly thereafter, the lock relay R1460 being of the slow-to-release type. Upon restoring, the lock relay R1460 interrupts, at the contacts 1461, the previously mentioned path for applying ground potential to the hold conductor C1294, thereby to interrupt the previously traced holding circuit for energizing the upper winding of the release relay R1430, whereupon the latter relay restores. Also the lock relay R1460 interrupts, at the contacts 1464, the previously mentioned path for short-circuiting the winding of the busy relay R1470; whereupon the latter relay operates and the primary register 1200 is completely released, in a manner more fully explained hereinafter. Shortly after the primary register 1200 is completely released the busy relay R1470 restores, the latter relay being of the slow-to-release type. Upon restoring, the busy relay R1470 interrupts, at the contacts 1471, a path, including the contacts 1242, for applying ground potential to the test conductor C646; thereby to mark the primary register 1200 as idle to the finders F610, etc., having access thereto.

The release of the established connection between the calling private subscriber substation TP and the manual operator position described above is primarily under the control of the subscriber at the calling private subscriber substation TP and is effected when the subscriber thereat replaces the receiver of the telephone instrument at the calling private subscriber substation TP upon its associated switchhook; thereby to interrupt the previously traced loop circuit extending therefrom to the trunk circuit associated with the trunk 508 seized by the switch mechanism 700. When the loop circuit mentioned is interrupted the trunk circuit associated with the seized trunk 508 is released; thereby to mark the trunk mentioned as idle, assuming that the operator at the manual operator position 0 has disconnected from this trunk at this time, and to remove the application of ground potential from the test wiper 703 of the wiper set. When ground potential is removed from the test wiper 703 of the wiper set the previously traced holding circuit for energizing the winding of the switch-through relay R770 in series with the winding of the step relay R760 is interrupted, thereby to cause the switch-through relay R770 to restore. Upon restoring, the switch-through relay R770 interrupts, at the contacts 776, a further point in the previously traced path for applying ground potential to the control conductor C465 of the trunk 462; and completes, at the contacts 777, a circuit, including the contacts 732 and 742 and the set of switch springs S715, for energizing the release magnet M714. When thus energized the release magnet M714 operates to release the wiper set of the switch mechanism 700 and to cause it to be returned to its normal rotary and vertical positions, whereupon the sets of switch springs S715 and S716 are actuated. More particularly, the set of switch springs S715 is actuated into disengagement, thereby to interrupt the previously traced circuit for energizing the release magnet M714 in order to cause the latter magnet to restore. At this time the primary selector 600 is completely released and available for further use.

When ground potential is removed from the control conductor C465 of the trunk 462 the line switch 423 is released; whereby the private subscriber line 407 is marked as idle to the connectors having access thereto. At this time the established connection between the calling private subscriber substation TP and the called manual operator position 0 is completely released.

In the foregoing explanation of the mode of operation of the primary selector 600, it was assumed that there was an idle trunk in the group, including the trunk 508, extending to the manual operator position 0; however, it may occur that there is no idle trunk in the group mentioned at this time. In this event, the step relay R760 and the rotary magnet M712 interact in the manner previously explained; whereby the wiper set of the switch mechanism 700 is driven in the rotary direction eleven steps away from its normal position in order to actuate the sets of switch springs S717 and S718. More particularly, the set of switch springs S717 is actuated into disengagement, thereby positively to prevent operation of switch through relay R770; while the set of switch springs S718 is actuated in order to disengage the contacts 720 and to engage the contacts 719, whereby an obvious alternative circuit, including the busy tone conductor C721, is completed for energizing the winding of the line relay R730. The above-mentioned circuit includes the previously traced loop circuit extending between the primary selector 600 and the calling private subscriber substation TP; whereby busy tone current is returned to the calling private subscriber substation TP in order to indicate to the subscriber thereat the all-busy condition mentioned. The subscriber at the calling private subscriber substation TP then effects the release of the primary selector 600.

More particularly, the subscriber at the calling private subscriber substation TP effects the release of the primary selector 600 by replacing the receiver of the telephone instrument thereat upon its associated switchhook; thereby to interrupt the previously traced loop circuit extending therefrom to the primary selector 600. When the loop circuit mentioned is interrupted the previously traced circuit for energizing the winding of the line relay R730 is interrupted; thereby to cause the latter relay to restore and interrupt, at the contacts 731, the previously traced circuit for energizing the winding of the hold relay R740. The hold relay R740 then restores shortly thereafter to complete, at the contacts 742, the previously traced circuit for energizing the release magnet M714; thereby to cause to latter magnet to operate and effect the release of the wiper set of the switch mechansim 700. When the wiper set of the switch mechanism 700 is thus released the sets of switch springs S715, S716, S717 and S718 are actuated. More particularly, the set of switch springs S715 is actuated into disengagement, thereby to interrupt the previously traced circuit for energizing the release magnet M714 in order to cause the latter magnet to restore; while the set of switch springs S718 is actuated, thereby to interrupt, at the contacts 719, a further point in the previously traced circuit, including the busy tone conductor C721, for energizing the winding of the line relay R730. Also the hold relay R740 interrupts, at the contacts 743, the previously traced path for applying ground potential to the control conductor C465 of the trunk 462; thereby to effect the release of the line switch 423, in the manner previously explained. At this time the primary selector 600 is completely released and available for further use and the private subscriber line 407 is marked as idle to the connectors having access thereto.

In view of the foregoing explanation of the mode of operation of the primary selector 600 and the primary register 1200 to effect the extension of a call from the calling ordinary private subscriber substation TP to the called manual operator position 0, it will be understood that this equipment is operative, in a substantially identical manner, to effect the extension of a call from any one of the calling party subscriber substations TS1, TS2, TS3 and TS4 to the called manual operator position 0. Also the primary selector 441 and the primary register 1200 are operative, in a substantially identical manner, to effect the extension of a call from the calling extended service private subscriber substation TX or from the calling denied toll service private subscriber substation TD to the called manual operator position 0.

*Special service calls*

Assuming that the call extending from the calling private subscriber substation TP to the primary selector 600 and the primary register 1200 is to be extended to a special service operator position, such, for example, as the information operator position 113 in exchange 4 zone 84, the subscriber at the calling private subscriber substation TP proceeds to dial the directory number of the information operator position 113. The directory number of each special service operator position comprises three digits, the first two digits of which are 1 and 1, the directory number of the information operator position 113 being 113.

Accordingly the subscriber at the calling private subscriber substation TP proceeds to dial the first digit 1, thereby to cause a corresponding number of impulses to be transmitted over the private subscriber line 407, in the manner previously explained. The operations of the primary register 1200 and the primary selector 600 in response to the first digit 1 are substantially identical to those previously explained. More particularly, at the conclusion of the first digit 1, the wipers noted of the first code switch A1500 in the primary register 1200 engage the first contacts in the associated contact banks and, shortly thereafter, the dial relay R1260 restores in order to effect the restoration of the dial slave relay R1310. Upon restoring, the dial slave relay R1310 prepares, at the contacts 1311 and 1312, respectively, the previously mentioned circuits for energizing the winding of the translate relay R1270 and the upper winding of the release relay R1430. In the present example, the circuit for energizing the winding of the translate relay R1270 is not completed in view of the fact that the first digit 1 registered in the first code switch A1500 does not indicate that the first digit received from the calling private subscriber substation TP is to be translated; while the circuit for energizing the upper winding of the release relay R1430 is completed in view of the fact that the first digit 1 registered in the first code switch A1500 indicates that no register translator is to be utilized and that the call may be extended to its destination directly under the control of the calling device at the calling private subscriber substation TP. More particularly, the circuit for energizing the upper winding of the release relay R1430 extends from ground by way of the contacts 1245 and 1451, the wiper 1503 of the first code switch A1500 and the engaged first contact in the associated contact bank, C1291, the contacts 1276 and 1312, C1326 and the upper winding of R1430 to battery. When thus energixed the release relay R1430 operates in order to effect the restoration of the cut-in relay R630 in the primary selector 600, in the manner previously explained. Upon restoring, the cut-in relay R630 effects the restoration of the send relay R620 in the primary selector 600; and the latter relay effects the restoration of the line relay R1450 in the primary register 1200. Also the release relay R1430 effects the release of the hold relay R1240 and the consequent restoration of the lock relay R1460; whereupon the primary register 1200 is released in a manner more fully explained hereinafter.

Considering now the operation of the primary selector 600 during the dialing of the first digit 1 and prior to the release of the cut-in relay R630, it is again pointed out that the line relay R1450 in the primary register 1200 repeats the impulse of the first digit 1 to the line relay R730 in the primary selector 600. The line relay R730 follows the first digit 1, thereby to control the vertical magnet M711; whereby the wiper set of the switch mechanism 700 is driven one step in the vertical direction. When the wiper set of the switch mechanism 700 is driven one step in the vertical direction the sets of switch springs S715 and S716 are actuated in the manner previously explained. Subsequent to the restoration of the cut-in relay R630 and the send relay R620 the previously traced loop circut extending between the calling private subscriber substation TP and the primary selector 600 is again recompleted; whereby the line relay R730 is retained in its operated position and the transfer relay R750 restores, in the manner previously explained. Upon restoring, the transfer relay R750 effects the previously explained interaction between the step relay R760 and the rotary magnet M712; whereby the wipers of the wiper set are driven automatically step by step in the rotary direction one step in order to test the idle or busy condition of the first trunk in the group of trunks, including the trunk 509, extending to the group of special service selectors. Subsequent operation of the primary selector 600 depends upon the idle or busy condition of the selected trunk, whereby the switch mechanism 700 is operative to seize a trunk extending to an idle special service selector.

Assuming that the trunk 509 extending to the special service selector 503 is the first idle trunk in the selected group, the switch mechanism 700 is controlled to seize the trunk mentioned; whereupon the switch-through relay R770 operates in order to effect the restoration of the line relay R730 and the hold relay R740, in the manner previously explained. At this time an obvious loop circuit is completed from the calling private subscriber substation TP through the primary selector 600 to the special service selector 503. Ground potential in the special service selector 503 is returned over the seized trunk 509 to the test wiper 703 of the wiper set of the switch mechanism 700; thereby to complete the previously traced holding circuit for energizing the winding of the switch-through relay R770 in series with the winding of the step relay R760 in order to retain the primary selector 600 in its operated position. Also the ground potential returned from the special service selector 503 to the test wiper 703 retains the application of ground potential upon the control conductor C465 of the trunk 462; thereby to retain the line switch 423 in its operated position. Accordingly, at this time, the connection has been extended from the calling private subscriber substation TP to the special service selector 503.

The subscriber at the calling private subscriber substantion TP then proceeds to dial the second digit 1 and the third digit 3 into the special service selector 503. It is again noted that the special service selector 503 is of the drop-back type; whereby the wiper set of the Strowger mechanism therein is operated to its first vertical level in response to the second digit 1 and then dropped back to its normal vertical position. The wiper set of the Strowger mechanism in the special service selector 503 is then operated to its third vertical level in response to the third digit 3; and then operates automatically to seize an idle trunk in the group extending to the information operator position 113, thereby to complete a communication connection between the calling private subscriber substation TP and the information operator position 113 when the operator at the last-mentioned position answers the call on the trunk mentioned.

The release of the apparatus involved in the established connection between the calling private subscriber substantion TP and the information operator position 113 is effected when the subscriber at the calling private subscriber substation TP replaces the receiver of the telephone instrument thereat upon its associated switchhook, in the manner previously explaind.

In view of the above explanation of the extension of a call from the calling private subscriber substation TP to the information operator position 113, it will be readily appreciated that a call may be extended, in a substantially identical manner, to the toll operator position 110 or to the miscellaneous operator position 112; the operations of the primary selector 600 and the primary register 1200 being identical in each case. In this connection it is pointed out that the directory number of the toll operator position 110 is 110 while the directory number of the miscellaneous operator position 112 is 112.

In view of the foregoing explanation of the mode of operation of the primary selector 600 and the primary register 1200 to effect the extension of a call from the calling ordinary private subscriber substantion TP to the called information operator position 113, to the toll operator position 110 or to the miscellaneous operator position 112, it will be understood that this equipment is operative in a substantially identical manner to effect the extension of a call from any one of the calling party subscriber substations TS1, TS2, TS3 and TS4 to any called one of the operator positions mentioned above.

Also the primary selector 441 and the primary register 1200 are operative in a substantially identical manner to effect the extension of a call from the calling extended service private subscriber substation TX or from the calling denied toll service private subscriber substation TD to any one of the called operator positions mentioned above.

*Local calls*

Assuming that the call extending from the calling private subscriber substation TP to the primary selector 600 and the primary register 1200 is to be extended to the called private subscriber substation TX in exchange 4 zone 84, the subscriber at the calling private subscriber substation TP proceeds to dial the directory number of the called private subscriber substation TX. The directory number of the called private subscriber substation TX comprises a code portion, including the digits 844 identifying the called zone and exchange, and a numerical portion, including the digits 0901 identifying the line terminal of the private subscriber line 401 extending to the called private subscriber substation TX. Thus the directory number of the called private subscriber substation TX is 844–0901.

Accordingly the subscriber at the calling private subscriber substation TP proceeds to dial the first digit 8; thereby to cause a corresponding number of impulses to be transmitted over the private subscriber line 407, in a well-known manner. The line relay R1450 in the primary register 1200 follows the impulses transmitted over the calling private subscriber line 407 in view of the fact that the circuit for energizing the upper and intermediate windings thereof includes the previously traced loop circuit extending to the calling private subscriber substation TP. Accordingly the line relay R1450 restores and reoperates intermittently in accordance with the digit 8. The line relay R1450 repeats, at the contacts 1453, the impulses of the first digit 8 to the dial relay R1260 and by way of the wiper 1631 of the sequence switch S1630 and the engaged home contact in the associated contact bank to the magnet AM1504 of the first code switch A1500; and repeats, at the contacts 1451, the impulses of the first digit 8 by way of the wiper 1635 of the sequence switch S1630 and the engaged home contact in the associated contact bank and the conductor C642 to the line relay R730 in the primary selector 600, in the manner previously explained. Thus the line relay R730 follows the impulses of the first digit 8 and drives the wiper set of the switch mechanism 700 eight steps in the vertical direction, in the manner previously explained. At the conclusion of the first digit 8 the wipers noted of the first code switch A1500 engage the eighth contacts in the associated contact banks. Shortly following the conclusion of the first digit 8 the dial relay R1260 restores in order to effect the restoration of the dial slave relay R1310, in the manner previously explained. Upon restoring, the dial slave relay R1310 interrupts, at the contacts 1313, the previously traced circuit for energizing the magnet SM1636 of the sequence switch S1630; thereby to cause the latter magnet to restore and drive the wipers noted of the sequence switch S1630 one step in the counterclockwise direction.

Also, upon restoring, the dial slave relay R1310 prepares, at the contacts 1311 and 1312, respectively, the previously mentioned circuits for energizing the winding of the translat erelay R1270 and the upper winding of the release relay R1430. In the present example, the circuit for energizing the winding of the translate relay R1270 is not completed in view of the fact that the first digit 8 registered in the first code switch A1500 does not indicate that this digit received from the calling private subscriber substation TP is to be translated; moreover, the circuit for energizing the upper winding of the release relay R1430 is not completed in view of the fact that the first digit 8 registered in the first code switch A1500 does not indicate that a register translator will not be utilized ultimately. In view of the fact that the release relay R1430 remains restored, the previously traced path for applying ground potential to the test conductor C646 is retained completed; thereby to retain the cut-in relay R630 in the primary selector 600 in its operated position. At this point it is noted that, when the wiper set of the switch mechanism 700 is driven in the vertical direction away from its normal position, the sets of switch springs S715 and S716 are actuated and the transfer relay R750 operates. Upon operating, the transfer relay R750 interrupts, at the contacts 751, the previously mentioned path for short-circuiting the upper winding thereof; whereupon the previously traced holding circuit, including the resistors 722, the strap 723, the conductor C644 and the resistor 1316, is completed for energizing the upper winding thereof; thereby to retain the transfer relay R750 in its operated position. The operated transfer relay R750 retains the step relay R760 in its operated position, as previously explained.

When the wipers noted of the sequence switch S1630 are driven one step in the counterclockwise direction the wiper 1635 thereof disengages the home contact in the associated contact bank, thereby to interrupt the previously traced path for applying ground potential to the conductor C642. When ground potential is removed from the conductor C642 the previously traced circuit for energizing the winding of the line relay R730 in the primary selector 600 is interrupted, thereby to cause the latter relay to restore. Upon restoring, the line relay R730 interrupts, at the contacts 731, the previously traced circuit for energizing the winding of the hold relay R740, thereby to cause the latter relay to restore shortly thereafter. Upon restoring, the hold relay R740 completes, at the contacts 742, the previously traced circuit for energizing the release magnet M714; thereby to cause the latter magnet to operate and release the wiper set of the switch mechanism 700, whereupon the wiper set is returned to its normal vertical position. When the wiper set is thus released the sets of switch springs S715 and S716 are actuated, respectively, to interrupt the previously traced circuit for energizing the release magnet M714 and to interrupt the previously traced circuit for energizing the winding of the step relay R760. The release magnet M714 and the step relay R760 then restore.

Also, when the wipers noted of the sequence switch S1630 are driven one step in the counterclockwise direction, the wiper 1634 thereof disengages the home contact in the associated contact bank; thereby to itnerrupt the previously traced circuit for energizing the winding of the dial tone relay R1250 in order to cause the latter relay to restore shortly thereafter, in the manner previously explained. Upon restoring, the dial tone relay R1250 interrupts, at the contacts 1251, the previously traced circuit, including the dial tone conductor C1215, for energizing the lower winding of the line relay R1450; and interrupts, at the contacts 1252, the previously traced circuit for energizing the lower winding of the auxiliary line relay R1410, thereby to cause the latter relay to restore. Also when the wiper 1634 of the sequence switch S1630 engages the first contact in the associated contact bank an obvious circuit, including the grounded hold conductor C1294 and C1481, is completed for energizing the winding of the party test relay R1440, thereby to cause the latter relay to operate. Upon operating, the party test relay R1440 completes, at the contacts 1446, a holding circuit, including the contacts 1244, for energizing the lower winding of the line relay R1450, thereby to retain the latter relay in its operated position. Also the party test relay R1440 interrupts, at the contacts 1441 and 1443, the previously traced original loop circuit, including the upper and intermediate windings of the line relay R1450; and completes, at the contacts 1442 and 1444, an alternative loop circuit, including the upper winding of the auxiliary line relay R1410 and the upper and lower windings of the party line relay R1420. The alternative loop circuit mentioned extends from battery potential by way of the lower winding of the party line relay R1420, the contacts 1444, C643, the wiper 613 of the finder F610 and the contacts 633 to the line conductor C464 of the trunk 462; and from booster battery potential by way of the upper winding of the auxiliary line relay R1410, the upper winding of R1420, the contacts 1442, C641, the wiper 611 of the finder F610 and the contacts 631 to the line conductor C463 of the trunk 462; the line conductors C463 and C464 of the trunk 462 being connected together by way of the loop circuit extending to the calling private subscriber substation TP. When this alternative loop circuit is completed the auxiliary line relay R1410 operates; however, the party line relay R1420 does not operate as the latter relay is of the differential type.

Also, upon operating, the party test relay R1440 interrupts, at the contacts 1445, a further point in the previously traced holding circuit for energizing the lower winding of the auxiliary line relay R1410; and interrupts, at the contacts 1447, the previously traced original circuit for energizing the winding of the hold relay R1240. Upon operating, the auxiliary line relay R1410 completes, at the contacts 1411, an alternative circuit, including the contacts 1448 and 1434 and C1288, for energizing the winding of the hold relay R1240, thereby to retain the latter relay in its operated position at this time. Also when the wiper 1631 of the sequence switch S1630 disengages the home contact in the associated contact bank it interrupts a further point in the previously traced circuit for energizing the magnet AM1504 of the first code switch A1500; and when the wiper 1631 of the sequence switch S1630 engages the first contact in the associated contact bank it prepares a circuit traced hereinafter for energizing the magnet BM1516 of the second code switch B1510.

The subscriber at the calling private subscriber substation TP proceeds to dial the second digit 4 at this time, whereupon the auxiliary line relay R1410 in the primary register 1200 follows the impulses transmitted over the private subscriber line 407; however, the party line relay R1420 does not follow the impulses of the second digit 4 as the latter relay is of the differential type. The line relay R1450 is retained in its operated position during the dialing of the second digit 4; accordingly the second digit 4 is not repeated by the line relay R1450 in the primary register 1200 to the line relay R730 in the primary selector 600.

During the second digit 4, each time the auxiliary line relay R1410 restores and then reoperates it interrupts and then recompletes, at the contacts 1411, the previously traced alternative circuit for energizing the winding of the hold relay R1240; thereby to retain the latter relay in its operated position during the dialing of the second digit 4. Each time the auxiliary line relay R1410 restores and then operates it completes and then interrupts, at the contacts 1412, an obvious alternative circuit, including the contacts 1448, C1482 and the contacts 1241, for energizing the winding of the dial relay R1260, and an obvious multiple circuit, including the wiper 1631 of the sequence switch S1630 and the engaged first contact in the associated contact bank, for energizing the magnet BM1516 of the second code switch B1510. When thus energized the dial relay R1240 operates in order to effect the operation of the dial slave relay R1310, in the manner previously explained. Also the dial slave relay R1310 recompletes, at the contacts 1313, the previously traced circuit for energizing the magnet SM1636 of the sequence switch S1630; thereby to condition the wipers noted of the sequence switch S1630 to be driven an additional step in the counterclockwise direction.

Each time the magnet BM1516 of the second code switch B1510 is thus energized and subsequently deenergized the wipers noted of the second code switch B1510 are driven one step in the counterclockwise direction. Also, upon operating, the dial slave relay R1310 again interrupts, at the contacts 1311 and 1312, the previously mentioned circuits for respectively energizing the winding of the translate relay R1270 and the upper winding of the release relay R1430.

At the conclusion of the second digit 4 the wipers noted of the second code switch B1510 engage the fourth contacts in the associated contact banks and, shortly thereafter, the dial relay R1260 restores in order to effect the restoration of the dial slave relay R1310. Upon restoring, the dial slave relay R1310 interrupts, at the contacts 1313, the previously traced circuit for energizing the magnet SM1636 of the sequence switch S1630; whereupon the wipers noted of the sequence switch S1630 are driven into engagement with the second contacts in the associated contact banks. Also the dial slave relay R1310 prepares, at the contacts 1311 and 1312, respectively, the previously mentioned circuits for energizing the winding of the translate relay R1270 and the upper winding of the release relay R1430. In the present example, the circuit for energizing the winding of the translate relay R1270 is not completed in view of the fact that the first digit 8 registered in the first code switch A1500, in combination with the second digit 4 registered in the second code switch B1510, does not indicate that the digits mentioned received from the calling private subscriber substation TP are to be translated; moreover, the circuit for energizing the upper winding of the release relay R1430 is not completed in view of the fact that the first digit 8 registered in the first code switch A1500, in combination with the second digit 4 registered in the second code switch B1510, does not indicate that a register translator will not be utilized ultimately.

When the wiper 1634 of the sequence switch S1630 disengages the first contact in the associated contact bank the previously traced circuit for energizing the winding of the party test relay R1440 is interrupted, thereby to cause the latter relay to restore; and when the wiper 1634 of the sequence switch S1630 engages the second contact in the associated contact bank a circuit traced hereinafter is prepared for energizing the winding of the start relay R1600 of the register translator allotter 1600.

Upon restoring, the party test relay R1440 interrupts, at the contacts 1442 and 1444, the previously traced alternative loop circuit for energizing in series the upper and lower windings of the party line relay R1420 and the upper winding of the auxiliary line relay R1410; and recompletes, at the contacts 1441 and 1443, the previously traced original loop circuit for energizing in series the upper and intermediate windings of the line relay R1450; whereupon the auxiliary line relay R1410 restores and the line relay R1450 is retained in its operated position. Also the party test relay R1440 interrupts, at the contacts 1446, the previously traced holding circuit for energizing the lower winding of the line relay R1450; however, the latter relay remains in its operated position due to the above-mentioned completed loop circuit for energizing in series the upper and intermediate windings thereof. Further, the party test relay R1440 recompletes, at the contacts 1447, the previously traced original circuit for energizing the winding of the hold relay R1240, thereby to retain the latter relay in its operated position.

When the wiper 1635 of the sequence switch S1630 engages the second contact in the associated contact bank an alternative circuit for energizing the winding of the line relay R730 in the primary selector 600 is completed; this circuit extending from ground by way of the contacts 1245 and 1451, the wiper 1503 of the first code switch A1500 and the engaged eighth contact in the associated contact bank, the wiper 1515 of the second code switch B1510 and the engaged fourth contact in the associated contact bank, the wiper 1635 of the sequence switch S1630 and the engaged second contact in the associated contact bank, C1293, the contacts 1271, C642, the wiper 612 of the finder F610, the contacts 623 and 773 and the winding of R730 to battery. When thus energized the line relay R730 reoperates in order to recomplete, at the contacts 731, the previously traced circuit for energizing the winding of the hold relay R740, thereby to cause the latter relay to reoperate.

The subscriber at the calling private subscriber substation TP then proceeds to dial the third digit 4 at this time, whereupon the line relay R1450 in the primary register 1200 again follows the impulses transmitted over the private subscriber line 407. The line relay R1450 repeats the impulses of the third digit 4 by way of the contacts 1451 over the above-traced alternative circuit to the line relay R730 in the primary selector 600; whereby the line relay R730 controls the vertical magnet M711 to drive the wiper set of the switch mechanism 700 four steps in the vertical direction, in the manner previously explained. Also the line relay R1450 repeats, at the contacts 1452, the impulses of the third digit 4 to the hold relay R1240, thereby to retain the latter relay in its operated position during impulsing; and repeats, at the contacts 1453, the impulses of the third digit 4 to the dial relay R1260 and the magnet CM1526 of the third code switch C1520, in an obvious manner; the circuit for energizing the magnet CM1526 of the third code switch C1520 including the wiper 1631 of the sequence switch S1630 and the engaged second contact in the associated contact bank. The dial relay R1260 operates and remains operated during impulsing in order to effect operation of the dial slave relay R1310, in the manner previously explained. Upon operating, the dial slave relay R1310 recompletes, at the contacts 1313, the previously traced circuit for energizing the magnet SM1636 of the sequence switch S1630;

thereby to cause the latter magnet to operate and condition the wipers noted of the sequence switch to be driven an additional step in the counterclockwise direction. Further the dial slave relay R1310 interrupts, at the contacts 1311 and 1312, respectively, the previously mentioned circuits for energizing the winding of the translate relay R1270 and the upper winding of the release relay R1430.

At the conclusion of the third digit 4 the wipers noted of the third code switch C1520 engage the fourth contacts in the associated contact banks and, shortly thereafter, the dial relay R1260 restores in order to effect the restoration of the dial slave relay R1310. Upon restoring, the dial slave relay R1310 interrupts, at the contacts 1313, the previously traced circuit for energizing the magnet SM1636 of the sequence switch S1630; thereby to cause the latter magnet to restore and drive the wipers noted of the sequence switch S1630 an additional step in the counterclockwise direction.

Further the dial slave relay R1310 prepares, at the contacts 1311 and 1312, respectively, the previously mentioned circuits for energizing the winding of the translate relay R1270 and the upper winding of the release relay 1430. In the present example, the circuit for energizing the winding of the translate relay R1270 is not completed in view of the fact that the combination of the first digit 8 registered in the first code switch A1500 and the second digit 4 registered in the second code switch B1510 and the third digit 4 registered in the third code switch C1520 does not indicate that the digits mentioned received from the calling private subscriber substation TP are to be translated; while the circuit for energizing the upper winding of the release relay 1430 is completed in view of the fact that the combination of the first digit 8 registered in the first code switch A1500 and the second digit 4 registered in the second code switch B1510 and the third digit 4 registered in the third code switch C1520 indicates that no register translator is to be utilized and that the call may be extended to its destination directly under the control of the calling device at the calling private subscriber substation TP. More particularly, the circuit for energizing the upper winding of the release relay R1430 extends from the grounded wiper 1525 of the third code cwitch C1520 and the engaged fourth contact in the associated contact bank, C1291, the contacts 1276 and 1312, C1326 and the upper winding of R1430 to battery. When thus energized the release relay R1430 operates to complete, at the contacts 1433, the previously traced holding circuit for energizing the upper winding thereof; and to interrupt, at the contacts 1432, the previously traced path for applying ground potential to the test conductor C646, thereby to effect the restoration of the cut-in relay R630 and the send relay R620 in the primary selector 600, in the manner previously explained. Also the release relay R1430 interrupts, at the contacts 1434, the previously traced circuit for energizing the winding of the hold relay R1240; thereby to cause the latter relay to restore shortly thereafter and effect the restoration of the lock relay R1460 further, shortly thereafter, in the manner previously explained.

Prior to the restoration of the cut-in relay R630 and the send relay R620 in the primary selector 600, an alternative circuit for energizing the winding of the line relay R730 in the primary selector 600 is completed, this circuit extending from the grounded wiper 1525 of the third code switch C1520 and the engaged fourth contact in the associated contact bank by way of the wiper 1635 of the sequence switch S1630 and the engaged third contact in the associated contact bank, C1293, the contacts 1271, C642, the wiper 612 of the finder F610, the contacts 623 and 773 and the winding of R730 to battery.

Upon restoring, the cut-in relay R630 in the primary selector 600 effects the restoration of the send relay R620, as previously noted, and effects the restoration of the line relay R1450 in the primary register 1200, as previously explained. At this time the primary register 1200 is released in a manner more fully explained hereinafter.

Upon restoring, the send relay R620 in the primary selector 600 recompletes, at the contacts 624 and 626, the previously traced loop circuit extending between the calling private subscriber substation TP and the primary selector 600; this loop circuit including the winding of the line relay R730 and the upper winding of the transfer relay R750. At this time the line relay R730 is retained in its operated position; however, the transfer relay R750 restores, as previously explained. Upon restoring, the transfer relay R750 initiates the previously described interaction between the step relay R760 and the rotary magnet M712, whereby the test wiper 703 of the wiper set of the switch mechanism 700 initiates the testing of the contact sets in the fourth level of the associated contact bank, in a manner substantially identical to that previously explained.

More particularly, the primary selector 600 operates in order to seize an idle one of the trunks in the group, including the trunk 507, extending to the group of first selectors, including the first selector 501. Assuming that the trunk 507 is the first idle trunk in the group mentioned, the primary selector 600 operates to seize the trunk 507; whereupon the switch-through relay R770 operates in order to effect the restoration of the line relay R730 and the hold relay R740, in the manner previously explained.

When the trunk 507 extending to the first selector 501 is thus seized by the primary selector 600 the first selector 501 operates in order to return ground potential over the seized trunk 507 to the test wiper 703 of the wiper set of the switch mechanism 700; thereby to complete the previously traced holding circuit for energizing the winding of the switch-through relay R770 in series with the winding of the step relay R760 in order to retain the primary selector 600 in its operated position. Also the ground potential applied to the test wiper 703 of the wiper set of the switch mechanism 700 is applied to the control conductor C465 of the trunk 462, thereby to retain the line switch 423 in its operated position. At this time the loop circuit extending from the calling private subscriber substation TP is extended by way of the line switch 423 and the primary selector 600 to the first selector 501; and the first selector 501 is conditioned to be responsive to a digit dialed thereinto.

The subscriber at the calling private subscriber substation TP then proceeds to dial the fourth digit 0, the fifth digit 9, the sixth digit 0 and the seventh digit 1 successively, in the usual manner. The operation of the first selector 501 in response to the fourth digit 0, the operation of the second selector, such, for example, as the second selector 502 in response to the fifth digit 9, and the operation of the individual connector, such, for example, as the individual connector 525 in response to the sixth digit 0 and the seventh digit 1 are entirely conventional; thereby to cause the connection to be forwarded to the private subscriber line 401 extending to the called private subscriber substation TX. The individual connector 525 operates to cause ringing current to be projected over the private subscriber line 401 to the called private subscriber substation TX, thereby to operate the ringer thereat. When the call is answered at the called private subscriber substation TX an obvious communication connection is completed between the calling private subscriber substation TP and the called private subscriber substation TX.

When the individual connector 525 seizes the private subscriber line 401 extending to the called private subscriber substation TX, apparatus therein operates in order to mark the private subscriber line 401 as busy to the other individual connectors having access thereto.

It should be noted that the incoming toll lines, such as 470, terminate in incoming toll line circuits, such as 504, which in turn terminate, by way of trunk lines, such as 505, in incoming first selectors switches, similar to first selector 501. The bank contacts of the local first selector switches 501 and the bank contacts of the incoming first selectors, terminating incoming toll trunks similar to trunk 505, are multiplied together, so that incoming calls from subscribers in zones 27, 45 and 68 may be completed by way of the local second selectors 502 and connectors, both party and individual, through the local subscribers in zone 84, exchange 4.

The apparatus may be arranged for either calling party or last party release. However, assuming that the apparatus is arranged for calling party release, when the subscriber at the calling private subscriber substation TP replaces the receiver of the telephone instrument thereat upon its associated switchhook, the previously traced loop circuit extending between the calling private subscriber substation TP and the individual connector 525 is interrupted; thereby to cause the individual connector 525 to be released. When the individual connector 525 is thus released the private subscriber line 401 extending to the called private subscriber substation TX is marked as idle to the individual connectors having access thereto, assuming that the subscriber at the called private subscriber substation TX has, at this time, replaced the receiver of the telephone instrument thereat upon its associated switchhook. Further the release of the individual connector 525 effects the release of the second selector 502 and the first selector 501, in a well-known manner, and causes ground potential to be removed from the control conductor of the trunk 507; whereupon ground potential is removed from the test wiper 703 of the wiper set of the switch mechanism 700 in order to interrupt the previously traced holding circuit for energizing the winding of the switch-through relay R770 in series with the winding of the step relay R760. The switch-through relay R770 then restores in order to effect the release of the primary selector 600 and the consequent release of the line switch 423, in the manner previously explained; whereupon the private subscriber line 407 extending to the calling private subscriber substation TP is marked as idle to the individual connectors having access thereto. Accordingly, at this time, all of the apparatus utilized in the established connection between the calling private subscriber substation TP and the called private subscriber substation TX is completely released and available for further use.

In view of the foregoing explanation of the mode of operation of the primary selector 600 and the primary register 1200 to effect the extension of a call from the calling ordinary private subscriber substation TP to the called extended service private subscriber substation TX, it will be understood that this equipment is operative in a substantially identical manner to effect the extension of a call from the calling ordinary private subscriber substation TP to the denied toll service private subscriber substation TD or to any one of the called party subscriber substations TS1, TS2, TS3 and TS4; or from any one of the calling party subscriber substations TS1, TS2, TS3 and TS4 to the called ordinary private subscriber substation TP, to the called extended service private subscriber substation TX or to the called denied toll service private subscriber substation TD. Further it will be understood that the primary selector 441 and the primary register 1200 are operative in a substantially identical manner to effect the extension of a call from the calling extended service private subscriber substation TX to the called ordinary private subscriber substation TP, to the called denied toll service private subscriber substation TD or to any one of the called party subscriber substations TS1, TS2, TS3 and TS4; or from the calling denied toll service private subscriber substation TD to the called ordinary private subscriber substation TP, to the called extended service private subscriber substation TX or to any one of the called party subscriber substations TS1, TS2, TS3 and TS4.

*Calls to other exchanges in zone 84*

Assuming that the call extending from the calling ordinary private subscriber substation TP to the primary selector 600 and the primary register 1200 is to be extended to a called subscriber substation in exchange 1 zone 84, the subscriber at the calling private subscriber substation TP proceeds to dial the directory number of the called subscriber substation. The directory number of the called subscriber substation comprises a code portion, including the digits 841 identifying the called zone and exchange, and a numerical portion, inluding four digits, such, for example, as the digits 1234 identifying the line terminal of the subscriber line extending thereto.

Accordingly, the subscriber at the calling private subscriber substation TP proceeds to dial the first digit 8, the second digit 4 and the third digit 1, in the manner previously explained. The line relay R1450 follows the first digit 8 and the third digit 1 while the auxiliary line relay R1410 follows the second digit 4; thereby to cause the respective digits to be registered in the first code switch A1500, the second code switch B1510 and the third code switch C1520, all in the manner previously explained. The line relay R1450 in the primary register 1200 repeats the first digit 8 to the line relay R730 in the primary selector 600 in order to cause the wiper set of the switch mechanism 700 to be driven eight steps in the manner previously explained. At the conclusion of the first digit 8 the wiper 1635 of the sequence switch S1630 in the primary register 1200 disengages the home contact in the associated contact bank, thereby to interrupt the previously traced circuit for energizing the winding of the line relay R730 in order to cause the latter relay to restore and effect the release of the wiper set of the switch mechanism 700 in the manner previously explained. The auxiliary line relay R1410 in the primary register 1200 does not repeat the second digit 4 to the line relay R730 in the primary selector 600, as previously explained. Finally, the line relay R1450 in the primary register 1200 repeats the third digit 1 to the line relay R730 in the primary selector 600, due to the fact that the wiper 1635 of the sequence switch S1630 engages the second contact in the associated contact bank during the third digit 1, as previously explained.

At the conclusion of the third digit 1 the wipers noted of the sequence switch S1630 are driven an additional step in the counterclockwise direction into engagement with the third contacts in the associated contact banks, whereupon the wiper 1635 thereof disengages the second contact in the associated contact bank in order to interrupt the previously traced circuit for energizing the winding of the line relay R730 in the primary selector 600; whereupon the latter relay restores in order to effect the restoration of the hold relay R740 and the release of the wiper set of the switch mechanism 700, in the manner previously explained. Also, shortly following the conclusion of the third digit 1, the dial relay R1260 and the dial slave relay R1310 restore, in the manner previously explained. Upon restoring, the dial slave relay R1310 prepares, at the contacts 1311 and 1312, respectively, the previously mentioned circuits for energizing the winding of the translate relay R1270 and the upper winding of the release relay R1430. In the present example, the circuit for energizing the upper winding of the release relay R1430 is not completed in view of the fact that the combination of the first digit 8 registered in the first code switch A1500 and the second digit 4 registered in the second code switch B1510 and the third digit 1 registered in the third code switch C1520 does not indicate that the call may be extended to its destination directly under the control of the calling device at the calling private subscriber substation TP; while the circuit for energizing the winding of the translate relay R1270 is completed in view of the fact that the combination of the first digit 8 registered in the first code switch A1500 and the second digit 4 registered in the second code switch B1510 and the third digit 1 registered in the third code switch C1520 indicates that a register translator is to be utilized and that the call may not be extended to its destination directly under the control of the calling device at the calling private subscriber substation TP. More particularly, the circuit for energizing the winding of the translate relay R1270 extends from the grounded wiper 1525 of the third code switch C1520 and the engaged first contact in the associated contact bank by way of C1325, the contacts 1311 and 1381 and the winding of R1270 to battery. When thus energized the translate relay R1270 operates to complete, at the contacts 1273, an obvious holding circuit, including the grounded hold conductor C1294 and the contacts 1381, for energizing the winding thereof. Also, the translate relay R1270 interrupts, at the contacts 1276, a further point in the previously traced circuit for energizing the upper winding of the release relay R1430, thereby positively to prevent operation of the latter relay at this time. Also, the translate relay R1270 completes, at the contacts 1277, a circuit for energizing the winding of the start relay R1600 in the register translator allotter 1600; the last-mentioned circuit extending from the grounded hold conductor C1294 by way of the wiper 1634 of the sequence switch S1630 and the engaged third contact in the associated contact bank C1327, the contacts 1345 and 1277, C1292 and the winding of R1600 to battery. When thus energized the start relay R1600 operates. Further, the translate relay R1270 completes, at the contacts 1275, a path for applying battery potential by way of the winding of the test relay R1340 to the test conductor C1292 accessible to the finders F2290 etc. individually associated with the various register translators 1700 etc. Further, the translate relay R1270 interrupts, at the contacts 1271, a further point in the previously traced circuit for energizing the winding of the line relay R730 in the primary selector 600; and prepares, at the contacts 1272, an alternative circuit traced hereinafter for energizing the winding of the line relay R730.

Upon operating, the start relay R1600 in the register translator allotter 1600 prepares, at the contacts 1602, a circuit for energizing the magnet FM1613 of the finder F1610; which circuit is completed only in the event that one of the register translators in the associated group is idle at this time such that ground potential appears upon the conductor C1653. In the event all of the register translators in the associated group are busy at this time, the previously mentioned circuit for energizing the magnet FM1613 of the finder F1610 is not completed and operation of the finder F1610 is not instituted at this time. In this event, the start relay R1600 also completes, at the contacts 1601, an obvious circuit, including the wiper 1611 of the finder F1610 and the engaged home contact in the associated contact bank, for operating the alarm A1615; thereby to indicate the all-busy condition of the entire group of register translators.

On the other hand, in the event any one of the register translators in the associated group is idle at this time or becomes idle, ground potential is applied to the conductor C1653; thereby to effect operation of the finder F1610 in order to find the idle register translator in the associated group and to prevent or arrest operation of the alarm A1615, as noted above. Assuming that the register translator 1700 is idle at this time, ground potential therein is applied by way of the contacts 2144 and 2212 and the contacts 2221 of the busy key K2220 to the conductor C1653, thereby to initiate operation of the finder F1610. More particularly, a circuit for energizing the magnet FM1613 is completed, which extends from the grounded conductor C1653 by way of the wiper 1612 of the finder F1610 and the engaged home contact in the associated contact bank, the contacts 1602 and 1614 and the magnet FM1613 to battery. When thus energized the magnet FM1613 operates to condition the wipers noted of the finder F1610 to be driven one step in the counterclockwise direction and to interrupt, at the contacts 1614, the previously traced circuit for energizing the magnet FM1613; whereupon the latter magnet restores, thereby to drive the wipers noted of the finder F1610 one step in the counterclockwise direction.

When the wiper 1611 of the finder F1610 disengages the home contact in the associated contact bank a point in the previously traced circuit for operating the alarm A1615 is interrupted; and the wiper 1612 of the finder F1610 engages the first contact in the associated contact bank terminating a test conductor extending to one of the register translators in the associated group. In the event the last-mentioned register translator is busy, direct ground potential appears upon the test conductor thereof; whereby the magnet FM1613 is reoperated in order to drive the wipers noted of the finder F1610 an additional step in the counterclockwise direction. More particularly, the wipers noted of the finder F1610 are driven step by step in the counterclockwise direction until the first available idle register translator in the associated group is selected.

Assuming that the register translator 1700 is the first available register translator in the associated group, when the wipers noted of the finder F1610 engage the contacts in the associated contact banks terminating the test conductors C1651 and C1652 extending to the register translator 1700, further operation of the finder F1610 is arrested. More particularly, when the wiper 1612 of the finder F1610 engages the contact in the associated contact bank terminating the test conductor C1652, a circuit is completed for energizing the winding of the start relay R2160 in the register translator 1700 in series with the magnet FM1613 of the finder F1610. The last-mentioned circuit extends from ground by way of the contacts 2290, the winding of R2160, the test conductor C1652, the wiper 1612 of the finder F1610 and the engaged contact in the associated contact bank, the contacts 1602 and 1614 and the magnet FM1613 to battery. When this series circuit is completed the start relay R2160 operates; however, the magnet FM1613 does not operate due to the high series resistance of the winding of the start relay R2160. Accordingly, further operation of the finder F1610 is arrested at this time.

Upon operating, the start relay R2160 completes, at the contacts 2161, an obvious circuit, including the contacts 2151, for energizing the magnet FM2299 of the finder F2290, thereby to cause the latter magnet to operate. It is noted that a path, including the contacts 2151 and 2141, is normally completed for short-circuiting the lower winding of the test relay R2150 in series with the upper winding of the cut-in relay R2140. Upon operating, the magnet FM2299 conditions the wipers noted of the finder F2290 to be driven one step in the counterclockwise direction and to interrupt, at the contacts 2290, the previously traced circuit for energizing the winding of the start relay R2160, thereby to cause the latter relay to restore. Upon restoring, the start relay R2160 interrupts, at the contacts 2161, the previously traced circuit for energizing the magnet FM2299; thereby to cause the latter magnet to restore and drive the wipers noted of the finder F2290 one step in the counterclockwise direction, and to recomplete, at the contacts 2290, the previously traced circuit for energizing the winding of the start relay R2160, whereupon the latter relay reoperates. The start relay R2160 and the magnet FM2299 interact in the manner described above, whereby the wipers noted of the finder F2290 are driven step by step in the counterclockwise direction until they engage the contacts in the associated contact banks terminating the conductor C1282, etc., extending to the primary register 1200; whereby a circuit is completed for energizing in series the upper winding of the test relay R2150 in the register translator 1700 and the winding of the test relay R1340 in the primary register 1200. The above-mentioned circuit extends from ground by way of the contacts 1601, the wiper 1611 of the finder F1610 and the engaged contact in the associated contact bank, C1651, the upper winding of R2150, C2173, the wiper 2291 of the finder F2290 and the engaged contact in the associated contact bank, C1282, the contacts 1275 and the winding of R1340 to battery; whereupon the relays mentioned operate. Upon operating, the test relay R2150 interrupts, at the contacts 2151, a further point in the previously traced circuit for energizing the magnet FM2299 and also the previously traced path for short-circuiting the lower winding thereof in series with the upper winding of the cut-in relay R2140. At this time an obvious circuit, including the contacts 2161 and 2241, is completed for energizing in series the lower winding of the test relay R2150, the upper winding of the cut-in relay R2140 and the magnet FM2299. When this series circuit is completed the cut-in relay R2140 operates, the test relay R2150 occupying its operated position at this time; however, the magnet FM2299 does not operate due to the high series resistance of the upper winding of the cut-in relay R2140 and the lower winding of the test relay R2150. Upon operating, the cut-in relay R2140 completes, at the contacts 2142, a holding circuit for energizing in series the upper and lower windings thereof and the magnet FM2299; and interrupts, at the contacts 2141, the previously traced circuit for energizing in series the lower winding of the test relay R2150, the upper winding of the cut-in relay R2140 and the magnet FM2299. The holding circuit for energizing in series the upper and lower windings of the cut-in relay R2140 and the magnet FM2299 includes the contacts 2142, C2173, the wiper 2291 of the finder F2290 and the engaged contact in the associated contact bank and the grounded test conductor C1282. At this point it is noted that ground potential appears upon the test conductor C1282 at this time due to the operation of the test relay R1340 in the primary register 1200. More particularly, upon operating, the test relay R1340 completes, at the contacts 1343, an obvious path, including the contacts 1274 and 1275, for applying ground potential to the test conductor C1282; and completes, at the contacts 1343, an obvious holding circuit for energizing the winding thereof. Also, upon operating, the test relay R1340 interrupts, at the contacts 1345, the previously traced circuit for energizing the winding of the start relay R1600 in the register translator allotter 1600; whereupon the latter relay restores to interrupt, at the contacts 1601, the previously traced path for applying ground potential to the test conductor C1651. The test relay R2150 in the register translator 1700 then restores, the upper winding thereof having been previously short-circuited due to the application of ground potential to the test conductor C1282, in an obvious manner. Also, upon restoring, the start relay R1600 interrupts, at the contacts 1602, the previously traced circuit for energizing the winding of the start relay R2160 in the register translator 1700, thereby to cause the latter relay to restore.

Also, upon operating, the cut-in relay R2140 interrupts, at the contacts 2144, the previously traced path for applying ground potential in the register translator 1700 to the conductor C1653 extending to the register translator allotter 1600; and completes, at the contacts 2143, an obvious path for applying ground potential to the test conductor C1652 extending to the register translator allotter 1600. At this point it is noted that direct ground potential is applied to the test conductor C1652 prior to the restoration of the start relay R1600; whereby the magnet FM1613 operates in order to drive the wipers noted of the finder F1610 an additional step in the counterclockwise direction so that the finder F1610 does not occupy a position selecting the busy register translator 1700 when the register translator allotter 1600 is completely released, as explained above. Further, the cut-in relay R2140 completes, at the contacts 2145, an obvious series circuit for energizing the windings of the switch relay R2280 and the hold relay R2130, thereby to cause the relays mentioned to operate, for a purpose more fully explained hereinafter.

In the primary register 1200 the test relay R1340 also interrupts, at the contacts 1341, the previously traced circuit for energizing the heating element 1332 of the thermostatic timer 1330 and interrupts, at the contacts 1342, a circuit traced hereinafter for energizing the winding of the busy relay R1380; and completes, at the contacts 1344, an obvious circuit for energizing the winding of the send relay R1370; thereby to cause the latter relay to operate shortly thereafter, the send relay R1370 being of the slow-to-operate type. At this point it is again noted that, when the primary register 1200 is seized by the finder F610, the lock relay R1460 operates in order to apply ground potential to the hold conductor C1294; whereby the heating element 1332 of the thermostatic timer 1330 is energized, as previously explained. In the event the primary register 1200 is not released or a register translator is not associated therewith, in order to cause operation of the test relay R1340 within a relatively short time interval, the heating element 1332 of the timer 1330 heats the bimetallic bar 1331 sufficiently to close the contacts 1333. When the contacts 1333 are thus closed by the bimetallic bar 1331 an obvious circuit, including the contacts 1322 and 1341, is completed for energizing the winding of the alarm relay R1320, thereby to cause the latter relay to operate. Upon operating, the alarm relay R1320 completes, at the contacts 1321, an obvious holding circuit, including the contacts 1341 and the grounded hold conductor C1294, for energizing the winding thereof; and interrupts, at the contacts 1322, the previously traced circuit for energizing the heating element 1332 of the thermostatic timer 1330; whereupon the bimetallic bar 1331 cools in order to open the contacts 1333. Also, the alarm relay R1320 completes, at the contacts 1323, an obvious circuit for illuminating the alarm lamp L1314 and for operating an alarm not shown. The operation of the alarm mentioned indicates that the previously mentioned condition exists in one of the primary registers; while the illumination of the alarm lamp L1314 indicates that the condition mentioned exists in the primary register 1200. It is pointed out that the above-described operation of the thermostatic timer 1330 may be due either to the failure of the subscriber at the calling private subscriber substation TP to dial promptly a full complement of digits into the primary register 1200 or to the fact that there is no idle register translator in the associated group to be allotted by the register translator allotter 1600 at this time.

The subscriber at the calling private subscriber substation TP next proceeds to dial the fourth digit 1, whereby the line relay R1450 follows this digit, in the manner previously explained. More particularly, the line relay R1450 repeats the fourth digit 1 at the contacts 1453 to the dial relay R1260 and the magnet DM1625 of the first numerical switch D1620, in the manner previously explained, whereby the dial relay R1260 operates in order to effect operation of the dial slave relay R1310. The circuit for energizing the magnet DM1625 of the first numerical switch D1620 extends, when completed, from ground by way of the contacts 1447 and 1453, C1482, the contacts 1241, the wiper 1631 of the sequence switch S1630 and the engaged third contact in the associated contact bank and the magnet DM1625 to battery. The fourth digit 1 is not repeated by the line relay R1450 in the primary register 1200 to the line relay R730 in the primary selector 600 due to the fact that the wiper 1635 of the sequence switch S1630 disengages the second contact in the associated contact bank at the conclusion of the third digit 1 and engages the third contact in the associated contact bank during the fourth digit 1. Hence, the switch mechanism 700 in the primary selector 600 is not operated during the fourth digit 1.

At the conclusion of the fourth digit 1 the wipers noted of the first numerical switch D1620 engage the first contacts in the associated contact banks; whereby the fourth digit 1 is registered in the first numerical switch D1620. Shortly thereafter the dial relay R1260 restores in order to effect the restoration of the dial slave relay R1310, in the manner previously explained. Upon restoring, the dial slave relay R1310 interrupts, at the contacts 1313, the previously traced circuit for energizing the magnet SM1636 of the sequence switch S1630; whereupon the latter magnet restores in order to drive the wipers noted of the sequence switch S1630 into engagement with the fourth contacts in the associated contact banks. When the wiper 1631 of the sequence switch S1630 engages the fourth contact in the associated contact bank a point in a path traced hereinafter is prepared for repeating the fifth digit 2 over the impulse conductor C1395 extending to the register translator 1700; also, when the wiper 1634 of the sequence switch S1630 engages the fourth contact in the associated contact bank a point in a path traced hereinafter is prepared for connecting ground potential to the conductor C1281 extending to the register translator 1700.

Upon operating, the send relay R1370 interrupts, at the contacts 1372 and 1374, the previously mentioned paths for respectively applying ground potential and battery potential by way of the resistor 1316 to the conductors C645 and C644 extending to the primary selector 600; and completes, at the contacts 1371 and 1373, obvious connections between the conductors C645 and C644 extending to the primary selector 600 and the respective conductors C1393 and C1394 extending to the register translator 1700. Further the send relay R1370 completes, at the contacts 1375, a circuit for energizing in multiple the upper and lower windings of the pulse relay R1350; this circuit extending from ground by way of the contacts 1464, the wiper 1501 of the first code switch A1500 and the engaged eighth contact in the associated contact bank, the contacts 1463 and 1375 and 1352 and the upper and lower windings of R1350 to battery. When thus energized the pulse relay R1350 operates to interrupt, at the contacts 1352, the previously traced circuit for energizing in multiple the upper and lower windings thereof; whereupon the upper and lower windings of the pulse relay R1350 are effectively short-circuited through the associated condenser 1317, causing the latter relay to restore shortly thereafter. Accordingly, the pulse relay R1350 operates and restores intermittently at a fixed rate, depending upon the characteristic of the condenser 1317, in an obvious manner. Finally, the send relay R1370 completes, at the contacts 1376, a circuit for energizing in multiple the upper and lower windings of the pulse relay R1360; this circuit extending from the grounded wiper 1513 of the second code switch B1510 and the engaged fourth contact in the associated contact bank by way of the wiper 1524 of the third code switch C1520 and the engaged first contact in the associated contact bank, C1328, the contacts 1376 and 1363, and the upper and lower windings of R1360 to battery. When thus energized the pulse relay R1360 operates to interrupt, at the contacts 1363, the previously traced circuit for energizing in multiple the upper and lower windings thereof; whereupon the upper and lower windings of the pulse relay R1360 are effectively short-circuited through the associated condenser 1318, causing the latter relay to restore shortly thereafter. Accordingly, the pulse relay R1360 operates and restores intermittently at a fixed rate, depending upon the characteristic of the condenser 1318, in an obvious manner.

Each time the pulse relay R1350 operates and then restores it completes and then interrupts, at the contacts 1351, an obvious circuit for energizing the magnet AM1504 of the first code switch A1500, thereby to cause the latter magnet to operate and restore; whereby the wipers noted of the first code switch A1500 are driven an additional step in the counterclockwise direction. Also, each time the pulse relay R1350 operates and then restores it completes and then interrupts, at the contacts 1353, a path for applying either light ground potential or heavy ground potential to the impulse conductor C1391 extending to the register translator 1700, as explained more fully below. More particularly, upon the first three operations of the pulse relay R1350, the wiper 1502 of the first code switch A1500 successively engages the eighth, ninth and tenth contacts in the associated contact bank; whereby light ground potential is applied twice by way of the resistor 1506 and heavy ground potential is applied once by way of the grounded tenth contact in the contact bank associated with the wiper 1502 to the impulse conductor C1391 extending to the register translator 1700. At this point it is noted that two light ground impulses are transmitted over the impulse conductor C1391 in view of the fact that the wipers noted of the first code switch A1500 engaged the eighth contacts in the associated contact banks when operation of the pulse relay R1350 was initiated; the number 2 being the complement of the digit 8 registered in the first code switch A1500. Accordingly, it will be understood that the pulse relay R1350 transmits a number of light ground impulses corresponding to the complement of the digit registered in the first code switch A1500 and then a heavy ground impulse. On the next three operations of the pulse relay R1350 the wiper 1502 of the first code switch A1500 successively engages the eleventh, twelfth and thirteenth contacts in the associated contact bank respectively terminating the marking conductors C1284, C1285 and C1286 which are adapted to be marked with ground potential by the respective party relays R1210, R1220 and R1230. In the present example, the calling subscriber substation TP being of the private type, as contrasted with a calling subscriber substation of the party type, does not effect operation of any one of the party relays R1210, R1220 and R1230, whereby no ground potential appears upon the marking conductors C1284, C1285 and C1286. Accordingly, upon the last three operations of the pulse relay R1350, three light ground impulses were transmitted over the impulse conductor C1391 to the register translator 1700. Upon the last-mentioned restoration of the pulse relay R1350 the wiper 1501 of the first code switch A1500 is driven to disengage the thirteenth contact in the associated contact bank; whereby the previously traced circuit for energizing in multiple the upper and lower windings of the pulse relay R1350 is interrupted in order to cause the latter relay to restore, further operation of the pulse relay R1350 being arrested at this time.

As the pulse relay R1360 operates and restores intermittently it successively sets the second code switch B1510, the third code switch C1520 and the first numerical switch D1620. More particularly, upon the first seven operations of the pulse relay R1360, an obvious circuit is completed at the contacts 1362 for energizing the magnet BM1516 of the second code switch B1510; whereupon the operating circuit is transferred to the magnet CM1526 of the third code switch C1520, in an obvious manner, the number 7 plus the second digit 4 registered in the second code switch B1510 being equal to 11. Upon the next ten operations of the pulse relay R1360 an obvious circuit is completed, at the contacts 1362, for energizing the magnet CM1526 of the third code switch C1520, whereupon the operating circuit is transferred to the magnet DM1625 of the first numerical switch D1620 in an obvious manner; the number 10 plus the third digit 1 registered in the third code switch C1520 being equal to 11. Upon the next ten operations of the pulse relay R1360 an obvious circuit is completed at the contacts 1362 for energizing the magnet DM1625 of the first numerical switch D1620, whereupon the operating circuit is interrupted in an obvious manner; the number 10 plus the fourth digit 1 registered in the first numerical switch D1620 being equal to 11.

Also, each time the pulse relay R1360 operates and then restores it completes and then interrupts, at the contacts 1361, a path for applying either light ground potential or heavy ground potential to the impulse conductor C1392 extending to the register translator 1700, as explained more fully below. More particularly, upon the first seven operations of the pulse relay R1360, the wiper 1513 of the second code switch B1510 successively engages the fourth, fifth, sixth, seventh, eighth, ninth and tenth contacts in the associated contact bank; whereby light ground potential is applied six times by way of the resistor 1315 and heavy ground potential is applied once by way of the tenth contact in the contact bank associated with the grounded wiper 1513 of the second code switch B1510 to the impulse conductor C1392 extending to the register translator 1700. At this point it is noted that six light ground impulses are transmitted over the impulse conductor C1392 in view of the fact that the wipers noted of the second code switch B1510 engaged the fourth contacts in the associated contact banks when operation of the pulse relay R1360 was initiated; the number 6 being the complement of the digit 4 registered in the second code switch B1510. Accordingly, it will be understood that the pulse relay R1360 transmits a number of light ground impulses corresponding to the complement of the digit registered in the second code switch B1510 and then a heavy ground impulse.

Upon the next ten operations of the pulse relay R1360 the wiper 1523 of the third code switch C1520 successively engages the first, second, third, fourth, fifth, sixth, seventh, eighth, ninth and tenth contacts in the associated contact bank, whereby light ground potential is applied nine times by way of the resistor 1315 and heavy ground potential is applied once by way of the tenth contact in the contact bank associated with the grounded wiper 1523 of the third code switch C1520 to the impulse conductor C1392 extending to the register translator 1700. At this point it is noted that nine light ground impulses are transmitted over the impulse conductor C1392 in view of the fact that the wipers noted of the third code switch C1520 engaged the first contacts in the associated contact banks when operation of the pulse relay R1360 was initiated at this time; the number 9 being the complement of the digit 1 registered in the third code switch C1520. Accordingly, it will be understood that the pulse relay R1360 transmits a number of light ground impulses corresponding to the complement of the digit registered in the third code switch C1520 and then a heavy ground impulse.

Upon the next ten operations of the pulse relay R1360 the wiper 1623 of the first numerical switch D1620 successively engages the first, second, third, fourth, fifth, sixth, seventh, eighth, ninth and tenth contacts in the associated contact bank; whereby light ground potential is applied nine times by way of the resistor 1315 and heavy ground potential is applied once by way of the tenth contact in the contact bank associated with the grounded wiper 1623 of the first numerical switch D1620 to the impulse conductor C1392 extending to the register translator 1700. At this point it is noted that nine light ground impulses are transmitted over the impulse conductor C1392 in view of the fact that the wipers noted of the first numerical switch D1620 engaged the first contacts in the associated contact banks when operation of the pulse relay R1360 was initiated at this time; the number 9 being the complement of the digit 1 registered in the first numerical switch D1620. Accordingly, it will be understood that the pulse relay R1360 transmits a number of light ground impulses corresponding to the complement of the digit registered in the first numerical switch D1620 and then a heavy ground impulse.

During the transmission of the complement of the second digit 4 registered in the second code switch P1510 by the pulse relay R1360, when the grounded wiper 1513 of the second code switch B1510 disengages the ninth contact in the associated contact bank the previously traced circuit for energizing in multiple the upper and lower windings of the pulse relay R1360 is interrupted and an obvious alternative circuit, including the grounded tenth contact in the contact bank associated with the wiper 1514 of the second code switch B1510, is completed for energizing in multiple the upper and lower windings of the pulse relay R1360. At this time the wipers noted of the second code switch B1510 are driven to engage the eleventh contacts in the associated contact banks, whereby the above-mentioned alternative circuit for energizing in multiple the upper and lower windings of the pulse relay R1360 is interrupted. When the grounded wiper 1513 of the second code switch B1510 engages the eleventh contact in the associated contact bank an alternative circuit, including the wiper 1523 of the third code switch C1520 and the engaged first contact in the associated contact bank and the wiper 1624 of the first numerical switch D1620 and the engaged first contact in the associated contact bank, is completed for energizing in multiple the upper and lower windings of the pulse relay R1360, whereby further operation of the pulse relay R1360 continues.

During the transmission of the complement of the third digit 1 registered in the third code switch C1520 by the pulse relay R1360, when the grounded wiper 1523 of the third code switch 1520 disengages the ninth contact in the associated contact bank the previously traced circuit for energizing in multiple the upper and lower windings of the pulse relay R1360 is interrupted and an obvious alternative circuit, including the grounded tenth contact in the contact bank associated with the wiper 1524 of the third code switch C1520 is completed for energizing in multiple the upper and lower windings of the pulse relay R1360. At this time the wipers noted of the third code switch C1520 are driven to engage the eleventh contacts in the associated contact banks, whereby the above-mentioned alternative circuit for energizing in multiple the upper and lower windings of the pulse relay R1360 is interrupted. When the grounded wiper 1523 of the third code switch C1520 engages the eleventh contact in the associated contact bank an alternative circuit, including the wiper 1623 of the first numerical switch D1620 and the engaged first contact in the associated contact bank and the wiper 1633 of the sequence switch S1630 and the engaged fourth contact in the associated contact bank, is completed for energizing in multiple the upper and lower windings of the pulse relay R1360; whereby further operation of the pulse relay R1360 continues.

During the transmission of the complement of the fourth digit 1 registered in the first numerical switch D1620 by the pulse relay R1360, when the grounded wiper 1623 of the first numerical switch D1620 disengages the ninth contact in the associated contact bank the previously traced circuit for energizing in multiple the upper and lower windings of the pulse relay R1360 is interrupted; and an obvious alternative circuit, including the grounded tenth contact in the contact bank associated with the wiper 1624 of the first numerical switch D1620, is completed for energizing in multiple the upper and lower windings of the pulse relay R1360. At this time the wipers noted of the first numerical switch D1620 are driven to engage the eleventh contacts in the associated contact banks, whereby the above-mentioned alternative circuit for energizing in multiple the upper and lower windings of the pulse relay R1360 is interrupted. Further operation of the pulse relay R1360 is positively arrested at this time.

The arrangement of the circuits traced above for continuing the operation of the pulse relay R1360 positively insures that the third digit 1 is registered in the third code switch C1520 prior to transmission of the complement of the second digit 4 registered in the second code switch B1510; also, this arrangement positively insures that the fourth digit 1 is registered in the first numerical switch D1620 prior to transmission of the complement of the third digit 1 registered in the third code switch C1520; finally, this arrangement positively insures the complete registration of the fourth digit 1 in the first numerical switch D1620 prior to the transmission of the complement of the fourth digit 1.

The subscriber at the calling private subscriber substation TP then proceeds to dial the fifth digit 2, in the manner previously explained. The line relay R1450 follows the fifth digit 2 and repeats the impulses thereof at the contacts 1453, over the impulse conductor C1395 extending to the register translator 1700. The path for repeating the impulses of the fifth digit 2 over the impulse conductor C1395 extends from ground by way of the contacts 1447, 1453, C1482, the contacts 1241 and the wiper 1631 and the engaged fourth contact in the associated contact bank to the impulse conductor C1395. Also the line relay R1450 repeats the impulses of the fifth digit 2, at the contacts 1453, to the dial relay R1260, thereby to cause the latter relay to operate and effect operation of the dial slave relay R1310, in the manner previously explained. Upon operating, the dial relay R1260 completes, at the contacts 1262, an obvious path, including C1290, the grounded hold conductor C1294 and the wiper 1634 of the sequence switch S1630 and the engaged fourth contact in the associated contact bank, for applying ground potential to the conductor C1281 extending to the register translator 1700. Also the dial slave relay R1310 completes, at the contacts 1313, the previously traced circuit for energizing the magnet SM1636 of the sequence switch S1630, thereby to cause the latter magnet to operate and condition the wipers noted of the sequence switch S1630 to be driven an additional step in the counterclockwise direction. Shortly following the conclusion of the fifth digit 2 the dial relay R1260 restores in order to interrupt, at the contacts 1262, the previously traced path for applying ground potential to the conductor C1281 extending to the register translator 1700 and to effect the restoration of the dial slave relay R1310. Upon restoring, the dial slave relay R1310 interrupts, at the contacts 1313, the previously traced circuit for energizing the magnet SM1636 of the sequence switch S1630; whereupon the latter magnet restores in order to drive the wipers noted of the sequence switch S1630 an additional step in the counterclockwise direction.

At this point it is noted that, when the line relay R1450 repeats, at the contacts 1453, the impulses of the fifth digit 2 over the impulse conductor C1395, in the manner explained above, a circuit traced hereinafter is prepared for energizing the winding of the busy relay R1380; which circuit is completed in the vent an idle register translator is not connected to the primary register 1200 at this time. More particularly, in the event an idle register translator 1700, etc., is not connected to the primary register 1200 at this time, the test relay R1340 occupies its restored position and the application of ground potential to the impulse conductor C1395, due to the operation of the line relay R1450 to repeat the impulses of the fifth digit 2 thereover, completes an obvious circuit, including the contacts 1382 and 1342, for energizing the winding of the busy relay R1380. In this event, there is no register translator in readiness to receive the fifth digit 2 repeated by the line relay R1450 over the impulse conductor C1395 and the busy relay R1380 operates. Upon operating, the busy relay R1380 completes, at the contacts 1383, an obvious holding circuit, including the grounded hold conductor C1294, for energizing the winding thereof; and interrupts, at the contacts 1381, a point in the previously traced holding circuit for energizing the winding of the translate relay R1270, thereby to cause the latter relay to restore. Also the busy relay R1380 interrupts, at the contacts 1382, a further point in the previously traced original operating circuit for energizing the winding thereof; and completes, at the contacts 1384, an obvious circuit, including the busy tone conductor C1319 and the condenser 1314, for energizing the lower winding of the line relay R1450. The busy tone current traversing the lower winding of the line relay R1450 induces busy tone voltage in the upper and intermediate windings thereof, whereby busy tone current is returned over the previously traced loop circuit to the calling private subscriber substation TP in order to indicate to the subscriber thereat that the desired connection may not be had immediately due to the all-busy condition mentioned. The subscriber at the calling private subscriber substation TP then proceeds to release the line switch 423, the primary selector 600 and the primary register 1200 by replacing the receiver of the telephone instrument thereat upon its associated switchhook, in the manner previously explained.

Continuing now with the operation of the primary register 1200, the subscriber at the calling private subscriber substation TP now proceeds to dial the sixth digit 3 and the seventh digit 4, in the manner previously explained; whereby the line relay R1450 in the primary register 1200 repeats the impulses of the sixth digit 3 and the seventh digit 4 over the impulse conductor C1395 to the register translator 1700 and the dial relay R1260 connects ground potential two additional times to the conductor C1281 extending to the register translator 1700, all in the manner previously explained.

Continuing now with the operation of the register translator 1700, it is again noted that the test relay R2150 operates in order to effect operation of the cut-in relay R2140 when the finder F2290 seizes the conductors C1282, etc., extending to the primary register 1200; whereby the hold relay R2130 and the switch relay R2280 operate, all in the manner previously explained. Upon operating, the hold relay R2130 completes, at the contacts 2136, an obvious path for applying ground potential to the hold conductor C2772. Upon operating, the switch relay R2280 prepares, at the contacts 2281, a circuit, including the impulse conductor C1391 extending to the primary register 1200, the wiper 2292 of the finder F2290 and C2071, for energizing in series the windings of the light code relay R2050 and the heavy code relay R2060; prepares, at the contacts 2282, a circuit, including the impulse conductor C1392 extending to the primary register 1200, the wiper 2293 of the finder F2290 and C2172, for energizing in series the windings of the light code relay R2110 and the heavy code relay R2120; and prepares, at the contacts 2286, a circuit, including the impulse conductor C1395, extending to the primary register 1200, the wiper 2297 of the finder F2290, C2171, the contacts 2746 and C2536, for energizing the magnet EM2525 of the second numerical switch E2520. Also the switch relay R2280 completes, at the contacts 2283, a series circuit for energizing the upper winding of the transfer relay R750 in the primary selector 600 and the lower winding of the special service relay R2040 in the register translator 1700; this circuit extending from ground by way of the resistor 722, the strap 723, the upper winding of R750, the contacts 720 of the set of switch springs S718, the contacts 771 and 625, the wiper 614 of the finder F610, C644, the contacts 1373, C1394, the wiper 2294 of the finder F2290, the contacts 2283, C1872, the contacts 1811 and 1713 and the lower winding of R2040 to battery. When this series circuit is completed the transfer relay R750 in the primary selector 600 remains in its operated position; however, the special service relay R2040 does not operate due to the high series resistance of this circuit, including the resistor 722, the special service relay R2040 being of the marginal type. Further the switch relay R2280 prepares, at the contacts 2284, a circuit, including the conductor C1281 extending to the primary register 1200, the wiper 2295 of the finder F2290, C2217, the contacts 2215 and 2743, for energizing the left-hand winding of the sequence relay R2740. Further the switch relay R2280 completes, at the contacts 2285, an alternative path, including the impedance 2216, C2232, the wiper 2296 of the finder F2290, C1393, the contacts 1371, C645, the wiper 615 of the finder F610 and the contacts 627, for applying ground potential to the control conductor C465 of the trunk 462, thereby to retain the line switch 423 in its operated position. Also the switch relay R2280 prepares, at the contacts 2288, a circuit, including the impulse conductor C891, the wiper 2262 of the timer switch M2260 and the engaged home contact in the associated contact bank, for energizing the winding of the timer relay R2270. At this point it is noted that twelve ground impulses per minute are applied to the impulse conductor C891; and that the latter conductor extends to the date and time unit 3900, wherein the timed ground impulses are produced. Further the switch relay R2280 prepares, at the contacts 2287, a circuit traced hereinafter and including the wiper 2298 of the finder F2290, C1283, the contacts 1272, C642, the wiper 612 of the finder F610, the contacts 623 and 773 for energizing the winding of the line relay R730 in the primary selector 600.

As previously pointed out in connection with the operation of the primary register 1200, the pulse relay R1350 therein first operates to transmit in light ground impulses the complement 2 of the first digit 8 and then a heavy ground impulse over the impulse conductor C1391; whereby the light code relay R2050 and the heavy code relay R2060 in the register translator 1700 respectively operate three times and once, the heavy code relay R2060 being of the marginal type. Each time the light code relay R2050 operates and then restores it completes and then interrupts, at the contacts 2051, a circuit, including the grounded wiper 2623 of the party switch N2620 and the engaged home contact in the associated contact bank, C2635 and C2422, for energizing the magnet AM2406 of the first code switch A2400; whereby the latter magnet operates and restores, thereby to drive the wipers noted of the first code switch A2400 one step in the clockwise direction. Accordingly, at this time, the magnet AM2406 is operated and restored three times, whereby the wipers noted of the first code switch A2400 are driven to engage the third contacts in the associated contact banks. When the first code switch A2400 is thus operated the wipers 2402 and 2403 thereof set up the code 8 in the group of WXYZ marking leads 2805 extending to the storage transfer switch U2820, for a purpose more fully explained hereinafter. More particularly, the wiper 2402 engages the third contact in the associated contact bank terminating the X conductor in the group of WXYZ marking leads 2805 corresponding in code to the digit 8, as previously explained. Also when the first code switch A2400 is thus operated the wiper 2404 thereof engages the third contact in the associated contact bank terminating the eighth marking conductor in the marking cable 2385, for a purpose more fully explained hereinafter; while the grounded wiper 2405 thereof engages the third contact in the associated contact bank terminating the conductor extending to the wiper 2338 of the composite code switch P2330. Accordingly the first code switch A2400 is responsive to the first digit 8 to select and to cause ground potential to be applied to the corresponding wiper 2338 of the composite code switch P2330.

When the heavy code relay R2060 operates and then restores it completes and then interrupts, at the contacts 2061, an obvious circuit for energizing the magnet NM2625 of the party switch N2620, thereby to cause the latter magnet to operate and restore; whereby the wipers noted of the party switch N2620 are driven one step in the counterclockwise direction away from their home positions. When the party switch N2620 is thus operated the wiper 2622 thereof engages the first contact in the associated contact bank, thereby to prepare a circuit traced hereinafter for energizing the upper winding of the pulse relay R1830; while the wiper 2623 thereof disengages the home contact in the associated contact bank, thereby to interrupt a further point in the previously traced circuit for energizing the magnet AM2406 of the first code switch A2400 in order positively to arrest operation of the latter switch at this time. Also when the party switch N2620 is thus operated the grounded wiper 2623 thereof engages the first contact in the associated contact bank terminating the first marking conductor C2641 which, in turn, is adapted to be connected to the first marking conductor C3401 extending to the detector 2900, for a purpose more fully explained hereinafter.

The pulse relay R1350 in the primary register 1200 then transmits three light ground impulses over the impulse conductor C1391 in conjunction with the test of whether the calling subscriber substation TP is of the party type, in the manner previously explained; whereby the light code relay R2050 in the register translator 1700 operates three additional times. This operation of the light code relay R2050 is without effect due to the fact that the wiper 2623 of the party switch N2620 disengages the home contact in the associated contact bank at this time, whereby no further operation of the first code switch A2400 is effected. In view of the fact that no further operation of the heavy code relay R2060 occurs at this time, no further operation of the party switch N2620 occurs.

As previously pointed out in connection with the operation of the primary register 1200, the pulse relay R1360 therein first operates to transmit in light ground impulses the complement 6 of the second digit 4 and then a heavy ground impulse over the impulse conductor C1392; whereby the light code relay R2110 and the heavy code relay R2120 in the register translator 1700 respectively operate seven times and once, the heavy code relay R2120 being of the marginal type. Each time the light code relay R2110 operates and then restores it completes and then interrupts, at the contacts 2111, a circuit, including the contacts 2715 and C2423, for energizing the magnet BM2415 of the second code switch B2410; whereby the latter magnet operates and restores, thereby to drive the wipers noted of the second code switch B2410 one step in the clockwise direction. Accordingly, at this time, the magnet BM2415 is operated and restored seven times, whereby the wipers noted of the second code switch B2410 are driven to engage the seventh contacts in the associated contact banks. When the second code switch B2410 is thus operated the wipers 2412 and 2413 thereof set up the code 4 in the group of WXYZ marking leads 2806 extending to the storage transfer switch U2820, for a purpose more fully explained hereinafter; more particularly, the wipers 2412 and 2413 respectively engage the seventh contacts in the associated contact banks respectively terminating the X and Y conductors in the group of WXYZ marking leads 2806 corresponding in code to the digit 4, as previously explained. Also when the second code switch B2410 is thus operated the wiper 2414 thereof engages the seventh contact in the associated contact bank terminating the fourth marking conductor in the marking cable 2385, for a purpose more fully explained hereinafter.

Also each time the light code relay R2110 operates and then restores it completes and then interrupts, at the contacts 2112, a circuit, including the contacts 2717 and C2393, for energizing the vertical magnet PM2340 of the composite code switch P2330, whereby the latter magnet operates in order to drive the wiper set of the composite code switch P2330 one step in the vertical direction away from its normal vertical position. When the wiper set of the composite code switch P2330 is driven one step in the vertical direction away from its normal vertical position the set of switch springs PS2343 is actuated, for a purpose more fully explained hereinafter. Accordingly, at this time, the vertical magnet PM2340 is operated and restored seven times, whereby the wiper set of the composite code switch P2330 is driven seven steps in the vertical direction away from its normal vertical position.

When the heavy code relay R2120 operates and then restores it completes and then interrupts, at the contacts 2121, a circuit, including the contacts 2713, for energizing the left-hand winding of the sequence relay R2710, thereby to cause the latter relay to operate first partially and then completely; whereby there is completed, at the contacts 2711, an obvious holding circuit, including the grounded hold conductor C2772, for energizing in series the right-hand and left-hand windings of the sequence relay R2710. Also, upon operating, the sequence relay R2710 interrupts, at the contacts 2713, a further point in the previously traced original circuit for energizing the left-hand winding thereof; and prepares, at the contacts 2712, a circuit traced hereinafter for energizing the left-hand winding of the sequence relay R2770. Further the sequence relay R2710 interrupts, at the contacts 2715, a further point in the previously traced circuit for energizing the magnet BM2415, thereby positively to prevent further operation of the second code switch B2410. Also, the sequence relay R2710 prepares, at the contacts 2714, a circuit traced hereinafter for energizing the magnet CM2505 of the third code switch C2500; and interrupts, at the contacts 2717, a further point in the previously traced circuit for energizing the vertical magnet PM2340, thereby positively to prevent further operation of the wiper set of the composite code switch P2330 in the vertical direction. Finally the sequence relay R2710 prepares, at the contacts 2716, a circuit traced hereinafter for energizing the rotary magnet PM2341 of the composite code switch P2330.

The pulse relay R1360 in the primary register 1200 then operates to transmit in light ground impulses the complement 9 of the third digit 1 and then a heavy ground impulse over the impulse conductor C1392; whereby the light code relay R2110 and the heavy code relay R2120 in the register translator 1700 respectively operate ten times and once. Each time the light code relay R2110 operates and then restores it completes and then interrupts, at the contacts 2111, the previously mentioned circuit, including the contacts 2714 and 2725 and C2531, for energizing the magnet CM2505 of the third code switch C2500; whereby the latter magnet operates and restores, thereby to drive the wipers noted of the third code switch C2500 one step in the clockwise direction. Accordingly, at this time, the magnet CM2505 is operated and restored ten times, whereby the wipers noted of the third code switch C2500 are driven to engage the tenth contacts in the associated contact banks. When the third code switch C2500 is thus operated the wipers 2502 and 2503 thereof set up the code 1 in the group of WXYZ marking leads 2807 extending to the storage transfer switch U2820, for a purpose more fully explained hereinafter; more particularly, the wipers 2502 and 2503 respectively engage the tenth contacts in the associated contact banks respectively terminating the W and X conductors in the group of WXYZ marking leads 2807 corresponding in code to the digit 1, as previously explained. Also when the third code switch C2500 is thus operated the wiper 2504 thereof engages the tenth contact in the associated contact bank terminating the first marking conductor in the marking cable 2385, for a purpose more fully explained hereinafter.

Also each time the light code relay R2110 operates and then restores it completes and then interrupts, at the contacts 2112, the previously mentioned circuit, including the contacts 2716 and 2726 and C2394, for energizing the rotary magnet PM2341 of the composite code switch P2330; whereby the latter magnet operates in order to drive the wiper set of the composite code switch P2330 one step in the rotary direction away from its normal rotary position. Accordingly, at this time, the rotary magnet PM2341 is operated and restored ten times, whereby the wiper set of the composite code switch P2330 is driven ten steps in the rotary direction away from its normal rotary position.

When the heavy code relay R2120 operates and then restores it completes and then interrupts, at the contacts 2121, the previously mentioned circuit, including the contacts 2712 and 2723, for energizing the left-hand winding of the sequence relay R2720, thereby to cause the latter relay to operate first partially and then completely; whereby there is completed, at the contacts 2721, an obvious holding circuit, including the grounded hold conductor C2772, for energizing in series the right-hand and left-hand windings of the sequence relay R2720. Also, upon operating, the sequence relay R2720 interrupts, at the contacts 2723, a further point in the previously traced original circuit for energizing the left-hand winding thereof; and prepares, at the contacts 2722, a circuit traced hereinafter for energizing the left-hand winding of the sequence relay R2730. Further the sequence relay R2720 interrupts, at the contacts 2725, a further point in the previously traced circuit for energizing the magnet CM2505, thereby positively to prevent further operation of the third code switch C2500. Also the sequence relay R2720 prepares, at the contacts 2724, a circuit traced hereinafter for energizing the magnet DM2515 of the first numerical switch D2510; and interrupts, at the contacts 2726, a further point in the previously traced circuit for energizing the rotary magnet PM2341, thereby positively to prevent further operation of the wiper set of the composite code switch P2330 in the rotary direction. Finally the sequence relay R2720 prepares, at the contacts 2727, a further point in the previously mentioned circuit for energizing the upper winding of the switch pulse relay R1830; which circuit is completed at this time due to the fact that the party switch N2620 occupies its operated position, as previously explained. The above-mentioned circuit extends from the grounded wiper 2303 of the digit sequence switch T2300 and the engaged home contact in the associated contact bank by way of C1776, the contacts 1764 and 1822, C1871, the contacts 2727, the wiper 2622 of the party switch N2620 and the engaged first contact in the associated contact bank, C2634, the contacts 1833 and the upper winding of the switch pulse relay R1830 to battery. Also the application of ground potential by way of the previously traced path to the contacts 1833 completes an obvious path for short-circuiting the condenser 1835 through the lower winding of the switch pulse relay R1830. Upon operating, the switch pulse relay R1830 interrupts, at the contacts 1833, the previously traced circuit for energizing the upper winding thereof and the previously traced multiple path for short-circuiting the condenser 1835 through the lower winding thereof; whereupon the condenser 1835 is charged through the upper and lower windings in series of the switch pulse relay R1830 in order to cause the latter relay to restore shortly thereafter. Hence, the switch pulse relay R1830 operates and restores intermittently at a predetermined rate, depending upon the characteristic of the associated condenser 1835, for a purpose more fully explained hereinafter.

At this time the first digit 8 is registered in the first code switch A2400 and the last-mentioned switch has selected the corresponding wiper 2338 of the composite code switch P2330; the second digit 4 and the third digit 1 are respectively registered in the second code switch B2410 and in the third code switch C2500 and the wiper set of the composite code switch P2330 occupies its corresponding seventh vertical and tenth rotary positions, in the manner previously explained.

The pulse relay R1360 in the primary register 1200 then operates to transmit in light ground impulses the complement 9 of the fourth digit 1 and then a heavy ground impulse over the impulse conductor C1392; whereby the light code relay R2110 and the heavy code relay R2120 in the register translator 1700 respectively operate ten times and once. Each time the light code relay R2110 operates and then restores it completes and then interrupts, at the contacts 2111, the previously mentioned circuit, including the contacts 2714, 2724 and 2734 and C2534, for energizing the magnet DM2515 of the first numerical switch D2510; whereby the latter magnet operates and restores, thereby to drive the wipers noted of the first numerical switch D2510 one step in the clockwise direction. Accordingly, at this time, the magnet DM2515 is operated and restored ten times, whereby the wipers noted of the first numerical switch D2510 are driven to engage the tenth contacts in the associated contact banks. When the first numerical switch D2510 is thus operated the wipers 2512 and 2513 thereof set up the code 1 in the group of WXYZ marking leads 2808 extending to the storage transfer switch U2820, for a purpose more fully explained hereinafter; more particularly, the wipers 2512 and 2513 respectively engage the tenth contacts in the associated contact banks respectively terminating the W and X conductors in the group of WXYZ marking leads 2808 corresponding in code to the digit 1, as previously explained. Also when the first numerical switch D2510 is thus operated the wiper 2514 thereof engages the tenth contact in the associated contact bank terminating the first marking conductor in the marking cable 2385, for a purpose more fully explained hereinafter.

When the heavy code relay R2120 operates and then restores it completes and then interrupts, at the contacts 2121, the previously mentioned circuit, including the contacts 2712, 2722 and 2732, for energizing the left-hand winding of the sequence relay R2730, thereby to cause the latter relay to operate first partially and then completely; whereby there is completed, at the contacts 2731, an obvious holding circuit, including the grounded hold conductor C2772, for energizing in series the right-hand and left-hand windings of the sequence relay R2730. Also, upon operating, the sequence relay R2730 interrupts, at the contacts 2732, a further point in the previously traced original circuit for energizing the left-hand winding thereof; and interrupts, at the contacts 2734, a further point in the previously traced circuit for energizing the magnet DM2515, thereby positively to prevent further operation of the first numerical switch D2510. Also the sequence relay R2730 prepares, at the contacts 2733, a circuit traced hereinafter for energizing the winding of the digit spacer relay R1920.

As previously pointed out in connection with the operation of the primary register 1200, the dial relay R1260 therein operates to apply ground potential to the conductor C1281 at the beginning of the fifth digit 2 and then to remove the application of ground potential from the conductor C1281 shortly following the conclusion of the fifth digit 2; while the line relay R1450 therein operates to transmit the impulses of the fifth digit 2 over the impulse conductor C1395. When the impulses of the fifth digit 2 are transmitted over the impulse conductor C1395 a circuit, including the wiper 2297 of the finder F2290, the contacts 2286, C2171, the contacts 2746, and C2536, is completed for energizing the magnet EM2525; whereby the latter magnet operates and restores twice in order to drive the wipers noted of the second numerical switch E2520 in the counterclockwise direction into engagement with the second contacts in the associated contact banks. When the second numerical switch E2520 is thus operated the wipers 2522 and 2523 thereof set up the code 2 in the group of WXYZ marking leads 2809 extending to the storage transfer switch U2820, for a purpose more fully explained hereinafter; more particularly, the wipers 2522 and 2523 respectively engage the second contacts in the associated contact banks respectively terminating the W and Y conductors in the group of WXYZ marking leads 2809 corresponding in code to the digit 2, as previously explained. Also when the second numerical switch E2520 is thus operated the wiper 2524 thereof engages the second contact in the associated contact bank terminating the second marking conductor in the marking cable 2385, for a purpose more fully explained hereinafter.

The application of ground potential to the conductor C1281 at the beginning of the fifth digit 2 completes a circuit, including the wiper 2295 of the finder F2290, the contacts 2284, C2217, the contacts 2215 and 2743, for energizing the left-hand winding of the sequence relay R2740. When thus energized the sequence relay R2740 operates partially, thereby to complete, at the contacts 2741, an obvious path, including the grounded hold conductor C2772, for short-circuiting the right-hand winding thereof. At the conclusion of the fifth digit 2, ground potential is removed from the conductor C1281 as previously noted, thereby to interrupt the previously traced original circuit for energizing the left-hand winding of the sequence relay R2740; whereupon an obvious circuit, including the contacts 2741 and the grounded hold conductor C2772, is completed for energizing in series the right-hand and left-hand windings of the sequence relay R2740. When thus energized the sequence relay R2740 operates fully, thereby to interrupt, at the contacts 2743, a further point in the previously traced circuit for energizing the left-hand winding thereof; and to prepare, at the contacts 2742, a circuit traced hereinafter for energizing the left-hand winding of the sequence relay R2750. Also, the sequence relay R2740 interrupts, at the contacts 2746, a further point in the previously traced circuit for energizing the magnet EM2525, thereby positively to prevent further operation of the second numerical switch E2520 at this time. Further, the sequence relay R2740 prepares, at the contacts 2745, a circuit traced hereinafter for energizing the magnet FM2605 of the third numerical switch F2600; and prepares, at the contacts 2744, an alternative circuit traced hereinafter for energizing the winding of the digit spacer relay R1920.

In the primary register 1200, the dial relay R1260 operates to apply ground potential to the conductor C12181 at the beginning of the sixth digit 3 and then to remove the application of ground potential from the conductor C1281 shortly following the conclusion of the sixth digit 3; while the line relay R1450 operates to transmit the impulses of the sixth digit 3 over the impulse conductor C1395. When the impulses of the sixth digit 3 are transmitted over the impulse conductor C1395 a circuit, including the wiper 2297 of the finder F2290, the contacts 2286, C2171, the contacts 2745 and 2756 and C2631, is completed for energizing the magnet FM2605; whereby the latter magnet operates and restores three times in order to drive the wipers noted of the third numerical switch F2600 in the counterclockwise direction into engagement with the third contacts in the associated contact banks. When the third numerical switch F2600 is thus operated the wipers 2602 and 2603 thereof set up the code 3 in the group of WXYZ marking leads 2810 extending to the storage transfer switch U2820, for a purpose more fully explained hereinafter; more particularly, the wipers 2602 and 2603 respectively engage the third contacts in the associated contact banks respectively terminating the W and Z conductors in the group of WXYZ marking leads 2810 corresponding in code to the digit 3, as previously explained. Also, when the third numerical switch F2600 is thus operated the wiper 2604 thereof engages the third contact in the associated contact bank terminating the third marking conductor in the marking cable 2385, for a purpose more fully explained hereinafter.

The application of ground potential to the conductor C1281 at the beginning of the sixth digit 3 completes a circuit, including the wiper 2295 of the finder F2290, the contacts 2284, C2217, the contacts 2215, 2742 and 2753, for energizing the left-hand winding of the sequence relay R2750. When thus energized the sequence relay R2750 operates partially, thereby to complete, at the contacts 2751, an obvious path, including the grounded hold conductor C2772, for short-circuiting the right-hand winding thereof. At the conclusion of the sixth digit 3, ground potential is removed from the conductor C1281 as previously noted, thereby to interrupt the previously traced original circuit for energizing the left-hand winding of the sequence relay R2750; whereupon an obvious circuit, including the contacts 2751 and the grounded hold conductor C2772, is completed for energizing in series the right-hand and left-hand windings of the sequence relay R2750. When thus energized the sequence relay R2750 operates fully, thereby to interrupt, at the contacts 2753, a further point in the previously traced circuit for energizing the left-hand winding thereof, and to prepare, at the contacts 2752, a circuit traced hereinafter for energizing the left-hand winding of the sequence relay R2760. Also, the sequence relay R2750 interrupts, at the contacts 2756, a further point in the previously traced circuit for energizing the magnet FM2605, thereby positively to prevent further operation of the third numerical switch F2600 at this time. Further, the sequence relay R2750 prepares, at the contacts 2755, a circuit traced hereinafter for energizing the magnet GM2615 of the fourth numerical switch G2610; and prepares, at the contacts 2754, an alternative circuit traced hereinafter for energizing the winding of the digit spacer relay R1920.

In the primary register 1200, the dial relay R1260 operates to apply ground potential to the conductor C1281 at the beginning of the seventh digit 4, and then to remove the application of ground potential from the conductor C1281 shortly following the conclusion of the seventh digit 4; while the line relay R1450 operates to transmit the impulses of the seventh digit 4 over the impulse conductor C1395. When the impulses of the seventh digit 4 are transmitted over the impulse conductor C1395 a circuit, including the wiper 2297 of the finder F2290, the contacts 2286, C2171, the contacts 2745, 2755 and 2764 and C2632, is completed for energizing the magnet GM2615; whereby the latter magnet operates and restores four times in order to drive the wipers noted of the fourth numerical switch G2610 in the counterclockwise direction into engagement with the fourth contacts in the associated contact banks. When the fourth numerical switch G2610 is thus operated the wipers 2612 and 2613 thereof set up the code 4 in the group of WXYZ marking leads 2811 extending to the storage transfer switch U2820, for a purpose more fully explained hereinafter; more particularly, the wipers 2612 and 2613 respectively engage the fourth contacts in the associated contact banks respectively terminating the X and Y conductors in the group of WXYZ marking leads 2811 corresponding in code to the digit 4, as previously explained. Also, when the fourth numerical switch G2610 is thus operated the wiper 2614 thereof engages the fourth contact in the associated contact bank terminating the fourth marking conductor in the marking cable 2385, for a purpose more fully explained hereinafter.

The application of ground potential to the conductor C1281 at the beginning of the seventh digit 4 completes a circuit, including the wiper 2295 of the finder F2290, the contacts 2284, C2217, the contacts 2215, 2742, 2752 and 2762, for energizing the left-hand winding of the sequence relay R2760. When thus energized the sequence relay R2760 operates partially, thereby to complete, at the contacts 2761, an obvious path, including the grounded hold conductor C2772, for short-circuiting the right-hand winding thereof. At the conclusion of the seventh digit 4, ground potential is removed from the conductor C1281, as previously noted, thereby to interrupt the previously traced original circuit for energizing the left-hand winding of the sequence relay R2760; whereupon an obvious circuit, including the contacts 2761 and the grounded hold conductor C2772, is completed for energizing in series the right-hand and left-hand windings of the sequence relay R2760. When thus energized the sequence relay R2760 operates fully, thereby to interrupt, at the contacts 2762, a further point in the previously traced circuit for energizing the left-hand winding thereof. Also, the sequence relay R2760 interrupts, at the contacts 2764, a further point in the previously traced circuit for energizing the magnet GM2615, thereby positively to prevent further operation of the fourth numerical switch G2610 at this time; and prepares, at the contacts 2763, an alternative circuit traced hereinafter for energizing the winding of the digit spacer relay R1920.

At this time the primary register 1200 has operated to transmit the first four digits registered therein and to repeat the next three digits received from the calling private subscriber substation TP over the finder F2290 to the register translator 1700; and the seven digits mentioned have been registered in the register translator 1700, all in the manner previously described. The register translator 1700 then operates to translate the first three registered digits, constituting the code portion of the called directory number; to transmit the translated digits; to transmit the last four registered digits, constituting the numerical portion of the called directory number; and to transmit certain code information, constituting certain items of information which may be recorded, back over the primary register 1200 to the primary selector 600, in a manner more fully explained hereinafter. The primary selector 600 operates in response to the first translated digit transmitted thereto; first to select the group of outgoing trunks extending to exchange 1 zone 84 and then to select an idle outgoing trunk in the group mentioned, such, for example, as the outgoing trunk 506, all in the manner previously explained. The remainder of the translated digits, the last four of the registered digits, as well as the code information, is transmitted over the trunk 506. At this point it is noted that a special charge may be made for the present call from exchange 4 zone 84 to exchange 1 zone 84; in which case the outgoing trunk 506 will include a toll ticket repeater of the character of the toll ticket repeater 452 or 800, wherein the code information will be utilized in order to cause a toll ticket to be prepared, in a manner more fully explained hereinafter. On the other hand, no special charge may be made for the present call from exchange 4 zone 84 to exchange 1 zone 84; in which case the outgoing trunk 506 will include an ordinary repeater of the character of the ordinary repeater 451, wherein the code information will not be utilized and no toll ticket will be prepared. The various digits transmitted over the outgoing trunk 506 effects operation of the automatic switching apparatus in exchange 1 zone 84, whereby a connection is completed between the calling private subscribed substation TP in exchange 4 zone 84 and the called subscriber substation in exchange 1 zone 84.

The release of this established connection is under the control of the subscriber at the calling private subscriber substation TP in exchange 4 zone 84 and is effected when this subscriber replaces the receiver of the telephone instrument upon its associated switchhook. The detailed operation of the apparatus incident to the release of this established connection is described more fully hereinafter.

In view of the foregoing explanation of the mode of operation of the primary register 1200, it will be understood that, in order to extend a call from any calling subscriber substation in exchange 4 zone 84 to any called subscriber substation in exchanges 1, 2, 3, 9 and 10 zone 84 (exchanges 2, 3, 9 and 10 not shown), it is necessary to translate the first three digits and to utilize a register translator in setting up the connection; on the other hand, in order to extend a call from any calling subscriber substation in exchange 4 zone 84 to any called subscriber substation in exchanges 5, 6, 7 and 8 zone 84 (exchange 8 not shown), it is not necessary to translate the first three digits to utilize a register translator in setting up the connection, as the connection may be set up directly under the control of the calling device at the calling subscriber substation.

Also, at this point, it is noted that the operation of the primary register 1200, to set up a call from exchange 4 zone 84 to exchanges 5, 6, 7 and 8 zone 84, is substantially identical to that previously described in connection with the setting up of a local call in exchange 4 zone 84; in no case will toll tickets be prepared for calls extended from exchange 4 zone 84 to exchanges 5, 6, 7 or 8 zone 84.

In view of the foregoing explanation of the mode of operation of the primary selector 600, the primary register 1200 and the register translator 1700, to extend a call which requires translation, from the calling ordinary private subscriber substation TP to another exchange in zone 84, it will be understood that this apparatus is operative, in a substantially identical manner, to extend a call, which requires translation, from any calling one of the party subscriber substations TS1, TS2, TS3 and TS4 to another exchange in zone 84. Also, the primary selector 441, the primary register 1200 and the register translator 1700 are operative, in a substantially identical manner, to extend a call, which requires translation, from the calling extended service private subscriber substation TX to another exchange in zone 84. However, the primary selector 441, the primary register 1200 and the register translator 1700 are operative to effect the interception of a call at the interceptor operator position 114—117 which is initiated at the denied toll service private subscriber substation TD and which requires translation, in a manner more fully explained hereinafter.

Finally, the primary selector 600, the primary register 1200 and the register translator 1700 are operative in a manner substantially identical to that explained in conjunction with local calls to extend a call, which requires no translation, from the calling ordinary private subscriber substation TP or from any calling one of the party subscriber substations TS1, TS2, TS3 and TS4 in exchange 4 zone 84 to another exchange in zone 84; while the primary selector 441, the primary register 1200 and the register translator 1700 are operative in a manner substantially identical to that explained in conjunction with local calls to extend a call, which requires no translation, from the calling extended service private subscriber substation TX or from the denied toll service private subscriber substation TD in exchange 4 zone 84 to another exchange in zone 84.

*Toll calls from exchange 4 zone 84 to exchange 9 zone 27*

Assuming that the call extending from the calling private subscriber substation TP to the primary selector 600 and the primary register 1200 is to be extended to a called subscriber substation in exchange 9 zone 27, the subscriber at the calling private subscriber substation TP proceeds to dial the directory number of the called subscriber substation. The directory number of the called subscriber substation comprises a code portion, including the digits 279, identifying the called zone and exchange, and a numerical portion, including four digits, such, for example, as the digits 1234, identifying the line terminal of the subscriber line extending to the called subscriber substation.

Accordingly the subscriber at the calling private subscriber substation TP proceeds to dial the first digit 2 thereby to cause the digit mentioned to be registered in the first code switch A1500 in the primary register 1200 and to cause the wiper set of the switch mechanism 700 in the primary selector 600 to be operated to its second vertical level in the manner previously described. In the primary register 1200 shortly following the conclusion of the first digit 2, the dial relay R1260 restores in order to effect the restoration of the dial slave relay R1310, whereupon the dial slave relay R1310 completes at the contacts 1311 a circuit substantially identical to that previously traced for effecting the operation of the translate relay R1270.

The subscriber at the calling private subscriber substation TP then dials the second digit 7, thereby to cause the digit mentioned to be registered in the second code switch B1510 in the primary register 1200. Shortly following the conclusion of the second digit 7, the dial relay R1260 restores in order to effect the restoration of the dial slave relay R1310, whereupon the wipers noted of the sequence switch S1630 are driven into engagement with the second contacts in the associated contact banks. At this time operation of the register translator allotter 1600 is initiated, whereby an idle register translator such, for example, as the register translator 1700, is connected to the primary register 1200 in the manner previously explained.

The subscriber at the calling private subscriber substation TP then successively dials the third digit 9, the fourth digit 1, the fifth digit 2, the sixth digit 3 and the seventh digit 4; whereby the third digit 9 and the fourth digit 1 are registered in the primary register 1200, the fifth digit 2, the sixth digit 3 and the seventh digit 4 being repeated directly from the primary register 1200 to the register translator 1700, in the manner previously explained. Also the primary register 1200 transmits the complements of the first digit 2, the second digit 7, the third digit 9 and the fourth digit 1 registered therein to the register translator 1700, in the manner previously explained. The seven digits transmitted and repeated to the register translator 1700 are registered therein, in the manner previously explained. More particularly, at this time, in the register translator 1700, the first digit 2, the second digit 7, the third digit 9, the fourth digit 1, the fifth digit 2, the sixth digit 3 and the seventh digit 4 are respectively effectively registered in the first code switch A2400, the second code switch B2410, the third code switch C2500, the first numerical switch D2510, the second numerical switch E2520, the third numerical switch F2600 and the fourth numerical switch G2610. Also, in the register translator 1700, the wiper 2332 of the wiper set of the composite code switch P2330 is selected, corresponding to the first digit 2 registered in the first code switch A2400; and the wiper set of the composite code switch P2330 occupies its fourth vertical position and its second rotary position respectively corresponding to the second digit 7 registered in the second code switch B2410 and to the third digit 9 registered in the third code switch C2500, as previously explained.

Considering now the operation of the register translator 1700 in greater detail, it is again pointed out that the previously traced circuit for energizing the upper and lower windings of the switch pulse relay R1830 is completed in response to operation of the sequence relay R2720 at the conclusion of the registration of the third digit 9 in the third code switch C2500; whereupon the switch pulse relay R1830 operates intermittently, in the manner previously explained. Also, at this time, ground potential is applied by way of the wiper 2405 of the first code switch A2400 and the engaged ninth contact in the associated contact bank to the corresponding wiper 2332 of the wiper set in the composite code switch P2330; while the wiper 2332 mentioned engages the 4 up 2 in contact in the associated contact bank, which contact (second contact in the fourth level) is connected to a predetermined contact in the contact bank associated with the wiper 2318 of the wiper set in the rate and route switch R2310 by way of the jumper 2351. More specifically, for purpose of illustration, the 4 up 2 in contact in the contact bank associated with the wiper 2332 of the wiper set in the composite code switch P2330 is connected to the 5 up 6 in contact in the contact bank associated with the wiper 2318 of the wiper set in the rate and route switch R2310. The 5 up 6 in contact in the contact bank associated with the wiper 2318 corresponds to a routing for the present call via exchange 6 zone 45 and exchange 1 zone 27 to exchange 9 zone 27, which route comprises five routing digits. The particular five routing digits required are designated in conformity with the trunking plan utilized which is assumed to be via the route specified above. More specifically, the routing digits required in order to route the call via the route specified comprise the five digits 32279. Hence, the first, second and third digits 2, 7 and 9 dialed at the calling private subscriber substation TP must be translated into the two digits 3 and 2 to be transmitted and also must be transmitted as registered following the digits 3 and 2 in order to produce the series of five digits 32279, which routing digits correspond to the route specified in conformity with the established trunking plan.

Accordingly the rate and route switch R2310 is operated to its fifth vertical position and sixth rotary position in order to cause the wipers noted of the wiper set thereof to seize the respective 5 up 6 in contacts in the associated contact banks. In order to accomplish this end, the contacts in each level of the contact bank associated with the wiper 2318 of the wiper set of the rate and route switch R2310 are connected by way of individual resistors, each having a high resistance, to the numerically corresponding control contact in the vertical control contact bank associated with the vertical control wiper 2319. For example, each contact in the first level of the contact bank associated with the wiper 2318 of the wiper set of the rate and route switch R2310 is connected by way of an individual resistor 2396 to the first contact in the vertical control contact bank associated with the vertical control wiper 2319.

As previously explained, when the sequence relay R2720 operates the switch pulse relay R1830 is set into operation. Each time the switch pulse relay R1830 operates and then restores at this time it completes and then interrupts, at the contacts 1831, a circuit, including the contacts 1931 and C2363, for energizing the vertical magnet RM2320; thereby to cause the latter magnet to operate and restore in order to drive the wiper set of the rate and route switch R2310 one step in the vertical direction away from its normal vertical position, whereupon the set of switch springs RS2324 is actuated for a purpose more fully explained hereinafter. The wiper set of the rate and route switch R2310 is driven step by step in the vertical direction and, when the vertical control wiper 2319 engages the fifth contact in the associated vertical control contact bank, resistance ground potential is applied thereto by way of the previously traced path, including the jumper 2351, from the grounded wiper 2405 of the first code switch A2400. This application of ground potential to the vertical control wiper 2319 completes a circuit for energizing the upper winding of the transfer relay R1930 in series with the vertical magnet RM2320; this circuit extending from the grounded vertical control wiper 2319 by way of C2374, the upper winding of R1930, C2363 and the vertical magnet RM2320 to battery. At this point it is noted that the above-traced circuit for energizing the upper winding of the transfer relay R1930 is completed when the switch pulse relay R1830 restores following the fifth impulse, as ground potential is applied by way of the contacts 1831 and 1931 to the terminal of the upper winding of the transfer relay R1930 prior to the restoration of the switch pulse relay R1830.

When thus energized the transfer relay R1930 operates to interrupt, at the contacts 1931, a further point in the previously traced original circuit for energizing the vertical magnet RM2320 of the rate and route switch R2310; and to prepare, at the contacts 1933, a circuit traced hereinafter for energizing the rotary magnet RM2321 of the rate and route switch R2310. Also the transfer relay R1930 completes, at the contacts 1934, a holding circuit, including C2361 and the contacts 2325 of the set of switch springs RS2324, for energizing the lower winding thereof. Each time the switch pulse relay R1830 operates and then restores, at this time, it completes and then interrupts, at the contacts 1831, the previously mentioned circuit, including the contacts 1933 and C2362, for energizing the rotary magnet RM2321; thereby to cause the latter magnet to operate and restore in order to drive the wiper set of the rate and route switch R2310 one step in the rotary direction away from its normal rotary position.

The wiper set of the rate and route switch R2310 is driven step by step in the rotary direction until the wiper 2318 thereof engages the sixth contact in the adjacent fifth level in the associated contact bank, whereupon direct ground potential is applied thereto by way of the jumper 2351 from the grounded wiper 2405 of the first code switch A2400. This application of ground potential to the wiper 2318 of the wiper set of the rate and route switch R2310 completes a circuit for energizing the upper winding of the stop relay R1940 in series with the rotary magnet RM2321; this circuit extending from the grounded wiper 2318 by way of C2373; the contacts 1941, the upper winding of R1940, C2362 and the rotary magnet RM2321 to battery. It is noted that the above-traced circuit for energizing the upper winding of the stop relay R1940 is completed when the switch pulse relay R1830 restores following the sixth impulse as ground potential is applied by way of the contacts 1831 and 1933 to the terminal of the upper winding of the stop relay R1940 prior to the restoration of the switch pulse relay R1830. Further it is noted that the stop relay R1940 is of the marginal type and will operate only when direct ground potential is encountered by the wiper 2318 of the wiper set of the rate and route switch R2310. When thus energized the stop relay R1940 operates to complete, at the contacts 1942, an obvious holding circuit, including the grounded conductor C2361, for energizing the lower winding thereof; and to interrupt, at the contacts 1941, the previously traced original circuit for energizing the upper winding thereof in series with the rotary magnet RM2321 of the rate and route switch R2310.

Also, upon operating, the stop relay R1940 completes, at the contacts 1943, an obvious circuit, including the resistor 1835′, for energizing the winding of the switch cutoff relay R1820, thereby to cause the latter relay to operate. Upon operating, the switch cutoff relay R1820 interrupts, at the contacts 1822, the previously traced circuit for energizing the upper winding of the switch pulse relay R1830; thereby to arrest further operation of the latter relay in order positively to arrest further operation of the wiper set of the rate and route switch R2310 in the rotary direction at this time. Also the switch cutoff relay R1820 completes, at the contacts 1821, an obvious circuit for energizing the winding of the digit pulse start relay R1710, thereby to cause the latter relay to operate. Upon operating, the digit pulse start relay R1710 interrupts, at the contacts 1713, the previously traced circuit for energizing the lower winding of the special service relay R2040 in the register translator 1700 in series with the upper winding of the transfer relay R750 in the primary selector 600; thereby to cause the transfer relay R750 to restore, the special service relay R2040 occupying its restored position at this time, as previously noted. Also the digit pulse start relay R1710 prepares, at the contacts 1714, a point in a circuit traced hereinafter for energizing the upper winding of the detector cutout relay R1950; which circuit is not completed in the present example, as more fully explained hereinafter. Further the digit pulse start relay R1710 completes, at the contacts 1715, an obvious circuit, including the contacts 1842, for energizing the upper winding of the digit pulse relay R1840 and an obvious multiple path for discharging the condenser 1844 through the lower winding of the digit pulse relay R1840, whereupon the latter relay operates. Upon operating, the digit pulse relay R1840 interrupts, at the contacts 1842, the previously traced circuit for energizing the upper winding thereof and the previously traced multiple path for short-circuiting the condenser 1844 through the lower winding thereof; whereupon the condenser 1844 is charged through the upper and lower windings in series of the digit pulse relay R1840 in order to cause the latter relay to restore shortly thereafter. Hence, the digit pulse relay R1840 operates and restores intermittently at a predetermined rate, depending upon the characteristic of the associated condenser 1844.

Further the digit pulse start relay R1710 completes, at the contacts 1716, a path, including C1777 and the wiper 2304 of the digit sequence switch T2300 and the engaged home contact in the associated contact bank, for applying ground potential to the wiper 2311 of the wiper set of the rate and route switch R2310, for a purpose more fully explained hereinafter. Further the digit pulse start relay R1710 prepares, at the contacts 1717, a circuit traced hereinafter for energizing the winding of the digit spacer relay R1920; and completes, at the contacts 1718, an alternative circuit for energizing the winding of the line relay R730 in the primary selector 600, thereby to cause the latter relay to reoperate in order to effect reoperation of the hold relay R740, in the manner previously explained. The above-mentioned circuit for energizing the winding of the line relay R730 in the primary selector 600 extends from ground, at the contacts 1718 and the conductor C2236, by way of two multiple branches to the conductor C2235; and therefrom by way of the contacts 2287, the wiper 2298 of the finder F2290, C1283, the contacts 1272, C642, the wiper 612 of the finder F610, the contacts 623 and 773 and the upper winding of R730 to battery. In the above traced circuit, one of the multiple branches between the conductors C2236 and C2235 includes the contacts 1843 and 2025; while the other multiple branch between the conductors C2236 and C2235 includes the wiper 2833 of the sender switch S2830 and the engaged home contact in the associated contact bank. Further the digit pulse start relay R1710 prepares, at the contacts 1719, a circuit traced hereinafter for energizing the winding of the detector start relay R1760.

Considering now the jumper arrangement among the contacts in the contact banks in the rate and route switch R2310, it is noted that the respective 5 up 6 in contacts in the contact banks associated with the wipers 2312 and 2313 of the wiper set are respectively connected by way of the jumper 2353 to the third and second marking conductors in the marking cable 2385; the 5 up 6 in contact in the contact bank associated with the wiper 2311 of the wiper set is connected to the conductor C2386, thereby to prepare a circuit traced hereinafter for energizing the winding of the code send relay R1730; while the 5 up 6 in contacts in the contact banks associated with the wipers 2314 and 2315 are connected by way of the jumper 2354 to the control conductor C2382, for a purpose more fully explained hereinafter.

The operations of the rate and route switch R2310 described above, in response to the operation of the composite code switch P2330, take place in an extremely short interval of time at the conclusion of the third digit 9; and in the meanwhile the subscriber at the calling private subscriber substation TP continues to dial the fourth digit 1, the fifth digit 2, the sixth digit 3 and the seventh digit 4 in order to cause the digits mentioned to be registered in the register translator 1700, in the manner previously explained.

Continuing now with the operation of the register translator 1700, the operation of the digit pulse start relay R1710 to apply ground potential by way of the previously traced path to the wiper 2311 of the wiper set of the rate and route switch R2310 is effective to complete the previously mentioned circuit for energizing the winding of the code send relay R1730; the 5 up 6 in contact in the contact bank engaged by the grounded wiper 2311 of the wiper set terminating the conductor C2386 included in the previously mentioned circuit for energizing the winding of the code send relay R1730 as previously noted. When thus energized the code send relay R1730 operates to complete, at the contacts 1732, an obvious holding circuit, including the contacts 1719, for energizing the winding thereof; and to complete, at the contacts 1731, a circuit for energizing the magnet TM2305 of the digit sequence switch T2300. The last-mentioned circuit extends from the grounded wiper 2303 of the digit sequence switch T2300 and the engaged home contact in the associated contact bank by way of C1776, the contacts 1731, the control conductor C2382, the contacts 2306 and the magnet TM2305 to battery. When thus energized the magnet TM2305 operates, thereby to condition the wipers noted of the digit sequence switch T2300 to be driven one step in the counterclockwise direction and to interrupt, at the contacts 2306, the previously traced circuit for energizing the magnet TM2305; whereupon the latter magnet then restores in order to drive the wipers noted of the digit sequence switch T2300 one step in the counterclockwise direction away from their home positions. When the wiper 2303 of the digit sequence switch T2300 disengages the home contact in the associated contact bank the above-traced circuit for energizing the magnet TM2305 of the digit sequence switch T2300 is interrupted at this time. Further the code send relay R1730 interrupts, at the contacts 1733, 1734 and 1735, obvious connections between the control conductor C2382 and the respective conductors C1780, C1781 and C1782 extending to the contact bank associated with the wiper 2303 of the digit sequence switch T2300, for a purpose more fully explained hereinafter.

When the wiper 2302 of the digit sequence switch T2300 engages the first contact in the associated contact bank the previously mentioned circuit for energizing the winding of the digit spacer relay R1920 is completed; this circuit extending from ground by way of the contacts 1717, C2369, the wiper 2302 of the digit sequence switch T2300 and the engaged first contact in the associated contact bank, C1778, the contacts 1914 and 2213, the winding of R1920 and the resistor 1924 to battery. At this point it is noted that the above-traced circuit for energizing the winding of the digit spacer relay R1920 must be initially completed when the digit pulse relay R1840 occupies its restored position in view of the fact that a path is completed for short-circuiting the winding of the digit spacer relay R1920 prior to the operation thereof and while the digit pulse relay R1840 occupies its operated position. The path mentioned extends, when completed, from one terminal of the winding of R1920 by way of the contacts 1841 and 1922 to the other terminal of the winding of R1920.

When thus energized the digit spacer relay R1920 operates to interrupt, at the contacts 1922, a point in the previously traced path for short-circuiting the winding thereof; and to complete, at the contacts 1921, a circuit, including the contacts 1911 and C2364, for energizing the magnet TM2305, thereby to cause the latter magnet to operate and condition the wipers noted of the digit sequence switch T2300 to be driven an additional step in the counterclockwise direction. Also the digit spacer relay R1920 prepares, at the contacts 1923, a point in a circuit for energizing the magnet SM2835 of the sender switch S2830; the circuit mentioned being completed at the contacts 1841 upon the next operation of the digit pulse relay R1840. The circuit for energizing the magnet SM2835 of the sender switch S2830 extends, when completed, from ground by way of the contacts 1717, C2369, the wiper 2302 of the digit sequence switch T2300 and the engaged first contact in the associated contact bank, C1778, the contacts 1914, 2213, 1841 and 1923, C2535 and the magnet SM2835 to battery. When thus energized the magnet SM2835 operates, thereby to condition the wipers noted of the sender switch S2830 to be driven one step in the counterclockwise direction. When the digit pulse relay R1840 next restores it interrupts, at the contacts 1841, the above-traced circuit for energizing the magnet SM2835, thereby to cause the latter magnet to restore and drive the wipers noted of the sender switch S2830 one step in the counterclockwise direction. Thus the digit pulse relay R1840 causes the wipers noted of the sender switch S2830 to be driven step by step in the counterclockwise direction.

Also, upon operating, the digit pulse relay R1840 interrupts, at the contacts 1843, the first branch in the previously traced circuit for energizing the winding of the line relay R730 in the primary selector 600; however, the circuit for energizing the winding of the line relay R730 is not interrupted at this time due to the completed second branch therein, including the wiper 2833 of the sender switch S2830 and the engaged home contact in the associated contact bank. Hence, when the wiper 2833 of the sender switch S2830 is driven two steps in the counterclockwise direction it disengages the first contact in the associated contact bank thereby to interrupt the second branch in the previously traced circuit for energizing the winding of the line relay R730 in the primary selector 600. Accordingly, after the wipers noted of the sender switch S2830 engage the second contacts in the associated contact banks, further operation of the digit pulse relay R1840 is effective intermittently to interrupt, at the contacts 1843, the first branch in the previously traced circuit for energizing the winding of the line relay R730 in the primary selector 600, whereby the line relay R730 follows subsequent impulsing of the digit pulse relay R1840. More particularly, the line relay R730 in the primary selector 600 operates intermittently in order to cause the wiper set of the switch mechanism 700 to be driven step by step in the vertical direction, in the manner previously explained.

The operation of the digit pulse relay R1840 described above continues until the wiper 2834 of the sender switch S2830 engages a marked contact in the associated contact bank; the fifth contact in the contact bank associated with the wiper 2834 being marked in the present instance as this contact terminates the third marking conductor in the marking cable 2385, whereby a circuit is completed for energizing the winding of the digit stop relay R1910. This circuit extends from ground by way of the contacts 1716, C1777, the wiper 2304 of the digit sequence switch T2300 and the engaged first contact in the associated contact bank, the wiper 2312 of the wiper set in the rate and route switch R2310 and the engaged 5 up 6 in contact in the associated contact bank, the jumper 2353, the third marking conductor in the marking cable 2385, the wiper 2834 of the sender switch S2830 and the engaged fifth contact in the associated contact bank, C2233 and the winding of R1910 to battery. When thus energized the digit stop relay R1910 operates to interrupt, at the contacts 1911, the previously traced circuit for energizing the magnet TM2305; whereupon the latter magnet restores in order to drive the wipers noted of the digit sequence switch T2300 into engagement with the second contacts in the associated contact bank. Also the digit stop relay R1910 completes, at the contacts 1912, a holding circuit including C2234, the wiper 2831 of the sender switch S2830 and the engaged contact in the associated contact bank, C2369 and the contacts 1717, for energizing the winding thereof. Further the digit stop relay R1910 completes, at the contacts 1913, an obvious path in multiple to the contacts 1843 controlled by the digit pulse relay R1804 and, consequently, a holding circuit substantially identical to that previously traced for energizing the winding of the line relay R730 in the primary selector 600. Hence, further operation of the line relay R730 in the primary selector 600 is arrested at this time, thereby positively to arrest further movement of the wiper set of the switch mechanism 700 in the vertical direction; whereupon the wiper set of the switch mechanism 700 is arrested in the third vertical position corresponding to the first routing digit 3. Also the digit stop relay R1910 interrupts, at the contacts 1914, the previously traced circuit for energizing the winding of the digit spacer relay R1920, thereby to cause the latter relay to restore. Upon restoring, the digit spacer relay R1920 completes, at the contacts 1924, an alternative circuit for energizing the magnet SM2835 of the sender switch S2830; this circuit extending from ground by way of the fuse alarm 2840, the wiper 2832 of the sender switch S2830 and the engaged contact in the associated contact bank, C2532, the contacts 1924, C2537, the contacts 2836 and the magnet SM2835 to battery. Accordingly the magnet SM2835 operates intermittently at this time in order to drive the wipers noted of the sender switch S2830 step by step in the counterclockwise direction until the wiper 2832 thereof disengages the twelfth contact and engages the thirteenth contact in the associated contact bank; thereby to interrupt, at the twelfth contact mentioned, the previously traced circuit for energizing the magnet SM2835 and to complete, at the thirteenth contact mentioned, an alternative circuit for energizing the winding of the digit spacer relay R1920. The last-mentioned circuit extends from ground by way of the fuse alarm 2840, the wiper 2832 of the sender switch S2830 and the engaged thirteenth contact in the associated contact bank, C2533, the contacts 1917, the winding of R1920 and the resistor 1924 to battery.

When thus energized the digit spacer relay R1920 operates, thereby to recomplete, at the contacts 1923, an alternative circuit for energizing the magnet SM2835 of the sender switch S2830. The last-mentioned circuit extends from ground by way of the fuse alarm 2840, the wiper 2832 of the sender switch S2830 and the engaged thirteenth contact in the associated contact bank, C2533, the contacts 1917, the contacts 1841, assuming that the digit pulse relay R1840 is operated at this time. the contacts 1923, C2535 and the magnet SM2835 to battery. When the magnet SM2835 is energized it operates, thereby to condition the wipers noted of the sender switch S2830 to be driven an additional step in the counterclockwise direction, as previously noted. Accordingly, at this time, the digit pulse relay R1840 completes intermittently, at the contacts 1841, the above-traced circuit for energizing the magnet SM2835, thereby to cause the magnet mentioned to operate intermittently; whereupon the wipers noted of the sender switch S2830 are driven additional steps in the counterclockwise direction until the wiper 1832 thereof disengages the seventeenth contact in the associated contact bank and engages the eighteenth contact therein, thereby to interrupt, at the seventeenth contact mentioned, the circuit for energizing the winding of the digit spacer relay R1920 and the previously traced circuit for intermittently energizing the magnet SM2835. The digit spacer relay R1920 then restores, thereby to recomplete, at the contacts 1924, the previously traced circuit, including the contacts 2836. for energizing the magnet SM2835, thereby to cause the latter magnet again to be energized intermittently; whereupon the wipers noted of the sender switch S2830 are driven step by step in the counterclockwise direction until the wiper 2832 thereof disengages the twenty-fourth contact in the associated contact bank and reengages the home contact therein, thereby to interrupt the above-traced circuit for energizing the magnet SM2835.

Further, upon operating, the digit stop relay R1910 completes, at the contacts 1915, an obvious circuit, including the contacts 1719, for energizing the winding of the special service cutoff relay R1810, thereby to cause the latter relay to operate. Upon operating, the special service cutoff relay R1810 completes, at the contacts 1813, an obvious holding circuit, including the contacts 1719, for energizing the winding thereof; and interrupts, at the contacts 1811, a further point in the previously traced circuit for energizing the lower winding of the special service relay R2040 in the register translator 1700 in series with the upper winding of the transfer relay R750 in the primary selector 600.

When the wipers noted of the sender switch S2830 are thus returned to their home positions the wiper 2831 thereof disengages the twenty-fourth contact in the associated contact bank; thereby to interrupt the previously traced holding circuit for energizing the winding of the digit stop relay R1910, whereupon the latter relay restores in order to complete the cycle of operation of the sender switch S2830. It is pointed out that the wipers noted in the sender switch S2830 are first driven step by step in the counterclockwise direction away from their home positions at a relatively low speed, thereby to insure that the impulses transmitted to the winding of the line relay R730 in the primary selector 600 are at a proper impulsing rate. Upon operation of the digit stop relay R1910 the wipers noted of the sender switch S2830 are driven at a relatively high speed into engagement with the thirteenth contacts in the associated contact banks; and thereafter the wipers noted of the sender switch S2830 are driven at a relatively low speed until they engage the eighteenth contacts in the associated contact banks, thereby to insure a proper time interval or space between successive digits transmitted to the primary selector 600. Finally the wipers noted of the sender switch S2830 are driven at a relatively high speed after they engage the eighteenth contacts in the associated contact banks back into their home positions.

Accordingly, at this time the first routing digit 3 registered in the rate and route switch R2310 has been transmitted by the sender switch S2830 to the primary selector 600; the wipers noted of the sender switch S2830 have been returned to their home positions in readiness to transmit the second routing digit 2; and the wipers noted of the digit sequence switch T2300 engage the second contacts in the associated contact banks, thereby to render the control of the sender switch S2830 in accordance with the second routing digit 2 registered in the rate and route switch R2310. Also, upon restoring, the digit stop relay R1910 recompletes, at the contacts 1914, the previously traced circuit for energizing the winding of the digit spacer relay R1920, thereby to cause the latter relay to reoperate; whereupon the second routing digit 2 registered in the rate and route switch R2310 is transmitted by the sender switch S2830, in the manner explained above.

Also, upon restoring, the digit stop relay R1910 interrupts, at the contacts 1913, the previously mentioned path between the conductors C2236 and C2235 shunting the contacts 1834 of the digit pulse relay R1840; and interrupts, at the contacts 1915, the previously traced original circuit for operating the special service cutout relay R1810. Further the digit stop relay R1910 completes, at the contacts 1916, a circuit, including the contacts 1719, 1953 and 1812, for energizing the winding of the detector start relay R1760. When thus energized the detector start relay R1760 operates to complete, at the contacts 1766, an obvious holding circuit, including the contacts 1719, for energizing the winding thereof.

In view of the foregoing explanation of the cycle of operation of the sender switch S2830 to transmit the first routing digit 3 to the primary selector 600, it will be readily understood that the second routing digit 2, the third routing digit 2, the fourth routing digit 7 and the fifth routing digit 9 will be sequentially transmitted to the primary selector 600, in an identical manner; the second routing digit 2 being registered in the contact bank associated with the wiper 2313 of the wiper set of the rate and route switch R2310; the third routing digit 2, the fourth routing digit 7 and the fifth routing digit 9 being respectively registered in the first code switch A2400, the second code switch B2410 and the third code switch C2500, as previously explained.

At this point it is noted that the rate and route switch R2310 is adapted to register as many as four routing digits; the actual number of routing digits required for a given call being determined by the trunking plan of the system. In the present example, two routing digits registered in the rate and route switch R2310 are required in conjunction with the three routing digits registered in the first code switch A2400, the second code switch B2410 and the third code switch C2500. In the event all four routing digits adapted to be registered in the rate and route switch R2310 are not utilized, the present example, the contacts in the associated contact banks engaged by corresponding ones of the wipers 2312 to 2315, inclusive, of the wiper set are connected by the jumper 2354 to the control conductor C2382. Accordingly, in the present example, the 5 up 6 in contacts in the contact banks respectively associated with the wipers 2314 and 2315 of the wiper set of the rate and route switch R2310 are connected by way of the jumper 2354 to the control conductor C2382. Hence, at the conclusion of the second routing digit 2, when the wiper 2304 of the digit sequence switch T2300 engages the third contact in the associated contact bank an alternative circuit is completed for energizing the magnet TM2305; this circuit extending from ground by way of the contacts 1716, C1777, the wiper 2304 of the digit sequence switch T2300 and the engaged third contact in the associated contact bank, the wiper 2314 of the wiper set mentioned and the engaged 5 up 6 in contact in the associated contact bank, the jumper 2354, the control conductor C2382, the contacts 2306 and the magnet TM2305 to battery. When thus energized the magnet TM2305 operates, thereby to interrupt, at the contacts 2306, the above-traced alternative circuit for energizing the latter magnet. Hence, the magnet TM2305 operates and restores immediately, thereby to drive the wipers noted of the digit sequence switch T2300 an additional step in the counterclockwise direction and into engagement with the fourth contacts in the associated contact banks. The wiper 2304 of the digit sequence switch T2300 engaging the fourth contact in the associated contact bank immediately recompletes the above-traced alternative circuit for energizing the magnet TM2305 due to the connection by the jumper 2354 between the control conductor C2382 and the 5 up 6 in contact in the contact bank engaged by the wiper 2315 of the wiper set of the rate and route switch R2310. Accordingly the magnet TM2305 again operates and restores immediately, thereby to drive the wipers noted of the digit sequence switch T2300 an additional step in the counterclockwise direction and into engagement with the fifth contacts in the associated contact banks.

Upon reoperating, the digit spacer relay R1920 recycles the sender switch S2830, thereby to cause the latter switch to transmit the third routing digit 2 stored in the first code switch A2400. At this point it is noted that the circuit for energizing the winding of the digit stop relay R1910, after the third routing digit 2 stored in the first code switch A2400 has been transmitted by the sender switch S2830 to the primary selector 600, extends from ground by way of the contacts 1716, C1777, the wiper 2304 of the digit sequence switch T2300 and the engaged fifth contact in the associated contact bank, C2381, the wiper 2404 of the first code switch A2400 and the engaged ninth contact in the associated contact bank, the second marking conductor in the marking cable 2385, the wiper 2834 of the sender switch S2830 and the engaged fourth contact in the associated contact bank, C2233 and the winding of R1910 to battery.

The digit spacer relay R1920 again recycles the sender switch S2830, thereby to cause the latter switch to transmit the fourth routing digit 7 stored in the second code switch B2410. In this case, the alternative circuit for energizing the winding of the digit stop relay R1910 is substantially identical to that previously traced and includes the wiper 2304 of the digit sequence switch T2300 and the engaged sixth contact in the associated contact bank, the wiper 2414 of the second code switch B2410 and the engaged fourth contact in the associated contact bank, the seventh marking conductor in the marking cable 2385 and the wiper 2834 of the sender switch S2830 and the engaged ninth contact in the associated contact bank.

The digit spacer relay R1920 again recycles the sender switch S2830, thereby to cause the latter switch to transmit the fifth routing digit 9 stored in the third code switch C2500. In this case, the alternative circuit for energizing the winding of the digit stop relay R1910 is substantially identical to that previously traced and includes the wiper 2304 of the digit sequence switch T2300 and the engaged seventh contact in the associated contact bank, the wiper 2504 of the third code switch C2500 and the engaged second contact in the associated contact bank, the ninth marking conductor in the marking cable 2385 and the wiper 2834 of the sender switch S2830 and the engaged eleventh contact in the associated contact bank.

In the event the first numerical digit 1 has been registered in the first numerical switch D2510 at this time, the sequence relay R2730 occupies its operated position, whereupon an alternative circuit for energizing the winding of the digit spacer relay R1920 is completed; this circuit extending from ground by way of the contacts 1717, C2369, the contacts 2733, C2370, the wiper 2302 of the digit sequence switch T2300 and the engaged eighth contact in the associated contact bank, C1778, the contacts 1914 and 2213, the winding of R1920 and the resistor 1924 to battery. Upon reoperating, the digit spacer relay R1920 recycles the sender switch S2830, thereby to cause the latter switch to transmit directly the fourth digit 1 stored in the first numerical switch D2510. At this point it is noted that the circuit for energizing the winding of the digit stop relay R1910, after the fourth digit 1 stored in the first numerical switch D2510 has been transmitted by the sender switch S2830 to the primary selector 600, extends from ground by way of the contacts 1716, C1777, the wiper 2304 of the digit sequence switch T2300 and the engaged eighth contact in the associated contact bank, C2378, the wiper 2514 of the first numerical switch D2510 and the engaged tenth contact in the associated contact bank, the first marking conductor in the marking cable 2385, the wiper 2834 of the sender switch S2830 and the engaged third contact in the associated contact bank, C2233 and the winding of R1910 to battery.

In view of the above description of the operation of the sequence relay R2730 to cause reoperation of the digit spacer relay R1920 and the consequent reoperation of the sender switch S2830 to transmit the fourth digit 1 stored in the first numerical switch D2510 to the primary selector 600, it will be understood that the sequence relay R2740 is operative in a similar manner to effect reoperation of the digit spacer relay R1920 and the consequent reoperation of the sender switch S2830 to transmit the fifth digit 2 stored in the second numerical switch E2520 to the primary selector 600. In this case, the alternative circuit for energizing the winding of the digit spacer relay R1920 is substantially identical to that previously traced and includes the contacts 2744 of the sequence relay R2740, C2371, the wiper 2302 of the digit sequence switch T2300 and the engaged ninth contact in the associated contact bank; while the alternative circuit for energizing the winding of the digit stop relay R1910 is substantially identical to that previously traced and includes the wiper 2304 of the digit sequence switch T2300 and the engaged ninth contact in the associated contact bank, the wiper 2524 of the second numerical switch E2520 and the engaged second contact in the associated contact bank, the second marking conductor in the marking cable 2385 and the wiper 2834 of the sender switch S2830 and the engaged fourth contact in the associated contact bank.

Similarly, the operation of the sequence relay R2750 effects reoperation of the digit spacer relay R1920 and the consequent reoperation of the sender switch S2830 to transmit the sixth digit 3 stored in the third numerical switch F2600 to the primary selector 600. In this case the alternative circuit for energizing the winding of the digit spacer relay R1920 is substantially identical to that previously traced and includes the contacts 1717, C2369, the contacts 1721, C2771, the contacts 2754 of the sequence relay R2750, C2366 and the wiper 2302 of the digit sequence switch T2300 and the engaged tenth contact in the associated contact bank; while the alternative circuit for energizing the winding of the digit stop relay R1910 is substantially identical to that previously traced and includes the wiper 2304 of the digit sequence switch T2300 and the engaged tenth contact in the associated contact bank, the wiper 2604 of the third numerical switch F2600 and the engaged third contact in the associated contact bank, the third marking conductor in the marking cable 2385 and the wiper 2834 of the sender switch S2830 and the engaged fifth contact in the associated contact bank. At this point it is noted that the last digit send relay R1720 must operate in order to prepare, at the contacts 1721, the above-traced alternative circuit for energizing the winding of the digit spacer relay R1920 before the digit spacer relay R1920 may be reoperated to cause the sender switch S2830 to transmit the sixth digit 3 to the primary selector 600, in the manner explained above. The last digit send relay R1720 is operated under the control of the storage transfer switch U2820, in a manner more fully explained subsequently.

Finally the operation of the sequence relay R2760 effects reoperation of the digit spacer relay R1920 and the consequent reoperation of the sender switch S2830 to transmit the seventh digit 4 stored in the fourth numerical switch G2610 to the primary selector 600. In this case the alternative circuit for energizing the winding of the digit spacer relay R1920 is substantially identical to that previously traced and includes the contacts 1717, C2369, the contacts 1721, C2771, the contacts 2763 of the sequence relay R2760, C2368 and the wiper 2302 of the digit sequence switch T2300 and the engaged eleventh contact in the associated contact bank; while the alternative circuit for energizing the winding of the digit stop relay R1910 is substantially identical to that previously traced and includes the wiper 2304 of the digit sequence switch T2300 and the engaged eleventh contact in the associated contact bank. The wiper 2614 of the fourth numerical switch G2610 and the engaged fourth contact in the associated contact bank, the fourth marking conductor in the marking cable 2385 and the wiper 2834 of the sender switch S2830 and the engaged sixth contact in the associated contact bank.

Prior to considering further operation of the register translator 1700 and the operation of the primary selector 600 in response to the various digits transmitted thereto, the operation of the detector 2900 to detect the line terminal of the private subscriber line 407 and, consequently, the numerical portion of the directory number of the calling private subscriber substation TP is described below.

*Operation of the detector*

As previously explained, in conjunction with the operation of the register translator 1700, after the first routing digit 3 has been transmitted therefrom to the primary selector 600 the digit stop relay R1910 operates and subsequently restores. Upon operating, the digit stop relay R1910 effects operation of the special service cutoff relay R1810; and, upon restoring, the digit stop relay R1910 effects operation of the detector start relay R1760. Upon operating, the detector start relay R1760 completes, at the contacts 1760, an obvious path, including the contacts 2244, for applying ground potential to the start conductor C3202 extending to the detector 2900; and completes, at the contacts 1767, an obvious path, including the contacts 2242 and 2251, for applying battery potential by way of the winding of the detector test relay R2230 to the test conductor C3101 extending to the detector 2900. The application of ground potential to the start conductor C3202 completes an obvious circuit for energizing the winding of the start relay R3210 in the detector 2900, thereby to cause the latter relay to operate; while the application of battery potential to the test conductor C3101 extending to the detector 2900 marks the register translator 1700 as a calling register translator.

Upon operating, the start relay R3210 completes, at the contacts 3211, a circuit for energizing in multiple the upper and lower windings of the pulse relay R3315; this circuit extending from ground at the contacts 3252 and 3272 by way of the contacts 3352, 3211 and 3316 and the upper and lower windings of R3315 to battery. When thus energized the pulse relay R3315 operates, thereby to interrupt, at the contacts 3316, the above-traced circuit for energizing in multiple the upper and lower windings thereof; whereupon the upper and lower windings of the pulse relay R3315 are effectively short-circuited in series through the condenser 3318 in order to cause the latter relay to restore shortly thereafter. Accordingly, the pulse relay R3315 operates intermittently at a predetermined rate, depending upon the characteristic of the associated condenser 3318.

The first time the pulse relay R3315 operates and restores it completes and then interrupts, at the contacts 3317, a circuit, including the contacts 3224, FC1, FB1 and FA1, for energizing the winding of the finder relay 1F. When thus energized the finder relay 1F operates to complete, at the contacts 1F3, a holding circuit for energizing the winding thereof in series with the cycle relay FA; this circuit extending from ground by way of the contacts 3212, FB3, the winding of FA, the contacts 1F3 and the winding of 1F to battery. When this holding circuit is completed the finder relay 1F is retained in its operated position and the cycle relay FA operates. Also, upon operating, the finder relay 1F prepares, at the contacts 1F2, a point in a circuit traced hereinafter for energizing the winding of the finder relay 2F; and prepares, at the contacts 1F1, a circuit, including the contacts 3231 and the test conductor extending to the first register translator, not shown, for energizing the winding of the stop relay R3220.

Assuming that the register translator 1700 which constitutes the sixth register translator is the first calling register translator, the above-mentioned circuit for energizing the winding of the stop relay R3220 is not completed and further operation of the finder relays 2F etc. takes place at this time. Upon operating, the cycle relay FA interrupts, at the contacts FA1, a further point in the previously traced original circuit for energizing the winding of the finder relay 1F; and prepares, at the contacts FA2, a further point in the previously mentioned circuit for energizing the winding of the finder relay 2F. Also the cycle relay FA interrupts, at the contacts FA3 and FA4, further points in circuits traced hereinafter for respectively energizing the windings of the cycle relays FC and FD. Upon the second operation and restoration of the pulse relay R3315 there is completed and interrupted, at the contacts 3317, a circuit substantially identical to that previously traced and including the contacts 3224, FC1, FB1, FA2 and 1F2 for energizing the winding of the finder relay 2F, whereupon the latter relay operates. Upon operating, the finder relay 2F completes, at the contacts 2F3, a holding circuit for energizing the winding thereof in series with the winding of the cycle relay FB; this circuit extending from ground by way of the contacts 3212, FD1 and FC3, the winding of FB, the contacts 2F3 and the winding of 2F to battery. When this holding circuit is completed the finder relay 2F is retained in its operated position and the cycle relay FB operates. Also the finder relay 2F prepares, at the contacts 2F1, a test circuit substantially identical to that previously mentioned for energizing the winding of the stop relay R3220; and prepares, at the contacts 2F2, a circuit traced hereinafter for energizing the winding of the finder relay 3F. Upon operating, the cycle relay FB interrupts, at the contacts FB1, a further point in the previously traced original circuit for energizing the winding of the finder relay 2F; and prepares, at the contacts FB2, a further point in the previously mentioned circuit for energizing the winding of the finder relay 3F. Also the cycle relay FB interrupts, at the contacts FB3, the previously traced holding circuit for energizing the winding of the finder relay 1F in series with the cycle relay FA, thereby to cause the relays mentioned to restore. Upon restoring, the cycle relay FA reprepares, at the contacts FA3 and FA4, further points in the previously mentioned circuits for respectively energizing the windings of the cycle relays FC and FD; prepares, at the contacts FA1, a further point in the previously traced original circuit for energizing the winding of the finder relay 1F; and interrupts, at the contacts FA2, a further point in the previously traced original circuit for energizing the winding of the finder relay 2F. Upon restoring, the finder relay 1F interrupts, at the contacts 1F3, a further point in the previously traced holding circuit for energizing the winding thereof in series with the winding of the cycle relay FA; interrupts, at the contacts 1F2, a further point in the previously traced original circuit for energizing the winding of the finder relay 2F; and interrupts, at the contacts 1F1, the previously traced test circuit extending between the winding of the stop relay R3220 and the first register translator, not shown.

In view of the foregoing explanation of the mode of operation of the finder relays 1F and 2F in conjunction with the cycle relays FA and FB, it will be understood that the finder relays 1F to 6F, inclusive, are operated sequentially to test the respective register translators in order to detect the calling register translator. Further it is pointed out that the finder relays 1F to 6F, inclusive, are operative continuously through repeated cycles until the calling register translator is detected thereby. At this point it is noted that the finder relays 1F and 4F lock in series with the cycle relay FA; the finder relays 2F and 5F lock in series with the cycle relay FB; the cycle relay 3F locks in series with the cycle relay FC; and the finder relay 6F locks in series with the cycle relay FD, in the manner explained above. In the present example, when the finder relay 6F operates it completes, at the contacts 6F3, a holding circuit substantially identical to that previously traced, and including the contacts 3212, FA4 and 6F3 for energizing the winding thereof in series with the winding of the cycle relay FD; whereupon the finder relay 6F is retained in its operated position and the cycle relay FD operates. Upon operating, the cycle relay FD interrupts, at the contacts FD1, the previously mentioned holding circuit for energizing in series the winding of the finder relay 5F and the winding of the cycle relay FB, thereby to cause the relays mentioned to restore. Also the finder relay 6F completes, at the contacts 6F1, a test circuit, including the winding of the stop relay R3220 and the test conductor C3101 extending to the calling register translator 1700. More particularly, at this time, a circuit is completed for energizing in series the windings of the detector test relay R2230 in the register translator 1700 and the stop relay R3220 in the detector 2900; this circuit extending from ground by way of the contacts 3231, the winding of R3220, the contacts 6F1, the test conductor C3101, the contacts 2251 and 2242, the winding of R2230 and the contacts 1767 to battery. When this series circuit is completed the stop relay R3220 and the detector test relay R2230 operate.

In the register translator 1700, upon operating, the detector test relay R2230 completes, at the contacts 2231, an obvious circuit for energizing the winding of the storage relay R2850, thereby to cause the latter relay to operate. Upon operating, the storage relay R2850 prepares, at the contacts 2855, a circuit traced hereinafter for energizing the winding of the detector release relay R2240; prepares, at the contacts 2856, a circuit traced hereinafter for energizing the winding of the detector failure relay R2250; prepares, at the contacts 2853, etc., circuits for energizing the various WXYZ magnets in the code storage device S2801 to S2804, inclusive; and prepares, at the contacts 2857 etc., obvious connections between the marking conductors C2641 to C2644, inclusive, extending to the party switch N2620 in the register translator 1700 and the marking conductors C3401 to C3404, inclusive, extending to the detector 2900, for a purpose more fully explained hereinafter. Finally the storage relay R2850 completes, at the contacts 2852, a connection between the S lead S433 individually associated with the private subscriber line 407 and the detector 2900. This connection extends from the S lead S433 by way of the line switch 423, the control conductor C465 of the trunk 462, the contacts 627, the wiper 615 of the finder F610, C645, the contacts 1371, C1393, the wiper 2296 of the finder F2290, the contacts 2285, C2232, the contacts 2852 and C3102 to one terminal of the winding 3162 of the transformer 3161 in the detector 2900. In the present example, the grounded wiper 2623 of the party switch N2620 engages the first contact in the associated contact bank, whereby ground potential is applied by way of C2641 and the contacts 2857 to the first hold conductor C3401 extending to the detector 2900; and no ground potential is applied to the hold conductor C3402, C3403 and C3404 extending to the detector 2900. Also it is noted that the S lead S433 extending to the line switch 423 individually associated with the private subscriber line 407 also extends directly to the detector 2900, the S lead S433 appearing before the tenth A relay in the tenth group, the A relay mentioned being 00A, as previously noted.

Returning now to the operation of the detector 2900, upon operating, the stop relay R3220 completes, at the contacts 3221, an obvious holding circuit for energizing the winding thereof in series with the detector test relay R2230 in the register translator 1700; and completes, at the contacts 3222, an obvious circuit for energizing the winding of the hold relay R3230, thereby to cause the later relay to operate. Further the stop relay R3220 interrupts, at the contacts 3224, a common point in the previously traced circuits for respectively energizing the finder relays 1F to 6F, inclusive, thereby positively to prevent further operation of these relays at this time. Further the stop relay R3220 completes, at the contacts 3225, an obvious start circuit for the tone generator 3160; whereby the tone generator 3160 produces a 2,000 cycle current which traverses the winding 3163 of the transformer 3161 and induces a corresponding voltage in the winding 3162 of the transformer 3161. The 2,000 cycle voltage induced in the winding 3162 of the transformer 3161 is connected by way of one terminal thereof, the conductor C3102 and the previously traced path, including the register translator 1700, the primary register 1200, the primary selector 600 and the line switch 423 to the S lead S433; while the 2,000 cycle voltage induced in the winding 3162 of the transformer 3161 is connected by way of the other terminal thereof to the multiple connected amplifiers 0AMP to 9AMP, inclusive, for a purpose more fully explained hereinafter. Finally the stop relay R3220 prepares, at the contacts 3223, a circuit traced hereinafter for energizing the winding of the pulse relay R3320.

The next time the pulse relay R3315 operates and then restores it completes and then interrupts, at the contacts 3317, the previously mentioned circuit, including the contacts 3223 and 3331, for energizing the winding of the pulse relay R3320, thereby to cause the latter relay to operate. Upon operating, the pulse relay R3320 prepares, at the contacts 3321, an obvious holding circuit, including the contacts 3336, for energizing the lower winding of the pulse control relay R3330 in series with the winding thereof; which circuit is completed when the pulse relay R3315 restores; whereupon the pulse control relay R3330 operates and the pulse relay R3320 is retained in its operated position. Upon the succeeding operation of the pulse relay R3315 a circuit, including the contacts 3317, 3223 and 3332, is completed for energizing the upper winding of the pulse control relay R3330 in series with the winding of the pulse control relay R3335; whereupon the pulse control relay R3330 is retained in its operated position and the pulse control relay R3335 operates. Upon operating, the pulse control relay R3335 interrupts, at the contacts 3336, the previously traced holding circuit for energizing the lower winding of the pulse control relay R3330 in series with the winding of the pulse relay R3320, thereby to cause the pulse relay R3320 to restore. Upon the subsequent restoration of the pulse relay R3315 there is interrupted, at the contacts 3317, the previously traced circuit for energizing the upper winding of the pulse control relay R3330 in series with the winding of the pulse control relay R3335, thereby to cause the relays mentioned to restore. In view of the foregoing explanation of the mode of operation of the pulse relay R3315 in conjunction with the pulse relay R3320 and the pulse control relays R3330 and R3335, it will be understood that the pulse relay R3320 operates and restores upon each two operations and restorations of the pulse relay R3315. Thus the pulse relay R3320 operates at one-half the rate of the relay R3315.

Each time the pulse relay R3320 operates it completes, at the contacts 3322, an obvious path, including the contacts 3292, for applying ground potential to the pulse conductor C3363. The first time ground potential is applied to the pulse conductor C3363 an obvious circuit, including the contacts KC1, KB1 and KA1, is completed for energizing the winding of the first step relay 1K. When thus energized the first step relay 1K operates to complete, at the contacts 1K3, an obvious path, including the contacts KB3 and the grounded hold conductor C3364, for short-circuiting the winding of the cycle relay KA. Subsequently, when ground potential is removed from the pulse conductor C3363 a holding circuit is completed for energizing in series the winding of the first step relay 1K and the winding of the cycle relay KA; this circuit extending from the grounded hold conductor C3364 by way of the contacts KB3, the winding of KA, the contacts 1K3 and the winding of 1K to battery. When this series holding circuit is completed the first step relay 1K is retained in its operated position and the cycle relay KA operates. Upon operating, the cycle relay KA interrupts, at the contacts KA3 and KA4, points in holding circuits traced hereinafter for respectively energizing the windings of the cycle relays KC and KD; interrupts, at the contacts KA1, a further point in the previously traced original circuit for energizing the winding of the first step relay 1K; and prepares, at the contacts KA2, a circuit traced hereinafter for energizing the winding of the second step relay 2K. The next time ground potential is applied to the pulse conductor C3363 the previously mentioned circuit for energizing the winding of the second step relay 2K is completed, this circuit extending from the grounded pulse conductor C3363 by way of the contacts KC1, KB1, KA2 and 1K4, and the winding of 2K to battery. When thus energized the second step relay 2K operates to complete, at the contacts 2K3, a path substantially identical to that previously traced for short-circuiting the winding of the cycle relay KB. Subsequently, when ground potential is removed from the pulse conductor C3363 a holding circuit is completed for energizing in series the winding of the second step relay 2K and the winding of the cycle relay KB; this circuit extending from the grounded hold conductor C3364 by way of the contacts KC3, the winding of KB, the contacts 2K3 and the winding of 2K to battery. When this holding circuit is completed the second step relay 2K is retained in its operated position and the cycle relay KB operates. Upon operating, the cycle relay KB interrupts, at the contacts KB3, the previously traced holding circuit for energizing in series the winding of the cycle relay KA and the winding of the first step relay 1K, thereby to cause the latter relays to restore. Also the cycle relay KB interrupts, at the contacts KB1, a further point in the previously traced original circuit for energizing the winding of the second step relay 2K; and prepares, at the contacts KB2, a point in a circuit substantially identical to that previously traced for energizing the winding of the third step relay 3K. Upon restoring, the cycle relay KA prepares, at the contacts KA3 and KA4, points in the previously mentioned holding circuits respectively for energizing the windings of the cycle relays KC and KD.

In view of the above description of the cycle of operation of the step relays 1K, 2K etc., it will be understood that the step relays 1K to 0K, inclusive, and the cycle relays KA, KB, KC and KD are operated in the following order:

| Number of Operations and Restorations of the Pulse Relay R3320 | Operated Step and Cycle Relays |
|---|---|
| 1 | 1K and KA |
| 2 | 2K and KB |
| 3 | 3K and KC |
| 4 | 4K and KA |
| 5 | 5K and KB |
| 6 | 6K and KC |
| 7 | 7K and KA |
| 8 | 8K and KB |
| 9 | 9K and KC |
| 10 | 0K and KD |

Also it is pointed out that the step relays 1K to 0K, inclusive, and the cycle relays KA, KB, KC and KD are operative continuously through a plurality of cycles of the character noted above until operation thereof is arrested, in a manner more fully explained hereinafter. Also at this point it is noted that, upon operating, the hold relay R3230 interrupts, at the contacts 3231, the previously traced original circuit for energizing in series the winding of the stop relay R3220 in the detector 2900 and the winding of the detector test relay R2230 in the register translator 1700; and completes, at the contacts 3232, the previously mentioned path, including the contacts 3215, for applying ground potential to the hold conductor C3364. Also, the hold relay R3230 prepares, at the contacts 3233, circuits traced hereinafter for respectively energizing the windings of the test relays R3250 and R3240; and completes, at the contacts 3234, an obvious circuit, including the contacts 3244, for energizing the winding of the control relay R3110. When thus energized the control relay R3110 operates to complete, at the contacts 3111, obvious multiple circuits for energizing the windings of the ten C relays 0C to 9C, inclusive, thereby to cause the latter relays to operate for a purpose more fully explained hereinafter.

Also, upon operating, the first step relay 1K completes, at the contacts 1K2, an obvious path, including the contacts KA5 and 3717, for applying ground potential to the first marking conductor in the cable 3801; thereby to complete a circuit for energizing the winding of the first B relay 1B, not shown, in the associated group of ten in order to cause the latter relay to operate, whereby the first group of 1,000 S leads is tested in a manner more fully explained hereinafter. Similarly, the second step relay 2K completes, at the contacts 2K2, an obvious path, including the contacts KB5 and 3714, for applying ground potential to the second marking conductor in the cable 3801; thereby to complete a circuit for energizing the winding of the second B relay 2B, not shown, in the associated group of ten in order to cause the latter relay to operate, whereby the second group of 1,000 S leads is tested; etc. Finally the tenth step relay 0K completes, at the contacts 0K2, an obvious path, including the contacts KD5 and 3719, for applying ground potential to the tenth marking conductor C3800 in the cable 3801; thereby to complete an obvious circuit for energizing the winding of the tenth B relay 0B in the associated group of ten in order to cause the latter relay to operate, whereby the tenth group of 1,000 S leads is tested.

More particularly, upon operating, the tenth B relay 0B prepares, at the contacts 0B0 to 0B9, inclusive, circuits for energizing the windings of the ten A relays in the associated group, the A relays 00A to 09A, inclusive. At this point it is again noted that only the ones of the A relays 00A to 09A, inclusive, which are connected to the first hold conductor C3401 are operated at this time in view of the fact that only the first hold conductor C3401 has ground potential thereon, in the present example. Accordingly, at this time, the A relays 00A, 01A, 05A, etc. and 09A are operated, while the A relays 02A, 03A and 04A are not operated, the A relays 02A, 03A and 04A being respectively connected to the second, third and fourth hold conductors C3402, C3403 and C3404, respectively. Accordingly the tenth B relay 0B is operative to effect the testing of the 1,000 S leads in the tenth group in an extremely rapid manner in view of the fact that three hundred of the test leads in the 0 thousand group are eliminated immediately, due to the failure of the A relays 02A, 03A and 04A to operate. The circuits for energizing the windings of the various A relays 00A, 01A etc. associated with the tenth B relay 0B respectively include the contacts 0B0, 0B1 etc. and the grounded first hold conductor C3401.

When thus energized the tenth A relay 00A operates to connect the tenth group of 100 S leads in the 0 thousand group of S leads to the corresponding tenth group of 100 test leads; the first A relay 01A operates to connect the first group of 100 S leads in the 0 thousand group of S leads to the corresponding first group of 100 test leads; etc. Accordingly, at this time, the tenth group of 100 S leads in the 0 thousand group of S leads is connected by way of the tenth A relay 00A to the tenth group of 100 test leads and therefrom by way of the tenth C relay 0C to the tenth test conductor C3500; the first group of 100 S leads in the 0 thousand group of S leads is connected by the first A relay 01A to the first group of 100 test leads and therefrom by the first C relay 1C to the first test conductor C3501; etc. The tenth test conductor C3500 is connected by way of the tenth amplifier 0AMP to one terminal of the winding 3162 of the transformer 3161; the first test conductor C3501 is connected by way of the first amplifier 1AMP to one terminal of the winding 3162 of the transformer 3161; etc. At this time the S lead S433 extending to the line switch 423 individually associated with the private subscriber line 407 is connected by way of the previously traced path to the tenth amplifier 0AMP, thereby to complete a circuit therethrough; however, the other circuits via the other nine amplifiers 1AMP to 9AMP, inclusive, are not completed due to the fact that the numerical portion of the directory number of the private subscriber line 407 is 0099, as previously noted.

Hence, at this time, the tenth amplifier 0AMP operates in order to complete an obvious circuit for energizing the winding of the tenth test stop relay 0R. When thus energized the tenth test stop relay 0R operates to complete, at the contacts 0R1, an obvious circuit, including the contacts 3242, for energizing the left-hand winding of the tenth test lock relay 0S, thereby to cause the latter relay to operate. Upon operating, the tenth test lock relay 0S completes at the contacts 0S1, an obvious holding circuit, including the contacts 3233, for energizing the right-hand winding thereof in series with the winding of the test relay R3240. When this series circuit is completed the tenth test lock relay 0S is retained in its operated position and the test relay R3240 operates. Upon operating, the test relay R3240 interrupts, at the contacts 3242, the previously traced original operating circuit for energizing the left-hand winding of the tenth test lock relay 0S; and completes, at the contacts 3241, an obvious circuit, including the contacts 3284, for energizing the winding of the mark relay R3290, thereby to cause the latter relay to operate. Also the test relay R3240 interrupts, at the contacts 3244, the previously traced circuit for energizing the winding of the control relay R3170, thereby to cause the latter relay to restore and interrupt, at the contacts 3171, the previously traced multiple circuits for energizing the windings of the ten C relays 0C to 9C, inclusive, whereupon the latter relays restore. When the tenth C relay 0C restores it interrupts, at the associated contacts, the previously traced circuit, including the tenth test conductor C3500, for operating the tenth amplifier 0AMP, thereby to cause the latter amplifier to restore in order to effect the restoration of the tenth stop relay 0R. Also, upon operating, the tenth test lock relay 0S completes, at the contacts 0S5, a holding circuit, including the tenth hold conductor C3710 in the cable 3711 and the contacts 00A1, for energizing the winding of the tenth A relay 00A, thereby to retain the latter relay in its operated position.

Upon operating, the mark relay R3290 interrupts, at the contacts 3292, a further point in the previously traced path for applying ground potential to the pulse conductor C3363, thereby positively to arrest further operation of the ten step relays 0K to 9K, inclusive, at this time. Also the mark relay R3290 completes, at the contacts 3293, an obvious path for applying ground potential to the marking conductor C3365 and an obvious multiple path, including the contacts 3313', for applying ground potential to the marking conductor C3366. The application of ground potential to the marking conductor C3365 is effective to complete a path for applying ground potential to certain of the WXYZ conductors in the first group of marking leads 3801, depending upon the particular operated one of the step relays 0K to 9, inclusive, at this time. In the present example, the tenth step relay 0K occupies its operated position, a holding circuit being completed for energizing the winding of the tenth step relay 0K and the cycle relay KD at this time. The tenth step relay 0K occupies its operated position in view of the fact that one of the ten amplifiers 0AMP to 9AMP, inclusive, was operated incident to the operation of the tenth B relay 0B, the tenth B relay 0B being operated incident to the operation of the tenth step relay 0K, as previously explained. Hence, in the present example, the ground potential appearing upon the marking conductor C3365 is applied by way of the contacts 0K5 and 3812 to the Z conductor in the first group of marking leads 3801. The application of ground potential to the Z conductor in the first group of marking leads 3801 completes an obvious circuit for energizing the winding of the Z relay in the first code storage device S2801 in the register translator 1700; whereby the latter relay operates in order to complete, at the associated contacts, an obvious holding circuit, including the contacts 2137, for energizing the winding thereof. This operation of the Z relay in the code storage device S2801 causes ground potential to be applied by way of the contacts 2137 and the associated contacts thereof to the Z conductor in the group of WXYZ marking leads 2801 in the register translator 1700, for a purpose more fully explained hereinafter. The marking of the Z conductor in the group of marking conductors 2801 corresponds to the digit 0, whereby the digit 0 is registered in the first code storage device S2801 in the register translator 1700. In the detector 2900, the application of ground potential to the marking conductor C3366 is effective to complete a path for applying ground potential to certain of the WXYZ conductors in the second group of marking leads 3701, depending upon the particular operated one of the test lock relays 0S to 9S, inclusive, at this time; which in turn depends upon the operated one of the ten amplifiers 0AMP to 9AMP, inclusive, which was operated during the prior test, as previously explained. In the present example, the tenth test lock relay 0S occupies its operated position, a holding circuit being completed for energizing the right-hand winding thereof in series with the winding of the test relay R3240 at this time. Accordingly the ground potential appearing upon the marking conductor C3366 is applied by way of the contacts 0S2 to the Z conductor in the second group of marking leads 3701. The application of ground potential to the Z conductor in the second group of marking leads 3701 corresponds to the digit 0 and is effective to cause the digit 0 to be registered in the code storage device S2802 in the register translator 1700, in the manner described above.

Further the mark relay R3290 prepares, at the contacts 3291, a circuit for energizing the winding of the control relay R3260. Upon the next operation of the pulse relay R3320 it completes, at the contacts 3322, the previously mentioned circuit, including the contacts 3291 and 3274, for energizing the winding of the control relay R3260, thereby to cause the latter relay to operate. Upon operating, the control relay R3260 completes, at the contacts 3261, an obvious path, including the contacts 3281 and 3232, for short-circuiting the winding of the control relay R3270. Upon the subsequent restoration of the pulse relay R3320 it interrupts, at the contacts 3322, the previously traced original circuit for energizing the winding of the control relay R3260; whereupon a circuit, including the contacts 3232, 3281 and 3261, is completed for energizing the winding of the control relay R3260 in series with the winding of the control relay R3270. When this series circuit is completed the control relay R3260 is retained in its operated position and the control relay R3270 operates. Upon operating, the control relay R3270 interrupts, at the contacts 3274, a further point in the previously traced original circuit for energizing the winding of the control relay R3260; and prepares, at the contacts 3273, a circuit traced hereinafter for energizing the winding of the control relay R3310. Also the control relay R3270 interrupts, at the contacts 3275, the previously traced path for applying ground potential to the hold conductor C3364; thereby to interrupt the previously traced holding circuit for energizing the winding of the tenth step relay 0K in series with the winding of the cycle relay KD, whereupon the relays mentioned restore.

Upon the next operation of the pulse relay R3320 there is completed, at the contacts 3322, the previously mentioned circuit, including the contacts 3291 and 3273, for energizing the winding of the control relay R3310, thereby to cause the latter relay to operate. Upon operating, the control relay R3310 completes, at the contacts 3311, an obvious path, including the contacts 3232, for short-circuiting the winding of the control relay R3280.

Upon the subsequent restoration of the pulse relay R3320 there is interrupted, at the contacts 3322, the previously traced original circuit for energizing the winding of the control relay R3310; whereupon a circuit, including the contacts 3232 and 3311, is completed for energizing the winding of the control relay R3280 in series with the winding of the control relay R3310. When this circuit is completed the control relay R3310 is retained in its operated position and the control relay R3280 operates. Upon operating, the control relay R3280 interrupts, at the contacts 3281, the previously traced holding circuit for energizing in series the windings of the control relays R3260 and R3270, thereby to cause the latter relays to restore; and completes, at the contacts 3282, an obvious circuit for energizing the winding of the switch relay R3810, thereby to cause the latter relay to operate. Upon operating, the switch relay R3810 interrupts, at the contacts 3812 etc., the connections between the first group of WXYZ marking leads 3801 and the marking contacts of the step relays 0K to 9K, inclusive; and completes, at the contacts 3811 etc., obvious connections between the third group of marking conductors 3802 and the marking contacts of the step relays 0K to 9K, inclusive. Further the control relay R3280 interrupts, at the contacts 3284, the previously traced circuit for energizing the winding of the mark relay R3290, thereby to cause the latter relay to restore; and prepares, at the contacts 3283, an alternative circuit traced hereinafter for energizing the winding of the mark relay R3290. Further the control relay R3280 interrupts, at the contacts 3286, a further point in a path, including the contacts 3323, 3243 and 3233, which was previously completed for short-circuiting the winding of the test relay R3240 prior to the restoration of the pulse relay R3320 subsequent to the operation of the tenth test lock relay 0S; this arrangement positively prevents operation of the test relay R3240, in the manner explained above, prior to the tenth restoration of the pulse relay R3320 during the first test. Further the control relay R3280 prepares, at the contacts 3285, a similar path, including the contacts 3323, 3285, 3255 and 3233, for short-circuiting the winding of the test relay R3250 prior to the ninth restoration of the pulse relay R3320 subsequent to the operation of the ninth test mark relay 9T, in a manner more fully explained hereinafter; this arrangement positively prevents operation of the test relay R3250, in a manner more fully explained hereinafter, prior to the ninth restoration of the pulse relay R3320 during the second test. Also, upon operating, the test relay R3240 completes, at the contacts 3241, an obvious circuit for energizing the winding of the switch relay R3710, thereby to cause the latter relay to operate. Upon operating, the switch relay R3710 interrupts, at the contacts 3712 etc., further points in the previously traced paths for applying ground potential to the various conductors in the cable 3801; and prepares, at the contacts 3711 etc., points in paths traced hereinafter for applying ground potential to the various conductors in the cable 3901.

Upon restoring, the mark relay R3290 interrupts, at the contacts 3291, a further point in the previously traced original circuit for energizing the winding of the control relay R3310; and interrupts, at the contacts 3293, the previously traced paths for applying ground potential to the marking conductors C3365 and C3366. Further the mark relay R3290 reprepares, at the contacts 3292, the previously traced path for applying ground potential to the pulse conductor C3363. Also, upon operating, the control relay R3310 prepares, at the contacts 3313, a point in a path traced hereinafter for applying ground potential to the marking conductors C3365 and C3367; and completes, at the contacts 3314, an obvious path for applying ground potential to the conductor C3368; thereby to complete a circuit for energizing the winding of one of the ten D relays 0D to 9D, inclusive, depending upon the particular operated one of the ten test lock relays 0S to 9S, inclusive, at this time. In the present example, the tenth test lock relay 0S occupies its operated position; accordingly the application of ground potential to the conductor C3368 completes an obvious circuit, including the contacts 0S4 and the conductor C3700 in the cable 3701, for energizing the winding of the tenth D relay 0D. When thus energized the tenth D relay 0D operates to connect the tenth group of 100 test leads to the riser cable 3900, for a purpose more fully explained hereinafter.

Each time the pulse relay R3320 operates and restores it completes and then interrupts, at the contacts 3322, the previously traced path for applying ground potential to the pulse conductor C3363; whereby the step relays 1K, 2K etc., are reoperated sequentially and locked in series with the cycle relays KA, KB etc., in the manner previously explained. At this time, upon operating, the first step relay 1K completes, at the contacts 1K1, an obvious path, including the contacts KA5 and 3716, for applying ground potential to the first conductor in the cable 3901, thereby to complete a circuit for energizing the winding of the first E relay 1E, not shown, in the associated group of ten in order to cause the latter relay to operate, whereby the first group of ten conductors in the riser cable 3900 is tested; the group mentioned comprising one of ten groups in the riser cable 3900 which are connected by way of the operated tenth D relay 0D to the tenth group of 100 test leads; which tenth group of 100 test leads is connected by way of the operated tenth A relay 00A to the tenth group of 100 S leads in the 0 thousand group; the tenth group of 100 S leads in the 0 thousand group including the S lead S433 extending to the line switch 423 individually associated with the private subscriber line 407, as previously noted. Similarly, upon operating, the second step relay 2K completes, at the contacts 2K1, an obvious path, including the contacts BK5 and 3713, for applying ground potential to the second conductor in the cable 3901, thereby to complete a circuit for energizing the winding of the second E relay 2E, not shown, in the associated group of ten in order to cause the latter relay to operate; whereby the second group of ten conductors in the riser cable 3900 is tested, in the manner explained above. Finally the ninth step relay 9K completes, at the contacts 9K1, an obvious path, including the contacts KC5 and 3711, for applying ground potential to the ninth conductor C3819 in the cable 3901; thereby to complete an obvious circuit for energizing the winding of the ninth E relay 9E in the associated group of ten in order to cause the latter relay to operate, whereby the ninth group of ten conductors in the riser cable 3900 is tested.

More particularly, upon operating, the ninth E relay 9E completes, at the associated contacts, connections between the ten conductors in the ninth group in the riser cable 3900 and the respective ten test conductors C3500 to C3509, inclusive. At this time the tenth group of 100 S leads in the 0 thousand group is connected by way of the operated tenth A relay 00A to the corresponding tenth group of 100 test conductors; and the ten groups of test conductors in the tenth group of test conductors are connected by the operated tenth D relay 0D to the ten groups of conductors in the riser cable 3900; and the ten conductors in the ninth group in the riser cable 3900 are respectively connected by the ninth E relay 9E to the respective ten test conductors C3500 to C3509, inclusive. Hence, at this time, a circuit is completed for operating the ninth amplifier 9AMP in view of the fact that the S lead S433 extends to the line switch 423 individually associated with the private subscriber line 407; the last two digits of the numerical portion of the directory number of the private subscriber line 407 being 99.

Upon operating, the ninth amplifier 9AMP effects operation of the ninth test stop relay 9R, in the manner previously explained; whereupon the latter relay completes, at the contacts 9R2, an obvious circuit, including the contacts 3312, for energizing the left-hand winding of the test mark relay 9T. When thus energized the test mark relay 9T operates to complete, at the contacts 9T1, a circuit, including the contacts 3233, for energizing the right-hand winding thereof in series with the winding of the test relay R3250. When this series circuit is completed the test mark relay 9T is retained in its operated position and the test relay R3250 operates. At this point it is noted that the previously traced path, including the contacts 3233, 3255, 3285 and 3323, for short-circuiting the winding of the test relay R3250 is completed prior to the ninth restoration of the pulse relay R3320. Upon operating, the test relay R3250 interrupts, at the contacts 3255, a further point in the previously traced path for short-circuiting the winding thereof; and completes, at the contacts 3254, an obvious circuit, including the contacts 3283, for energizing the winding of the mark relay R3290, thereby to cause the latter relay to operate.

Upon operating, the mark relay R3290 interrupts, at the contacts 3292, a further point in the previously mentioned path for applying ground potential to the pulse conductor C3363; thereby positively to arrest further operation of the step relays 0K to 9K, inclusive, at this time. Also the mark relay R3290 prepares, at the contacts 3291, a further point in the previously mentioned circuit for energizing the winding of the control relay R3260; and completes, at the contacts 3293, the previously mentioned path, including the contacts 3313, for applying ground potential to the marking conductors C3365 and C3367. The application of ground potential to the marking conductor C3365 is effective to complete a path for applying ground potential to certain of the WXYZ conductors in the third group of marking leads C3802, depending upon the particular operated one of the step relays 0K to 9K, inclusive, at this time. In the present example, the ninth step relay 9K occupies its operated position, a holding circuit being completed for energizing the winding of the ninth step relay 9K and the cycle relay KC at this time. The ninth step relay 9K occupies its operated position in view of the fact that one of the ten amplifiers 0AMP to 9AMP, inclusive, operated incident to the operation of the ninth E relay 9E, the ninth E relay being operated incident to the operation of the ninth step relay 9K, as previously explained. In the present example, the ground potential appearing upon the marking conductor C3365 is applied by way of the contacts 9K5 and 3813 to the Y conductor in the third group of marking leads 3802. The application of ground potential to the Y conductor in the third group of marking leads 3802 corresponding to the ligit 9 causes the digit 9 to be registered in the third code storage device S2803 in the register translator 1700, in the manner previously explained. The application of ground potential to the marking conductor C3367 is effective to complete a path for applying ground potential to certain of the WXYZ conductors in the fourth group of marking leads 3601, depending upon the particular operated one of the test mark relays 0T to 9T, inclusive, at this time; which in turn depends upon which of the ten amplifiers 0AMP to 9AMP, inclusive, was operated during the prior test, as previously explained. In the present example, the ninth test mark relay 9T occupies its operated position, a holding circuit being completed for energizing the right-hand winding thereof in series with the winding of the test relay R3250 at this time. Hence, in the present example, the ground potential appearing upon the marking conductor C3367 is applied by way of the contacts 9T2 to the Y conductor in the fourth group of marking leads 3601. The application of ground potential to the Y conductor in the fourth group of marking leads 3601 corresponding to the digit 9 is effective to cause the digit 9 to be registered in the fourth code storage device S2804 in the register translator 1700.

Upon the next operation of the pulse relay R3320 there is completed, at the contacts 3322, the previously mentioned path, including the contacts 3291 and 3274, for energizing the winding of the control relay R3260; thereby to cause the latter relay to operate and complete, at the contacts 3261, an obvious path, including the contacts 3253 and 3232, for short-circuiting the winding of the control relay R3270. Upon the next restoration of the pulse relay R3320 there is interrupted, at the contacts 3322, the previously traced original operating circuit for energizing the winding of the control relay R3260; whereupon a circuit, including the contacts 3232, 3253 and 3261, is completed for energizing the winding of the control relay R3260 in series with the winding of the control relay R3270. When this circuit is completed the control relay R3260 is retained in its operated position and the control relay R3270 operates.

Upon operating, the control relay R3270 interrupts, at the contacts 3275, the previously mentioned path for applying ground potential to the hold conductor C3364; thereby to interrupt the previously mentioned holding circuit for energizing the winding of the ninth step relay 9K in series with the winding of the cycle relay KC, thereby to cause the relays mentioned to restore. Also the control relay R3270 interrupts, at the contacts 3272, the previously traced circuit for energizing in multiple the upper and lower windings of the pulse relay R3315, thereby positively to arrest further operation of the latter relay at this time. Finally the control relay R3270 completes, at the contacts 3271, an obvious path, including the contacts 3251, for applying ground potential to the conductor C3201 extending to the register translator 1700.

The application of ground potential to the conductor C3201 completes the previously mentioned circuit, including the contacts 2855, for energizing the winding of the detector release relay R2240, thereby to cause the latter relay to operate. Upon operating, the detector release relay R2240 completes, at the contacts 2243, an obvious holding circuit, including the contacts 1760, for energizing the winding thereof; and interrupts, at the contacts 2244, the previously traced path for applying ground potential to the start conductor C3202 extending to the detector 2900. Further the detector release relay R2240 interrupts, at the contacts 2242, the previously traced circuit for energizing in series the winding of the detector test relay R2230 in the register translator 1700 and the stop relay R3220 in the detector 2900, thereby to cause the relays mentioned to restore. Further the detector release relay R2240 completes, at the contacts 2241, a circuit, including the contacts 2036, 1763 and 1852, for energizing the lower winding of the code pulse relay R1850 and a multiple path for discharging the condenser 1854 through the upper winding of the code pulse relay R1850. When thus energized the code pulse relay R1850 operates to interrupt, at the contacts 1852, the previously traced circuit for energizing the lower winding thereof and the previously traced multiple path for short-circuiting the condenser 1854 through the upper winding thereof; whereupon the condenser 1854 is charged through the upper and lower windings in series of the code pulse relay R1850 in order to cause the latter relay to restore shortly thereafter. Hence, the code pulse relay R1850 operates and restores intermittently at a predetermined rate, depending upon the characteristic of the associated condenser 1854 for a purpose more fully explained hereinafter.

Upon restoring, the detector test relay R2230 effects the restoration of the storage relay R2850; which latter relay interrupts, at the contacts 2855, the previously traced original operating circuit for energizing the winding of the detector release relay R2240. Also, the storage relay R2850 interrupts, at the contacts 2856, a further point in the previously mentioned circuit for energizing the winding of the detector failure relay R2250; and interrupts, at the contacts 2852, the previously traced test circuit, including the S conductor S433 extending to the line switch 423 individually associated with the private subscriber line 407, whereupon the ninth amplifier 9AMP in the detector 2900 is released in order to effect the restoration of the ninth test stop relay 9R, in an obvious manner. Also the storage relay R2850 interrupts, at the contacts 2853 etc., the previously traced connection between the four groups of WXYZ marking leads 3601, 3802, 3701 and 3801 and the respective code storage devices S2804 to S2801, inclusive. Finally the storage relay R2850 interrupts, at the contacts 2857 etc., the connections between the conductors C2641 to C2644, inclusive, extending to the party switch N2620 in the register translator 1700 and the hold conductors C3401 to C3404, inclusive, extending to the detector 2900.

Continuing now with the release of the detector 2900, when ground potential is removed from the start conductor C3202, the start relay R3210 restores, thereby to interrupt, at the contacts 3212, the previously traced holding circuit for energizing the winding of the cycle relay FD in series with the winding of the finder relay 6F, thereby to cause the latter relays to restore. Upon restoring, the stop relay R3220 interrupts, at the contacts 3222, the previously mentioned circuit for energizing the winding of the hold relay R3230; thereby to cause the latter relay to restore shortly thereafter, the hold relay R3230 being of the slow-to-release type. Upon restoring, the hold relay R3230 interrupts, at the contacts 3232, the previously traced holding circuit for energizing in series the windings of the control relays R3270 and R3260 and the previously traced multiple holding circuit for energizing in series the windings of the control relays R3280 and R3310, thereby to cause the relays mentioned to restore. Also the hold relay R3230 interrupts, at the contacts 3233, the previously traced holding circuit for energizing the winding of the test relay R3240 in series with the right-hand winding of the tenth test lock relay 0S and the previously traced multiple holding circuit for energizing the winding of the test relay R3250 in series with the right-hand winding of the ninth test mark relay 9T, thereby to cause the relays mentioned to restore. Upon restoring, the control relay R3270 interrupts, at the contacts 3271, the previously mentioned path for applying ground potential to the conductor C3201 extending to the register translator 1700; and, upon restoring, the control relay R3280 interrupts, at the contacts 3283, the previously traced circuit for energizing the winding of the mark relay R3290, thereby to cause the latter relay to restore. Also, at this time, the pulse relay R3315 occupies its restored position, whereupon the pulse relay R3320 is restored in order to effect the restoration of the pulse control relays R3330 and R3335. Upon restoring, the test relay R3240 interrupts, at the contacts 3241, the previously traced circuit for energizing the winding of the switch relay R3710, thereby to cause the latter relay to restore; and, upon restoring, the control relay R3280 interrupts, at the contacts 3282, the previously traced circuit for energizing the winding of the switch relay R3810, thereby to cause the latter relay to restore. Upon restoring, the tenth test lock relay 0S interrupts, at the contacts 0S5, the previously traced holding circuit for energizing the winding of the tenth A relay 00A, thereby to cause the latter relay to restore; and interrupts, at the contacts 0S4, the previously traced holding circuit for energizing the winding of the tenth D relay 0D, thereby to cause the latter relay to restore. Finally, when the ninth step relay 9K restores it interrupts, at the contacts 9K1, the previously traced circuit for energizing the winding of the ninth E relay 9E, thereby to cause the latter relay to restore. At this time the detector 2900 is completely released and available for further use.

In view of the foregoing explanation of the mode of operation of the detector 2900, it will be understood that it operated to detect the numerical portion of the directory number of the private subscriber line 407 extending to the calling private subscriber substation TP and effected the registration of the detected numerical portion of the directory number mentioned in the code storage devices S2801 to S2804, inclusive, in the register translator 1700. More particularly, at this time, the four digits 0, 0, 9 and 9 representing the numerical portion of the directory number of the private subscriber line 407 are respectively registered in the code storage devices S2801 to S2804, inclusive, in the register translator 1700.

In view of the foregoing explanation of the mode of operation of the detector 2900 to detect a numerical portion of the directory number of the calling subscriber line 407, it will be understood that the step relays 0K to 9K, inclusive, are operated through a first cycle, to detect the thousand digit of the directory number in conjunction with the amplifiers 0AMP to 9AMP, inclusive, to detect the hundred digit of the directory number; then the step relays 0K to 9K, inclusive, are operated through a second cycle, to detect the ten digit of the directory number in conjunction with the amplifiers 0AMP to 9AMP, inclusive, to detect the unit digit of the directory number. During either the first test or the second test of the step relays 0K to 9K, inclusive, should these relays operate through a first complete cycle and fail to make a detection in the manner explained above, a second cycle of operation thereof would be initiated, as will be explained hereinafter.

At the beginning of the second cycle of operation of the step relays 0K to 9K, inclusive, the first step relay 1K would operate while the tenth step relay 0K and the cycle relay KD occupy their operated positions. In this event, upon operating, the first step relay 1K completes, at the contacts 1K7, an obvious circuit, including the contacts KD6 and 3346, for energizing the winding of the first test relay R3340, thereby to cause the latter relay to operate. Upon operating, the first test relay R3340 completes, at the contacts 3341, an obvious path, including the grounded hold conductor C3364, for short-circuiting the winding of the lock relay R3345. During this second cycle of operation of the step relays 0K to 9K, inclusive, when the cycle relay KD restores its interrupts, at the contacts KD6, the above traced original operating circuit for energizing the winding of the first test relay R3340; whereupon a series circuit, including the grounded hold conductor C3364 and the contacts 3341, is completed for energizing the winding of the lock relay R3345 in series with the winding of the first test relay R3340. When this series circuit is completed the first test relay R3340 is retained in its operated position and the lock relay R3345 operates. Upon operating, the lock relay R3345 interrupts, at the contacts 3346, a further point in the previously traced circuit for energizing the winding of the first test relay R3340; and prepares, at the contacts 3347, a point in a circuit traced hereinafter for energizing the winding of the second test relay R3350.

During the second cycle of operation mentioned of the step relays 0K to 9K, inclusive, in the event a detection is made, the control relay R3270 operates in order to interrupt, at the contacts 3275, the previously traced path for applying ground potential to the hold conductor C3364, as previously explained; whereby the previously traced holding circuit for energizing the winding of the lock relay R3345 in series with the winding of the first test relay R3360 is interrupted in order to cause the latter relay to restore; and the step relays 0K to 9K, inclusive, and the cycle relays KA, KB etc. are restored, all in the manner previously explained. On the other hand, in the event no detection is made during the second cycle of operation mentioned of the step relays 0K to 9K, inclusive, a third cycle of operation thereof is initiated, as previously explained.

At the beginning of the third cycle of operation of the step relays 0K to 9K, inclusive, the first step relay 1K operates while the tenth step relay 0K and the cycle relay KD occupy their operated positions. In this event, upon operating, the first step relay 1K completes, at the contacts 1K7, the previously mentioned circuit, including the contacts KD6 and 3347, for energizing the winding of the second test relay R3350. When thus energized the second test relay R3350 operates to complete, at the contacts 3354, an obvious holding circuit, including the grounded hold conductor C3364 for energizing the winding thereof. Also the second test relay R3350 completes, at the contacts 3353, an obvious circuit for energizing the winding of the alarm relay R3360; thereby to cause the latter relay to operate and complete, at the contacts 3361, an obvious holding circuit, including the reset key K3370, for energizing the winding thereof. Also the alarm relay R3360 completes, at the contacts 3362, an obvious circuit for operating the alarm A3375, thereby to indicate to the exchange attendant that the detector 2900 has operated and failed to detect a directory number. Further the second test relay R3350 interrupts, at the contacts 3352, the previously traced circuit for energizing in multiple the upper and lower windings of the pulse relay R3315, thereby to arrest further operation of the latter relay at this time. Finally the second test relay R3350 completes, at the contacts 3351, an obvious path for applying ground potential to the conductor C3301 extending to the register translator 1700.

The application of ground potential to the conductor C3301 extending to the register translator 1700 completes an obvious circuit, including the contacts 2856, for energizing the winding of the detector failure relay R2250. When thus energized the detector failure relay R2250 operates, thereby to complete, at the contacts 2252, an obvious holding circuit, including the contacts 2137, for energizing the winding thereof and to interrupt, at the contacts 2251, the previously traced holding circuit for energizing the winding of the detector test relay R2230 in the register translator 1700 in series with the stop relay R3220 in the detector 2900; whereby the relays mentioned restore and the detector 2900 is released, in the manner previously explained. Also the operation of the detector failure relay R2250 in the register translator 1700 effects certain operation of the apparatus therein in order to cause the call initiated at the calling private subscriber substation TP to be intercepted at the interceptor operator position 114—117; which operation is described in detail hereinafter.

The exchange attendant may replace the detector 2900 again in service by momentarily operating the reset key K3370; thereby to interrupt the previously mentioned holding circuit for energizing the winding of the alarm relay R3360 in order to cause the latter relay to restore. Upon restoring, the alarm relay R3360 interrupts, at the contacts 3361, a further point in the previously traced holding circuit for energizing the winding thereof; and interrupts, at the contacts 3362, the previously mentioned circuit for operating the alarm A3375.

*Extension of the call by the register translator*

Incident to the setting up of the present call the register translator 1700 first transmits the first routing digit 3 to the primary selector 600, in the manner previously explained. More particularly, the first routing digit 3 is transmitted from ground by way of the contacts 1718, the contacts 1843 of the digit pulse relay R1840, the contacts 2025, C2235, the contacts 2287, the wiper 2298 of the finder F2290, C1283, the contacts 1272, C642, the wiper 612 of the finder F610, the contacts 623 and 773 and the winding of the line relay R730 in the primary selector 600 to battery; whereby the line relay R730 follows the first routing digit 3 in order to cause the wiper set of the switch mechanism 700 to be driven three steps in the vertical direction, in the manner previously explained. When the first routing digit 3 is completely transmitted from the register translator 1700 the digit stop relay R1910 therein operates, as previously explained, in order to complete, at the contacts 1913, a holding circuit substantially identical to that traced above for energizing the winding of the line relay R730, thereby positively to prevent further operation of the wiper set of the switch mechanism 700 in the vertical direction. Also the digit stop relay R1910 effects operation of the special service cutoff relay R1810, as previously noted; whereupon the latter relay interrupts, at the contacts 1811, the previously traced holding circuit, including the resistor 1814, C1872, the contacts 2283, the wiper 2294 of the finder F2290, C1394, the contacts 1373, C644, the wiper 614 of the finder F610, the contacts 625 and 771, the contacts 720 of the set of switch springs S718, the strap 723 and the resistor 722, for energizing the upper winding of the transfer relay R750 in the primary selector 600, whereupon the latter relay restores in order to effect the previously explained interaction between the step relay R760 and the rotary magnet M712; whereby the wiper set of the switch mechanism 700 is driven step by step in the rotary direction to hunt for an idle trunk in the associated group terminated in the third level in the associated contact bank.

Assuming that the trunk 780 extending to the toll ticket repeater 800 is the first idle trunk in the group terminated in the third level of the contact bank of the switch mechanism 700, the switch mechanism 700 operates to seize the trunk 780, whereupon the switch-through relay R770 operates, in the manner previously explained. The trunk 780 is marked as idle to the switch mechanism 700 by the absence of ground potential upon the control conductor C783 thereof, as previously noted.

Upon operating, the switch-through relay R770 in the primary selector 600 interrupts, at the contacts 771, a further point in the previously traced holding circuit for energizing the upper winding of the transfer relay R750; and prepares, at the contacts 772, a circuit traced hereinafter for energizing in series the windings of the step relay R920 and the code relay R910 in the toll ticket repeater 800. Also the switch relay R770 in the primary selector 600 interrupts, at the contacts 773, the previously traced circuit for energizing the winding of the line relay R730, thereby to cause the latter relay to restore; and completes, at the contacts 774, a circuit substantially identical to that previously traced and including the wiper 702 of the wiper set, the line conductor C782 of the trunk 780 and the winding 902 of the repeater 900 for energizing the lower winding of the impulse relay R960 in the toll ticket repeater 800, thereby to cause the latter relay to operate. Upon operating, the impulse relay R960 completes, at the contacts 962, an obvious circuit for energizing the winding of the hold relay R840, thereby to cause the latter relay to operate. Upon operating, the hold relay R840 completes, at the contacts 841, an obvious path for applying ground potential to the control conductor C783 of the trunk 780, thereby to mark the toll ticket repeater 800 as busy to the other primary selectors 441, etc., having access thereto. Also the application of ground potential to the control conductor C783 of the trunk 780 completes the previously traced holding circuit, including the wiper 703 of the wiper set of the switch mechanism 700, the contacts 776, the set of switch springs S717, the contacts 713 and the set of switch springs S716, for energizing the winding of the switch-through relay R770 in series with the winding of the step relay R760; whereby the switch-through relay R770 is retained in its operated position, in the manner previously explained. The line relay R730 in the primary selector 600 then restores in order to effect restoration of the hold relay R740 shortly thereafter, as previously explained.

Also, upon operating, the impulse relay R960 in the toll ticket repeater 800 completes, at the contacts 961, an obvious impulsing bridge, including the contacts 952, between the line conductors of the trunk 907 extending to the toll selector 513; whereby the toll selector 513 is conditioned to be responsive to a routing digit transmitted thereto. Also, upon operating, the hold relay R840 completes, at the contacts 843, an obvious circuit for energizing the winding of the control relay R830, thereby to cause the latter relay to operate. Upon operating, the control relay R830 completes, at the contacts 832′, an obvious path for applying ground potential to the hold conductor C889.

In view of the above description of the primary selector 600 and the toll ticket repeater 800, it will be understood that the first routing digit 3 is transmitted from the register translator 1700 to the line relay R730 in the primary selector 600; whereas the second, third, fourth and fifth routing digits 2, 2, 7 and 9, respectively, are transmitted from the register translator 1700 over the primary selector 600 and the line conductor C782 of the trunk 780 to the lower winding of the impulse relay R960 in the toll ticket repeater 800. Accordingly, the impulse relay R960 repeats the second, third, fourth and fifth routing digits 2, 2, 7 and 9 at the contacts 961 over the trunk 907 extending to the toll selector 513; the hold relay R840 remaining in its operated position during impulsing as it is of the slow-to-release type. The toll selector 513 responds to the second routing digit 2 in order to select the corresponding group of toll lines extending to exchange 6 zone 45; and then operates automatically to select an idle toll line, such, for example, as the toll line 470 from the selected group. Accordingly, the third, fourth and fifth routing digits 2, 7 and 9 are transmitted over the toll line 470 to the switching apparatus in exchange 6 zone 45. Subsequently the register translator 1700 operates to transmit the fourth, fifth, sixth and seventh digits dialed at the calling private subscriber substation TP, the digits 1, 2, 3 and 4, over the trunk 780 to the toll ticket repeater 800; which digits are repeated over the toll line 470 to the switching apparatus in exchange 6 zone 45, in the manner previously explained.

The third and fourth routing digits 2 and 7 transmitted over the toll line 470 may be utilized in automatic switching apparatus in exchange 6 zone 45 to select an idle toll line extending between exchange 6 zone 45 and exchange 1 zone 27; the fifth routing digit 9 transmitted over the toll line 470 may be utilized in automatic switching apparatus in exchange 1 zone 27 to select an idle trunk extending between exchange 1 zone 27 and exchange 9 zone 27. The fourth, fifth, sixth and seventh digits 1, 2, 3 and 4 respectively corresponding to the numerical portion of the directory number of the called subscriber substation in exchange 9 zone 27 are utilized in automatic switching apparatus in exchange 9 zone 27 to select the line terminal of the subscriber line extending to the called subscriber substation therein. The switching apparatus in exchange 9 zone 27 then operates in accordance with conventional practice in order to cause ringing current to be projected over the subscriber line extending to the called subscriber substation, thereby to operate the ringer thereat.

Returning now to the operation of the register translator 1700, when the detector 2900 operates to detect the directory number of the private subscriber line 407 extending to the calling private subscriber substation TP and to store the detected directory number in the code storage devices S2801 to S2804, inclusive, in the register translator 1700, the detector release relay R2240 is operated, as previously explained. Upon operating, the detector release relay R2240 completes, at the contacts 2241, the previously traced circuit for energizing the lower winding of the code pulse relay R1850 and a multiple path for discharging the condenser 1854 through the upper winding of the code pulse relay R1850; whereupon the code pulse relay R1850 operates and restores intermittently at a predetermined rate, all in the manner previously explained. Each time the code pulse relay R1850 operates and then restores it completes and then interrupts, at the contacts 1853, an obvious circuit, including C2424, for energizing the magnet UM2827; thereby to cause the latter magnet to operate and restore, whereupon the wipers noted of the storage transfer switch U2820 are driven one step in the clockwise direction. Also each time the code pulse relay R1850 operates and then restores it completes and then interrupts, at the contacts 1851, a path for applying ground potential to the conductor C1872; the ground potential applied to the conductor C1872 being either direct ground potential at the contacts 1861 or resistance ground potential by way of the resistor 1862, depending, respectively, upon the operated or restored position of the mark relay R1860, as explained more fully hereinafter. The application of direct ground potential by way of the contacts 1861 and 1851 to the conductor C1872 completes the previously mentioned circuit, including the contacts 2283, the wiper 2294 of the finder F2290, C1394, the contacts 1373, C644, the wiper 614 of the finder F610, the contacts 625, 772, the wiper 701 of the wiper set of the switch mechanism 700, the line conductor C781 of the trunk 780 and the contacts 954, for energizing in series the windings of the step relay R920 and the code relay R910 in the toll ticket repeater 800, whereby both of the relays mentioned operate; on the other hand, the application of resistance ground potential by way of the resistor 1862 and the contacts 1851 completes the above-traced circuit for energizing in series the windings of the step relay R920 and the code relay R910; whereby only the step relay R920 operates, the code relay R910 being of the marginal type. Also, at this time, a circuit, including the multiply connected wipers 2821 and 2822 of the storage transfer switch U2820, C2177 and the contacts 2038, is prepared for energizing the winding of the mark relay R1860; and the wiper 2821 of the storage transfer switch U2820 engages the home contact in the associated contact bank terminating the W conductor in the group of WXYZ marking leads 2805 extending to the first code switch A2400. In the present example, the first digit 2 is registered in the first code switch A2400, whereby ground potential is applied to the W and Y conductors in the group of marking leads 2805, as previously explained.

Hence, upon the first operation of the code pulse relay R1850, the mark relay R1860 occupies its operated position and direct ground potential is applied by way of the contacts 1861 and 1851 to the conductor C1872, in the manner explained above. The circuit for energizing the winding of the mark relay R1860 includes the grounded W conductor in the group of WXYZ marking leads 2805, the wiper 2821 of the storage transfer switch U2820 and the engaged home contact in the associated contact bank. Upon the first restoration of the code pulse relay R1850 the previously traced path for applying direct ground potential to the conductor C1872 is interrupted and the magnet UM2827 restores in order to drive the wipers noted of the storage transfer switch U2820 one step in the clockwise direction, as previously noted. When the wiper 2821 of the storage transfer switch U2820 disengages the home contact in the associated contact bank the previously traced circuit for energizing the winding of the mark relay R1860 is interrupted, thereby to cause the latter relay to restore; and when the wiper 2821 of the storage transfer switch U2820 engages the first contact in the associated contact bank terminating the X conductor of the group of marking leads 2805 the previously traced circuit for energizing the winding of the mark relay R1860 is not recompleted due to the fact that no ground potential appears upon the X conductor mentioned. Accordingly, upon the second operation of the code pulse relay R1850, resistance ground potential by way of the resistor 1862 is applied to the conductor C1872. In view of the above description of the mode of operation of the storage transfer switch U2820 to transfer the code digit 2 registered in the first code switch A2400, it will be understood that, upon the first and third operations of the code pulse relay R1850, the mark relay R1860 occupies its operated position and direct ground potential is applied to the conductor C1872; while, upon the second and fourth operations of the code pulse relay R1850, the mark relay R1860 occupies its restored position and resistance ground potential is applied to the conductor C1872; this operation resulting from the registration of the digit 2 in the first code switch A2400, whereby the W and Y conductors in the associated group of WXYZ leads 2805 are marked with direct ground potential, as explained above.

Upon the fourth restoration of the code pulse relay R1850 the magnet UM2827 restores thereby to drive the wiper 2821 to engage the fifth contact in the associated contact bank terminating the W conductor in the group of WXYZ marking leads 2806 extending to the second code switch B2410. Accordingly, at this time, the storage transfer switch U2820 is in readiness to transfer the digit 7 registered in the second code switch B2410 over the conductor C1872 to the toll ticket repeater 800, in the manner explained above.

At this point it is noted that the groups of WXYZ marking leads 2805 and 2806 are terminated in a clockwise direction in the contact bank associated with the wiper 2821 of the storage transfer switch U2820; the group of WXYZ marking leads 2807 is terminated in both the lower portion of the contact bank associated with the wiper 2821 and the upper portion of the contact bank associated with the wiper 2822 of the storage transfer switch U2820; the groups of WXYZ marking leads 2801, 2802, 2803, 2804 and 2812 are terminated in a clockwise direction in the contact bank associated with the wiper 2822 of the storage transfer switch U2820; the group of WXYZ marking leads 2813 is terminated in both the lower portion of the contact bank associated with the wiper 2822 and the upper portion of the contact bank associated with the wiper 2823 of the storage transfer switch U2820; and the groups of WXYZ marking leads 2814, 2815, 2808, 2809, 2810 and 2811 are terminated in a clockwise direction in the contact bank associated with the wiper 2823 of the storage transfer switch U2820. The groups of WXYZ marking leads 2805, 2806 and 2807 respectively terminate in the contact banks of the first code switch A2400, the second code switch B2410 and the third code switch C2500; the groups of WXYZ marking leads 2801, 2802, 2803 and 2804 respectively terminate in the code storage devices S2801, S2802, S2803 and S2804; the group of WXYZ marking leads 2812 terminates by way of the jumper 2352 in the contact banks associated with the wipers 2316 and 2317 of the wiper set of the rate and route switch R2310; the group of WXYZ marking leads 2813 terminates in the terminal block B2770; the Z conductor comprising the group of WXYZ marking leads 2814 terminates in the contacts 2044 of the special service relay R2040; the Z conductor comprising the group of WXYZ marking leads 2815 terminates in the contacts 1755 of the code send relay R1750; while the groups of WXYZ marking leads 2808, 2809, 2810 and 2811 respectively terminate in the first numerical switch D2510, the second numerical switch E2520, the third numerical switch F2600 and the fourth numerical switch G2610.

At this time the wiper set of the rate and route switch R2310 occupies its 5 up 6 in position, thereby to cause a complementary digit of a rate factor digit applicable to the call from exchange 4 zone 84 to exchange 9 zone 27 to be selected. Assuming that the rate factor digit 3 is applicable to the call mentioned, the complementary digit 8 thereof is selected. More particularly, the wipers 2316 and 2317 of the wiper set of the rate and route switch R2310 mark the associated group of WXYZ marking leads 2812 in accordance with the complementary digit 8, the X conductor in the group of WXYZ marking leads 2812 being marked with direct ground potential. At this point it is noted that the wipers 2316 and 2317 of the wiper set of the rate and route switch R2310 set up the complementary digit, whereby the sum of the complementary digit and the rate factor digit is equal to 11, in view of the fact that the complementary digits 0, 9, 8 and 7 respectively corresponding to the rate factor digits 1, 2, 3 and 4 may be set up by respectively marking only the Z, Y, X and W conductors in the associated group of WXYZ marking conductors 2812 by way of only the wiper 2317 of the wiper set of the rate and route switch R2310. Accordingly the wiper 2316 of the wiper set of the rate and route switch R2310 is not utilized to mark the complementary digits 7 to 0, inclusive respectively corresponding to the rate factor digits 4 to 1 inclusive. This arrangement is utilized in view of the fact that the wiper 2316 of the wiper set of the rate and route switch R2310 is, under certain conditions, adapted to mark the control conductor C2391 with ground potential when the rate factor digit applicable to the call is 1, 2, 3 or 4. Accordingly this arrangement prevents any cross connection between the control conductor C2391 and the WXYZ marking conductors in the group of WXYZ marking leads 2812.

Further, the first, second and third code digits 2, 7 and 9 are respectively registered in the first code switch A2400, the second code switch B2410 and the third code switch C2500, whereby the respective groups of WXYZ marking leads 2805, 2806 and 2807 are respectively marked in accordance with the digits 2, 7 and 9; while the first, second, third and fourth numerical digits 1, 2, 3 and 4 are respectively registered in the first numerical switch D2510, the second numerical switch E2520, the third numerical switch F2600 and the fourth numerical switch G2610, whereby the respective groups of WXYZ marking leads 2808, 2809, 2810 and 2811 are respectively marked in accordance with the digits 1, 2, 3 and 4. Further, the terminal block B2770 marks the associated group of WXYZ marking leads 2813 in accordance with the digit 6, corresponding to the number of the register translator 1700, as previously noted; while the groups of WXYZ marking leads 2814 and 2815 are not marked in view of the fact that the respectively associated special service relay R2040 and the code send relay R1750 occupy their restored positions at this time. Finally the code storage devices S2801, S2802, S2803 and S2804 respectively register the digits 0, 0, 9 and 9, corresponding to the directory number of the line terminal of the private subscriber line 407 extending to the calling private subscriber substation TP, whereby the respectively associated groups of WXYZ marking leads 2801, 2802, 2803 and 2804 are respectively marked in accordance with the digits 0, 0. 9 and 9.

In the storage transfer switch U2820 the wiper 2821 first successively engages the contacts in the associated contact bank; then the wiper 2822 successively engages the contacts in the associated contact bank; and, finally, the wiper 2823 successively engages the contacts in the associated contact bank. When the wipers noted of the storage transfer switch U2820 are driven thirty-three steps in the clockwise direction away from their home positions the wiper 2825 thereof engages the thirty-third contact in the associated contact bank terminating the conductor C1775, whereby a circuit is completed for energizing the upper winding of the wiper switch relay R2030. The last-mentioned circuit extends from ground by way of the contacts 1768, C2421, the wiper 2825 of the storage transfer switch U2820 and the engaged thirty-third contact in the associated contact bank, C1775, the contacts 1762 and 2033 and the upper winding of R2030 to battery. When thus energized the wiper switch relay R2030 operates partially, thereby to complete, at the contacts 2034, an obvious path, including the grounded hold conductor C2772, for short-circuiting the lower winding thereof. When the wiper 2825 of the storage transfer switch U2820 is driven an additional step in the clockwise direction it disengages the thirty-third contact in the associated contact bank, thereby to interrupt the above-traced original circuit for energizing the upper winding of the wiper switch relay R2030; whereupon an obvious holding circuit, including the contacts 2034 and the grounded hold conductor C2772, is completed for energizing in series the upper and lower windings of the wiper switch relay R2030. When thus energized the wiper switch relay R2030 operates completely; thereby to interrupt, at the contacts 2033, a further point in the previously traced original circuit for energizing the upper winding thereof and to interrupt, at the contacts 2036, the previously traced original circuit for energizing the lower winding of the code pulse relay R1850. Also the wiper switch relay R2030 completes, at the contacts 2035, an alternative circuit for energizing the lower winding of the code pulse relay R1850. The last-mentioned circuit extends from the wiper 2826 of the storage transfer switch U2820 and the engaged grounded thirty-fourth contact in the associated contact bank by way of C2175, the contacts 2035, 1763, 1852 and the lower winding of R1850 to battery. Further the wiper switch relay R2030 interrupts, at the contacts 2038, a further point in the previously traced circuit, including the multiple connected wipers 2821 and 2822 of the storage transfer switch U2820, for energizing the winding of the mark relay R1830; and prepares, at the contacts 2037, a substantially identical alternative circuit, including C2176 and the wiper 2823 of the storage transfer switch U2820, for energizing the winding of the mark relay R1860.

The wipers noted of the storage transfer switch U2820 are driven four additional steps in the clockwise direction, whereupon the wiper 2826 thereof disengages the thirty-seventh contact in the associated contact bank and engages the thirty-eighth contact therein; whereby the previously traced alternative circuit for energizing the lower winding of the code pulse relay R1850 is interrupted and an alternative circuit substantially identical to that previously traced, and including the contacts 2735 for energizing the lower winding of the code pulse relay R1850, is completed in the event the sequence relay R2730 occupies its operated position at this time, indicating that the first numerical digit 1 has been registered in the first numerical switch D2510. The wipers noted of the storage transfer switch U2820 are driven four additional steps in the clockwise direction, whereupon the wiper 2826 thereof disengages the forty-first contact in the associated contact bank and engages the forty-second contact therein; whereby the previously traced alternative circuit for energizing the lower winding of the code pulse relay R1850, and including the contacts 2735, is interrupted and an alternative circuit substantially identical to that previously traced, and including the contacts 2747 for energizing the lower winding of the code pulse relay R1850, is completed in the event the sequence relay R2740 occupies its operated position at this time, indicating that the second numerical digit 2 has been registered in the second numerical switch E2520. The wipers noted of the storage transfer switch U2820 are driven four additional steps in the clockwise direction, whereupon the wiper 2826 thereof disengages the forty-fifth contact in the associated contact bank and engages the forty-sixth contact therein; whereby the previously traced alternative circuit for energizing the lower winding of the code pulse relay R1850, and including the contacts 2747, is interrupted and an alternative circuit substantially identical to that previously traced, and including the contacts 2757 for energizing the lower winding of the code pulse relay R1850, is completed in the event the sequence relay R2750 occupies its operated position at this time, indicating that the third numerical digit 3 has been registered in the third numerical switch F2600. The wipers noted of the storage transfer switch U2820 are driven four additional steps in the clockwise direction, whereupon the wiper 2826 thereof disengages the forty-ninth contact in the associated contact bank and engages the home contact therein; whereby the previously traced alternative circuit for energizing the lower winding of the code pulse relay R1850, and including the contacts 2757, is interrupted and an alternative circuit substantially identical to that previously traced, and including the contacts 2765 for energizing the lower winding of the code pulse relay R1850, is completed in the event the sequence relay R2760 occupies its operated position at this time, indicating that the fourth numerical digit 4 has been registered in the fourth numerical switch G2610. The wipers noted of the storage transfer switch U2820 are driven four additional steps in the clockwise direction, whereupon the wiper 2826 thereof disengages the third contact in the associated contact bank and engages the fourth contact therein; whereby the previously traced alternative circuit for energizing the lower winding of the code pulse relay R1850, and including the contacts 2765, is interrupted.

When the wiper 2823 of the storage transfer switch U2820 engages the fourth contact in the associated contact bank, the previously mentioned circuit for operating the last digit send relay R1720 is completed, as previously explained. More particularly, at this time, a circuit is completed for energizing the winding of the last digit send relay R1720 in series with the winding of the mark relay R1860; this circuit extending from ground by way of the winding of R1720, C1774, the wiper 2823 of the storage transfer switch U2820 and the engaged fourth contact in the associated contact bank, C2176, the contacts 2037 and the winding of R1860 to battery. When this series circuit is completed, both the last digit send relay R1720 and the mark relay R1860 operate. Upon operating, the mark relay R1860 prepares, at the contacts 1861, the previously mentioned path for applying direct ground potential to the conductor C1872; which path is again completed upon the next operation of the code pulse relay R1850, as explained more fully hereinafter. Finally, when the wiper 2826 of the storage transfer switch U2820 engages the fourth contact in the associated contact bank, a further alternative circuit for energizing the lower winding of the code pulse relay R1850 is prepared; which circuit is completed when the wiper 2303 of the digit sequence switch T2300 engages the twelfth contact in the associated contact bank indicating that all of the routing and numerical digits have been transmitted by the digit pulse relay R1840 to the impulse relay R960 in the toll ticket repeater 800, in the manner previously explained. The last-mentioned circuit extends from the grounded wiper 2303 of the digit sequence switch T2300 and the engaged twelfth contact in the associated contact bank, C2372, the wiper 2826 of the storage transfer switch U2820 and the engaged fourth contact in the associated contact bank, C2175, the contacts 2035, 1763 and 1852 and the lower winding of R1850 to battery. When this circuit is completed the code pulse relay R1850 again operates and restores; thereby to cause the wipers noted of the storage transfer switch U2820 to be driven an additional step in the clockwise direction and to cause direct ground potential to be again applied to the conductor C1872. It is noted that this application of direct ground potential to the conductor C1872 occurs subsequent to the transmission of the last code digit from the storage transfer switch U2820 and is utilized in the toll ticket repeater 800, for a purpose more fully explained hereinafter.

Incident to the operation and subsequent restoration of the code pulse relay R1850 the wipers noted of the storage transfer switch U2820 are driven an additional step in the clockwise direction, in the manner previously explained; whereupon the wiper 2826 of the storage transfer switch U2820 disengages the fourth contact in the associated contact bank, thereby to interrupt the previously traced circuit for energizing the lower winding of the code pulse relay R1850 in order to arrest further operation of the latter relay at this time. Also, when the wiper 2823 of the storage transfer switch U2820 disengages the fourth contact in the associated contact bank the previously traced circuit for energizing in series the winding of the last digit send relay R1720 and the winding of the mark relay R1860 is interrupted, thereby to cause the relays mentioned to restore. Also, at this time, the wiper 2824 of the storage transfer switch U2820 engages the fifth contact in the associated contact bank, thereby to complete a circuit for energizing the lower winding of the release relay R2210; the last-mentioned circuit extends from ground by way of the contacts 1768, C2421, the wiper 2824 of the storage transfer switch U2820 and the engaged fifth contact in the associated contact bank, C2174, the contacts 2032, C2389 and the lower winding of R2210 to battery. When thus energized the release relay R2210 operates to effect the release of the register translator 1700 and the primary register 1200, in a manner more fully explained hereinafter.

Referring now to the toll ticket repeater 800, it is noted that the groups of WXYZ marking leads respectively extending to the code storage devices S1121 to S1126, inclusive, are terminated in a clockwise direction in the contact bank associated with the wiper 1101 of the register and timer switch R1100; the group of WXYZ marking leads extending both to the code storage device S1127 is terminated both in the left-hand side of the contact bank associated with the wiper 1101 and the right-hand side of the contact bank associated with the wiper 1102 of the register and timer switch R1100; the groups of WXYZ marking leads respectively extending to the code storage devices S1128 to S1134, inclusive, are terminated in a clockwise direction in the contact bank associated with the wiper 1102 of the register and timer switch R1100; while the group of WXYZ marking leads extending to the code storage device S1135 is terminated in a clockwise direction in the contact bank associated with the wiper 1103 of the register and timer switch R1100. During the operation of the register and timer switch R1100 the wiper 1101 first sequentially engages the contacts in the associated contact banks; then the wiper 1102 sequentially engages the contacts in the associated contact banks; and finally the wiper 1103 sequentially engages the contacts in the associated contact banks.

Each time the step relay R920 operates and then restores it completes and then interrupts, at the contacts 921, an obvious circuit, including C974, for energizing the magnet RM1106, thereby to cause the latter magnet to operate and restore; whereupon the wipers noted of the register and timer switch R1100 are driven one step in the clockwise direction. Each time the code relay R910 operates and restores it completes and then interrupts, at the contacts 911, a path for applying ground potential to the multiple connected wipers 1101 and 1102 or to the wiper 1103 of the register and timer switch R1100, depending upon the restored or operated position of the wiper switching relay R930. When the wiper switching relay R930 occupies its restored position ground potential is applied by way of the contacts 911 and 935 and C979 to the multiple connected wipers 1101 and 1102 of the register and timer switch R1100; and when the wiper switching relay R930 occupies its operated position ground potential is applied by way of the contacts 911 and 934 and C978 to the wiper 1103 of the register and timer switch R1100. When the wipers noted of the register and timer switch R1100 are driven twenty-four steps in the clockwise direction the wiper 1105 thereof engages the twenty-fourth contact in the associated contact bank, whereupon a circuit is completed for energizing the lower winding of the wiper switching relay R930; the last-mentioned circuit extending from ground by way of the contacts 833, C877, the wiper 1111 of the storage transfer switch S1110 and the engaged home contact in the associated contact bank, C874, the contacts 832, C876, the wiper 1105 of the register and timer switch R1100 and the engaged twenty-fourth contact in the associated contact bank, C873, the contacts 838 and 933 and the lower winding of 930 to battery. When thus energized the wiper switching relay R930 operates partially, thereby to complete, at the contacts 931, an obvious path, including the contacts 836, for short-circuiting the upper winding thereof. Subsequently, when the wipers noted of the register and timer switch R1100 are driven back into their home positions the wiper 1105 thereof disengages the twenty-fourth contact in the associated contact bank, thereby to interrupt the previously traced original circuit for energizing the lower winding of the wiper switching relay R930; whereupon a holding circuit, including the contacts 836 and 931, is completed for energizing in series the upper and lower windings thereof. When thus energized the wiper switching relay R930 operates fully, thereby to interrupt, at the contacts 933, a further point in the previously traced original circuit for energizing the lower winding thereof. Also the wiper switching relay R930 interrupts, at the contacts 935, a further point in the previously traced path for applying ground potential to the multiple connected wipers 1101 and 1102 of the register and timer switch R1100; and prepares, at the contacts 934, the previously traced path for applying ground potential to the wiper 1103 of the register and timer switch R1100.

In view of the foregoing description of the operation of the storage transfer switch U2820 in the register translator 1700 and the register and timer switch R1100 in the toll ticket repeater 800, it will be understood that each time the code pulse relay R1850 operates it completes, at the contacts 1853, the previously traced circuit for energizing the magnet UM2827; and completes, at the contacts 1851, the previously traced path for applying either resistance or direct ground potential to the conductor C1872, thereby to cause operation of the step relay R920; whereupon the step relay R920 operates to complete, at the contacts 921, the previously traced circuit for energizing the magnet RM1106. Hence, the magnets UM2827 and RM1106 are energized and deenergized in synchronism, thereby to cause the storage transfer switch U2820 in the register translator 1700 and the register and timer switch R1100 in the toll ticket repeater 800 to be operated in synchronism. Accordingly it will be understood that the wipers noted of the storage transfer switch U2820 successively engage the conductors in the various groups of WXYZ marking leads previously noted; while the wipers noted of the register and timer switch R1100 successively engage the various conductors in the groups of WXYZ marking leads extending to the code storage devices S1121 to S1135, inclusive. Accordingly the code markings corresponding to the different digits appearing upon the conductors in the various groups of WXYZ marking leads associated with the storage transfer switch U2820 are transferred to corresponding ones of the code storage devices S1121 to S1135, inclusive, associated with the register and timer switch R1100.

By way of example, it is pointed out that the W and Y conductors in the group of WXYZ marking leads 2805 are marked with ground potential corresponding to the first code digit 2. Thus, when the wiper 2821 of the storage transfer switch U2820 engages the home and second contacts in the associated contact bank, ground potential on the W and Y conductors in the group of WXYZ marking leads 2805 is encountered; on the other hand, when the wiper 2821 of the storage transfer switch U2820 engages the first and third contacts in the associated contact bank, no ground potential on the X and Z conductors in the group of WXYZ marking leads 2805 is encountered. Accordingly the register translator 1700 transmits a direct ground impulse, then a resistance ground impulse, then a direct ground impulse and then a resistance ground impulse over the conductor C1872. The two direct ground impulses and the two resistance ground impulses cause four complete operations of the step relay R920, thereby to cause the wipers noted of the register and timer switch R1100 to be driven four steps in the clockwise direction, in the manner previously explained; however, only the first and third of the four impulses, the direct ground impulses, cause operation of the code relay R910. Thus the code relay R910 is operated at times when the wiper 1101 of the register and timer switch R1100 engages the home and second contacts in the associated contact banks, thereby to complete circuits for energizing the W and Y relays in the code storage device S1121. The circuit for energizing the W relay in the code storage device S1121 extends from ground by way of the contacts 911 and 935, C979, the wiper 1101 of the register and timer switch R1100 and the engaged home contact in the associated contact bank and the W relay to battery. The W and Y relays in the code storage device S1121 operate, thereby to mark with ground potential the W and Y conductors in the associated group of WXYZ marking leads 1121 in accordance with the first code digit 2, in the manner previously explained.

At the conclusion of the cycle of operation of the storage transfer switch U2820 in the register translator 1700 and the register and timer switch R1100 in the toll ticket repeater 800, the various items of record information stored in the various registers in the register translator 1700 have been transferred to the various code storage devices S1121 to S1135, inclusive, in the toll ticket repeater 800, and represent the following information, as indicated below:

| Register in Register Translator 1700 Transferred From— | Code Storage Device in Toll Ticket Repeater 800 Transferred to— | Nature of Record Information |
|---|---|---|
| First code switch A2400 | S1121 | The respective first, second and third digits of the code portion of the directory number of the called subscriber substation identifying the zone and exchange thereof, the digits 2, 7 and 9. |
| Second code switch B2410 | S1122 | |
| Third code switch C2500 | S1123 | |
| Code storage device S2801 | S1124 | The respective first, second, third and fourth digits of the numerical portion of the directory number of the calling subscriber substation identifying the line terminal thereof, the digits 0, 0, 9 and 9. |
| Code storage device S2802 | S1125 | |
| Code storage device S2803 | S1126 | |
| Code storage device S2804 | S1127 | |
| Rate and route switch R2310 | S1128 | The complementary digit of the rate factor digit applicable to the toll call between the calling subscriber substation in exchange 4 zone 84 and the called subscriber substation in exchange 9 zone 27, the complementary digit 8 of the rate factor digit 3. |
| Terminal block B2770 | S1129 | The digit identifying the register translator 1700 utilized, the digit 6. |
| The special service relay R2040 | S1130 | The digit 0 indicating that the calling subscriber substation is rendered extended service, no digit being registered. |
| The code send relay R1750 | S1131 | The digit 0 indicating that the code portion of the directory number of the called subscriber substation identifying the zone and the exchange thereof comprises only two digits, no digit being registered. |
| First numerical switch D2510 | S1132 | The respective first, second, third and fourth digits of the numerical portion of the directory number of the called subscriber substation identifying the line terminal thereof, the digits 1, 2, 3 and 4. |
| Second numerical switch E2520 | S1133 | |
| Third numerical switch F2600 | S1134 | |
| Fourth numerical switch G2610 | S1135 | |

It is noted that the direct ground and resistance ground impulses transmitted by the code pulse relay R1850 to the step relay R920 and the code relay R910 are transmitted simultaneously with the transmission of the impulses by the digit pulse relay R1840 to the impulse relay R960. The impulses transmitted to the step relay R920 and the code relay R910 constitute code digits corresponding to record information digits; while the impulses transmitted to the impulse relay R960 constitute numerical digits corresponding to switch control digits. In view of the connection and arrangement of the register translator 1700, previously described, the code digits are completely transmitted therefrom prior to the transmission of the last numerical digit therefrom.

As previously pointed out, after all of the code digits and all of the numerical digits have been transmitted from the register translator 1700 to the toll ticket repeater 800, the register translator 1700 operates to transmit another direct ground impulse over the conductor C1872; whereby the step relay R920 and the code relay R910 in the toll ticket repeater 800 reoperate. At this time the wiper 1103 of the register and timer switch R1100 engages the fourth contact in the associated contact bank. Hence, when the code relay R910 operates it completes, at the contacts 911, a circuit, including the contacts 934, C978, the wiper 1103 of the register and timer switch R1100 and the engaged fourth contact in the associated contact bank and C975, for energizing the winding of the switch-through relay R950. When thus energized the switch-through relay R950 operates to complete, at the contacts 956, an obvious holding circuit, including the grounded hold conductor C889, for energizing the winding thereof. Also, when the step relay R920 operates and restores it completes and then interrupts, at the contacts 921, the previously traced circuit for energizing the magnet RM1106 of the register and timer switch R1100; whereby the wipers noted thereof are driven an additional step in the clockwise direction, in the manner previously explained.

Also, upon operating, the switch-through relay R950 completes, at the contacts 953 and 955, a connection between the upper winding of the impulse relay R960 and the line conductor C781 of the trunk 780; this connection extending from ground by way of the upper winding of R960, the contacts 955, the winding 901 of the repeater 900 and the contacts 953 to the line conductor C781 of the trunk 780. It is again noted that the line conductor C782 of the trunk 780 is connected by way of the winding 902 of the repeater 900 and the lower winding of the impulse relay R960 to battery. Further the switch-through relay R950 interrupts, at the contacts 954, a further point in the previously traced circuit for energizing in series the windings of the step relay R920 and the code relay R910, thereby positively to prevent operation of the latter relays at this time. Further the switch-through relay R950 completes, at the contacts 951, an obvious circuit for energizing the right-hand winding of the answer relay R940; however, the latter relay does not operate at this time as it is of the shunt field type. Further the switch-through relay R950 interrupts, at the contacts 952, the previously traced impulsing bridge between the line conductors of the trunk 907 extending to the toll selector 513; whereupon an obvious circuit, including the contacts 961 and the windings 903 and 904 of the repeater 900, is completed for energizing the left-hand winding of the answer relay R940 over the trunk 907 extending to the toll selector 513. However, the answer relay R940 does not operate at this time as it is of the shunt field type, as previously noted.

Finally the switch-through relay R950 completes, at the contacts 957, a circuit for energizing the magnet RM1106 of the register and timer switch R1100. This circuit extends from ground by way of the contacts 833, C877, the wiper 1111 of the storage transfer switch S1110 and the engaged home contact in the associated contact bank, C874, the contacts 832, C876, the wiper 1104 of the register and timer switch R1100 and the engaged contact in the associated contact bank, C886, the contacts 957, C977, the contacts 1107 and the magnet RM1106 to battery. When thus energized the magnet RM1106 operates intermittently, thereby to drive the wipers noted of the register and timer switch R1100 step by step in the clockwise direction back into their home positions. When the register and timer switch R1100 is thus released the wipers 1104 and 1105 thereof reengage the home contacts in the associated contact banks, thereby to interrupt the previously traced circuit for energizing the magnet RM1106 in order to arrest further operation of the register and timer switch R1100 at this time.

As previously explained, after all of the code digits and all of the numerical digits have been transmitted from the register translator 1700 the release relay R2210 therein operates. Upon operating, the release relay R2210 completes, at the contacts 2214, a circuit, including C2217, the contacts 2284, the wiper 2295 of the finder F2290, C1281 and the contacts 1263, for energizing the lower winding of the release relay R1430 in the primary register 1200. When thus energized the release relay R1430 operates to complete, at the contacts 1433, the previously traced circuit, including the hold conductor C1294, for energizing the upper winding thereof; and to interrupt, at the contacts 1432, the previously traced circuit for energizing the winding of the cut-in relay R630 in the primary selector 600, whereupon the latter relay restores.

In the primary selector 600 the cut-in relay R630 effects restoration of the send relay R620, in the manner previously explained, whereupon the latter relay completes, at the contacts 624 and 626, a loop circuit extending from the calling private subscriber substation TP for energizing in series the upper and lower windings of the impulse relay R960 in the toll ticket repeater 800, thereby to retain the latter relay in its operated position. The last-mentioned circuit extends from ground by way of the upper winding of R960, the contacts 955, the winding 901 of the repeater 900, the contacts 953, C781, the wiper 701 of the wiper set of the switch mechanism 700, the contacts 772 and 626 to the line conductor C464 of the trunk 462; and from battery by way of the lower winding of R960, the winding 902 of the repeater 900, C782, the wiper 702 of the wiper set of the switch mechanism 700 and the contacts 774 and 624 to the line conductor C463 of the trunk 462; the line conductors C463 and C464 of the trunk 462 being connected together by way of the line switch 423, the line conductors of the private subscriber line 407 and the bridge at the calling private subscriber substation TP. Accordingly, at this time, an operative connection is completed between the calling private subscriber substation TP and the toll line 470 extending to exchange 6 zone 45; and therefrom by way of the automatic switching apparatus in exchange 6 zone 45, in exchange 1 zone 27 and in exchange 9 zone 27 to the subscriber line extending to the called subscriber substation.

*Release of the primary register and the register translator*

In the primary register 1200, upon operating, the release relay R1430 not only completes, at the contacts 1433, the previously traced holding circuit for energizing the upper winding thereof and interrupts, at the contacts 1432, the previously traced holding circuit for energizing the winding of the cut-in relay R630 in the primary selector 600, all in the manner previously explained, but this relay also completes, at the contacts 1431, an alternative circuit for energizing the lower winding of the impulse relay R960 in the toll ticket repeater 800 prior to the release of the send relay R620 in the primary selector 600. The last-mentioned circuit extends from ground by way of the contacts 1431, C642, the wiper 612 of the finder F610, the contacts 623 and 774, the wiper 702 of the wiper set of the switch mechanism 700, C782, the winding 902 of the repeater 900 and the lower winding of R960 to battery. Further the release relay R1430 interrupts, at the contacts 1434, the previously mentioned circuit for energizing the winding of the hold relay R1240, thereby to cause the latter relay to restore shortly thereafter; the hold relay R1240 being of the slow-to-release type, as previously noted. Also, when the cut-in relay R630 in the primary selector 600 restores it interrupts, at the contacts 631 and 633, the previously traced loop circuit for energizing in series the upper and intermediate windings of the line relay R1450 in the primary register 1200, thereby to cause the latter relay to restore.

Upon restoring, the hold relay R1240 interrupts, at the contacts 1244, the previously mentioned circuit for energizing the winding of the lock relay R1460; thereby to cause the latter relay to restore shortly thereafter, the lock relay R1460 being of the slow-to-release type. Upon restoring, the lock relay R1460 interrupts, at the contacts 1461, the previously mentioned path for applying ground potential to the hold conductor C1294; thereby to interrupt the previously traced holding circuit for energizing the upper winding of the release relay R1430, whereupon the latter relay restores. Also when ground potential is removed from the hold conductor C1294 the alarm relay R1320, the busy relay R1380 and the party relays R1210, R1220 and R1230 restore in the event any one of these relays occupies its operated position at this time. Further the removal of ground potential from the hold conductor C1294 interrupts the previously traced holding circuit for energizing the winding of the translate relay R1270; thereby to cause the latter relay to restore and interrupt, at the contacts 1274, the previously traced holding circuit for energizing the winding of the test relay R1340, whereupon the latter relay restores. Upon restoring, the test relay R1340 interrupts, at the contacts 1344, the previously traced circuit for energizing the winding of the send relay R1370, thereby to cause the latter relay to restore.

Further when the lock relay R1460 restores it interrupts, at the contacts 1464, the previously mentioned path for short-circuiting the winding of the busy relay R1470; and completes, at the contacts 1462, a circuit for energizing the winding of the busy relay R1470 in series with the magnet AM1504 of the first code switch A1500. The last-mentioned circuit extends from ground by way of the winding of R1470, the wiper 1501 of the first code switch A1500 and the engaged contact in the associated contact bank, the contacts 1462 and 1505 and the magnet AM1504 to battery. When this series circuit is completed the busy relay R1470 operates and remains operated during the release of the various code switches A1500, B1510, etc., in view of the fact that it is of the slow-to-release type.

Also the magnet AM1504 operates intermittently, thereby to drive the wipers noted of the first code switch A1500 step by step in the counterclockwise direction back into their home positions. When the first code switch A1500 is thus released the wiper 1501 thereof reengages the home contact in the associated contact bank; whereupon the previously traced circuit for energizing the winding of the busy relay R1470 in series with the magnet AM1504 is interrupted and an obvious alternative circuit is completed for energizing the winding of the busy relay R1470 in series with the magnet BM1516 of the second code switch B1510.

The magnet BM1516 then operates intermittently, thereby to drive the wipers noted of the second code switch B1510 step by step in the counterclockwise direction back into their home positions. When the second code switch B1510 is thus released the wiper 1512 thereof reengages the home contact in the associated contact bank; whereupon the previously traced circuit for energizing the winding of the busy relay R1470 in series with the magnet BM1516 is interrupted and an obvious alternative circuit is completed for energizing the winding of the busy relay R1470 in series with the magnet CM1526 of the third code switch C1520. The magnet CM1526 then operates intermittently, thereby to drive the wipers noted of the third code switch C1520 step by step in the counterclockwise direction back into their home positions. When the third code switch C1520 is thus released the wiper 1522 thereof reengages the home contact in the associated contact bank, whereupon the previously traced circuit for energizing the winding of the busy relay R1470 in series with the magnet CM1526 is interrupted and an obvious alternative circuit is completed for energizing the winding of the busy relay R1470 in series with the magnet DM1625 of the first numerical switch D1620.

The magnet DM1625 then operates intermittently, thereby to drive the wipers noted of the first numerical switch D1620 step by step in the counterclockwise direction back into their home positions. When the first numerical switch D1620 is thus released the wiper 1622 thereof reengages the home contact in the associated contact bank, whereupon the previously traced circuit for energizing the winding of the busy relay R1470 in series with the magnet DM1625 is interrupted and an obvious alternative circuit is completed for energizing the winding of the busy relay R1470 in series with the magnet SM1636 of the sequence switch S1630.

The magnet SM1636 then operates intermittently, thereby to drive the wipers noted of the sequence switch S1630 step by step in the counterclockwise direction back into their home positions. When the sequence switch S1630 is thus released the wiper 1632 thereof reengages the home contact in the associated contact bank, whereupon the previously traced circuit for energizing the winding of the busy relay R1470 in series with the magnet SM1636 is interrupted. Shortly thereafter the busy relay R1470 restores, the latter relay being of the slow-to-release type, as previously noted. Upon restoring, the busy relay R1470 interrupts, at the contacts 1471, an obvious path, including the contacts 1242, for applying ground potential to the test conductor C646 accessible to the various finders F610 etc. In order to mark the primary register 1200 as idle thereto. At this time the primary register 1200 is completely released and available for further use.

When the primary register 1200 is released in the manner explained above, ground potential is removed from the conductor C1282, thereby to interrupt the previously traced circuit for energizing the upper and lower windings of the cut-in relay R2140 in series with the magnet FM2299 of the finder F2290, whereupon the cut-in relay R2140 restores. Upon restoring, the cut-in relay R2140 interrupts, at the contacts 2143, the previously mentioned path for applying ground potential to the test conductor C1652; and completes, at the contacts 2144, an obvious alternative path, including the contacts 2211, for applying ground potential to the test conductor C1652; whereby the register translator 1700 is retained marked as busy to the register translator allotter 1600, in the manner previously explained. Further the cut-in relay R2140 interrupts, at the contacts 2145, the previously traced circuit for energizing the winding of the switch relay R2280 in series with the winding of the hold relay R2130, thereby to cause the relays mentioned to restore. Upon restoring, the switching relay R2280 interrupts, at the contacts 2288, a further point in the previously traced circuit for energizing the winding of the timer relay R2270, thereby positively to arrest further operation of the latter relay at this time. Upon restoring, the hold relay R2130 interrupts, at the contacts 2137, the previously traced holding circuits for energizing the various WXYZ magnets in the code storage devices S2801 to S2804, inclusive, whereby the code storage devices mentioned are released. Also the hold relay R2130 interrupts, at the contacts 2136, the previously mentioned path for applying ground potential to the hold conductor C2772; thereby to interrupt the previously traced holding circuit for energizing in series the upper and lower windings of the wiper switching relay R2030 and the previously traced holding circuits for energizing in series the right-hand and left-hand windings of the various sequence relays R2710 to R2760, inclusive, whereby the relays mentioned restore. Further the hold relay R2130 completes, at the contacts 2133, a circuit for energizing the upper winding of the release relay R2210 in series with the release magnet MM2264 of the timer switch M2260. The last-mentioned circuit extends from ground by way of the fuse alarm 2840, the wiper 2832 of the sender switch S2830 and the engaged home contact in the associated contact bank, C2218, the upper winding of R2210, the contacts 2133, the contacts 2266 of the set of switch springs SM2265 and the release magnet MM2264 to battery. When thus energized the release magnet MM2264 operates in order to release the wipers noted of the timer switch M2260, whereby the wipers thereof are returned to their home positions. When the timer switch M2260 is thus released the set of switch springs SM2265 is actuated; whereby there is interrupted, at the contacts 2266 thereof, the previously traced circuit for energizing the upper winding of the release relay R2210 in series with the release magnet MM2264 of the timer switch M2260, and there is completed, at the contacts 2267 thereof, an alternative circuit for energizing the upper winding of the release relay R2210 in series with the release magnet PM2342 of the composite code switch P2330. The last-mentioned circuit extends from ground by way of the previously traced path including the upper winding of the release relay R2210, the contacts 2267 of the set of switch springs SM2265, C2325, the contacts 2345 of the set of switch springs PS2343 and the release magnet PM2342 to battery.

When thus energized the release magnet PM2342 operates to release the wiper set of the composite code switch P2330 and to cause it to be returned to its normal rotary and vertical positions. When the composite code switch P2330 is thus released the set of switch springs PS2343 is actuated, thereby to interrupt, at the contacts 2345 thereof, the above-traced circuit for energizing the upper winding of the release relay R2210 in series with the release magnet PM2342 of the composite code switch P2330; and to complete, at the contacts 2344 thereof, an alternative circuit for energizing the upper winding of the release relay R2210 in series with the release magnet RM2322 of the rate and route switch R2310. The last-mentioned circuit extends from ground by way of the previously traced path including the upper winding of the release relay R2210, the contacts 2344 of the set of switch springs PS2343, the contacts 2326 of the set of switch springs RS2324 and the release magnet RM2322 to battery. When thus energized the release magnet RM2322 operates, thereby to release the wiper set of the rate and route switch R2310; whereupon it is returned to its rotary and vertical positions. When the rate and route switch R2310 is thus released the set of switch springs RS2324 is actuated, thereby to interrupt, at the contacts 2326 thereof, the previously traced circuit for energizing the upper winding of the release relay R2210 in series with the release magnet RM2322 of the rate and route switch R2310.

When the rate and route switch R2310 is thus released the set of switch springs RS2324 is actuated, as noted above, thereby to interrupt, at the contacts 2325 thereof, the previously traced multiple holding circuits for energizing the lower windings of the transfer relay R1930 and the stop relay R1940, whereupon the relays mentioned restore. Upon restoring, the stop relay R1940 interrupts, at the contacts 1943, the previously traced circuit for energizing the winding of the switch cutoff relay R1820, thereby to cause the latter relay to restore. Upon restoring, the switch cutoff relay R1820 interrupts, at the contacts 1821, the previously traced circuit for energizing the winding of the digit pulse start relay R1710, thereby to cause the latter relay to restore. Upon restoring, the digit pulse start relay R1710 interrupts, at the contacts 1715, the previously traced circuit for energizing the upper winding of the digit pulse relay R1840, thereby positively to arrest further operation of the latter relay at this time. Further the digit pulse start relay R1710 interrupts, at the contacts 1719, the previously traced holding circuits for energizing the windings of the code send relay R1730, the detector start relay R1760 and the special service cutoff relay R1810; thereby to cause the relays mentioned to restore, the special service cutoff relay R1810 being of the slow-to-release type. Upon restoring, the detector start relay R1760 interrupts, at the contacts 1760, the previously traced holding circuit for energizing the winding of the detector release relay R2240, thereby to cause the latter relay to restore.

Furthermore, upon restoring, the hold relay R2130 completes, at the contacts 2134, a multiple circuit for energizing the upper winding of the release relay R2210 in series with the magnet TM2305 of the digit sequence switch T2300. The last-mentioned circuit extends from ground by way of the fuse alarm 2840, the wiper 2832 of the sender switch S2830 and the engaged home contact in the associated contact bank, C2218, the upper winding of R2210, the contacts 2134, C2365, the wiper 2301 of the digit sequence switch T2300 and the engaged contact in the associated contact bank, the contacts 2306 and the magnet TM2305 to battery. When thus energized the magnet TM2305 operates intermittently, thereby to drive the wipers noted of the digit sequence switch T2300 step by step in the counterclockwise direction back into their home positions. When the digit sequence switch T2300 is thus released the wiper 2301 thereof reengages the home contact in the associated contact bank, thereby to interrupt the previously traced circuit for energizing the upper winding of the release relay R2210 in series with the magnet TM2305 of the digit sequence switch T2300 and to complete an alternative circuit for energizing the upper winding of the release relay R2210 in series with the magnet NM2625 of the party switch N2620. The last-mentioned circuit extends from ground by way of the previously traced path including the upper winding of the release relay R2210, the wiper 2301 of the digit sequence switch T2300 and the engaged home contact in the associated contact bank, C2367, the contacts 2132, C2633, the wiper 2621 of the party switch N2620 and the engaged contact in the associated contact bank, the contacts 2626 and the magnet NM2625 to battery.

The magnet NM2625 then operates intermittently, thereby to drive the wipers noted of the party switch N2620 step by step in the counterclockwise direction back into their home positions. When the party switch N2620 is thus released the wiper 2621 thereof reengages the home contact in the associated contact bank; thereby to interrupt the previously traced circuit for energizing the upper winding of the release relay R2210 in series with the magnet NM2625 and to complete an obvious alternative circuit for energizing the upper winding of the release relay R2210 in series with the magnet GM2615 of the fourth numerical switch G2610.

The magnet GM2615 then operates intermittently, thereby to drive the wipers noted of the fourth numerical switch G2610 step by step in the counterclockwise direction back into their home positions. When the fourth numerical switch G2610 is thus released the wiper 2611 thereof reengages the home contact in the associated contact bank; thereby to interrupt the previously traced circuit for energizing the upper winding of the release relay R2210 in series with the magnet GM2615 and to complete an obvious alternative circuit for energizing the upper winding of the release relay R2210 in series with the magnet FM2605 of the third numerical switch F2600.

The magnet FM2605 then operates intermittently, thereby to drive the wipers noted of the third numerical switch F2600 step by step in the counterclockwise direction back into their home positions. When the third numerical switch F2600 is thus released the wiper 2601 thereof reengages the home contact in the associated contact bank; thereby to interrupt the previously traced circuit for energizing the upper winding of the release relay R2210 in series with the magnet FM2605 and to complete an obvious alternative circuit for energizing the upper winding of the release relay R2210 in series with the magnet EM2525 of the second numerical switch E2520.

The magnet EM2525 then operates intermittently, thereby to drive the wipers noted of the second numerical switch E2520 step by step in the counterclockwise direction back into their home positions. When the second numerical switch E2520 is thus released the wiper 2521 thereof reengages the home contact in the associated contact bank, thereby to interrupt the previously traced circuit for energizing the upper winding of the release relay R2210 in series with the magnet EM2525 and to complete an obvious alternative circuit for energizing the upper winding of the release relay R2210 in series with the magnet DM2515 of the first numerical switch D2510.

The magnet DM2515 then operates intermittently, thereby to drive the wipers noted of the first numerical switch D2510 step by step in the clockwise direction back into their home positions. When the first numerical switch D2510 is thus released the wiper 2511 thereof reengages the home contact in the associated contact bank, thereby to interrupt the previously traced circuit for energizing the upper winding of the release relay R2210 in series with the magnet DM2515 and to complete an obvious alternative circuit for energizing the upper winding of the release relay R2210 in series with the magnet CM2505 of the third code switch C2500.

The magnet CM2505 then operates intermittently, thereby to drive the wipers noted of the third code switch C2500 step by step in the clockwise direction back into their home positions. When the third code switch C2500 is thus released the wiper 2501 thereof reengages the home contact in the associated contact bank, thereby to interrupt the previously traced circuit for energizing the upper winding of the release relay R2210 in series with the magnet CM2505 and to complete an obvious alternative circuit for energizing the upper winding of the release relay R2210 in series with the magnet BM2415 of the second code switch B2410.

The magnet BM2415 then operates intermittently, thereby to drive the wipers noted of the second code switch B2410 step by step in the clockwise direction back into their home positions. When the second code switch B2410 is thus released the wiper 2411 thereof reengages the home contact in the associated contact bank, thereby to interrupt the previously traced circuit for energizing the upper winding of the release relay R2210 in series with the magnet BM2415 and to complete an obvious alternative circuit for energizing the upper winding of the release relay R2210 in series with the magnet AM2406 of the first code switch A2400.

The magnet AM2406 then operates intermittently, thereby to drive the wipers noted of the first code switch A2400 step by step in the clockwise direction back into their home positions. When the first code switch A2400 is thus released the wiper 2401 thereof reengages the home contact in the associated contact bank, thereby to interrupt the previously traced circuit for energizing the upper winding of the release relay R2210 in series with the magnet AM2406 and to complete an alternative circuit for energizing the upper winding of the release relay R2210 in series with the magnet UM2827 of the storage transfer switch U2820. The last-mentioned circuit extends from ground by way of the previously traced path including the upper winding of the release relay R2210, the wiper 2401 of the first code switch A2400 and the engaged home contact in the associated contact bank, the contacts 1769, C2421, the wiper 2824 of the storage transfer switch U2820 and the engaged contact in the associated contact bank, C1771, the contacts 1711, C1772, the contacts 2828 and the magnet UM2827 to battery.

The magnet UM2827 then operates intermittently, thereby to drive the wipers noted of the storage transfer switch U2820 step by step in the clockwise direction back into their home positions. When the storage transfer switch U2820 is thus released the wiper 2824 thereof reengages the home contact in the associated contact bank, thereby to interrupt the previously traced circuit for energizing the upper winding of the release relay R2210 in series with the magnet UM2827. At this point it is noted that the release relay R2210 remains operated until the storage transfer switch U2820 is released, as described above, and then restores shortly thereafter; the release relay R2210 being of the slow-to-release type.

Upon restoring, the release relay R2210 interrupts, at the contacts 2211, the previously traced path for applying ground potential to the test conductor C1652, thereby to mark the register translator 1700 as idle to the register translator allotter 1600. Also the release relay R2210 completes, at the contacts 2212, the previously traced path, including the contacts 2144 and the contacts 2221 of the busy key K2220, for applying ground potential to the conductor C1653 extending to the register translator allotter 1600; thereby to indicate thereto that there is an idle register translator in the associated group, in the manner previously explained. At this time the register translator 1700 is completely released and available for further use.

At this point it is noted that the register translator 1700 may be marked as busy to the register translator allotter 1600 merely by operating the busy key K2220, thereby to complete, at the contacts 2222 thereof, an obvious path, including the contacts 2144 and 2212, for applying ground potential to the test conductor C1652 extending to the register translator allotter 1600. Also when the busy key K2220 is thus operated there is interrupted, at the contacts 2221 thereof, the previously traced path for applying ground potential in the register translator 1700 to the conductor C1653 extending to the register translator allotter 1600. At this time ground potential is removed from the conductor C1653 unless one of the other register translators in the associated group is idle, as previously explained.

Further it is noted that the rate of impulsing of the register translator 1700 may be tested by inserting the plug of a suitable test set into the test jack J2045. When the plug of the test set is inserted into the test jack J2045 there is prepared, at the tip and ring thereof, a circuit for energizing the winding of the pulse test relay R2020; which circuit is completed only in the event that the register translator 1700 is idle at this time and the busy key K2220 occupies its normal position, both the cut-in relay R2140 and the release relay R2210 occupying their restored positions. The above-mentioned circuit extends, when completed, from ground by way of the contacts 2223 of the busy key K2220, the contacts 2216, 2146 and 2023, the tip and the ring of the test jack J2045, the tip and the ring of the test plug, the connection in the test set and the winding of R2020 to battery. When thus energized the pulse test relay R2020 operates to complete, at the contacts 2022, an obvious holding circuit substantially identical to that previously traced for energizing the winding thereof; and to interrupt, at the contacts 2023, the above-traced original operating circuit for energizing the winding thereof. Also the pulse test relay R2020 interrupts, at the contacts 2025, a further point in the previously traced impulse circuit extending from the register translator 1700 to the finder F2290, thereby positively to prevent the operation of the register translator 1700 from affecting external circuits. Finally the pulse test relay R2020 completes, at the contacts 2021, an obvious circuit for energizing the lower winding of the release relay R2210, thereby to cause the latter relay to operate; and completes, at the contacts 2024, an obvious circuit for energizing the winding of the digit pulse start relay R1710, thereby to cause the latter relay to operate. Upon operating, the release relay R2210 interrupts, at the contacts 2212, the previously traced path for applying ground potential to the conductor C1653; and completes, at the contacts 2211, the previously traced path for applying ground potential to the test conductor C1652. The application of ground potential to the test conductor C1652 and the removal of ground potential in the register translator 1700 from the conductor C1653, both extending to the register translator allotter 1600, accomplish the functions previously described.

Upon operating, the digit pulse start relay R1710 completes, at the contacts 1715, the previously traced circuit for energizing the upper winding of the digit pulse relay R1840; whereby the latter relay operates and restores intermittently, in the manner previously explained. Each time the digit pulse relay R1840 operates and restores it interrupts and then recompletes, at the contacts 1843, an impulsing circuit, including the contacts 1718, the sleeve of the test jack J2045 and the sleeve of the test plug of the test set, whereby impulses are transmitted to the test set. Accordingly the test set may be calibrated to measure both the speed and the make and break ratio of the impulses transmitted by the digit pulse relay R1840 from the register translator 1700, in an obvious manner.

*Additional operation of the toll ticket repeater*

Again considering the operation of the toll ticket repeater 800, a connection has been established between the calling private subscriber substation TP in exchange 4 zone 84 and the subscriber line extending to the called subscriber substation in exchange 9 zone 27; which last-mentioned connection includes the line switch 423, the trunk 462, the primary selector 600, the trunk 780, the toll ticket repeater 800, the trunk 907, the toll selector 513 and the toll line 470 extending from exchange 4 zone 84 to exchange 6 zone 45. Also, at this time, a loop circuit is completed between the calling private subscriber substation TP and the upper and lower windings of the impulse relay R900 in the toll ticket repeater 800, as previously traced; and the previously traced circuit, including the toll selector 513, and the toll line 470, the switching apparatus in exchange 6 zone 45, the toll line extending from exchange 6 zone 45 to exchange 1 zone 27, the switching apparatus in exchange 1 zone 27, the trunk extending between exchange 1 zone 27 and exchange 9 zone 27 and the switching apparatus including the connector in exchange 9 zone 27, is completed for energizing the left-hand winding of the answer relay R940 in the toll ticket repeater 800.

In the event the called subscriber substation in exchange 9 zone 27 is busy at this time, busy tone current is returned from the connector in the switching apparatus in exchange 9 zone 27 over the previously traced connection to the left-hand winding of the answer relay R940 in the toll ticket repeater 800 by way of the windings 903 and 904 of the repeater 900. The busy tone current traversing the windings 903 and 904 of the repeater 900 induces busy tone voltage in the windings 901 and 902 thereof, whereby busy tone current is returned over the primary selector 600, the line switch 423 and the private subscriber line 407 to the calling private subscriber substation TP; thereby to indicate to the subscriber thereat that the called subscriber substation is busy, all in accordance with conventional practice. On the other hand, in the event the called subscriber substation in exchange 9 zone 27 is idle at this time, ringing current is projected over the subscriber line extending thereto and ring-back tone current is returned over the previously traced connection to the calling private subscriber substation TP; thereby to operate the ringer at the called subscriber substation and to give the subscriber at the calling private subscriber substation TP supervision.

When the subscriber at the called subscriber substation in exchange 9 zone 27 answers the call extending thereto an operative communication connection is completed thereto from the calling private subscriber substation TP in exchange 4 zone 84. Also, at this time, the connector in the automatic switching apparatus in exchange 9 zone 27 operates in order to cause ground and battery potentials to be reversed over the line conductors of the trunk 907; whereby the left-hand winding of the answer relay R940 in the toll ticket repeater 800 is energized in the opposite direction, causing the latter relay to operate. Upon operating, the answer relay R940 completes, at the contacts 943, a circuit for energizing the magnet SM1117 of the storage transfer switch S1110; this circuit extending from ground by way of the contacts 833, C877, the wiper 1111 of the storage transfer switch S1110 and the engaged home contact in the associated contact bank, C874, the contacts 832, C876, the wiper 1104 of the register and timer switch R1100 and the engaged home contact in the associated contact bank, the wiper 1112 of the storage transfer switch S1110 and the engaged home contact in the associated contact bank, C976, the contacts 943, C885, the contacts 1118 and the magnet SM1117 to battery. When thus energized the magnet SM1117 operates and restores, thereby to drive the wipers noted of the storage transfer switch S1110 one step in the counterclockwise direction, whereby the wipers 1111 and 1112 thereof disengage the home contacts in the associated contact banks; thereby to interrupt the above-traced circuit for energizing the magnet SM1117, whereupon further operation of the storage transfer switch S1110 is arrested at this time.

When the wiper 1111 of the storage transfer switch S1110 engages the first contact in the associated contact bank a circuit for energizing the winding of the control relay R850 is completed; this circuit extending from ground by way of the contacts 833, C877, the wiper 1111 of the storage transfer switch S1110 and the engaged first contact in the associated contact bank, C879 and the winding of R850 to battery. When thus energized the latter relay operates, thereby to complete, at the contacts 853, an obvious multiple holding circuit for energizing the winding of the control relay R830. Also the control relay R850 prepares, at the contacts 854, an obvious circuit, including the contacts 844 and the impulse conductor C891, for energizing the winding of the time pulse relay R860; the last-mentioned circuit is completed each time ground potential is applied to the impulse conductor C891 in the date and time unit 3900, as previously noted, ground potential being applied to the impulse conductor C891 twelve times per minute. Accordingly the time pulse relay R860 operates and restores twelve times per minute, in an obvious manner. Each time the time pulse relay R860 operates and then restores it completes and then interrupts, at the contacts 863, a circuit for energizing the magnet RM1106, thereby to cause the latter magnet to operate and then restore; whereby the wipers noted of the register and timer switch R1100 are driven one step in the clockwise direction away from their home positions. The above-mentioned circuit extends, when completed, from ground by way of the contacts 851, C878, the wiper 1021 of the ten and hundred time switch D1020 and the engaged home contact in the associated contact bank, C972, the contacts 941, C971, the contacts 863, C974 and the magnet RM1106 to battery. Accordingly the wipers noted of the register and timer switch R1100 are driven twelve steps per minute in the clockwise direction in accordance with the rate of operation of the time pulse relay R860.

It is noted that, when the time pulse relay R860 operates while the wiper 1106 of the register and timer switch R1100 engages either the home or the twelfth contact in the associated contact bank, a multiple circuit is completed for energizing the magnet UM1015 of the unit time switch U1010. The last-mentioned circuit extends, when completed, from ground by way of the contacts 851, C878, the wiper 1021 of the ten and hundred time switch D1020 and the engaged contact in the associated contact bank, C972, the contacts 941, C971, the wiper 1106 of the register and timer switch R1100 and the engaged home or twelfth contact in the associated contact bank, C882, the contacts 862, C883 and the magnet UM1015 to battery. Accordingly the magnet UM1015 operates and restores once each minute, whereby the wipers noted of the unit time switch U1010 are driven one step in the clockwise direction each minute. At this point it is noted that, when the time pulse relay R860 operates while the wiper 1106 of the register and timer switch R1100 engages the twenty-fourth contact in the associated contact bank, an alternative circuit is completed for energizing the magnet RM1106; thereby to cause the latter magnet to operate and restore in order to drive the wipers noted of the register and timer switch R1100 one step in the clockwise direction back into their home positions. The above-mentioned alternative circuit extends, when completed, from the grounded wiper 1106 of the register and timer switch R1100 and the engaged twenty-fourth contact in the associated contact bank, the contacts 1107 and the magnet RM1106 to battery.

It is noted that, when the time pulse relay R860 operates while the wiper 1011 of the unit time switch U1010 engages either the ninth or the twenty-fourth contact in the associated contact bank, a multiple circuit is completed for energizing the magnet DM1027 of the ten and hundred time switch D1020. The last-mentioned circuit extends, when completed, from ground by way of the contacts 851, C878, the wiper 1021 of the ten and hundred time switch D1020 and the engaged contact in the associated contact bank, C972, the contacts 941, C971, the wiper 1106 of the register and timer switch R1100 and the engaged home or twelfth contact in the associated contact bank, C882, the wipers 1011 of the unit time switch U1010 and the engaged ninth or twenty-fourth contact in the associated contact bank, C880, the contacts 861, C881 and the magnet DM1027 to battery. Accordingly the magnet DM1027 operates and restores once each ten minutes, whereby the wipers noted of the ten and hundred time switch D1020 are driven one step in the clockwise direction each ten minutes. At this point it is noted that, when the wiper 1013 of the unit time switch U1010 engages the eleventh contact in the associated contact bank, an obvious circuit, including the contacts 1016, is completed for energizing the magnet UM1015, whereby the latter magnet operates and restores in order to drive the wipers noted of the unit time switch U1010 five steps to engage the sixteenth contact in the associated contact bank. When the wiper 1013 of the unit time switch U1010 engages the sixteenth contact in the associated contact bank the previously traced alternative circuit for energizing the magnet UM1015 is interrupted, thereby to arrest further automatic operation of the unit time switch U1010 at this time.

In view of the foregoing explanation of the mode of operation of the time pulse relay R860 to control the operation of the register and timer switch R1100; the operation of the time pulse relay R860 and the register and timer switch R1100 to control the unit time switch U1010; and the operation of the time pulse relay R860, the register and timer switch R1100 and the unit time switch U1010 to control the operation of the ten and hundred time switch D1020, it will be understood that the unit time switch U1010 and the ten and hundred time switch D1020 are respectively operative to register the unit and the ten and hundred time intervals of the total time duration of the established connection between the calling private subscriber substation TP in exchange 4 zone 84 and the called subscriber substation in exchange 9 zone 27. As previously noted, the ten and hunded time switch D1020 is operative to register the hundred time intervals of the total time duration of the established connection mentioned. More particularly, the wipers 1013 and 1014 of the unit time switch U1010 register the unit time interval of the total time duration of the established connection mentioned in the respectively associated contact banks terminating the WXYZ conductors in the group of WXYZ marking leads 1033, in the manner previously explained. Similarly, the wipers 1023 and 1024 of the ten and hundred time switch D1020 register the ten time interval of the total time duration of the established connection mentioned in the respectively associated contact banks terminating the WXYZ conductors in the group of WXYZ marking leads 1032, in the manner previously explained. Finally the wipers 1025 and 1026 of the ten and hundred time switch D1020 register the hundred time interval of the total time duration of the established connection mentioned in the respectively associated contact banks terminating the WXYZ conductors in the group of WXYZ marking leads 1034, in the manner previously explained.

In the event the established connection mentioned persists for thirty minutes, the wiper 1026 of the ten and hundred time switch D1020 engages the third contact in the associated contact bank, thereby to complete an obvious circuit for illuminating the thirty minute alarm lamp L1043 in order to indicate to the exchange attendant that the call mentioned has persisted for this time duration. Similarly, in the event the established connection mentioned persists for fifty minutes, the wiper 1025 of the ten and hundred time switch D1020 engages the fifth contact in the associated contact bank, thereby to complete an obvious circuit for energizing the winding of the W relay comprising the only relay in the code storage device S1031. When thus energized the W relay mentioned operates to complete, at the associ ted contacts, an obvious holding circuit, including the grounded hold conductor C889, for energizing the winding thereof and an obvious path for applying ground potential to the W conductor comprising the group of WXYZ marking leads 1031; whereby the digit 7 is stored in the code storage device S1031 and marked to the associated group of WXYZ marking leads 1031. The storage of the digit 7 in the code storage device S1031 indicates that the connection mentioned has persisted for fifty minutes which is beyond the calculating capacity of the printer controller 4200, as explained more fully hereinafter. Finally, in the event the established connection mentioned persists for four hours, the wiper 1021 of the ten and hundred time switch D1020 engages the twenty-fourth contact in the associated contact bank; thereby to complete an obvious circuit for illuminating the four-hour alarm lamp L1044 and an obvious multiple circuit, including C973, for illuminating the release lamp L946. The illumination of the four-hour alarm lamp L1044 indicates to the exchange attendant that the established connection mentioned has persisted for the time interval indicated; while the illumination of the release lamp L946 indicates to the exchange attendant either that the established connection mentioned has persisted for four hours; or that the subscriber at the called subscriber substation in exchange 9 zone 27 has replaced the receiver of the telephone instrument thereat upon its associated switchhook, while the subscriber at the calling private subscriber substation TP in exchange 4 zone 84 has not replaced the receiver of the telephone instrument thereat upon its associated switchhook in order to release the connection, in a manner more fully explained below.

At this point it is noted that the release of the established connection between the calling private subscriber substation TP in exchange 4 zone 84 and the called subscriber substation in exchange 9 zone 27 is under the control of the subscriber at the calling private subscriber substation TP. However, when the subscriber at the called subscriber substation in exchange 9 zone 27 replaces the receiver of the telephone instrument thereat upon its associated switchhook, the connector in the automatic switching apparatus in exchange 9 zone 27 operates in order to cause battery potential to be reversed over the previously traced circuit including the trunk 907; whereby the left-hand winding of the answer relay R940 is energized in the opposite direction, causing the latter relay to restore. Upon restoring, the answer relay R940 interrupts, at the contacts 941, a further point in the previously traced circuit for energizing the magnet RM1106, thereby positively to arrest further operation of the register and timer switch R1100 at this time and the consequent timing of the total time duration of the established connection by the unit time switch U1010 and the ten and hundred time switch D1020, in the manner previously explained. Also the answer relay R940 completes, at the contacts 942, a circuit, including the contacts 851, C878, the wiper 1021 of the ten and hundred time switch D1020 and the engaged contact in the associated contact bank and C972, for illuminating the release lamp L946. The illumination of the release lamp L946 indicates to the exchange attendant that the established connection mentioned has persisted for four hours; or that the subscriber at the called subscriber substation in exchange 9 zone 27 has replaced the receiver of the telephone instrument thereat upon its associated switchhook, while the subscriber at the calling private subscriber substation TP in exchange 4 zone 84 has not replaced the receiver of the telephone instrument thereat upon its associated switchhook in order to effect the release of the established connection.

At this point it is again noted that, when the subscriber at the called subscriber substation in exchange 9 zone 27 answers the call, the answer relay R940 operates, thereby to effect operation of the control relay R850 and the consequent timed operation of the time pulse relay R860, in the manner previously explained. Accordingly the established connection mentioned persists for five seconds before the time pulse relay R860 operates in order to cause the wipers noted of the unit time switch U1010 to be driven one step in the clockwise direction away from their home positions.

When the wiper 1014 of the unit time switch U1010 engages the home contact in the associated contact bank an obvious path is completed for applying ground potential to the Z conductor in the group of WXYZ marking leads 1033 correspinding to the digit 0; and when the wipers 1013 and 1014 of the unit time switch U1010 engage the first contacts in the associated contact banks, obvious paths are completed for respectively applying ground potential to the W and X conductors in the group of WXYZ marking leads 1033 corresponding to the digit 1. Accordingly the digit 0 is normally registered by the unit time switch U1010 in the group of WXYZ marking leads 1033; which digit registration is changed to the digit 1 only in the event the established connection mentioned persists for five seconds. This short time interval of five seconds permits the answering of the call at the called subscriber substation in exchange 9 zone 27 and the immediate release of the established connection by the subscriber at the calling private subscriber substation TP in exchange 4 zone 84 without the registration of any time in the unit time switch U1010 in the event a wrong number was dialed at the calling private subscriber substation TP.

*Initial operation of the printer controller*

In the present example, assuming that the established connection between the calling private subscriber substation TP in exchange 4 zone 84 and the called subscriber substation in exchange 9 zone 27 is maintained for four minutes and that after the elapse of the time interval mentioned the subscriber at the calling private subscriber substation TP replaces the receiver of the telephone instrument thereat upon its associated switchhook; when this is done the previously traced loop circuit for energizing in series the upper and lower windings of the impulse relay R960 in the toll ticket repeater 800 is interrupted, thereby to cause the latter relay to restore. Upon restoring, the impulse relay R960 interrupts, at the contacts 961, the previously traced loop circuit between the left-hand winding of the answer relay R940 and the trunk 907; thereby to cause the answer relay R940 to restore and to effect the release of the toll selector 513, the automatic switching apparatus in exchange 6 zone 45, the automatic switching apparatus in exchange 1 zone 27 and the automatic switching apparatus in exchange 9 zone 27, all in accordance with conventional practice. When the toll selector 513 is thus released the toll line circuit 504 operates in order to mark the toll line 470 extending between exchange 4 zone 84 and exchange 6 zone 45 as idle. Also when the automatic switching apparatus in exchange 9 zone 27 is released the subscriber line extending to the called subscriber substation therein is marked as idle to the connector switches having access thereto, assuming that the subscriber at the called subscriber substation mentioned has replaced the receiver of the telephone instrument thereat upon its associated switchhook at this time. Upon restoring, the answer relay R940 interrupts, at the contacts 941, the previously traced circuit for energizing the magnet RM1106 of the register and timer switch R1100, thereby positively to arrest further operation of the unit time switch U1010 and consequently the ten and hundred time switch D1020, in the manner previously explained.

Also the answer relay R940 completes, at the contacts 942, the previously traced circuit for illuminating the release lamp L946. Further the impulse relay R960 interrupts, at the contacts 962, the previously traced circuit for energizing the winding of the hold relay R840, thereby to cause the latter relay to restore shortly thereafter; the hold relay R840 being of the slow-to-release type. Upon restoring, the hold relay R840 interrupts, at the contacts 844, a further point in the previously traced circuit for energizing the winding of the time pulse relay R860, thereby positively to arrest further operation of the latter relay at this time. Also, the hold relay R840 interrupts, at the contacts 841, the previously traced path for applying ground potential to the control conductor C783 of the trunk 780; thereby to interrupt the previously traced holding circuit for energizing the winding of the switch-through relay R770 in series with the winding of the step relay R760 in the primary selector 600, whereupon the switch-through relay R770 restores. Upon restoring, the switch-through relay R770 effects the release of the primary selector 600 and the line switch 423, in the manner previously explained; whereupon the trunk 462 extending to the primary selector 600 is marked as idle to the line switches 424 etc. having access thereto and the private subscriber line 407 extending to the calling private subscriber substation TP is marked as idle to the connectors having access thereto, all in the manner previously explained.

Further the hold relay R840 completes, at the contacts 842, an obvious circuit, including the contacts 835, for energizing the lower winding of the busy relay R810; thereby to cause the latter relay to operate shortly thereafter, the busy relay R810 being of the slow-to-operate type. Upon operating, the busy relay R810 completes, at the contacts 811, an obvious alternative path for applying ground potential to the control conductor C783 of the trunk 780, thereby to mark the trunk 780 as busy to the primary selector 600 etc. having access thereto. Also the busy relay R810 completes, at the contacts 813, an obvious path, including the contacts 821 and 855, for applying ground potential to the start conductor C890 extending to the printer controller allotter 4600. The application of ground potential to the start conductor C890 completes an obvious circuit for energizing the winding of the start relay R4645 in the printer controller allotter 4600, thereby to cause the latter relay to operate. Upon operating, the start relay R4645 prepares, at the contacts 4646, a circuit, including the contacts 4644, the wiper 4641 of the finder F4640 and the engaged home contact in the associated contact bank and the test conductor C4671, for energizing the magnet FM4643; which circuit is completed in the event ground potential appears upon the test conductor C4671 extending to the printer controller 4200, indicating that this printer controller is busy at this time. In the event the above-traced circuit for energizing the magnet FM4643 is completed, the latter magnet operates and restores; whereby the wipers noted of the finder F4640 are driven one step in the clockwise direction in order to test the idle or busy condition of the next printer controller in the associated group, in the manner previously explained.

Assuming that the printer controller 4200 is idle at this time, no ground potential appears upon the test conductor C4671 extending thereto and the previously traced circuit for energizing the magnet FM4643 of the finder F4640 is not completed. Accordingly the finder F4640 has operated to select the printer controller 4200 at this time. Also, in the present example, the start relay R4645 completes, at the contacts 4646, a circuit for energizing the winding of the step relay R4340 in series with the magnet FM4643; this circuit extending from ground by way of the contacts 4218, the winding of R4340, C4671, the wiper 4641 of the finder F4640 and the engaged home contact in the associated contact bank, the contacts 4646 and 4644 and the magnet FM4643 to battery. When this series circuit is completed the step relay R4340 operates; however, the magnet FM4643 does not operate due to the high series resistance of the winding of the step relay R4340. Upon operating, the step relay R4340 completes, at the contacts 4341, an obvious circuit, including the contacts 4311, for energizing the magnet FM4217 of the finder F4210. When thus energized the magnet FM4217 operates, thereby to condition the wipers noted of the finder F4210 to be driven one step in the counterclockwise direction; and to interrupt, at the contacts 4218, the previously traced series circuit for energizing the winding of the step relay R4340 and the magnet FM4643 of the finder F4640, whereby the step relay R4340 restores. Upon restoring, the step relay R4340 interrupts, at the contacts 4341, the previously traced circuit for energizing the magnet FM4217; thereby to cause the latter magnet to restore and drive the wipers noted of the finder F4210 one step in the counterclockwise direction and to recomplete, at the contacts 4218, the previously traced circuit for energizing the winding of the step relay R4340 in series with the magnet FM4643. Accordingly the step relay R4340 and the magnet FM4217 interact, in the manner described above, whereby the wipers noted of the finder F4210 are driven step by step in the counterclockwise direction until the first calling toll ticket repeater in the associated group is found.

Assuming that the calling toll ticket repeater 800 is the first in the associated group, when the finder F4210 selects the conductors C872, C888 etc. extending thereto, a series circuit is completed for energizing the winding of the test relay R820 in the toll ticket repeater 800 and the lower winding of the test relay R4310 in the printer controller 4200. The above-mentioned circuit extends from ground by way of the contacts 4647, the wiper 4642 of the finder F4640 and the engaged home contact in the associated contact bank, C4673, the lower winding of R4310, the wiper 4211 of the finder F4210 and the engaged contact in the associated contact bank, C872, the contacts 812 and 852 and the winding of R820 to battery. When this series circuit is completed the relays mentioned operate. Upon operating, the test relay R4310 interrupts, at the contacts 4311, a further point in the previously traced circuit for energizing the magnet FM4217, thereby positively to arrest further operation of the finder F4210 at this time. Also the test relay R4210 interrupts, at the contacts 4311, an obvious normally completed path, including the contacts 4325, for short-circuiting the upper winding thereof in series with the upper winding of the busy relay R4320. When the step relay R4340 then reoperates, in the manner previously explained, it recompletes, at the contacts 4341, a series circuit, including the contacts 4325, for energizing the upper winding of the test relay R4310, the upper winding of the busy relay R4320 and the magnet FM4217 of the finder F4210. When this series circuit is completed the busy relay R4320 operates partially, thereby to complete, at the contacts 4323, a path traced hereinafter for short-circuiting the lower winding thereof. Upon operating, the test relay R820 in the toll ticket repeater 800 completes, at the contacts 821, a path for applying ground potential by way of the alarm A864 and the contacts 812 to the conductor C872; and interrupts, at the contacts 821′, the previously mentioned path for applying ground potential to the start conductor C890 extending to the printer controller allotter 4600. When ground potential is removed from the start conductor C890 the previously traced circuit for energizing the winding of the start relay R4645 is interrupted, thereby to cause the latter relay to restore. The path for short-circuiting the lower winding of the busy relay R4320 extends from ground by way of the contacts 4341, the upper winding of the test relay R4310, the contacts 4325, the lower winding of R4320, the contacts 4323 and the wiper 4211 of the finder F4210 and the engaged contact in the associated contact bank to the grounded conductor C872 extending to the toll ticket repeater 800. Upon restoring, the start relay R4645 interrupts, at the contacts 4646, the previously traced circuit for energizing the winding of the step relay R4340 in series with the magnet FM4643 of the finder F4640, whereupon the step relay R4340 restores. Upon restoring, the step relay R4340 interrupts, at the contacts 4341, the previously traced circuit for energizing the upper winding of the test relay R4310, the upper winding of the busy relay R4320 and the magnet FM4217 of the finder F4210 in series; and interrupts, at the contacts 4341, the previously traced path for short-circuiting the lower winding of the busy relay R4320; whereupon a holding circuit for energizing the upper and lower windings of the busy relay R4320 in series with the magnet FM4217 of the finder F4210 is completed. The last-mentioned circuit extends from the grounded conductor C872 extending to the toll ticket repeater 800 by way of the wiper 4211 of the finder F4210 and the engaged contact in the associated contact bank, the contacts 4323, the lower and upper windings of the busy relay R4320 and the magnet FM4217 to battery. When this series circuit is completed the busy relay R4320 operates completely; however, the magnet FM4217 does not operate due to the high series resistance of the upper and lower windings of the busy relay R4320.

Upon operating fully, the busy relay R4320 interrupts, at the contacts 4325, a further point in the previously traced path for short-circuiting the lower winding thereof; and interrupts, at the contacts 4321, an obvious path, including the contacts 4361 and the contacts 4377 of the busy key K4375, for applying ground potential in the printer controller 4200 to the test conductor C4672 extending to the printer controller allotter 4600. At this point it is noted that ground potential is applied by way of a path substantially identical to that traced above in each of the printer controllers in the group to the test conductor C4672 when the printer controller is idle. Accordingly, when all of the printer controllers in the associated group are busy, ground potential is removed from the test conductor C4672, whereby the finder F4640 operates to engage the tenth contact in the associated contact bank incident to operation of the start relay R4645; whereupon further operation of the finder F4640 is arrested until one of the printer controllers in the associated group becomes idle, in an obvious manner. Also the busy relay R4320 completes, at the contacts 4322, an obvious path for applying ground potential to the test conductor C4671 extending to the printer controller allotter 4600, thereby to mark the printer controller 4200 as busy to the printer controller allotter 4600 at this time. Further the busy relay R4320 completes, at the contacts 4324, an obvious circuit for energizing the winding of the busy slave relay R4330, thereby to cause the latter relay to operate.

Upon operating, the busy slave relay R4330 completes, at the contacts 4337, an obvious path for applying ground potential to the start conductor C4302 extending to the printer link 5000; thereby to complete an obvious circuit, including the contacts 5025, 5071 and the wiper 5021 of the control switch S5020 and the engaged home contact in the associated contact bank, for energizing the winding of the start relay R5040 in series with the magnet SM5024 of the control switch S5020. When this series circuit is completed the start relay R5040 operates; however, the magnet SM5024 does not operate due to the high series resistance of the winding of the start relay R5040. Also the busy slave relay R4330 completes, at the contacts 4331, an obvious path for applying battery potential by way of the winding of the test relay R4430 to the test conductor C4301 extending to the printer link 5000. Further the busy slave relay R4330 prepares, at the contacts 4332, a circuit traced hereinafter for energizing the winding of the computation stop relay R4370; prepares, at the contacts 4338, multiple holding circuits traced hereinafter for energizing the windings of the computation stop relay R4370, the special service relay R4380 and the two-digit code relay R4390; and interrupts, at the contacts 4333 and 4334, points in a circuit traced hereinafter for energizing the winding of the release relay R4360. Also the busy slave relay R4330 completes, at the contacts 4335, an obvious path for applying ground potential to the hold conductor C4339 extending to the code storage devices S4621 to S4638, inclusive. Finally the busy slave relay R4330 completes, at the contacts 4336, a circuit, including the contacts 4714, C4473 and the contacts 4452, for energizing the lower winding of the pulse relay R4450 and for charging the associated condenser 4454 through the upper winding thereof. When thus energized the pulse relay R4450 operates, thereby to interrupt, at the contacts 4452, the previously traced circuit for energizing the lower winding thereof; whereby a circuit is completed for discharging the associated condenser 4454 in series through the upper and lower windings of the pulse relay R4450 in order to cause the latter relay to restore shortly thereafter. Hence, the pulse relay R4450 operates intermittently at a predetermined rate in accordance with the characteristic of the associated condenser 4454, in a well-known manner.

Each time the pulse relay R4450 operates and restores it completes and then interrupts, at the contacts 4451, a circuit, including the contacts 4351 and C4251, for energizing the magnet SM4227; thereby to cause the latter magnet to operate and restore, whereby the wipers noted of the storage register switch S4220 are driven one step in the clockwise direction. Also each time the magnet SM4227 operates and restores it campletes and then interrupts, at the contacts 4229, a circuit, including the wiper 4212 of the finder F4210 and the engaged contact in the associated contact bank, C888, the contacts 831′ and C887, for energizing the magnet SM1117 of the storage transfer switch S1110 in the toll ticket repeater 800. Accordingly the wipers noted of the storage register switch S4220 in the printer controller 4200 are driven in synchronism with the wipers noted of the storage transfer switch S1110 in the toll ticket repeater 800. At the beginning of this cycle of operation of the storage transfer switch S1110 and the storage register switch S4220, the wipers noted of the storage transfer switch S1110 engage the first contacts in the associated contact banks and the wipers noted of the storage register switch S4220 engage the home contacts in the associated contact banks; whereby the previously mentioned circuit for energizing the winding of the computation stop relay R4370 is completed in the event the digit 7 is stored in the code storage device S1031 in the toll ticket repeater 800 at this time, in view of the fact that the wiper 4223 of the storage register switch S4220 engages the home contact in the associated contact bank terminating the conductor extending to the winding of the computation stop relay R4370 and the wipers noted of the storage transfer switch S1110 engage the first contacts in the associated contact banks terminating the group of WXYZ marking leads 1031 extending to the code storage device S1031. In the present example, the circuit mentioned for energizing the winding of the computation stop relay R4370 is not completed in view of the fact that the digit 7 is not registered in the code storage device S1031, as previously noted.

In view of the foregoing explanation it will be understood that the synchronous operation of the storage transfer switch S1110 in the toll ticket repeater 800 and the storage register switch S4220 in the printer controller 4200 is effective to transfer the items of record information stored in the code storage devices S1031 and S1121 to S1135, inclusive, the items of record information stored in the unit time switch U1010 and in the ten and hundred time switch D1020 and the items of record information stored on the terminal blocks B1136 and B1137, all in the toll ticket repeater 800, to the computation stop relay R4370, the special service relay R4380, the two-digit code relay R4390 and the code storage devices S4621 to S4638, inclusive, all in the printer controller 4200. At the conclusion of the cycle of operation of the storage transfer switch S1110 in the toll ticket repeater 800 and the storage register switch S4220 in the printer controller 4200, the various items of record information stored in the various registers in the toll ticket repeater 800 have been transferred to the various registers in the printer controller 4200 and represent the following information, as indicated below:

| Register in the Toll Ticket Repeater 800 Transferred from— | Register in the Printer Controller 4200 Transferred to— | Nature of the Record Information |
|---|---|---|
| S1031 | The computation stop relay R4370. | The digit 7 indicating that the time duration of the established connection exceeds the cost calculating capacity of the printer controller 4200, no digit being registered. |
| S1130 | The special service relay R4380. | The digit 0 indicating that the calling subscriber substation is rendered extended service, no digit being registered. |
| S1131 | The two-digit code relay R4390. | The digit 0 indicating that the code portion of the directory number of the called subscriber substation identifying the zone and the exchange thereof comprises only two digits, no digit being registered. |
| S1128 | S4621 | The complementary digit of the rate factor digit applicable to the toll call between the calling subscriber substation in exchange 4 zone 84 and the called subscriber substation in exchange 9 zone 27, the complementary digit 8 of the rate factor digit 3. |
| Ten and hundred time switch D1020. | S4622 | The hundred minute digit of the time duration of the toll call between the calling subscriber substation in exchange 4 zone 84 and the called subscriber substation in exchange 9 zone 27, no digit being registered. |
| Ten and hundred time switch D1020. | S4623 | The ten minute digit of the time duration of the toll call between the calling subscriber substation in exchange 4 zone 84 and the called subscriber substation in exchange 9 zone 27, no digit being registered. |
| Unit time switch U1010 | S4624 | The unit minute digit of the time duration of the toll call between the calling subscriber substation in exchange 4 zone 84 and the called subscriber substation in exchange 9 zone 27, the digit 4. |
| S1124 | S4625 | The respective first, second, third and fourth digits of the numerical portion of the directory number of the calling subscriber substation identifying the line terminal thereof, the digits 0, 0, 9 and 9. |
| S1125 | S4626 | |
| S1126 | S4627 | |
| S1127 | S4628 | |
| S1121 | S4629 | The respective first, second and third digits of the code portion of the directory number of the called subscriber substation identifying the zone and exchange thereof, the digits 2, 7 and 9. |
| S1122 | S4630 | |
| S1123 | S4631 | |
| S1132 | S4632 | The respective first, second, third and fourth digits of the numerical portion of the directory number of the called subscriber substation identifying the line terminal thereof, the digits 1, 2, 3 and 4. |
| S1133 | S4633 | |
| S1134 | S4634 | |
| S1135 | S4635 | |
| S1129 | S4636 | The digit identifying the register translator 1700 utilized, the digit 6. |
| Terminal block B1136 | S4637 | The digits identifying the toll ticket repeater 800 utilized, the digits 0 and 1. |

During the operation of the storage register switch S4220 the wiper 4223 thereof successively engages the second and third contacts in the associated contact banks, whereby the previously mentioned circuits for respectively energizing the windings of the special service relay R4380 and the two-digit code relay R4390 are prepared; which circuits are not completed due to the fact that the digits 0 are not registered in the respective code storage devices S1130 and S1131 in the toll ticket repeater 800, as previously explained. Subsequently the wipers 4223, 4224, 4225 and 4226 of the storage register switch S4220 successively engage the third through the twentieth contacts in the associated contact banks, whereby the record information is registered in the code storage devices S4621 to S4638, inclusive, in the manner explained above. When the grounded wiper 4222 of the storage register switch S4220 engages the seventh contact in the associated contact bank an obvious circuit for energizing the upper winding of the hold relay R4350 is completed, thereby to cause the latter relay to operate. Upon operating, the hold relay R4350 completes, at the contacts 4353, an obvious multiple holding circuit for energizing the lower and upper windings of the busy relay R4320 in series with the magnet FM4217 of the finder F4210 and an obvious multiple path, including the wiper 4211 of the finder F4210, for applying ground potential to the test conductor C872 extending to the toll ticket repeater 800. The application of ground potential to the test conductor C872 completes an obvious multiple holding circuit, including the contacts 812 and 852, for energizing the winding of the test relay R820 and an obvious path, including the contacts 812 and 821, for short-circuiting the alarm A864. It is noted that the alarm A864 is of the slow-to-operate type and does not operate within a reasonably short time interval prior to the application of ground potential in the printer controller 4200 to the test conductor C872. However, in the event the printer controller 4200 does not operate within the time interval mentioned to cause ground potential to be applied to the test conductor C872, whereby the alarm A864 is short-circuited, the alarm A864 operates in order to indicate to the exchange attendant either that the printer controller allotter 4600 has failed to assign an idle printer controller in the associated group to the use of the calling toll ticket repeater 800 or that an assigned printer controller in the associated group has failed to operate promptly to reecive the record information, in the manner explained above.

Also, upon operating, the hold relay R4350 interrupts, at the contacts 4351, the previously traced original circuit for energizing the magnet SM4227 of the storage register switch S4220; and completes, at the contacts 4352, an alternative circuit, including the grounded wiper 4222 of the storage register switch S4220 and the engaged seventh contact in the associated contact bank, the contacts 4451 and C4251, for energizing the magnet SM4227 of the storage register switch S4220. Further, the hold relay R4350 prepares, at the contacts 4355, a circuit traced hereinafter for energizing the magnet TM4829 of the calculator selector switch T4820. The above-mentioned circuit is completed and then interrupted at the contacts 4453 each time the pulse relay R4450 operates and then restores; this circuit extending, when completed, from ground by way of the contacts 4355, 4421, 4453 and 4442 and the magnet TM4829 to battery. Accordingly, the magnet TM4829 operates and restores intermittently, thereby to drive the wipers noted of the calculator selector switch T4820 step by step in the counterclockwise direction, for a purpose more fully explained below.

More particularly, the wipers noted of the calculator selector switch T4820 are driven step by step in the counterclockwise direction until they engage the contacts in the associated contact banks terminating the marked WXYZ conductors in the associated group of WXYZ marking leads 4621 extending to the first code storage device S4621 in which the complementary digit of the rate factor digit is stored. In the present example, the complementary digit 8 of the rate factor digit 3 is stored in the code storage device S4621 whereby the X conductor in the associated group of WXYZ marking leads 4621 is marked with ground potential. Hence the wipers noted of the calculator selector switch T4820 are driven four steps in the counterclockwise direction; whereupon the wiper 4823 thereof engages the fourth contact in the associated contact bank terminating the marked X conductor of the associated group of WXYZ marking leads 4621 and the wiper 4824 thereof engages the fourth contact in the associated contact bank marked with ground potential, whereby circuits are completed for energizing the left-hand and right-hand windings of the transfer relay R4440. The circuit for energizing the left-hand winding of the transfer relay R4440 extends from the grounded wiper 4823 of the calculator selector switch T4820 by way of C4484 and the left-hand winding of R4440 to battery; while the circuit for energizing the right-hand winding of the transfer relay R4440 extends from the grounded wiper 4824 of the calculator selector switch T4820 by way of C4485 and the right-hand winding of R4440 to battery. It is noted that the transfer relay R4440 is of the shunt field type and operates only when both the left-hand and the right-hand windings thereof are energized. When thus energized the transfer relay R4420 operates to interrupt, at the contacts 4442, a further point in the previously traced circuit for energizing the magnet TM4829 of the calculator selector switch T4820, thereby positively to prevent further operation of the latter switch at this time. Also the transfer relay R4440 prepares, at the contacts 4441, a circuit traced hereinafter for energizing the magnet MM4736 of the calculator setting switch M4730.

Accordingly, at this time, the wipers noted of the calculator selector switch T4820 engage the fourth contacts in the associated contact banks; whereby the grounded wipers 4825 and 4826 thereof respectively engage the fourth contacts in the associated contact banks respectively terminating the W and Z conductors in the group of WXYZ marking leads 4801 in order to set up in code the rate factor digit 3 in the group of WXYZ marking leads 4801, for a purpose more fully explained hereinafter. Further the wipers 4827 and 4828 of the calculator selector switch T4820 respectively engage the fourth contacts in the associated contact banks respectively terminating the vertical magnet BM4927 and the rotary magnet BM4928 of the second calculating switch B4920; whereby the calculator selector switch T4820 has selected the second calculating switch B4920 of the three calculating switches to be selectively set, in a manner more fully explained hereinafter. Further, the grounded wiper 4821 of the calculator selector switch T4820 engages the fourth contact in the associated contact bank terminating the winding of the wiper switching relay R4550, whereby the latter relay operates.

Upon operating, the wiper switching relay R4550 interrupts, at the contacts 4551, 4553 and 4555, connections between the respective wipers 4921, 4922 and 4923 of the wiper set of the calculating switch B4920 and the control conductors extending to the ticket printer control switch P4510; and completes, at the contacts 4552, 4554 and 4556, connections between the respective wipers 4924, 4925 and 4926 of the wiper set of the calculating switch B4920 and the control conductors mentioned extending to the ticket printer control switch P4510. Accordingly, the calculator selector switch T4820 also selects the first wiper set, comprising the wipers 4924, 4925 and 4926, of the two wiper sets of the calculating switch B4920.

In view of the foregoing explanation of the mode of operation of the calculator selector switch T4820, it will be understood that, when the rate factor applicable to the call is 1 or 2, the calculating switch A4940 is selected; when the rate factor applicable to the call is 3 or 4 the calculating switch B4920 is selected; and when the rate factor applicable to the call is 5 or 6 the calculating switch C4900 is selected. Also when the rate factor applicable to the call is 1, 3 or 5 the first or lower wiper set of the selected calculating switch of the three calculating switches is selected; and when the rate factor applicable to the call is 2, 4 or 6 the second or upper wiper set of the selected calculating switch of the three calculating switches is selected.

Now each time the pulse relay R4450 operates and restores it completes and then interrupts, at the contacts 4453, the previously mentioned circuit, including the contacts 4355, 4421, 4441 and 4372, for energizing the magnet MM4736, thereby to cause the latter magnet to operate and restore; whereby the wipers noted of the calculator setting switch M4730 are driven one step in the clockwise direction. Accordingly, the wipers noted of the calculator setting switch M4730 are driven step by step in the clockwise direction until the wipers 4732 and 4733 thereof engage the contacts in the associated contact banks terminating the marked WXYZ conductors in the group of WXYZ marking leads 4623 extending to the code storage device S4623, wherein the ten digit of the time duration of the established connection is registered. In the present example, the time duration of the established connection comprises no ten digit, whereby no digit is registered in the code storage device S4623; hence, the wipers noted of the calculator setting switch M4730 are driven ten steps in the clockwise direction. When the wipers 4732 and 4733 of the calculator setting switch M4730 engage the grounded tenth contacts in the associated contact banks, obvious circuits are completed for respectively energizing the left-hand and right-hand windings of the stop relay R4420. It is noted that the stop relay R4420 is of the shunt field type and operates only when both the left-hand and right-hand windings are energized. When thus energized the stop relay R4420 operates to interrupt, at the contacts 4421, a further point in the previously traced circuit for energizing the magnet MM4736, thereby positively to arrest further operation of the calculator setting switch M4730 at this time.

During the operation of the calculator setting switch M4730, each time the magnet MM4736 operates and restores it completes and then interrupts, at the contacts 4738, a circuit, including the contacts 4411, the wiper 4735 of the calculator setting switch M4730 and the engaged contact in the associated contact bank, C4761, the wiper 4827 of the calculator selector switch T4820 and the engaged fourth contact in the associated contact bank, for energizing the vertical magnet BM4927 of the selected calculating switch B4920, whereby the latter magnet operates and restores. Each time the vertical magnet BM4927 operates it drives the first and second wiper sets of the calculating switch B4920 one step in the vertical direction away from their normal vertical positions, in an obvious manner. Hence, in the present example, the magnet MM4736 operates and restores ten times in order to set the wipers noted of the calculator setting switch M4730 in the manner previously explained; whereby the vertical magnet BM4927 operates ten times in order to drive the two wiper sets of the calculating switch B4920 ten steps in the vertical direction away from their normal vertical positions. When the two wiper sets of the calculating switch B4920 are driven one step in the vertical direction away from their normal vertical positions the set of switch springs BS4930 is actuated, thereby to prepare a circuit traced hereinafter for energizing the release magnet BM4929 of the calculating switch B4920.

Also, upon operating, the stop relay R4420 completes, at the contacts 4422, a circuit, including the grounded wiper 4734 of the calculator setting switch M4730 and the engaged tenth contact in the associated contact bank, for energizing the winding of the control relay R4410, thereby to cause the latter relay to operate. Upon operating, the control relay R4410 completes, at the contacts 4412, a holding circuit substantially identical to that previously traced for energizing the winding thereof; and interrupts, at the contacts 4411, a further point in the previously traced circuit for energizing the vertical magnet BM4927 of the calculating switch B4920. Further the control relay R4410 prepares, at the contacts 4413, an alternative circuit, including the contacts 4355, 4453, 4441 and 4372, for energizing the magnet MM4736 of the calculator setting switch M4730. The pulse relay R4450 then operates and restores one or more times, thereby to complete and then interrupt, at the contacts 4453, the previously traced alternative circuit for energizing the magnet MM4736, whereby the latter magnet operates and restores one or more times. More particularly, the magnet MM4736 operates and restores one or more times, thereby to drive the wipers noted of the calculator setting switch M4730 to engage the eleventh contacts in the associated contact banks; whereby the wiper 4734 disengages the tenth contact in the associated contact bank in order to interrupt the previously traced holding circuit for energizing the winding of the control relay R4410. The control relay R4410 then restores, thereby to interrupt, at the contacts 4413, the previously traced alternative circuit for energizing the magnet MM4736 of the calculator setting switch M4730 in order positively to arrest further operation of the latter switch at this time. Also the control relay R4410 prepares, at the contacts 4411, a circuit traced hereinafter for energizing the rotary magnet BM4928 of the selected calculating switch B4920. When the wipers 4732 and 4733 of the calculator setting switch M4730 engage the eleventh contacts in the associated contact banks the previously traced circuits for respectively energizing the left-hand and right-hand windings of the stop relay R4420 are interrupted; thereby to cause the latter relay to restore in order to prepare, at the contacts 4421, the previously traced original circuit for energizing the magnet MM4736 of the calculator setting switch M4730.

The pulse relay R4450 then operates and restores intermittently, thereby to complete and then interrupt, at the contacts 4453, the previously traced original circuit for energizing the magnet MM4736 of the calculator setting switch M4730, whereby the wipers noted of the last-mentioned switch are driven additional steps in the clockwise direction. More particularly, the wipers noted of the calculator setting switch M4730 are driven an additional number of steps in the clockwise direction until the wipers 4732 and 4733 thereof engage contacts in the associated contact banks terminating the marked WXYZ conductors in the associated group of WXYZ marking leads 4624 extending to the code storage device S4624, wherein there is registered the unit time digit of the time duration of the established connection mentioned. In the present example, the unit time digit 4 is registered in the code storage device S4624, whereby the X and Y conductors in the associated group of marking leads 4624 are marked with ground potential. More particularly, the wipers noted of the calculator setting switch M4730 are driven four additional steps in the clockwise direction to engage the fifteenth contacts in the associated contact bank respectively terminating the grounded X and Y conductors in the associated group of WXYZ marking leads 4624, whereby obvious circuits are completed for respectively energizing the left-hand and right-hand windings of the stop relay R4420. When thus energized the stop relay R4420 reoperates, thereby to interrupt, at the contacts 4421, the previously traced original circuit for energizing the magnet MM4736 of the calculator setting switch M4730 in order positively to arrest further operation of the latter switch at this time. Hence the magnet MM4736 is operated and restored four additional times, thereby to complete and then interrupt, at the contacts 4738, four times, the previously mentioned circuit for energizing the rotary magnet BM4928 of the selected calculating switch B4920. The last-mentioned circuit extends, when completed, from ground by way of the contacts 4411, 4738, the wiper 4735 of the calculator setting switch M4730 and the engaged contact in the associated contact bank, C4762, the wiper 4828 of the calculator selector switch T4820 and the engaged fourth contact in the associated contact bank and the magnet BM4928 to battery. Accordingly the magnet BM4928 is operated and restored four times, thereby to drive the two wiper sets of the calculating switch B4920 four steps in the rotary direction. Hence, at this time, the two wiper sets of the selected calculating switch B4920 engage the 0 up 4 in contacts in the associated contact banks and the first wiper set thereof, comprising the wipers 4924, 4925 and 4926, is selected. More particularly, the 0 up 4 in contacts in the contact banks engaged by the first wiper set of the calculating switch B4920 are suitably jumpered by way of the jumper 4951 to the group of ten marking conductors 5201 in order to establish a charge for the previously mentioned call calculated on a monetary basis, in a manner more fully explained hereinafter.

Considering now the initial operation of the printer link 5000 in conjunction with the printer controller 4200, it is again noted that, when the busy slave relay R4330 in the printer controller 4200 operates, ground potential is applied, at the contacts 4337, to the start conductor C4302, thereby to cause operation of the start relay R5040 in the printer link 5000. Upon operating, the start relay R5040 completes, at the contacts 5042, an obvious circuit, including the contacts 5032 and 5062, for energizing in multiple the upper and lower windings of the pulse relay R5060, thereby to cause the latter relay to operate. Upon operating, the pulse relay R5060 interrupts, at the contacts 5062, the previously traced circuit for energizing the upper and lower windings thereof in multiple; whereupon an obvious path for short-circuiting the upper and lower windings of the pulse relay R5060 in series through the associated condenser 5034 is completed in order to cause the latter relay to restore shortly thereafter. Hence the pulse relay R5060 operates intermittently at a predetermined rate, depending upon the characteristic of the associated condenser 5034, in an obvious manner. Each time the pulse relay R5060 operates and restores it completes and then interrupts, at the contacts 5061, an obvious circuit, including the contacts 5032 and 5081, for energizing the magnet FM5012 of the finder F5010 individual to the printer link 5000 and having access to the various test conductors C4301, etc., extending to the printer controllers 4200, etc., in the associated group. Also, upon operating, the start relay R5040 completes, at the contacts 5043, an obvious circuit for energizing the winding of the record relay R5150, thereby to cause the latter relay to operate. Further the start relay R5040 prepares, at the contacts 5043, a circuit, including the contacts 5075, C5251 and the contacts 5234 of the set of switch springs S5233, for energizing in series the windings of the toll ticket test relay R5090, the toll ticket relay R5140 and the magnet M5232 of the toll ticket printer 5230; which circuit is completed in the event the paper engaging rod 5236 of the toll ticket printer 5230 has previously actuated the set of switch springs S5233 to close the contacts 5234 thereof, as illustrated. In this event, the carriage of the toll ticket printer 5230 occupies its right-hand marginal stop position and an adequate supply of paper stock is upon the roll 5413, as previously explained; whereby the toll ticket test relay R5090, the toll ticket relay R5140 and the magnet M5232 of the toll ticket printer 5230 operate.

Upon operating, the magnet M5232 of the toll ticket printer 5230 restrains the set of switch springs S5233 in their actuated positions, whereby the contacts 5234 thereof are restrained closed and the contacts 5235 thereof are restrained opened. Accordingly, subsequent movement of the carriage of the toll ticket printer 5230 away from its right-hand marginal stop position, causing the roll 5413 of paper stock to disengage the end of the paper engaging rod 5236, does not actuate the set of switch springs S5233 while the magnet M5232 is operated. Upon operating, the toll ticket relay R5140 completes, at the contacts 5141, an operating circuit for the motor 5231 of the toll ticket printer 5230; this circuit extending from one terminal of the 110 volt A. C. source by way of the contacts 5141, C5255, the motor 5231 and C5252 to the other terminal of the 110 volt A. C. source. Also the toll ticket relay R5140 interrupts, at the contacts 5142, a circuit traced hereinafter for operating the toll ticket alarm A5134. Upon operating, the record relay R5150 completes, at the contacts 5151, a circuit for the motor 5241 of the record printer 5240, this circuit extending from one terminal of the 110 volt A. C. source by way of the contacts 5141, C5256, the motor 5241 and C5252 to the other terminal of the 110 volt A. C. source. Also the record relay R5150 interrupts, at the contacts 5152, a circuit traced hereinafter for operating the record alarm A5135. Upon operating, the toll ticket test relay R5090 completes, at the contacts 5091, an obvious multiple holding circuit for energizing the winding thereof in series with the winding of the toll ticket relay R5140 and the magnet M5232 of the toll ticket printer 5230. At this time the motor 5231 of the toll ticket printer 5230 is operated, rendering the last-mentioned printer controllable to print on a toll ticket; and the motor 5241 of the record printer 5240 is operated, rendering the last-mentioned printer controllable to print on a record sheet. Further it is noted that the winding of the power alarm relay R5130 bridges the terminals of the 110 volt A. C. source, whereby the latter relay normally occupies its operated position and restores only in the event of a power failure. The operated power alarm relay R5130 retains interrupted, at the contacts 5132, an obvious circuit for operating the power alarm A5133. Finally, upon operating, the toll ticket test relay R5090 interrupts, at the contacts 5092, a path for applying ground potential to the conductor C4481 commonly extending to the printer controllers in the associated group.

The magnet FM5012 continues to operate intermittently, thereby to drive the wiper 5011 of the finder F5010 step by step in the clockwise direction until it engages the contact in the associated contact bank terminating the test conductor extending to the first calling printer controller in the associated group. Assuming that the printer controller 4200 is the first calling printer controller in the associated group, when the wiper 5011 of the finder F5010 engages the contact in the associated contact bank terminating the test conductor C4301 extending to the printer controller 4200, a series circuit is completed for energizing the windings of the test relay R5030 in the printer link 5000 and the test relay R4430 in the printer controller 4200. The last-mentioned circuit extends from ground by way of the contacts 5041, the winding of R5030, the wiper 5011 of the finder F5010 and the engaged contact in the associated contact bank, C4301, the contacts 4331 and the winding of R4430 to battery. When this series circuit is completed the test relays R4430 and R5030 operate. Upon operating, the test relay R5030 in the printer link 5000 completes, at the contacts 5031, a holding circuit substantially identical to that previously traced for energizing the winding thereof in series with the winding of the test relay R4430. Also the test relay R5030 interrupts, at the contacts 5032, the previously traced circuit for energizing in multiple the upper and lower windings of the pulse relay R5060, thereby to arrest further operation of the latter relay at this time. Further the test relay R5030 completes, at the contacts 5033, an obvious circuit for energizing the winding of the hold relay R5070, thereby to cause the latter relay to operate. Upon operating, the hold relay R5070 completes, at the contacts 5074, an obvious alternative circuit for energizing the winding of the toll ticket test relay R5090 in series with the winding of the toll ticket relay R5140 and the magnet M5232 of the toll ticket printer 5230; and prepares, at the contacts 5076, a further point in the previously mentioned path for applying ground potential to the conductor C4481. Also the hold relay R5070 interrupts, at the contacts 5071, the previously traced circuit for energizing the winding of the start relay R5040 in series with the magnet SM5024 of the control switch S5020; whereupon the start relay R5040 restores shortly thereafter, the start relay R5040 being of the slow-to-release type. Further, the hold relay R5070 completes, at the contacts 5072, a circuit, including the contacts 5025 and the grounded wiper 5022 of the control switch S5020 and the engaged home contact in the associated contact bank, for energizing the magnet SM5024. The magnet SM5024 then operates and restores, thereby to drive the wipers noted of the control switch S5020 one step in the clockwise direction, whereupon the wiper 5022 thereof disengages the home contact in the associated contact bank in order to interrupt the above-traced circuit for energizing the magnet SM5024, whereby further operation of the control switch S5020 is positively prevented at this time. When the grounded wiper 5022 of the control switch S5020 engages the first contact in the associated contact bank an obvious multiple holding circuit is completed for energizing the winding of the hold relay R5070.

Upon operating, the test relay R4430 in the printer controller 4200 connects, at the contacts 4432, the conductor C4481 extending to the printer link 5000 to the home contacts engaged by the wipers 4811, 4812 and 4813 of the record storage transfer switch R4810; whereby obvious multiple circuits respectively including C4662, C4663 and C4664 are prepared for energizing the windings of the mark relays WB, XB and YB. In the present example, no ground potential appears upon the conductor C4481 due to the fact that the toll ticket test relay R5090 operated when operation of the printer link 5000 was initiated; accordingly the previously mentioned multiple circuits for energizing the windings of the mark relays WB, XB and YB are not completed at this time and the latter relays remain in their restored positions. On the other hand, had the toll ticket test relay R5090 in the printer link 5000 failed to operate due to the fact that the carriage of the toll ticket printer 5230 occupied other than its normal right-hand marginal stop position, or to the fact that there was an inadequate supply of paper stock upon the roll 5413 when operation of the printer link 5000 was initiated, ground potential would now be connected to the conductor C4481. In the last-mentioned case, the multiple circuits for energizing the windings of the mark relays WB, XB, and YB would have been completed, thereby to cause the relays mentioned to operate. Upon operating, the mark relays WB, XB and YB respectively complete, at the contacts WB1, XB1 and YB1, an obvious connection between the mark conductor C4661 and the stroke conductor C5225 extending to the record printer 5240, for a purpose more fully explained hereinafter.

Also, upon operating, the test relay R4430 completes, at the contacts 4433, a circuit, including the contacts 4713, 4354 and 4462, for energizing in multiple the upper and lower windings of the pulse relay R4460, thereby to cause the latter relay to operate. Upon operating, the pulse relay R4460 interrupts, at the contacts 4462, the previously traced circuit for energizing in multiple the upper and lower windings thereof; whereupon an obvious path, including the condenser 4465, is completed for short-circuiting in series the upper and lower windings of the pulse relay R4460 in order to cause the latter relay to restore shortly thereafter. Accordingly the pulse relay R4460 operates intermittently at a predetermined rate, depending upon the characteristic of the associated condenser 4465, in an obvious manner.

Also, upon operating, the test relay R4430 completes, at the contacts 4431, a circuit, including C4254, the wiper 4231 of the ticket storage transfer switch C4230 and the engaged home contact in the associated contact bank and the contacts 4238, for energizing the magnet CM4237; whereby the latter magnet operates and restores in order to drive the wipers noted of the ticket storage transfer switch C4230 one step in the counterclockwise direction. When the wiper 4231 of the ticket storage transfer switch C4230 disengages the home contact in the associated contact bank the above-traced circuit for energizing the magnet CM4237 is interrupted, thereby positively to arrest further operation of the ticket storage transfer switch C4230 at this time. At this time the wipers noted of the ticket storage transfer switch C4230 engage the first contacts in the associated contact banks, whereby the wipers 4233, 4234, 4235 and 4236 thereof engage the first contacts in the associated contact banks terminating the WXYZ conductors of the group of WXYZ marking leads 4601 extending to the date and time unit 3900, for a purpose more fully explained hereinafter. Also the grounded wiper 4232 of the ticket storage transfer switch C4230 engages the first contact in the associated contact bank terminating the guard conductor C3961 extending to the date and time unit 3900, whereby a holding circuit traced hereinafter is completed for energizing the lower winding of the minute relay R3950 therein the next time the last-mentioned relay operates, as explained more fully hereinafter.

Each time the pulse relay R4460 operates and restores it completes and then interrupts, at the contacts 4461, an obvious path, including C4482, for applying ground potential to the multiple connected wipers 4515 and 4516 of the ticket printer control switch P4510; completes and then interrupts, at the contacts 4463, an obvious circuit for energizing the magnet PM4517 of the ticket printer control switch P4510, thereby to cause the latter magnet to operate and restore in order to drive the wipers noted of the ticket printer control switch P4510 one step in the counterclockwise direction; and completes and then interrupts, at the contacts 4464, an obvious circuit, including C4471, for energizing the magnet RM4816 of the record storage transfer switch R4810, thereby to cause the latter magnet to operate and restore in order to drive the wipers noted of the record storage transfer switch R4810 one step downwardly as illustrated. Accordingly the intermittent operation of the pulse relay R4460 effects the synchronous operation of the magnets PM4517 and RM4816, whereby the respective ticket printer control switch P4510 and the record storage transfer switch R4810 are operated in synchronism. Each time the magnet RM4816 of the record storage transfer switch R4810 operates it completes, at the contacts 4817, an obvious path for applying ground potential to the mark conductor C4661; and each time the magnet PM4517 of the ticket printer control switch P4510 operates it completes, at the contacts 4518, an obvious path for applying ground potential to the multiple connected wipers 4511 and 4512 thereof. The ticket printer control switch P4510 and the record storage transfer switch R4810 are operative selectively to control, respectively, the toll ticket printer 5230 and the record printer 5240, in a manner more fully explained hereinafter.

*Release of the toll ticket repeater*

When the wipers noted of the storage transfer switch S1110 engage the twenty-first contacts in the associated contact banks the last item of record information registered in the toll ticket repeater 800 is transferred to the printer controller 4200, as previously explained. Subsequently, when the wiper 1111 of the storage transfer switch S1110 then disengages the twenty-first contact in the associated contact bank the previously traced circuit for energizing the winding of the control relay R850 is interrupted, thereby to cause the latter relay to restore. Upon restoring, the control relay R850 interrupts, at the contacts 851, the previously traced circuit for illuminating the release lamp L946; interrupts, at the contacts 852, the previously traced circuit for energizing the winding of the test relay R820, thereby to cause the latter relay to restore; and interrupts, at the contacts 853, the previously mentioned holding circuit for energizing the winding of the control relay R830, thereby to cause the latter relay to restore. Upon restoring, the control relay R830 interrupts, at the contacts 836, the previously traced holding circuit for energizing in series the upper and lower windings of the wiper switching relay R930, thereby to cause the latter relay to restore; and interrupts, at the contacts 832', the previously traced holding circuit for energizing the winding of the switch-through relay R950, thereby to cause the latter relay to restore. Also the control relay R830 interrupts, at the contacts 832', the previously mentioned path for applying ground potential to the hold conductor C889, thereby to effect the restoration of the various WXYZ relays in the code storage devices S1121 to S1135, inclusive, and to cause the W relay in the code storage device S1031 to restore in the event the latter relay occupies its operated position. Further the control relay R830 interrupts, at the contacts 835, the previously traced circuit for energizing the lower winding of the busy relay R810; and completes, at the contacts 834, a circuit for energizing the upper winding of the busy relay R810 in series with the magnet UM1015 of the unit time switch U1010. The last-mentioned circuit extends from ground by way of the alarm A864, the contacts 834, the upper winding of R810, C871, the wiper 1012 of the unit time switch U1010 and the engaged contact in the associated contact bank, the contacts 1016 and the magnet UM1015 to battery. When this series circuit is completed the busy relay R810 is retained in its operated position; the magnet UM1015 operates intermittently, thereby to drive the wipers noted of the unit time switch U1010 step by step in the clockwise direction back into their home positions; and the alarm A864 does not operate immediately as it is of the slow-acting type. When the unit time switch U1010 is thus released the wiper 1012 disengages the twenty-fourth contact in the associated contact bank and engages the home contact therein; thereby to interrupt the previously traced circuit for energizing the upper winding of the busy relay R810 in series with the magnet UM1015 and to prepare an obvious alternative circuit for energizing the upper winding of the busy relay R810 in series with the magnet DM1027 of the ten and hundred time switch D1020.

The above-mentioned circuit is completed in the event the wipers noted of the ten and hundred time switch D1020 occupy other than their home positions; whereby the magnet DM1027 operates intermittently in order to drive the wipers noted of the ten and hundred time switch D1020 step by step in the clockwise direction back into their home positions. When the ten and hundred time switch D1020 is thus released, in the event it is operated, the wiper 1022 thereof disengages the twenty-fourth contact in the associated contact bank and engages the home contact therein; thereby to interrupt the previously mentioned circuit for energizing the upper winding of the busy relay R810 in series with the magnet DM1027 and to complete an alternative circuit for energizing the upper winding of the busy relay R810 in series with the magnet RM1106 of the register and timer switch R1100. The last-mentioned circuit extends from ground by way of the alarm A864 and the previously traced path, including the upper winding of the busy relay R810, to the wiper 1022 of the ten and hundred time switch D1020 and the engaged home contact in the associated contact bank; and therefrom by way of C875, the contacts 831, C876, the wiper 1104 or 1105 of the register and timer switch R1100 and the engaged contact in the respectively associated contact bank, C886 the contacts 830, C977, the contacts 1107 and the magnet RM1106. When thus energized, the magnet RM1106 operates intermittently, thereby to drive the wipers noted of the register and timer switch R1100 step by step in the clockwise direction back into their home positions; whereby the wiper 1105 thereof disengages the twenty-fourth contact in the associated contact bank, thereby to interrupt the previously traced circuit for energizing the upper winding of the busy relay R810 in series with the magnet RM1106 of the register and timer switch R1100.

When the register and timer switch R1100 is thus released the wiper 1104 thereof engages the home contact in the associated contact bank, thereby to complete a circuit extending from ground by way of the previously traced path, including the alarm A864 and the upper winding of the busy relay R810, the wiper 1112 of the storage transfer switch S1110 and the engaged contact in the associated contact bank, C884, the contacts 837, C885 and the contacts 1118, for energizing the magnet SM1117 of the storage transfer switch S1110. When this series circuit is completed the magnet SM1117 operates intermittently, thereby to drive the wipers noted of the storage transfer switch S1110 step by step in the counterclockwise direction back into their home positions. When the storage transfer switch S1110 is thus released the wiper 1112 thereof reengages the home contact in the associated contact bank, thereby to interrupt the previously traced circuit for energizing the magnet SM1117 of the storage transfer switch S1110 in series with the upper winding of the busy relay R810. At this time the busy relay R810 restores, thereby to interrupt, at the contacts 811, the previously mentioned path for applying ground potential to the control conductor C783 of the trunk 780, whereby the trunk 780 is marked as idle to the various primary selectors 300, etc., having access thereto. At this time the toll ticket repeater 800 is completely released and available for further use.

At this point it is noted that, in the event the toll ticket repeater 800 fails to release promptly, the previously traced operating circuit for the alarm A864, including the upper winding of the busy relay R810 and the magnets of the various switches, is completed for a total time duration exceeding a predetermined time interval; in which case the slow-acting alarm A864 operates in order to indicate to the exchange attendant that the toll ticket repeater 800 is defective and has failed promptly to release.

*Operation of the date and time unit*

Considering now the operation of the date and time unit 3900 it is noted that the master clock 3901 operates continuously to complete and to interrupt each five seconds an obvious circuit for energizing the winding of the pulse relay R3940; whereby the pulse relay R3940 operates and restores twelve times per minute. Each time the pulse relay R3940 operates and restores it completes and then interrupts, at the contacts 3943, the previously mentioned path for applying ground potential to the impulse conductor C891 extending to the toll ticket repeater 800, etc., the register translator 1700, etc., as previously explained. Also each time the pulse relay R3940 operates and restores it completes and then interrupts, at the contacts 3942, an obvious circuit for energizing the magnet M3912; whereby the latter magnet operates and restores in order to drive the wiper 3911 of the timer switch 3910 one step in the clockwise direction; whereby the wiper 3911 of the timer switch 3910 is driven step by step in the clockwise direction twelve steps per minute.

Each time the pulse relay R3940 operates, while the grounded wiper 3911 of the timer switch 3910 engages either the twelfth or the twenty-fourth contacts in the associated contact banks, it completes, at the contacts 3941, an obvious circuit for energizing the upper winding of the minute relay R3950, thereby to cause the latter relay to operate. Upon operating, the minute relay R3950 prepares, at the contacts 3952, a holding circuit, including the guard conductor C3961, for energizing the lower winding thereof; and completes, at the contacts 3951, an obvious path for applying ground potential to the check conductor C3902 extending to the master clock 3901. The application of ground potential to the check conductor C3902 indicates to the master clock 3901 that an impulse has been received by the minute relay R3950 in order to keep the master clock 3901 in synchronism. Subsequently, when the grounded wiper 3911 of the timer switch 3910 disengages either the twelfth or the twenty-fourth contacts in the associated contact banks the previously traced circuit for energizing the upper winding of the minute relay R3950 is interrupted, thereby to cause the latter relay to restore in the event the previously mentioned holding circuit, including the guard conductor C3961, for energizing the lower winding thereof is not completed at this time. When the grounded wiper 3911 of the timer switch 3910 engages the twenty-fifth contact in the associated contact bank an obvious circuit, including the contacts 3913, is completed for energizing the magnet M3912, whereby the latter magnet operates and restores in order to drive the wiper 3911 of the timer switch 3910 back into engagement with its first contact. In view of the foregoing explanation of the mode of operation of the master clock 3901 in conjunction with the timer switch 3910, it will be understood that the minute relay R3950 operates and then restores once each minute.

Now assuming that the start key K3930 occupies its operated position, each time the minute relay R3950 operates and restores it completes and then interrupts, at the contacts 3953, an obvious circuit for energizing the magnet M3924; thereby to cause the latter magnet to operate and restore in order to drive the wipers noted of the unit minute switch 3920 one step in the clockwise direction. Thus the wipers noted of the unit minute switch 3920 are driven one step in the clockwise direction each minute; and while the grounded wiper 3921 thereof engages either the ninth or the nineteenth contact in the associated contact bank an obvious circuit, including the contacts 3926, is completed and then interrupted for energizing the magnet M4014, thereby to cause the latter magnet to operate and restore in order to drive the wipers noted of the ten minute switch 4010 one step in the clockwise direction. When the grounded wiper 3921 of the unit minute switch 3920 engages the twentieth contact in the associated contact bank an obvious alternative circuit, including the contacts 3925, is completed for energizing the magnet M3924, whereby the latter magnet operates intermittently in order to drive the wipers noted of the unit minute switch 3920 back into their home positions. The grounded wipers 3922 and 3923 continuously mark the WXYZ conductors in the associated group of WXYZ marking leads 4601 in accordance with the unit minute digit of the time of day, in the manner previously explained.

Thus the wipers noted of the ten minute switch 4010 are driven one step in the clockwise direction each ten minutes; and while the grounded wiper 4011 thereof engages and subsequently disengages the fifth, eleventh, seventeenth and twenty-third contacts in the associated contact banks an obvious circuit, including the contacts 4016, is completed and then interrupted for energizing the magnet M4026, thereby to cause the latter magnet to operate and restore in order to drive the wipers noted of the hour switch 4020 one step in the clockwise direction. When the grounded wiper 4011 of the ten minute switch 4010 engages the twenty-fourth contact in the associated contact bank an obvious alternative circuit, including the contacts 4015, is completed for energizing the magnet M4014, whereby the latter magnet operates and restores in order to drive the wipers noted of the ten minute switch 4010 back into their home positions. The grounded wipers 4012 and 4013 continuously mark the WXYZ conductors in the associated group of WXYZ marking leads 4602 in accordance with the ten minute digit of the time of day, in the manner previously explained.

Thus the wipers noted of the hour switch 4020 are driven one step in the clockwise direction each hour; and while the grounded wiper 4021 thereof engages the twenty-third contact in the associated contact bank an obvious circuit, including the contacts 4027, is completed and then interrupted for energizing the magnet M4119, thereby to cause the latter magnet to operate and restore in order to drive the wipers noted of the day switch 4110 one step in the clockwise direction. When the grounded wiper 4021 of the hour switch 4020 engages the twenty-fourth contact in the associated contact bank an obvious alternative circuit, including the contacts 4028, is completed for energizing the magnet M4026, whereby the latter magnet operates and restores in order to drive the wipers noted of the hour switch 4020 back into their home positions. The grounded wipers 4024 and 4025 continuously mark the WXYZ conductors in the associated group of WXYZ marking leads 4603 in accordance with the unit hour digit of the time of day; while the grounded wipers 4022 and 4023 continuously mark the WXYZ conductors in the associated group of WXYZ marking leads 4604 in accordance with the ten hour digit of the time of day; all in the manner previously explained.

Thus the wipers noted of the day switch 4110 are driven one step in the clockwise direction each day. Assuming that the wipers noted of the day switch 4110 occupy their home positions illustrated, at the conclusion of nineteen days the grounded wiper 4118 thereof engages the nineteenth contact in the associated contact bank; whereupon an obvious alternative circuit, including the contacts 4120, is completed for energizing the magnet M4119 of the day switch 4110. The magnet M4119 then operates intermittently in order to drive the wipers noted of the day switch 4110 step by step in the clockwise direction to engage the twenty-fifth contacts in the associated contact banks. At the conclusion of eight additional days, a total of twenty-eight days, the wiper 4111 of the day switch 4110 engages the thirty-third contact in the associated contact bank, thereby to prepare a circuit for energizing the winding of the control relay R4140; which circuit is completed under conditions more fully explained hereinafter. Similarly, at the conclusion of nine, ten and eleven additional days, respective totals of twenty-nine, thirty and thirty-one days, the wiper 4111 of the day switch 4110 engages the respective thirty-fourth, thirty-fifth and thirty-sixth contacts in the associated contact banks, thereby to prepare corresponding alternative circuits for energizing the winding of the control relay R4140; one of which circuits is completed under conditions more fully explained hereinafter.

Considering now the month switch 4120, it is noted that, when the grounded wiper 4122 thereof engages the home, second, fourth, sixth, seventh, ninth and eleventh contacts in the associated contact bank, respectively corresponding to the successive months in a first year comprising thirty-one days, ground potential is applied to the conductor C4131; when the grounded wiper 4122 thereof engages the first contact in the associated contact bank, corresponding to the month in the first year comprising twenty-eight days, ground potential is applied to the conductor C4128; and when the grounded wiper 4122 thereof engages the third, fifth, eighth and tenth contacts in the associated contact bank, respectively corresponding to the successive months in the first year comprising thirty days, ground potential is applied to the conductor C4130.

Similarly, when the grounded wiper 4122 of the month switch 4120 engages the twelfth, fourteenth, sixteenth, eighteenth, nineteenth, twenty-first and twenty-third contacts in the associated contact bank, respectively corresponding to the successive months in a second year comprising thirty-one days, ground potential is applied to the conductor C4131; when the grounded wiper 4122 thereof engages the thirteenth contact in the associated contact bank, corresponding to the month in the second year comprising twenty-eight days, ground potential is applied to the conductor C4128; and when the grounded wiper 4122 thereof engages the fifteenth, seventeenth, twentieth and twenty-second contacts in the associated contact bank, respectively corresponding to the successive months in the second year comprising thirty days, ground potential is applied to the conductor C4130.

When the grounded wiper 4122 of the month switch 4120 engages the twenty-fourth contact in the associated contact bank an obvious circuit, including the contacts 4128, is completed for energizing the magnet M4127, thereby to cause the latter magnet to operate and restore; whereby the wiper 4121 of the month switch 4120 engages the twenty-sixth contact in the associated contact bank.

When the grounded wiper 4121 of the month switch 4120 engages the twenty-sixth, twenty-eighth, thirtieth, thirty-second, thirty-third, thirty-fifth and thirty-seventh contacts in the associated contact bank, respectively corresponding to the successive months in a third year comprising thirty-one days, ground potential is applied to the conductor C4131; when the grounded wiper 4121 thereof engages the twenty-seventh contact in the associated contact bank, corresponding to the month in the third year comprising twenty-eight days, ground potential is applied to the conductor C4128; and when the grounded wiper 4121 thereof engages the twenty-ninth, thirty-first, thirty-fourth and thirty-sixth contacts in the associated contact bank, respectively corresponding to the successive months in the third year comprising thirty days, ground potential is applied to the conductor C4130.

Finally, when the grounded wiper 4121 of the month switch 4120 engages the thirty-eighth, fortieth, forty-second, forty-fourth, forty-fifth, forty-seventh and forty-ninth contacts in the associated contact bank, respectively corresponding to the successive months in a fourth year comprising thirty-one days, ground potential is applied to the conductor C4131; when the grounded wiper 4121 thereof engages the thirty-ninth contact in the associated contact bank, corresponding to the month in the fourth year comprising twenty-nine days, ground potential is applied to the conductor C4129; and when the grounded wiper 4121 thereof engages the forty-first, forty-third, forty-sixth and forty-eighth contacts in the associated contact bank, respectively corresponding to the successive months of the fourth year comprising thirty days, ground potential is applied to the conductor C4130.

When the grounded wiper 4121 of the month switch 4120 engages the fiftieth contact in the associated contact bank an obvious circuit, including the contacts 4128, is completed for energizing the magnet M4127, thereby to cause the latter magnet to operate and restore; whereby the wipers noted of the month switch 4120 are driven an additional step in the counterclockwise direction back into their home positions.

In view of the foregoing explanation of the mode of operation of the month switch 4120, it will be understood that it operates continuously to mark the conductors C4128 to C4131, inclusive, in accordance with the number of days in the successive months throughout a four-year period; whereby the number of days included in the month of February is appropriately marked, depending upon whether the year is an ordinary year or a leap year, in an obvious manner.

During the cycle of operation of the day switch 4110 the wiper 4111 thereof engages one of the contacts 33, 34, 35 or 36 terminating a corresponding one of the conductors C4128, C4129, C4130 and C4131 having ground potential thereon in accordance with the operation of the month switch 4120; whereby an obvious circuit is completed for energizing the winding of the control relay R4140. When thus energized the control relay R4140 operates to complete, at the contacts 4142, an obvious holding circuit, including the grounded wiper 4112 of the day switch 4110 and the engaged contact in the associated contact bank, for energizing the winding thereof. Also the control relay R4140 completes, at the contacts 4141, an obvious circuit for energizing the magnet M4127, thereby to cause the latter magnet to operate and condition the wipers noted of the month switch 4120 to be driven one step in the counterclockwise direction. Finally the control relay R4140 completes, at the contacts 4143, a circuit, including the grounded wiper 4112 of the day switch 4110 and the engaged contact in the associated contact bank, the contacts 4142 and 4120, for energizing the magnet M4119, whereby the latter magnet operates intermittently in order to drive the wipers noted of the day switch 4110 step by step in the clockwise direction back into their home positions. When the day switch 4110 is thus released the wiper 4112 thereof reengages the home contact in the associated contact bank, whereby the previously traced holding circuit for energizing the winding of the control relay R4140 is interrupted, thereby to cause the latter relay to restore. Upon restoring, the control relay R4140 interrupts, at the contacts 4143, a further point in the previously traced circuit for energizing the magnet M4119 of the day switch 4110; and interrupts, at the contacts 4141, the previously mentioned circuit for energizing the magnet M4127 of the month switch 4120. The magnet M4127 then restores, thereby to drive the wipers noted of the month switch 4120 an additional step in the counterclockwise direction. At this time the day switch 4110 has been recycled and is in readiness to operate in accordance with the number of days in the month of the year, in the manner explained above, and the month switch 4120 occupies a position adapted to control the operation of the day switch 4110 in accordance with the number of days in the month of the year.

The grounded wipers 4117 and 4118 of the day switch 4110 continuously mark the WXYZ conductors in the associated group of WXYZ marking leads 4605 in accordance with the unit digit of the day of the month; while the grounded wipers 4113, 4114, 4115 and 4116 thereof continuously mark the WXYZ conductors in the associated group of WXYZ marking leads 4606 in accordance with the ten digit of the day of the month. Similarly, the grounded wipers 4125 and 4126 of the month switch 4120 continuously mark the WXYZ conductors in the associated group of WXYZ marking leads 4607 in accordance with the unit digit of the month of the year; while the grounded wipers 4123 and 4124 thereof continuously mark the WXYZ conductors in the associated group of WXYZ marking leads 4608 in accordance with the ten digit of the month of the year.

As previously pointed out, the date and time unit 3900 operates continuously to mark the unit digit and the ten digit of the minute of the hour, the unit digit and the ten digit of the hour of the day, the unit digit and the ten d git of the day of the month and the unit digit and the ten digit of the month of the year, taking care of the number of days in the month of February included in both ordinary and leap years. However, it is necessary initially to set the times and dates in the date and time unit 3900 and to correct the setting thereof in the event of failure of the master clock 3901 at any time. This may be accomplished by appropriately operating the minute correct key K3935, the hour correct key K4030, the day correct key 4040 and the month correct key 4130. More particularly, each t me the minute correct key K3935 is operated and restored an obvious alternative circuit for energizing the magnet M3924 is completed and then interrupted, thereby to cause the latter magnet to operate and restore; whereby the wipers noted of the unit minute switch 3920 are operated an add tional step in the clockwise direction and the ten minute switch 4010 is appropriately controlled by the unit minute switch 3920, in the manner previously explained. Similarly, each time the hour correct key K4030 is operated and restored an obvious alternative circuit for energizing the magnet M4026 is completed and then interrupted, thereby to cause the latter magnet to operate and restore, whereby the wipers noted of the hour switch 4020 are operated an additional step in the clockwise direction; and each time the day correct key K4040 is operated and restored an obvious alternative circuit for energizing the magnet M4119 is completed and then interrupted, thereby to cause the latter magnet to operate and restore, whereby the wipers noted of the day switch 4110 are operated an additional step in the clockwise direction. Finally each time the month correct key K4130 is operated and restored an obvious alternative circuit for energizing the magnet M4127 is completed and then interrupted, thereby to cause the latter magnet to operate and restore, whereby the wipers noted of the month switch 4120 are operated an additional step in the clockwise direction.

*Further operation of the printer controller*

Continuing now with the operation of the printer controller 4200, after all of the items of record information have been transferred thereto from the repeater 800, the wipers noted of the storage register switch S4220 engage the twenty-first contacts in the associated contact banks; whereby the wiper 4222 thereof disengages the twentieth contact in the associated contact bank and engages the twenty-first contact therein in order, respectively, to interrupt the previously traced circuit for energizing the upper winding of the hold relay R4350 and to complete an obvious holding circuit for energizing the lower winding thereof, whereby the hold relay R4350 is retained in its operated position. When the wiper 4222 of the storage register switch S4220 disengages the twentieth contact in the associated contact bank it also interrupts a further point in the previously traced circuit for energizing the magnet SM4227, whereby further operation of the pulse relay R4450 does not effect further operation of the storage transfer switch S4220 at this time.

As previously explained, the date and time unit 3900 operates continuously to cause the date and time to be marked to the groups of WXYZ marking leads 4601 to 4608, inclusive. For convenience, it may be assumed that the groups of WXYZ marking conductors 4601 to 4608, inclusive, are marked by the date and time unit 3900 in accordance with the following items of record information, as indicated below:

| Group of WXYZ Marking Leads | Nature of Record Information |
|---|---|
| 4608<br>4607 | The respective ten and unit digits of the month of the year, the respective digits 1 and 1 being registered. |
| 4606<br>4605 | The respective ten and unit digits of the day of the month, the respective digits 2 and 9 being registered. |
| 4604<br>4603 | The respective ten and unit digits of the hour of the day, the respective digits 1 and 1 being registered. |
| 4602<br>4601 | The respective ten and unit digits of the minute of the hour, the respective digits 3 and 3 being registered. |

Considering now the operation of the ticket printer control switch P4510 to govern the toll ticket printer 5230, upon the first operation of the pulse relay R4460 there is completed, at the contacts 4463, the previously traced circuit for energizing the magnet PM4517; thereby to cause the latter magnet to operate and condition the wipers noted of the ticket printer control switch P4510 to be driven one step in the counterclockwise direction. Also, upon the first operation of the pulse relay R4460 there is completed, at the contacts 4461, the previously mentioned path for applying ground potential to the multiple connected wipers 4515 and 4516 of the ticket printer control switch P4510, thereby to complete a circuit, including the wiper 4516 and the engaged home contact in the associated contact bank and C4255, for energizing the magnet CM4237; whereby the latter magnet operates and conditions the wipers noted of the ticket storage transfer switch C4230 to be driven an additional step in the counterclockwise direction. Upon operating, the magnet PM4517 completes, at the contacts 4518, the previously mentioned path for applying ground potential to the multiple connected wipers 4511 and 4512 of the ticket printer control switch P4510, whereby the wiper 4512 engaging the home contact in the associated contact bank applies ground potential to the mark conductor C4541. The application of ground potential to the mark conductor C4541 completes a path, including the contacts WA1 and XA1, for applying ground potential to the first marking conductor in the group of marking leads 5201 extending to the toll ticket printer 5230; the relays WA and XA being operated at this time, in a manner more fully described hereinafter. This application of ground potential to the first marking conductor in the group of marking leads 5201 completes an obvious circuit, including the contacts 5234 of the set of switch springs S5233, for energizing the #1 printer magnet in the toll ticket printer 5230, whereby the latter magnet operates in order to cause the toll ticket printer 5230 to print the first digit 1 in the first line on the toll ticket shown in Figs. 56 and 62. The first digit 1 in the first line on the toll ticket, shown in Figs. 56 and 62, corresponds to the ten digit 1 of the month of the year.

Before explaining the mode of operation of the WA, XA, YA and ZA relays respectively associated with the wipers 4233, 4234, 4235 and 4236 of the ticket storage transfer switch C4230, the general operation of the ticket printer control switch P4510 will be explained. Continuing now with the operation of the ticket printer control switch P4510, it is noted that the wiper 4512 first engages the home contact and then the first contact in the associated contact bank terminating the mark conductors C4541, thereby to cause the toll ticket printer 5230 to print the digits 1 and 1 in the first line on the toll ticket mentioned, shown in Figs. 56 and 62. The wiper 4512 then engages the second contact in the associated contact bank terminating the dash conductor C5208, thereby to cause the toll ticket printer 5230 to print the dash (—) in the first line on the toll ticket. The wiper 4512 then successively engages the third and fourth contacts in the associated contact bank terminating the mark conductor C4541, thereby to cause the toll ticket printer to print the digits 2 and 9 in the first line on the toll ticket. The wiper 4512 then engages the fifth contact in the associated contact bank terminating the stroke conductor C5209, thereby to cause the toll ticket printer to print the stroke (/) in the first line on the toll ticket.

The wiper 4512 then successively engages the sixth and seventh contacts in the associated contact bank terminating the mark conductor C4541, thereby to cause the toll ticket printer 5230 to print the digits 1 and 1 in the first line on the toll ticket. The wiper 4512 then engages the eighth contact in the associated contact bank terminating the period conductor C5210, thereby to cause the toll ticket printer 5230 to print the period (.) in the first line on the toll ticket. The wiper 4512 then successively engages the ninth and tenth contacts in the associated contact bank terminating the mark conductor C4541, thereby to cause the toll ticket printer 5230 to print the digits 3 and 3 in the first line on the toll ticket. The wiper 4512 then engages the eleventh contact in the associated contact bank terminating the shift conductor C5207, thereby to cause the toll ticket printer 5230 to space and to shift the toll ticket, whereby the second line thereon may be printed.

The wiper 4512 then engages the twelfth contact in the associated contact bank which is blank, causing no operation of the toll ticket printer 5230. The wiper 4512 then successively engages the thirteenth and fourteenth contacts in the associated contact bank terminating the conductors C5212 and C5213 extending to the terminal block B5211, which are respectively jumpered to the eighth and fourth conductors in the group of marking leads 5201, thereby to cause the toll ticket printer 5230 to print the digits 8 and 4 in the second line on the toll ticket. The wiper 4512 then engages the fifteenth contact in the associated contact bank terminating the space conductor C5206, thereby to cause the toll ticket printer 5230 to space the toll ticket. The wiper 4512 then engages the sixteenth contact in the associated contact bank terminating the conductor C5214 extending to the terminal block B5211, which is jumpered to the fourth conductor in the group of marking leads 5201, thereby to cause the toll ticket printer 5230 to print the digit 4 in the second line on the toll ticket.

The wiper 4512 then engages the seventeenth contact in the associated contact bank terminating the dash conductor C5208, thereby to cause the toll ticket printer 5230 to print the dash (—) in the second line on the toll ticket. The wiper 4512 then successively engages the eighteenth, nineteenth, twentieth and twenty-first contacts in the associated contact bank terminating the mark conductor C4541, thereby to cause the toll ticket printer 5230 to print the digits 0, 0, 9 and 9 in the second line on the toll ticket. The wiper 4512 then engages the twenty-second contact in the associated contact bank terminating the shift conductor C5207, thereby to cause the toll ticket printer 5230 to space and to shift the toll ticket, whereby the third line thereon may be printed.

The wiper 4512 then engages the twenty-third contact in the associated contact bank which is blank, causing no operation of the toll ticket printer 5230. The wiper 4512 then engages the twenty-fourth contact in the associated contact bank and the wiper 4511 next engages the twenty-fifth contact in the associated contact bank terminating the mark conductor C4541, thereby to cause the toll ticket printer 5230 to print the digits 2 and 7 in the third line on the toll ticket. The wiper 4511 then engages the twenty-sixth contact in the associated contact bank terminating the space conductor C5206, thereby to cause the toll ticket printer 5230 to space the toll ticket. The wiper 4511 then engages the twenty-seventh contact in the associated contact bank which is connected by way of the contacts 4531 to the mark conductor C4541, thereby to cause the toll ticket printer to print the digit 9 in the third line on the toll ticket.

The wiper 4511 then engages the twenty-eighth contact in the associated contact bank which is connected by way of the contacts 4533 to the dash conductor C5208, thereby to cause the toll ticket printer 5230 to print the dash (—) in the third line on the toll ticket. The wiper 4511 then successively engages the twenty-ninth, thirtieth, thirty-first and thirty-second contacts in the associated contact bank terminating the mark conductor C4541, thereby to cause the toll ticket printer 5230 to print the digits 1, 2, 3 and 4 in the third line on the toll ticket. The wiper 4511 then engages the thirty-third contact in the associated contact bank terminating the shift conductor C5207, thereby to cause the toll ticket printer 5230 to space and to shift the toll ticket, whereby the fourth line thereon may be printed.

The wiper 4511 then engages the thirty-fourth contact in the associated contact bank which is blank, causing no operation of the toll ticket printer 5230. The wiper 4511 then successively engages the thirty-fifth, thirty-sixth and thirty-seventh contacts in the associated contact bank terminating the mark conductor C4541, thereby to cause the toll ticket printer 5230 to space the toll ticket twice and then to print the digit 4 in the fourth line on the toll ticket. The wiper 4511 then engages the thirty-eighth contact in the associated contact bank terminating the stroke conductor C5209, thereby to cause the toll ticket printer 5230 to print the stroke (/) in the fourth line on the toll ticket. The wiper 4511 then engages the thirty-ninth contact in the associated contact bank terminating the mark conductor C4541, thereby to cause the toll ticket printer 5230 to print the digit 3 in the fourth line on the toll ticket. The wiper 4511 then engages the fortieth contact in the associated contact bank terminating the stroke conductor C5209, thereby to cause the toll ticket printer 5230 to print the stroke (/) in the fourth line on the toll ticket. The wiper 4511 then engages the forty-first contact in the associated contact bank which is connected by way of the contacts 4523 to the (F) conductor C5204, thereby to cause the toll ticket printer 5230 to print the (F) in the fourth line on the toll ticket. The wiper 4511 then engages the forty-second contact in the associated contact bank terminating the shift conductor C52J7, thereby to cause the toll ticket printer 5230 to space and to shift the toll ticket, whereby the fifth line thereon may be printed.

The wiper 4511 then engages the forty-third contact in the associated contact bank which is blank, causing no operation of the toll ticket printer 5230. The wiper 4511 then successively engages the forty-fourth and forty-fifth contacts in the associated contact bank, which are respectively connected by way of the contacts 4552 and 4554 and C4964 and C4965, respectively, to the wipers 4924 and 4925 of the first wiper set of the calculating switch B4920; and therefrom by way of the engaged 0 up 4 in contacts in the respectively associated contact banks and the jumper 4951 to the respective sixth and tenth conductors in the group of marking leads 5201; thereby to cause the toll ticket printer 5230 to print the digits 6 and 0 in the fifth line on the toll ticket. The wiper 4511 then engages the forty-sixth contact in the associated contact bank which is connected by way of the contacts 4556 and C4966 to the wiper 4926 of the first wiper set of the calculating switch B4920; the last-mentioned contact being blank, causing no operation of the toll ticket printer 5230.

The wiper 4511 then engages the forty-seventh contact in the associated contact bank terminating the space conductor C5206, thereby to cause the toll ticket printer 5230 to space the toll ticket. The wiper 4511 then engages the forty-eighth contact in the associated contact bank which is connected by way of the contacts 4521 to the (C) conductor C5202, thereby to cause the toll ticket printer 5230 to print the (C) in the fifth line on the toll ticket. The wiper 4511 then engages the forty-ninth contact in the associated contact bank which is blank, causing no operation of the toll ticket printer 5230.

It is noted that, when the wiper 4515 of the ticket printer control switch P4510 engages the forty-third contact in the associated contact bank and the pulse relay R4460 operates, a circuit, including the contacts 4461, C4482, the wiper 4515 of the ticket printer control switch P4510 and the engaged forty-third contact in the associated contact bank and C4543, is completed for energizing the winding of the control relay R4710, thereby to cause the latter relay to operate. Upon operating, the control relay R4710 completes, at the contacts 4713′, an obvious holding circuit, including the contacts 4336, for energizing the winding thereof; and interrupts, at the contacts 4714, the previously traced circuit for energizing in multiple the upper and lower windings of the pulse relay R4450, thereby positively to arrest further operation of the latter relay at this time. Also the control relay R4710 interrupts, at the contacts 4713, the previously traced circuit for energizing in multiple the upper and lower windings of the pulse relay R4450; and completes, at the contacts 4712, an alternative circuit, including the grounded wiper 4222 of the storage register switch S4220 and the engaged twenty-first contact in the associated contact bank, the contacts 4354, 4433 and 4462, for energizing in multiple the upper and lower windings of the pulse relay R4460. Further the control relay R4710 interrupts, at the contacts 4711, a further point in a path traced hereinafter for applying ground potential to the space conductor C5222 extending to the record printer 5240.

When the wiper 4515 of the ticket printer control switch P4510 engages and subsequently disengages the forty-ninth contact in the associated contact bank and the pulse relay R4460 operates and restores, a circuit, including the contacts 4461, C4482, the wiper 4515 of the ticket printer control switch P4510 and the engaged forty-ninth contact in the associated contact bank and C4251, is completed and then interrupted for energizing the magnet SM4227 of the storage register switch S4220, thereby to cause the latter magnet to operate and restore; whereby the wiper 4222 thereof disengages the twenty-first contact in the associated contact bank. When the wiper 4222 of the storage register switch S4220 disengages the twenty-first contact in the associated contact bank the printer controller 4200 is released, in a manner more fully explained hereinafter.

Considering now the operation of the marking relays WA, XA, YA and ZA, when the wipers 4233 to 4236, inclusive, of the ticket storage transfer switch C4230 engage the first contacts in the associated contact banks the WXYZ conductors in the group of WXYZ marking leads 4608 extending to the date and time unit 3900 are operatively connected to the windings of the respective marking relays WA, XA, YA and ZA in view of the fact that a code corresponding to the ten digit of the month of the year, the digit 1, is marked in the group of WXYZ marking leads 4608. Ground potential appears upon the W and X conductors in the group of WXYZ marking leads 4608, whereupon obvious circuits for energizing the windings of the marking relays WA and XA are completed. When thus energized the WA and XA relays operate to complete, at the respective contacts WA1 and XA1, a path for applying ground potential to the first conductor in the group of marking leads 5201; this path extending from the grounded wiper 4512 of the ticket printer control switch P4510 and the engaged home contact in the associated contact bank, the mark conductor C4541 and the contacts WA1 and XA1 to the first conductor in the group of marking leads 5201 extending to the toll ticket printer 5230.

From the foregoing it will be understood that, as the wipers noted of the ticket storage transfer switch C4230 are rotated step by step in the counterclockwise direction, they successively engage the contacts in the associated contact banks terminating the WXYZ conductors in the various groups of WXYZ marking leads 4801 and 4601 to 4608, inclusive, and the various groups of WXYZ marking leads extending to the code storage devices S4622 to S4638, inclusive, thereby to cause the marking relays WA, XA, YA and ZA to operate in accordance with the code marked in the particular group of WXYZ marking leads. The various combinations of operations of the marking relays WA, XA, YA and ZA complete marking paths between the mark conductor C4541 and the ten marking conductors in the group of marking leads 5201 extending to the toll ticket printer 5230, in an obvious manner.

Further it is noted that, when there is no code digit marked in a given group of WXYZ marking leads selected by the wipers noted of the ticket storage transfer switch C4230, no ground potential appears upon the associated WXYZ conductors, thereby to cause each of the marking relays WA, XA, YA and ZA to remain in its restored position. At this time a path is completed for connecting the mark conductor C4541 to the space conductor C5206 extending to the toll ticket printer 5230, this path including the contacts WA2, XA4, YA6 and ZA8.

In order to cause the toll ticket printer 5230 to operate and print the information previously described upon the toll ticket, shown in Figs. 56 and 62, it is necessary for the different groups of WXYZ marking leads 4801 and 4601 to 4608, inclusive, and the different code storage devices S4622 to S4635, inclusive, to be connected to the various contacts in the contact banks associated with the wipers 4233 and 4236, inclusive, of the ticket storage transfer switch C4230, in a predetermined order and as indicated in the following schedule:

| Position of Terminating Contacts in the Contact Banks of the Ticket Storage Transfer Switch C4230 | Group of WXYZ Marking Leads or Code Storage Device |
|---|---|
| 1 | 4608 |
| 2 | 4607 |
| 3 | 4606 |
| 4 | 4605 |
| 5 | 4604 |
| 6 | 4603 |
| 7 | 4602 |
| 8 | 4601 |
| 9 | S4625 |
| 10 | S4626 |
| 11 | S4627 |
| 12 | S4628 |
| 13 | S4629 |
| 14 | S4630 |
| 15 | S4631 |
| 16 | S4632 |
| 17 | S4633 |
| 18 | S4634 |
| 19 | S4635 |
| 20 | S4622 |
| 21 | S4623 |
| 22 | S4624 |
| 23 | 4801 |

At this point it is again noted that, when the pulse relay R4460 operates and restores while the wiper 4516 or 4515 of the ticket printer control switch P4510 engages a contact in the respectively associated contact bank terminating the multiple conductor C4255, the previously traced circuit for energizing the magnet CM4237 of the ticket storage transfer switch C4230 is completed and then interrupted, thereby to cause the magnet mentioned to operate and restore in order to drive the wipers noted of the ticket storage transfer switch C4230 one step in the counterclockwise direction; while each time the pulse relay R4460 operates and restores the previously traced circuit for energizing the magnet PM4517 is completed and interrupted, thereby to cause the latter magnet to operate and restore in order to drive the wipers noted of the ticket printer control switch P4510 one step in the counterclockwise direction. Accordingly it will be understood that each time the pulse relay R4460 operates and restores the wipers noted of the ticket printer control switch P4510 are driven one step in the counterclockwise direction; while the wipers noted of the ticket storage transfer switch C4230 are driven one step in the counterclockwise direction upon each of only certain operations and restorations of the pulse relay R4460, as explained above.

Considering now the operation of the record storage transfer switch R4810 to govern the record printer 5240, upon the first operation of the pulse relay R4460 there is completed, at the contacts 4464, the previously traced circuit for energizing the magnet RM4816, thereby to cause the latter magnet to operate and condition the wipers noted of the record storage transfer switch R4810 to be driven one step downwardly as illustrated. Also, upon operating, the magnet RM4816 of the record storage transfer switch R4810 completes, at the contacts 4817, the previously mentioned path for applying ground potential to the mark conductor C4661. The application of ground potential to the mark conductor C4661 completes a path, including the contacts WB2, XB4, YB8 and ZB12 and 4711, for applying ground potential to the space conductor C5222 extending to the record printer 5240; the relays WB, XB, YB and ZB occupying their restored positions at this time, as explained more fully hereinafter. This application of ground potential to the space conductor C5222 completes an obvious circuit for energizing the space magnet in the record printer 5240, whereby the latter magnet operates in order to cause the record printer 5240 to space the record sheet, shown in Figs. 55 and 61.

At this point it is again noted that the marking relays WB, XB, YB and ZB occupy their restored positions when the wipers noted of the record storage transfer switch R4810 engage the home contacts in the associated contact banks, due to the fact that ground potential does not appear upon the conductor C4481 extending to the printer link 5000; the last-mentioned condition prevailing in view of the fact that the toll ticket test relay R5090 in the printer link 5000 occupies its operated position at this time, as previously noted.

Before explaining the mode of operation of the WB, XB, YB and ZB relays respectively associated with the wipers 4811, 4812, 4813 and 4814 of the record storage transfer switch R4810, the general operation of the record storage transfer switch R4810 will be explained. Continuing now with the operation of the record storage transfer switch R4810, it is pointed out that the wipers noted thereof first engage the home contacts in the associated contact banks, whereby the grounded mark conductor C4661 is connected to the space conductor C5222 in order to cause the record printer 5240 to space the record sheet, as previously explained. The wipers noted of the record storage transfer switch R4810 successively engage the first and second contacts in the associated contact banks, whereby the grounded mark conductor C4661 is respectively connected to the first and first marking conductor in the group of marking leads 5221; whereby the record printer 5240 prints the digits 1 and 1 on the record sheet mentioned.

The wipers noted of the record storage transfer switch R4810 then successively engage the third to the forty-fifth, inclusive, contacts in the associated contact banks, whereby the grounded mark conductor C4661 is successively connected to the various marking conductors in the group of marking leads 5221; whereby the record printer 5240 prints the remainder of the information in the single line on the record sheet, as illustrated in Figs. 55 and 61 previously noted. Finally, when the wipers of the record storage transfer switch R4810 engage the forty-fifth contacts in the associated contact banks, the grounded mark conductor C4661 is connected to the shift conductor C5223 in the group of marking leads 5221, whereby the record printer 5240 spaces and shifts the record sheet.

Considering now the operation of the marking relays WB, XB, YB and ZB, when the wipers 4811 to 4814, inclusive, of the record storage transfer switch R4810 engage the first contacts in the associated contact banks the WXYZ conductors in the group of WXYZ marking leads 4608 extending to the date and time unit 3900 are operatively connected to the windings of the respective marking relays WB, XB, YB and ZB. In view of the fact that a code corresponding to the ten digit of the month of the year, the digit 1, is marked in the group of WXYZ marking leads 4608, ground potential appears upon the W and X conductors in the group of WXYZ marking leads 4608; whereupon obvious circuits, respectively including C4662 and C4663, for energizing the windings of the marking relays WB and XB are completed. When thus energized the WB and XB relays operate to complete, at the respective contacts WB1 and XB1, a path for applying ground potential to the first conductor in the group of marking leads 5221 extending to the record printer 5240, this path including the grounded mark conductor C4661 and the contacts WB1, XB1, YB2 and ZB2.

From the foregoing it will be understood that, as the wipers noted of the record storage transfer switch R4810 are moved step by step downwardly as illustrated, they successively engage contacts in the associated contact banks terminating the WXYZ conductors in the various groups of WXYZ marking leads 4801 and 4601 to 4608, inclusive, and the various groups of WXYZ marking leads extending to the code storage devices S4622 to S4638, inclusive; thereby to cause the marking relays WB, XB, YB and ZB to operate in accordance with the code marked in the particular group of WXYZ marking leads. Also the wipers noted of the record storage transfer switch R4810 successively engage the contacts in the associated contact banks which are connected directly to ground potential, thereby to cause the marking relays WB, XB, YB and ZB to operate in accordance with the particular grounded contacts in the contact banks engaged by the wipers noted. The various combinations of operations of the marking relays WB, XB, YB and ZB complete marking paths between the mark conductor C4661 and the ten marking conductors, the stroke conductor C5225, the dash conductor C5224 and the shift conductor C5223 in the group of marking leads 5221 extending to the record printer 5240, in an obvious manner.

Further it is noted that, when there is no code digit marked in a given group of WXYZ marking leads selected by the wipers noted of the record storage transfer switch R4810, no ground potential appears upon the associated WXYZ conductors, thereby to cause each of the marking relays WB, XB, YB and ZB to remain in its restored position. At this time a path is completed for connecting the mark conductor C4661 to the space conductor C5222 extending to the record printer 5240 in the event the control relay R4710 has not operated at this time, the above-mentioned path including the contacts WB2, XB4, YB8, ZB12 and 4711.

In order to cause the record printer 5240 to operate and print the information previously described upon the record sheet, shown in Figs. 55 and 61, it is necessary for the different groups of WXYZ marking leads 4611, 4612, 4613, 4701, 4801 and 4601 to 4608, inclusive, and the different code storage devices S4622 to S4638, inclusive, as well as direct ground potential, to be connected to the various contacts in the contact banks associated with the wipers 4811 to 4814, inclusive, of the record storage transfer switch R4810, in a predetermined order and as indicated in the following schedule:

| Position of the Terminating Contacts in the Contact Banks of the Record Storage Transfer Switch R4810 | Group of WXYZ Marking Leads, Code Storage Device, Control Conductor, Relay or Ground Potential |
|---|---|
| Home | The control conductor C4481 |
| 1 | 4608 |
| 2 | 4607 |
| 3 | Direct ground combination making dash (—) |
| 4 | 4606 |
| 5 | 4605 |
| 6 | Direct ground combination making stroke (/) |
| 7 | 4604 |
| 8 | 4603 |
| 9 | Direct ground combination making dash (—) |
| 10 | 4602 |
| 11 | 4601 |
| 12 | Direct ground combination making stroke (/) |
| 13 | 4611 |
| 14 | 4612 |
| 15 | 4613 |
| 16 | Direct ground combination making dash (—) |
| 17 | S4625 |
| 18 | S4626 |
| 19 | S4627 |
| 20 | S4628 |
| 21 | Direct ground combination making stroke (/) |
| 22 | S4629 |
| 23 | S4630 |
| 24 | S4631 |
| 25 | Direct ground combination making dash (—) |
| 26 | S4632 |
| 27 | S4633 |
| 28 | S4634 |
| 29 | S4635 |
| 30 | Direct ground combination making stroke (/) |
| 31 | S4622 |
| 32 | S4623 |
| 33 | S4624 |
| 34 | Direct ground combination making stroke (/) |
| 35 | 4801 |
| 36 | Direct ground combination making stroke (/) |
| 37 | The special service relay R4380 |
| 38 | Direct ground combination making stroke (/) |
| 39 | S4636 |
| 40 | Direct ground combination making stroke (/) |
| 41 | S4637 |
| 42 | S4638 |
| 43 | Direct ground combination making stroke (/) |
| 44 | 4701 |
| 45 | Direct ground combination making shift. |

*Release of the printer controller*

As previously noted, after the ticket printer control switch P4510 has controlled the toll ticket printer 5230 in the manner previously explained, the wipers thereof are automatically driven in the counterclockwise direction back into their home positions, whereby the wipers noted of the storage register switch S4220 are driven an additional step in the clockwise direction to disengage the twenty-first contacts in the associated contact banks; whereby the ticket printer control switch P4510 is completely released. When the grounded wiper 4222 of the storage register switch S4220 disengages the twenty-first contact in the associated contact bank the previously traced holding circuit for energizing the lower winding of the hold relay R4350 and the multiple circuit for energizing in multiple the upper and lower windings of the pulse relay R4460 are interrupted, thereby to cause the hold relay R4350 to restore and to arrest further operation of the pulse relay R4460. Upon restoring, the hold relay R4350 interrupts, at the contacts 4353, the previously traced holding circuit for energizing in series the upper and lower windings of the busy relay R4320 and the magnet FM4217 of the finder F4210, whereupon the busy relay B4320 restores. Upon restoring, the busy relay R4320 interrupts, at the contacts 4324, the previously mentioned circuit for energizing the winding of the busy slave relay R4330, thereby to cause the latter relay to restore. Upon restoring, the busy slave relay R4330 interrupts, at the contacts 4338, the previously mentioned holding circuits for energizing the windings of the computation stop relay R4370, the special service relay R4380 and the two-digit code relay R4390 in the event any one of the relays mentioned occupies its operated position in order to cause the relay mentioned to restore. Also the busy slave relay R4330 interrupts, at the contacts 4335, the previously mentioned path for applying ground potential to the hold conductor C4339, thereby to cause the various WXYZ relays in the code storage devices S4621 to S4638, inclusive, to restore.

Further the busy slave relay R4330 interrupts, at the contacts 4336, the previously traced holding circuit for energizing the winding of the control relay R4710, thereby to cause the latter relay to restore; and interrupts, at the contacts 4331, the previously traced circuit for energizing the winding of the test relay R4430 in the printer controller 4200 in series with the test relay R5030 in the printer link 5000, thereby to cause the relays mentioned to restore. Further the busy slave relay R4330 completes, at the contacts 4334, a circuit, including the wiper 4731 of the calculator setting switch M4730 and the engaged contact in the associated contact bank and the contacts 4737, for energizing the winding of the release relay R4360 in series with the magnet MM4736. When this series circuit is completed the release relay R4360 operates to complete, at the contacts 4362, a path, including the contacts 4321, for applying ground potential to the test conductor C4671 extending to the finder F4640, thereby to mark the printer controller 4200 as busy to the printer controller allotter 4600. Also the magnet MM4736 operates intermittently, thereby to drive the wipers noted of the calculator setting switch M4730 step by step in the clockwise direction back into their home positions. When the calculator setting switch M4730 is thus released the wiper 4731 disengages the twenty-fourth contact in the associated contact bank; thereby to interrupt the previously traced circuit for energizing the winding of the release relay R4360 in series with the magnet MM4736 and to complete an alternative circuit, including C4472 and the wiper 4822 of the calculator selector switch T4820 and the engaged contact in the associated contact bank and the contacts 4830, for energizing the winding of the release relay R4360 in series with the magnet TM4829. When thus energized the magnet TM4829 operates intermittently, thereby to drive the wipers noted of the calculator selector switch T4820 step by step in the counterclockwise direction back into their home positions.

When the calculator selector switch T4820 is thus released the wiper 4822 disengages the twelfth or twenty-fourth contact in the associated contact bank; thereby to interrupt the previously traced circuit for energizing the winding of the release relay R4360 in series with the magnet TM4829 and to complete an alternative circuit, including C4542, the wiper 4513 or 4514 of the ticket printer control switch P4510 and the engaged contact in the respectively associated contact bank and the contacts 4519, for energizing the winding of the release relay R4360 in series with the magnet PM4517 in the event the ticket printer control switch P4510 is not completely released at this time. Also when the calculator selector switch T4820 is thus released the wiper 4821 thereof disengages the contact in the associated contact bank included in the previously traced circuit for energizing the winding of the wiper switching relay R4550, thereby to cause the latter relay to restore. When the above-traced circuit is completed the magnet PM4517 operates intermittently, thereby to drive the wipers noted of the ticket printer control switch P4510 step by step in the counterclockwise direction back into their home positions, in the event this switch is not completely released at this time.

When the ticket printer control switch P4510 is thus released the wiper 4513 disengages the forty-ninth contact in the associated contact bank, thereby to interrupt the previously traced circuit for energizing the winding of the release relay R4360 in series with the magnet PM4517 and to complete an alternative circuit, including C4253, the wiper 4221 of the storage register switch S4220 and the engaged contact in the associated contact bank and the contacts 4228, for energizing the winding of the release relay R4360 in series with the magnet SM4227. The magnet SM4227 operates intermittently, thereby to drive the wipers noted of the storage register switch S4220 step by step in the clockwise direction back into their home positions.

When the storage register switch S4220 is thus released the wiper 4221 thereof disengages the twenty-fourth contact in the associated contact bank; thereby to interrupt the previously traced circuit for energizing the winding of the release relay R4360 in series with the magnet SM4227 and to complete an alternative circuit, including C4252, the wiper 4815 of the record storage transfer switch R4810 and the engaged contact in the associated contact bank and the contacts 4818, for energizing the winding of the release relay R4360 in series with the magnet RM4816. The magnet RM4816 operates intermittently, thereby to drive the wipers noted of the record storage transfer switch R4810 step by step downwardly as illustrated, back into their home positions.

When the record storage transfer switch R4810 is thus released the wiper 4815 thereof disengages the forty-ninth contact in the associated contact bank, thereby to interrupt the previously traced circuit for energizing the winding of the release relay R4360 in series with the magnet RM4816 and to complete an alternative circuit, including C4483, the wiper 4231 of the ticket storage transfer switch C4230 and the engaged contact in the associated contact bank and the contacts 4238, for energizing the winding of the release relay R4360 in series with the magnet CM4237. The magnet CM4237 operates intermittently, thereby to drive the wipers noted of the ticket storage transfer switch C4230 step by step in the counterclockwise direction back into their home positions. When the ticket storage transfer switch C4230 is thus released the wiper 4231 thereof disengages the twenty-fourth contact in the associated contact bank; thereby to interrupt the previously traced circuit for energizing the winding of the release relay R4360 in series with the magnet CM4237 of the ticket storage transfer switch C4230.

Also, upon restoring, the busy slave relay R4330 completes, at the contacts 4334 and 4333, a circuit, including C4485 and the set of switch springs BS4930, for energizing the winding of the release relay R4360 in series with the release magnet BM4929. When thus energized the release magnet BM4929 operates to release the first and second wiper sets of the calculating switch B4920, whereupon they are returned to their normal rotary and vertical positions. When the calculating switch B4920 is thus released the set of switch springs BS4930 are actuated, thereby to interrupt the previously traced circuit for energizing the winding of the release relay R4360 in series with the release magnet BM4929.

When the ticket storage transfer switch C4230 and the operated calculating switch B4920 are thus released the previously traced circuit for energizing the winding of the release relay R4360 is interrupted, thereby to cause the latter relay to restore shortly thereafter; the release relay R4360 being of the slow-to-release type. Upon restoring, the release relay R4360 interrupts, at the contacts 4362, the previously traced path for applying ground potential to the test conductor C4671 extending to the finder F4640, thereby to mark the printer controller 4200 as idle to the printer controller allotter 4600. Also the release relay R4360 completes, at the contacts 4361, the previously traced path for applying ground potential in the printer controller 4200 to the conductor C4672 extending to the finder F4640; thereby to indicate the presence of an idle printer controller in the associated group to the printer controller allotter 4600, as previously explained. At this time, the printer controller 4200 is completely released and available for further use.

Also it is noted that the printer controller 4200 may be rendered busy by operating the busy key K4375, thereby to interrupt, at the contacts 4377 thereof, the previously traced path for applying ground potential in the printer controller 4200 to the conductor C4672 extending to the finder F4640; and to complete, at the contacts 4376 thereof, an obvious path, including the contacts 4321 and 4361, for applying ground potential to the test conductor C4671 extending to the finder F4640; whereby the printer controller 4200 is marked as busy to the printer controller allotter 4600.

*Further operation of the printer link*

As previously explained, when the printer controller 4200, selected by the finder F5010, is released the previously traced circuit for energizing the winding of the test relay R5030 in the printer link 5000 is interrupted in order to cause the latter relay to restore. Upon restoring, the test relay R5030 completes, at the contacts 5032, an obvious circuit, including the contacts 5073, for energizing the winding of the release relay R5080, thereby to cause the latter relay to operate. Upon operating, the release relay R5080 interrupts, at the contacts 5081, a further point in the previously traced circuit for energizing the magnet FM5012 of the finder F5010; and prepares, at the contacts 5082, a circuit traced hereinafter for energizing the magnet SM5024 of the control switch S5020. Also the release relay R5080 completes, at the contacts 5084, an obvious path for connecting the condenser 5035 in multiple with the condenser 5034; and completes, at the contacts 5083, an alternative circuit, including the contacts 5062, for energizing the upper and lower windings of the pulse relay R5060 in multiple. When thus energized the pulse relay R5060 operates to interrupt, at the contacts 5062, the previously traced multiple circuit for energizing the upper and lower windings thereof, whereby the upper and lower windings of the pulse relay R5060 are short-circuited in series through the multiple connected condensers 5034 and 5035 in order to cause the latter relay to restore shortly thereafter. Accordingly the pulse relay R5060 operates and restores intermittently at a predetermined rate in accordance with the joint characteristics of the multiple connected condensers 5034 and 5035.

Each time the pulse relay R5060 operates and restores it completes and then interrupts, at the contacts 5061, an obvious circuit, including the contacts 5032 and 5082, for energizing the magnet SM5024, thereby to cause the latter relay to operate and restore; whereby the wipers noted of the control switch S5020 are driven an additional step in the clockwise direction. Also each time the pulse relay R5060 operates and restores it completes and then interrupts, at the contacts 5063, an obvious path for applying ground potential to the wiper 5023 of the control switch S5020.

The wipers noted of the control switch S5020 are driven step by step in the clockwise direction away from their home positions and, when the wiper 5023 thereof engages the first, second, third, fourth and fifth contacts in the associated contact bank, ground potential is applied to the shift conductor C5207 extending to the toll ticket printer 5230. Accordingly the toll ticket printer 5230 operates to space and to shift and then to space four additional times the toll ticket shown in Figs. 56 and 62.

Referring now to Fig. 54, the carriage 5403 occupies its right-hand marginal stop position, as viewed from the front, due to the first operation of the shift magnet; while the printing on the ribbon of paper stock from the roll 5413 is disposed entirely in the paper chute 5416 due to the five spacing operations of the shift magnet, as previously explained.

The grounded wiper 5023 of the control switch S5020 engages and then disengages the sixth contact in the associated contact bank, whereby ground potential is applied to the tab-cut conductor C5093 extending to the toll ticket printer 5230 in order to cause the tabulating magnet therein to operate. Upon operating, the tabulating magnet actuates the tabulating mechanism in the toll ticket printer 5230, whereby the knife support 5417 is latched against movement with the carriage 5403 and the carriage 5403 is moved from its right-hand marginal stop position to its left-hand marginal stop position; whereby the relative movement between the base 5414 and the knife support 5417 of the paper cutting mechanism 5411 effects the cutting off of the end of the ribbon of paper stock from the roll 5413 upon which the printing appears, whereby the toll ticket thus produced slides down the paper chute 5416 due to the action of gravity and is received in a suitable receptacle disposed below the end of the paper chute 5416.

The grounded wiper 5023 of the control switch S5020 then engages the seventh contact in the associated contact bank, whereby no action of the apparatus in the printer link 5000 or the toll ticket printer 5230 is produced. The grounded wiper 5023 of the control switch S5020 then engages and disengages the eighth contact in the associated contact bank, thereby to complete and then interrupt an obvious circuit for operating the toll ticket register R5137 and an obvious multiple circuit, including the wiper 5123 of the counting switch B5120 and the engaged contact in the associated contact bank, for energizing the magnet AM5113 of the counting switch A5110. The toll ticket register R5137 operates to register the issuing of a toll ticket by the toll ticket printer 5230; and the magnet AM5113 operates and restores, thereby to drive the wipers noted of the counting switch A5110 one step in the clockwise direction, for a purpose more fully explained hereinafter.

The grounded wiper 5023 of the control switch S5020 then engages the ninth contact in the associated contact bank, whereby ground potential is again applied to the shift conductor C5207 extending to the toll ticket printer 5230 in order to cause the shift magnet therein to operate; whereby the end of the ribbon of paper stock from the roll 5413 is spaced one space and the carriage 5403 is returned from its left-hand marginal stop position to its right-hand marginal stop position, as viewed from the front; whereby the toll ticket printer 5230 is in readiness to print the next toll ticket.

The grounded wiper 5023 of the control switch S5020 then engages and disengages the tenth contact in the associated contact bank, thereby to complete and then interrupt an obvious circuit for energizing the magnet FM5012 in order to cause the latter magnet to operate and restore; whereby the wiper 5011 of the finder F5010 is driven an additional step in the clockwise direction to disengage the contact terminating the test conductor C4301 extending to the printer controller 4200. When the wiper 5022 of the control switch S5020 disengages the tenth contact in the associated contact bank and engages the eleventh contact therein the previously traced holding circuit for energizing the winding of the hold relay R5070 is interrupted, thereby to cause the latter relay to restore. Upon restoring, the hold relay R5070 interrupts, at the contacts 5073, the previously traced circuit for energizing the winding of the release relay R5080, thereby to cause the latter relay to restore. Upon restoring, the release relay R5080 interrupts, at the contacts 5083, the previously traced circuit for energizing in multiple the upper and lower windings of the pulse relay R5060, thereby positively to arrest further operation of the latter relay at this time. Further the hold relay R5070 completes, at the contacts 5071, an alternative circuit, including the wiper 5021 of the control switch S5020 and the engaged grounded eleventh contact in the associated contact bank and the contacts 5025, for energizing the magnet SM5024; whereby the latter magnet operates and restores in order to drive the wipers noted of the control switch S5020 an additional step in the clockwise direction into engagement with the twelfth contacts in the associated contact banks. When the wiper 5021 of the control switch S5020 disengages the eleventh contact in the associated contact bank and engages the twelfth contact therein the above-traced alternative circuit for energizing the magnet SM5024 is interrupted, thereby positively to arrest further operation of the control switch S5020 at this time; and an alternative path is completed for applying battery potential by way of the magnet SM5024, the contacts 5025 and 5071, the wiper 5021 of the control switch S5020 and the engaged twelfth contact in the associated contact bank and the winding of the start relay R5040 to the start conductor C4302 extending to the associated group of printer controllers. At this point it is noted that the control switch S5020 has two home positions which are occupied when the wipers thereof engage either the home or the twelfth contacts in the associated contact banks.

Further, upon restoring, the hold relay R5070 interrupts, at the contacts 5074, the previously traced alternative holding circuit for energizing the winding of the toll ticket test relay R5090 in series with the winding of the toll ticket relay R5140 and the magnet M5232 of the toll ticket printer 5230, whereby the relays and the magnet mentioned restore. Further the hold relay R5070 interrupts, at the contacts 5074, the previously traced circuit for energizing the winding of the record relay R5150, thereby to cause the latter relay to restore. Upon restoring, the toll ticket relay R5140 interrupts, at the contacts 5141, the previously traced circuit for operating the motor 5231 of the toll ticket printer 5230; and prepares, at the contacts 5142, the previously mentioned circuit for operating the toll ticket alarm A5134. At this point it is noted that, in the event the carriage 5403 of the toll ticket printer 5230 has not been returned completely to its right-hand marginal stop position or in the event there is an inadequate supply of paper stock upon the roll 5413, the paper test rod 5236 does not engage the adjacent end of the paper roll 5413, as previously explained; whereby the set of switch springs S5233 is actuated. When the set of switch springs S5233 is thus actuated there is interrupted, at the contacts 5234 thereof, a further point in the previously traced original circuit for energizing the winding of the toll ticket test relay R5090 in series with the winding of the toll ticket relay R5140 and the magnet M5232 of the toll ticket printer 5230; and there is completed, at the contacts 5235 thereof, the previously mentioned circuit, excluding C5253 and the contacts 5142, for operating the toll ticket alarm A5134. The operation of the toll ticket alarm A5134 indicates to the exchange attendant either that the carriage 5403 of the toll ticket printer 5230 has not been returned completely to its right-hand marginal stop position at the conclusion of the last toll ticket printing operation by the toll ticket printer 5230 or that there is an inadequate supply of paper stock upon the roll 5413.

Upon restoring, the record relay R5150 interrupts, at the contacts 5151, the previously traced operating circuit for the motor 5241 of the record printer 5240; and prepares, at the contacts 5152, the previously mentioned circuit for operating the record alarm A5135. At this point it is noted that, in the event the carriage of the record printer 5240 is not completely returned to its right-hand marginal stop position at the conclusion of the last printing operation, the set of switch springs S5242 is actuated; thereby to complete the previously mentioned circuit, including C5254 and the contacts 5152, for operating the record alarm A5135. The operation of the record alarm A5135 indicates to the exchange attendant that the carriage of the record printer 5240 was not returned completely to its right-hand marginal stop position upon the conclusion of the last record printing operation.

Finally it is noted that, in the event of power failure of the 110 volt A. C. source, the winding of the power alarm relay R5130 is deenergized and restored, thereby to complete, at the contacts 5132, an obvious circuit for operating the power alarm A5133 in order to indicate the condition mentioned to the exchange attendant. At this time the printer link 5000 is completely released and is in readiness to be used in conjunction with any calling one of the printer controllers 4200 etc. in the associated group.

In view of the above description of the mode of operation of the printer link 5000, it will be understood that, after one of the printer controllers 4200 etc. has operated in order to cause the toll ticket printer 5230 to print the items of record information, in conjunction with a call upon the end of the ribbon of paper stock carried by the roll 5413, the printer controller utilized is released and the printer link 5000 then operates in order to cause the end of the ribbon of paper stock upon which the printing appears to be cut off; thereby to produce a toll ticket and to cause the toll ticket printer 5230 to be conditioned for the next toll ticket printing operation. Also the printer link 5000 effects operation of the toll ticket register 5137 to register the issuing of a toll ticket by the toll ticket printer 5230 and effects operation of the counting switch A5110 to count the issuing of a toll ticket by the toll ticket printer 5230. More particularly, each time a toll ticket is issued by the toll ticket printer 5230 the wipers noted of the counting switch A5110 are driven one step in the clockwise direction. When the magnet AM5113 operates and restores the twenty-fifth time in order to drive the wipers noted of the counting switch A5110 back into their home positions, it completes and then interrupts, at the contacts 5115, a circuit for energizing the magnet BM5123 of the counting switch B5120. The last-mentioned circuit extends, when completed, from ground by way of the contacts 5165, 5115, the wiper 5112 of the counting switch A5110 and the engaged twenty-fourth contact in the associated contact bank and the magnet BM5123 to battery. Accordingly the magnet BM5123 operates and restores, thereby to drive the wipers noted of the counting switch B5120 one step in the clockwise direction each time twenty-five toll tickets have been issued by the toll ticket printer 5230.

When the magnet BM5123 has been operated and restored twenty-two times, five hundred fifty toll tickets have been issued by the toll ticket printer 5230 and the wipers noted of the counting switch B5120 disengage the twenty-first contacts in the associated contact banks and engage the twenty-second contacts therein. When the wiper 5123 of the counting switch B5120 disengages the twenty-first contacts in the associated contact bank a further point in the previously traced circuit for energizing the magnet AM5113 is interrupted, thereby positively to prevent further operation of the counting switch A5110 at this time; and when the grounded wiper 5121 of the counting switch B5120 engages the twenty-second contact in the associated contact bank an obvious circuit for operating the paper alarm A5136 is completed. The operation of the paper alarm A5136 indicates to the exchange attendant that five hundred fifty toll tickets have been issued by the toll ticket printer 5230 and that the supply of paper stock upon the roll 5413 of the toll ticket printer 5230 must be almost exhausted, even though the paper position testing mechanism 5412 carried by the toll ticket printer 5230 has not operated in order to cause operation of the toll ticket alarm A5134, in the manner previously explained. Hence, the paper alarm A5136 indicates that the toll ticket printer 5230 requires attention due to an inadequate supply of paper stock upon the roll 5413 thereof when the toll ticket printer 5230 has issued five hundred fifty toll tickets. At this point it will be noted that the previously traced circuit for operating the paper alarm A5136 may be wired upon other than the twenty-second contact in the contact bank associated with the wiper 5121 of the counting switch B5120 in order to cause operation of the paper alarm A5136 when 500, 525 etc. toll tickets, instead of 550 toll tickets, have been issued by the toll ticket printer 5230, in an obvious manner.

When the paper alarm A5136 is thus operated the exchange attendant provides the toll ticket printer 5230 with a new roll of paper and then momentarily operates the reset key K5166, thereby to complete an obvious circuit for energizing the upper winding of the reset relay R5160, whereupon the latter relay operates. Upon operating, the reset relay R5160 completes, at the contacts 5161 and 5162, an obvious holding circuit, including the wiper 5111 of the counting switch A5110 and the engaged contact in the associated contact bank, for energizing the upper winding of the reset relay R5160; and completes, at the contacts 5163 and 5164, an obvious holding circuit, including the wiper 5122 of the counting switch B5120 and the engaged contact in the associated contact bank, for energizing the lower winding of the reset relay R5160. Also the reset relay R5160 completes, at the contacts 5161, an obvious circuit, including the wiper 5111 of the counting switch A5110 and the engaged contact in the associated contact bank and the contacts 5114, for energizing the magnet AM5113; and completes, at the contacts 5163, an obvious circuit, including the wiper 5122 of the counting switch B5120 and the engaged contact in the associated contact bank and the contacts 5124, for energizing the magnet BM5123. The magnet AM5113 then operates intermittently, thereby to drive the wipers noted of the counting switch A5110 step by step in the clockwise direction back into their home positions; and the magnet BM5123 then operates intermittently, thereby to drive the wipers noted of the counting switch B5120 step by step in the clockwise direction back into their home positions.

When the counting switch A5110 is thus released the wiper 5111 thereof disengages the twenty-fourth contact in the associated contact bank, thereby to interrupt the previously traced circuit for energizing the magnet AM5113 and to interrupt the previously traced holding circuit for energizing the upper winding of the reset relay R5160. When the counting switch B5120 is thus released the wiper 5122 thereof disengages the twenty-fourth contact in the associated contact bank, thereby to interrupt the previously traced circuit for energizing the magnet BM5123 and to interrupt the previously traced holding circuit for energizing the lower winding of the reset relay R5160. Accordingly further operation of the counting switches A5110 and B5120 is arrested at this time and the reset relay R5160 restores. At this time the counting switches A5110 and B5120 are completely released and the apparatus is in readiness to again count the number of toll tickets issued by the toll ticket printer 5230, in the manner explained above.

*Operation of the record printer in the event of failure of the toll ticket printer*

As previously pointed out, in the event the carriage on the toll ticket printer 5230 is not completely returned to its right-hand marginal stop position at the conclusion of the last printing operation thereof, or in the event there is inadequate paper stock upon the roll 5413 carried thereby, the paper engaging rod 5236 is not engaged and the set of switch springs S5233 is actuated. In this event, when the finder F5010 operates to seize the calling printer controller 4200, the start relay R5040 in the printer link 5000 operates, as previously explained. However, in this event, the previously traced circuit for energizing the winding of the toll ticket test relay R5090 in series with the winding of the toll ticket relay R5140 and the magnet M5232 of the toll ticket printer 5230 is not completed and the relays mentioned remain in their restored positions. The toll ticket relay R5140 does not initiate operation of the motor 5231 of the toll ticket printer 5230; while the restored toll ticket test relay R5090 prepares, at the contacts 5092, the previously traced path for applying ground potential to the conductor C4481 commonly extending to the printer controllers of the associated group. Subsequently, when the finder F5010 selects the printer controller 4200, the test relay R5030 in the printer link 5000 operates in order to cause operation of the hold relay R5070, whereby ground potential is applied to the conductor C4481. The application of ground potential to the conductor C4481 extending to the printer controller 4200 completes an obvious multiple circuit, including the contacts 4432 and the respective wipers 4811, 4812 and 4813 of the record storage transfer switch R4810 and the engaged home contacts in the associated contact banks and the respective conductors C4662, C4663 and C4664, for respectively energizing the windings of the marking relays WB, XB and YB, whereby the relays mentioned operate. Upon operating the marking relays WB, XB and YB complete, at the contacts WB1, XB1 and YB1, an obvious connection between the mark conductor C4461 and the stroke conductor C5225 extending to the record printer 5240.

When the magnet RM4816 of the record storage transfer switch R4810 first operates while the wipers noted of the record storage transfer switch R4810 engage the home contacts in the associated contact banks, there is completed, at the contacts 4817, the previously mentioned path for applying ground potential to the mark conductor C4661; whereby ground potential is connected by way of the previously traced path to the stroke conductor C5225 extending to the record printer 5240. This application of ground potential to the stroke conductor C5225 extending to the record printer 5240 causes the record printer 5240 to operate and print the stroke (/) at the beginning of the line on the associated record sheet.

More particularly, in the present example, the printer controller 4200 operates in order to cause the record printer 5240 to operate and print the various items of record information on the associated record sheet, as indicated in the second line on the record sheet, shown in Fig. 55. It will be observed in Fig. 55 that, on the record sheet, the printing of the items of record information in the second line is identical to that in the first line except that the stroke (/) precedes the second line of printing on the record sheet in order to indicate that the toll ticket printer 5230 failed to operate in order to produce a toll ticket individual to the present call.

Subsequently, when the record sheet is received in the Billing Department the appearance of the stroke (/) at the beginning in the second line thereon indicates that no toll ticket was produced by the toll ticket printer 5230 for the call corresponding to the line mentioned; whereupon the clerk makes a toll ticket for this call by the ordinary typing method.

The remainder of the operations of the printer controller 4200 and the printer link 5000, in conjunction with the call mentioned, as well as the ultimate release thereof, are the same as those previously described.

*Toll calls from exchange 4 zone 84 to the exchange in zone 68*

Assuming that the call extending from the calling private subscriber substation TP to the primary selector 600 and the primary register 1200 is to be extended to a called subscriber substation in the exchange in zone 68, the subscriber at the calling private subscriber substation TP proceeds to dial the directory number of the called subscriber substation. The directory number of the called subscriber substation comprises a code portion, including the digits 68, identifying the called zone and exchange, and a numerical portion, including four digits, such, for example, as the digits 1234, identifying the line terminal of the subscriber line extending to the called subscriber substation.

Accordingly the subscriber at the calling private subscriber substation TP proceeds to dial the first digit 6, thereby to cause the last-mentioned digit to be registered in the first code switch A1500 in the primary register 1200, in the manner previously explained. The wiper set of the switch mechanism 700 in the primary selector 600 is operated to its sixth vertical position in accordance with the first digit 6 and is then released at the conclusion of the last-mentioned digit, in the manner previously explained. The wiper 1503 of the first code switch A1500 engages the sixth contact in the associated contact bank, whereby the previously traced circuit for energizing the winding of the translate relay R1270 is completed incident to the restoration of the dial slave relay R1310 shortly following the conclusion of the first digit 6, in the manner previously explained.

The subscriber at the calling private subscriber substation TP then proceeds to dial the second digit 8, thereby to cause the last-mentioned digit to be registered in the second code switch B1510, in the manner previously explained. At the conclusion of the second digit 8 the wipers noted of the sequence switch S1630 are driven into engagement with the second contacts in the associated contact banks, whereupon the previously traced circuit for energizing the winding of the start relay R1600 in the register translator allotter 1600 is completed in order to cause the latter relay to operate; whereupon the register translator allotter 1600 assigns an idle register translator, such, for example, as the register translator 1700. When the register translator 1700 is thus assigned the finder F2290 operate to connect it to the primary register 1200, in the manner previously explained. At this time the pulse relay R1350 in the primary register 1200 operates to transmit the complement 5 of the first digit 6 to the register translator 1700, whereby the first digit 6 is effectively registered in the first code switch A2400 in the register translator 1700, in the manner previously explained. Also the pulse relay R1350 effects operation of the party switch N2620 in the register translator 1700 in accordance with the operated or restored positions of the party relays R1210, R1220 and R1230 in the primary register 1200, whereby there is registered in the party switch N2620 the position of the calling subscriber substation on the associated subscriber line in the event the calling subscriber substation is of the party type, as previously noted and as explained more fully hereinafter.

The subscriber at the calling private subscriber substation TP then proceeds to dial the third digit 1 and the fourth digit 2, which digits are respectively registered in the third code switch C1520 and the first numerical switch D1620 in the primary register 1200, whereby the pulse relay R1360 operates in order to transmit the respective complements 3, 0 and 9 of the second digit 8, the third digit 1 and the fourth digit 2 to the register translator 1700; which last-mentioned digits are respectively registered in the second code switch B2410, the third code switch C2500 and the first numerical switch D2510 in the register translator 1700, in the manner previously explained.

The subscriber at the calling private subscriber substation TP then proceeds to dial the fifth digit 3 and the sixth digit 4, which digits are repeated directly by the line relay R1450 in the primary register 1200 to the register translator 1700; which digits are respectively registered in the second numerical switch E2520 and the third numerical switch F2600 in the register translator 1700, in the manner previously explained.

Accordingly, at this time, the first digit 6, the second digit 8 and the third digit 1 are respectively registered in the first code switch A2400, the second code switch B2410 and the third code switch C2500; the wiper 2405 of the first code switch A2400 engages the fifth contact in the associated contact bank, thereby to select the wiper 2336 of the wiper set of the composite code switch P2330; and the wiper set of the composite code switch P2330 occupies its third vertical level and its tenth rotary position, as previously explained. Also, at the conclusion of the registration of the third digit 1 in the third code switch C2500 in the register translator 1700, the sequence relay R2720 operates in order to initiate operation of the switch pulse relay R1830, in the manner previously explained.

At this point it is noted that the first digit 6 and the second digit 8 respectively registered in the first code switch A2400 and the second code switch B2410 comprise the code portion of the directory number of the called subscriber substation in the exchange in zone 68; while the third digit 1 registered in the third code switch C2500 comprises the first digit of the numerical portion of the directory number of the called subscriber substation in the exchange in zone 68, rather than the third digit of the code portion of the directory number of the called subscriber substation in the exchange in zone 68. This situation is presented due to the fact that the code portion of the directory number of the called subscriber substation in the exchange in zone 68 comprises two digits instead of three digits. Thus it will be understood that the routing of the call, as determined by the composite code switch P2330, from exchange 4 zone 84 to the exchange in zone 68 must in fact be determined by the first digit 6 and the second digit 8, irrespective of the actual value of the third digit 1. In order to accomplish this end, a special multiple is provided in the contact bank associated with the wiper 2336 of the wiper set of the composite code switch P2330. More particularly, the contacts in the third horizontal level of contacts in the contact bank associated with the wiper 2336 of the wiper set of the composite code switch P2330 are connected together and are connected by way of the jumper 2351 to the corresponding 0 up 7 in contact in the contact bank associated with the wiper 2318 of the wiper set of the rate and route switch R2310. Thus it will be understood that the operation of the switch pulse relay R1830 is effective to cause the wiper set of the rate and route switch R2310 to be operated to its 0 up 7 in position when the wiper set of the composite code switch P2330 occupies its 3 up 1 in, 3 up 2 in, 3 up 3 in, etc., positions; and the wiper 2336 of the wiper set of the composite code switch P2330 is selected due to the registration of the first digit 6 in the first code switch A2400. Accordingly, at this time, the operating switch pulse relay R1830 causes the wiper set of the rate and route switch R2310 to be operated to its 0 up 7 in position, thereby to select the routing of the present call from exchange 4 zone 84 to the exchange in zone 68 via exchange 6 zone 45, which routing requires the four routing digits 3, 2, 6 and 3.

Considering now the jumper arrangement among the contacts in the contact banks in the rate and route switch R2310, it is noted that the 0 up 7 in contacts in the contact banks respectively associated with the wipers 2312, 2313, 2314 and 2315 of the wiper set of the rate and route switch R2310 are respectively connected by the jumper 2353 to the respective third, second, sixth and third marking conductors in the marking cable 2385. Finally the 0 up 7 in contact in the contact bank associated with the wiper 2311 of the wiper set of the rate and route switch R2310 terminates the conductor C2388, thereby to prepare a circuit traced hereinafter for energizing the winding of the code send relay R1750.

The operation of the rate and route switch R2310 described above, in response to the operation of the composite code switch P2330, takes place in an extremely short interval of time at the conclusion of the third digit 1. At this time the stop relay R1940 operates in order to effect operation of the switch cutoff relay R1820 and the consequent operation of the digit pulse start relay R1710. Upon operating, the digit pulse start relay R1710 completes, at the contacts 1716, the previously mentioned circuit for energizing the winding of the code send relay R1750; the last-mentioned circuit extending from ground by way of the contacts 1716, C1777, the wiper 2304 of the digit sequence switch T2300 and the engaged home contact in the associated contact bank and the wiper 2311 of the wiper set of the rate and route switch R2310 and the engaged 0 up 7 in contact in the associated contact bank, C2388 and the winding of R1750 to battery. When thus energized the code send relay R1750 operates to complete, at the contacts 1752, an obvious holding circuit, including the contacts 1719, for energizing the winding thereof; and interrupts, at the contacts 1754, the previously traced connection between the conductor C1780 and the control conductor C2382, for a purpose more fully explained hereinafter. Further the code send relay R1750 completes, at the contacts 1753, an obvious connection between the conductor C1779 and the control conductor C2382, for a purpose more fully explained hereinafter; and completes, at the contacts 1751, the previously traced circuit for energizing the magnet TM2305 of the digit sequence switch T2300, thereby to cause the latter magnet to operate and restore, whereby the wipers noted of the digit sequence switch T2300 are driven one step in the counterclockwise direction to disengage the home contacts in the associated contact banks and to engage the first contacts therein. Finally the code send relay R1750 completes, at the contacts 1755, an obvious path for applying ground potential to the Z conductor of the group of WXYZ marking leads 2815 extending to the storage transfer switch U2820.

The wiper 2304 of the digit sequence switch T2300 then successively engages the first, second, third and fourth contacts in the associated contact bank which respectively terminate the conductors extending to the wipers 2312, 2313, 2314 and 2315 of the rate and route switch R2310, whereby the sender switch S2830 is successively operated and controlled by the respective wipers 2312, 2313, 2314 and 2315 of the wiper set of the rate and route switch R2310 in order to cause the first, second, third and fourth routing digits 3, 2, 6 and 3, respectively, to be transmitted to the primary selector 600, in the manner previously explained. The wiper 2303 of the digit sequence switch T2300 then successively engages the fifth and sixth contacts in the associated contact bank respectively terminating the conductors C1782 and C1781 which are connected by way of the previously traced paths to the control conductor C2382, whereby the magnet TM2305 of the digit sequence switch T2300 is operated and restored twice in rapid succession in order to cause the wipers noted of the digit sequence switch T2300 to be driven to engage the seventh contacts in the associated contact banks. When the wiper 2303 of the digit sequence switch T2300 engages the seventh contact in the associated contact bank terminating the conductor C1780 the magnet TM2305 of the digit sequence switch T2300 is not immediately operated and restored, as explained above, in view of the fact that the operated code send relay R1750 has interrupted, at the contacts 1754, the previously traced connection between the conductor C1780 and the control conductor C2382, as previously noted.

At this time the wiper 2304 of the digit sequence switch T2300 engages the seventh contact in the associated contact bank terminating the conductor C2379 extending to the wiper 2504 of the third code switch C2500, whereby the sender switch S2830 is controlled in order to send the third digit 1 registered in the third code switch C2500 to the primary selector 600, in the manner previously explained. Thus it will be understood that the operated code send relay R1750 causes the register translator 1700 to skip the first and second digits 6 and 8, comprising the first and second code digits, respectively registered in the first code switch A2400 and the second code switch B2410 and to send the third digit 1, comprising the first numerical digit, registered in the third code switch C2500. The wiper 2304 of the digit sequence switch T2300 then successively engages the eighth, ninth and tenth contacts in the associated contact banks respectively terminating the conductors C2378, C2377 and C2376 respectively extending to the wiper 2514 of the first numerical switch D2510, the wiper 2524 of the second numerical switch E2520 and the wiper 2604 of the third numerical switch F2600, whereby the sender switch S2830 is controlled in order to send the fourth digit 2, the fifth digit 3 and the sixth digit 4 respectively registered in the first numerical switch D2510, the second numerical switch E2520 and the third numerical switch F2600 to the primary selector 600, in the manner previously explained.

The grounded wiper 2303 of the digit sequence switch T2300 then engages the eleventh contact in the associated contact bank terminating the conductor C1779 which is connected by way of the contacts 1753 of the operated code send relay R1750 to the control conductor C2382; whereby the magnet TM2305 then operates and restores immediately in order to drive the wipers noted of the digit sequence switch T2300 into engagement with the twelfth contacts in the associated contact banks, as previously explained. Thus it will be understood that the operated code send relay R1750 causes the register translator 1700 to skip the fourth numerical switch G2610 in which there is no digit registered in the present example. When the wiper 2303 of the digit sequence switch T2300 engages the twelfth contact in the associated contact bank terminating the conductor C2372 the previously traced alternative circuit for energizing the lower windings of the code pulse relay R1850 is prepared; which circuit is subsequently completed when the wiper 2826 of the storage transfer switch U2820 engages the fifty-fourth contact in the associated contact bank for the purpose previously explained.

At the conclusion of the transmission of the first routing digit 3 from the register translator 1700 the digit stop relay R1910 operates, as previously explained, thereby to effect operation of the special service cutoff relay R1810. Subsequently, the digit stop relay R1910 restores, thereby to effect operation of the detector start relay R1760, whereby the latter relay operates in order to effect operation of the detector 2900, all in the manner previously explained. After the operation of the detector 2900 is completed the detector release relay R2240 operates in order to cause intermittent operation of the code pulse relay R1850, in the manner previously explained. The code pulse relay R1850 causes operation of the storage transfer switch U2820, whereby the items of record information are transmitted from the register translator 1700 to the toll ticket repeater which has been seized by the primary selector 600 at this time; whereupon the register translator 1700 is released, all in the manner previously explained.

For purpose of illustration it is assumed that the primary selector 600 responds to the first routing digit 3 to seize the toll ticket repeater 800, in the manner previously explained; and that the toll ticket repeater 800 repeats the second routing digit 2 over the trunk 907 to the toll selector 513, causing the toll selector 513 to seize the toll line 470 extending to exchange 6 zone 45. The toll ticket repeater 800 then repeats the third routing digit 6 and the fourth routing digit 3 over the trunk 907 and the toll line 470, whereby automatic switching apparatus in exchange 6 zone 45 operates to seize an idle toll line extending from exchange 6 zone 45 to the exchange in zone 68. Finally the toll ticket repeater 800 operates to repeat the four numerical digits 1, 2, 3 and 4 over the trunk 907 and the toll line 470; thereby to cause automatic switching apparatus in the exchange in zone 68 to seize the line terminal terminating the subscriber line extending to the called subscriber substation therein.

As previously noted, the storage transfer switch U2820 in the register translator 1700 operates to transmit the items of record information registered in the various switches and code storage devices in the register translator 1700 to the various code storage devices S1121 to S1135, inclusive, in the toll ticket repeater 800, in the manner previously explained. At this point it is noted that the digit 0 stored in the group of WXYZ marking leads 2815 is transferred by the storage transfer switch U2820 from the register translator 1700 and stored in the code storage device S1131 in the toll ticket repeater 800.

Now assume that the connection is established between the calling private subscriber substation TP in exchange 4 zone 84 and the called subscriber substation in the exchange in zone 68, and that the established connection is maintained for two minutes and then released under the control of the subscriber at the calling private subscriber substation TP, all in the manner previously explained. In this event, the toll ticket repeater 800 operates in order to cause the printer controller allotter 4600 to allot an idle printer controller, such, for example, as the printer controller 4200, whereupon the finder F4210 operates to find the calling toll ticket repeater 800, all in the manner previously explained. When the printer controller 4200 is thus connected to the toll ticket repeater 800 the storage transfer switch S1110 in the toll ticket repeater 800 and the storage register switch S4220 in the printer controller 4200 operate; whereby the various items of record information stored in the toll ticket repeater 800 are transferred to the printer controller 4200 and stored in the various code storage devices S4621 to S4638, inclusive, etc. More particularly, in the present example, when the wiper 4223 of the storage register switch S4220 engages the second contact in the associated contact bank the previously mentioned circuit for energizing the winding of the two-digit code relay R4390 is completed in view of the fact that the digit 0 is stored in the corresponding code storage device S1131 in the toll ticket repeater 800, as previously explained. When thus energized the two-digit code relay R4390 operates to complete, at the contacts 4392, an obvious holding circuit, including the contacts 4338, for energizing the winding thereof. Also the two-digit code relay R4390 completes, at the contacts 4391, an obvious circuit, including C4304, for energizing the two-digit code slave relay R4530, thereby to cause the latter relay to operate; and completes, at the contacts 4393, an obvious circuit for energizing the winding of the slip relay R4750, thereby to cause the latter relay to operate.

Upon operating, the two-digit code slave relay R4530 slips the markings between certain of the control conductors and certain of the contacts in the contact banks associated with the wipers 4511 and 4515 of the ticket printer control switch P4510. More particularly, the two-digit code slave relay R4530 interrupts, at the contacts 4531, the normally completed connection between the twenty-seventh contact in the contact bank associated with the wiper 4511 and the mark conductor C4541; completes, at the contacts 4532, an obvious connection between the twenty-seventh contact in the contact bank associated with the wiper 4511 and the dash conductor C5208; interrupts, at the contacts 4533, the normally completed connection between the twenty-eighth contact in the contact bank associated with the wiper 4511 and the dash conductor C5208; completes, at the contacts 4534, an obvious connection between the twenty-eighth contact in the contact bank associated with the wiper 4511 and the mark conductor C4541; interrupts, at the contacts 4536, the normally completed connection between the twenty-seventh contact in the contact bank associated with the wiper 4515 and the conductor C4255; and completes, at the contacts 4535, an obvious connection between the twenty-eighth contact in the contact bank associated with the wiper 4515 and the conductor C4255.

Upon operating, the slip relay R4750 slips certain of the contacts in the contact banks of the record storage transfer switch R4810. More particularly, the slip relay R4750 interrupts, at the contacts 4751', 4756, 4754' and 4752, the normally completed connections between the WXYZ conductors in the group of WXYZ marking leads extending to the code storage device S4631 and the twenty-fourth contacts in the contact banks of the record storage transfer switch R4810; completes, at the contacts 4752, 4757, 4755' and 4753, obvious connections between the WXYZ conductors in the group of WXYZ marking leads extending to the code storage device S4631 and the twenty-fifth contacts in the contact banks of the record storage transfer switch R4810; interrupts, at the contacts 4753', 4758 and 4754, the normally completed paths for applying ground potential to the twenty-fifth contacts in the contact banks respectively associated with the wipers 4811, 4812 and 4814 of the record storage transfer switch R4810; and completes, at the contacts 4759, 4755 and 4751, obvious alternative paths for applying ground potential to the twenty-fourth contacts in the contact banks respectively associated with the wipers 4811, 4812 and 4814 of the record storage transfer switch R4810.

Figure 57:
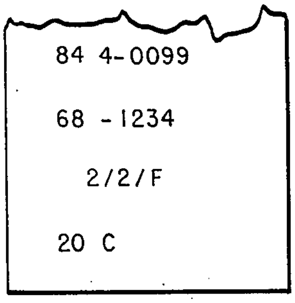

Now assume that the finder F5010 has operated to select the calling printer controller 4200, whereby the printer link 5000 is operatively connected to the printer controller 4200, in the manner previously explained. The ticket printer control switch P4510 then operates in conjunction with the ticket storage transfer switch C4230 to the control marking relays WA, XA, YA and ZA in order to govern the operation of the toll ticket printer 5230, whereby the toll ticket illustrated in Fig. 57 is produced, all in the manner previously explained. In this connection it is pointed out that the operated two-digit code slave relay R4530 governs the ticket printer control switch P4510, whereby the information appearing in line 3 on the toll ticket, shown in Fig. 57, is printed as follows:

68 –1234

Accordingly the ticket printer control switch P4510 is so controlled that the dash (—) always immediately precedes the first numerical digit of the directory number of the called subscriber substation, regardless of whether the code portion of the directory number of the called subscriber substation comprises three digits or two digits, as clearly illustrated in Figs. 56 and 57.

The record storage transfer switch R4810 then operates to control the marking relays WB, XB, YB and ZB in order to govern the operation of the record printer 5240, whereby the third line on the record sheet illustrated in Fig. 55 is printed, all in the manner previously explained. In this connection it is pointed out that the operated slip relay R4750 governs the record storage transfer switch R4810, whereby the information appearing in line 3 on the record sheet, shown in Fig. 55, is printed as follows:

11–29/11–45/844–0099/68–1234 / 2/2/1/6/01/2

Accordingly the record storage transfer switch R4810 is so controlled that the dash (—) always immediately precedes the first numerical digit of the directory number of the called subscriber substation, regardless of whether the code portion of the directory number of the called subscriber substation comprises three digits or two digits, as clearly illustrated in Fig. 55.

The subsequent operation and release of the printer controller 4200 and the printer link 5000 are the same as those previously described.

*Toll calls from a private subscriber substation rendered extended service*

The extension of a toll call from a private subscriber substation rendered extended service, such, for example, as the private subscriber substation TX, is initiated at the calling private subscriber substation TX and extended therefrom under the control of the calling device thereat, in the manner previously explained; however, the apparatus in the register translator and in the printer controller operate in a slightly different manner, as explained more fully below.

Assume that a call has been initiated at the calling private subscriber substation TX; that the line switch 421 individual to the associated private private subscriber line 401 extending to the calling private subscriber substation TX has operated to seize the trunk 461 extending to the primary selector 441; and that the finder F442 individual to the primary selector 441 has seized the conductors extending to the primary register 1200, all in the manner previously explained. At this point it is noted that the line switch 421 individual to the private subscriber line 401 extending to the calling private subscriber substation TX is included in the second group having access to the second group of primary selectors, including the primary selector 441. Further assuming that the call from the calling private subscriber substation TX is to be extended to a called subscriber substation in exchange 9 zone 27, the subscriber at the calling private subscriber substation TX proceeds to dial the directory number of the called subscriber substation. The directory number of the called subscriber substation comprises a code portion, including the digits 279, identifying the called zone and exchange and a numerical portion, including four digits, such, for example, as the digits 1234, identifying the line terminal of the subscriber line extending to the called subscriber substation.

Accordingly the subscriber at the calling private subscriber substation TX proceeds to dial the first digit 2, thereby to cause the last-mentioned digit to be registered in the first code switch A1500 in the primary register 1200, in the manner previously explained. The wiper set of the switch mechanism in the primary selector 441 is operated to its second vertical position in accordance with the first digit 2 and is then released at the conclusion of the last-mentioned digit, in the manner previously explained. The wiper 1503 of the first code switch A1500 engages the second contact in the associated contact bank, whereby the previously traced circuit for energizing the winding of the translate relay R1270 is completed incident to the restoration of the dial slave relay R1310 shortly following the conclusion of the first digit 2, in the manner previously explained.

The subscriber at the calling private subscriber substation TX then proceeds to dial the second digit 7, thereby to cause the last-mentioned digit to be registered in the second code switch B1510, in the manner previously explained. At the conclusion of the second digit 7 the wipers noted of the sequence switch S1630 are driven into engagement with the second contacts in the associated contact banks, whereupon the previously traced circuit for energizing the winding of the start relay R1600 in the register translator allotter 1600 is completed in order to cause the latter relay to operate; whereupon the register translator allotter 1600 assigns an idle register translator, such, for example, as the register translator 1700. When the register translator 1700 is thus assigned the finder F2290 operates to connect it to the primary register 1200, in the manner previously explained. At this time the pulse relay R1350 in the primary register 1200 operates to transmit the complement 9 of the first digit 2 to the register translator 1700, whereby the first digit 2 is effectively registered in the first code switch A2400 in the register translator 1700, in the manner previously explained. Also the pulse relay R1350 effects operation of the party switch N2620 in the register translator 1700 in accordance with the operated or restored positions of the party relays R1210, R1220 and R1230 in the primary register 1200, whereby there is registered in the party switch N2620 the position of the calling subscriber substation on the associated subscriber line in the event the calling subscriber substation is of the party type, as previously noted and as explained more fully hereinafter.

The subscriber at the calling private subscriber substation TX then proceeds to dial the third digit 9 and the fourth digit 1, which digits are respectively registered in the third code switch C1520 and the first numerical switch D1620 in the primary register 1200, whereby the pulse relay R1360 operates in order to transmit the respective complements 4, 2 and 10 of the second digit 7, the third digit 9 and the fourth digit 1 to the register translator 1700; which last-mentioned digits are respectively registered in the second code switch B2410, the third code switch C2500 and the first numerical switch D2510 in the register translator 1700, in the manner previously explained.

The subscriber at the calling private subscriber substation TX then proceeds to dial the fifth digit 2, the sixth digit 3 and the seventh digit 4, which digits are repeated directly by the line relay R1450 in the primary register 1200 to the register translator 1700; which digits are respectively registered in the second numerical switch E2520, the third numerical switch F2600 and the fourth numerical switch G2610 in the register translator 1700, in the manner previously explained.

Accordingly, at this time, the first digit 2, the second digit 7 and the third digit 9 are respectively registered in the first code switch A2400, the second code switch B2410 and the third code switch C2500; the wiper 2405 of the first code switch A2400 engages the ninth contact in the associated contact bank, thereby to select the wiper 2332 of the wiper set of the composite code switch P2330; and the wiper set of the composite code switch P2330 occupies its fourth vertical level and its second rotary position, as previously explained. Also, at the conclusion of the registration of the third digit 9 in the third code switch C2500 in the register translator 1700, the sequence relay R2720 operates in order to initiate operation of the switch pulse relay R1830; whereby the wiper set of the rate and route switch R2310 is operated to its 5 up 6 in position, all in the manner previously explained. When the wiper set of the rate and route switch R2310 occupies its 5 up 6 in position the routing digits 3 and 2 are set up to be sent by the register translator 1700 and the code send relay R1730 is operated, whereby the three registered code digits 2, 7 and 9 are set up to be sent by the register translator 1700, all in the manner previously explained. The routing digits 3 and 2, in conjunction with the code digits 2, 7 and 9, establish a routing for the present call from exchange 4 zone 84 to exchange 9 zone 27 via exchange 6 zone 45 and exchange 1, zone 27, as previously noted.

Also it is noted that, when the register translator 1700 is connected to the primary register 1200, a series circuit is completed for energizing the upper winding of the transfer relay R443 in the primary selector 441 and the lower winding of the special service relay R2040 in the register translator 1700; the last-mentioned circuit extending from ground by way of the strap 444, the upper winding of R443, the wiring in the primary selector, not shown, the finder F442, C644, the contacts 1373, C1394, the wiper 2294 of the finder F2290, the contacts 2283, C1872, the contacts 1811 and 1713 and the lower winding of R2040 to battery. When this series circuit is completed the special service relay R2040 operates, the latter relay being of the marginal type. This operation of the special service relay R2040 is effected only when the register translator 1700 is connected by way of one of the primary registers to any one of the primary selectors in the second group due to the provision of the direct connection of ground potential to one terminal of the upper winding of the transfer relay in the last-mentioned primary selector. More particularly, it is noted that, in the primary selector 441, the strap 444 connects ground potential directly to one terminal of the upper winding of the transfer relay R443; which strap is connected in multiple to the strap 446 and the resistor 445 having ground potential thereon. Upon operating, the special service relay R2040 completes, at the contacts 2041, an obvious holding circuit, including the grounded hold conductor C2772, for energizing the upper winding thereof.

Also, the special service relay R2040 prepares, at the contacts 2042, a circuit traced hereinafter for energizing the winding of the denied service relay R2010; which circuit is not complete, in the present example, in view of the fact that the wiper 2623 of the party switch N2620 engages the first contact in the associated contact bank. Also the special service relay R2040 prepares, at the contacts 2043, a path traced hereinafter, including the conductor C2391, for short-circuiting the winding of the switch cut-off relay R1820; which path is not completed in the present example in view of the fact that the grounded wiper 2316 of the wiper set of the rate and route switch R2310 engages the 5 up 6 in contact in the associated contact bank which does not terminate the control conductor C2391. Finally the special service relay R2040 completes, at the contacts 2044, an obvious path for applying ground potential to the Z conductor in the group of WXYZ marking leads 2814, for a purpose more fully explained hereinafter.

The operation of the rate and route switch R2310 described above, in response to the operation of the composite code switch P2330, takes place in an extremely short interval of time at the conclusion of the third digit 9. At this time the stop relay R1940 operates in order to effect operation of the switch cutoff relay R1820 and the consequent operation of the digit pulse start relay R1710. Upon operating, the digit pulse start relay R1710 interrupts, at the contacts 1713, the previously traced circuit for energizing the lower winding of the special service relay R2040; however, the latter relay remains in its operated position due to the completed holding circuit for energizing the upper winding thereof. Furthermore, the transfer relay R443 in the primary selector 441 remains in its operated position due to the completed multiple holding circuit, including the resistor 1814, for energizing the upper winding thereof. Also the digit pulse start relay R1710 completes, at the contacts 1716, the previously traced circuit for energizing the winding of the code send relay R1730, thereby to cause the latter relay to operate, as previously explained. Upon operating, the code send relay R1730 initiates operation of the digit sequence switch T2300, whereby the digit sequence switch T2300 causes the sender switch S2830 to send the first and second routing digits 3 and 2, the first, second and third code digits 2, 7 and 9 and the four numerical digits 1, 2, 3 and 4, all in the manner previously explained.

At the conclusion of the transmission of the first routing digit 3 from the register translator 1700, the digit stop relay R1910 operates, as previously explained, thereby to effect operation of the special service cutoff relay R1810. Subsequently, the digit stop relay R1910 restores, thereby to effect operation of the detector start relay R1760, whereby the latter relay operates in order to effect operation of the detector 2900, all in the manner previously explained. Upon operating, the special service cutoff relay R1810 interrupts, at the contacts 1811, the previously traced multiple holding circuit for energizing the upper winding of the transfer relay R443 in the primary selector 441, thereby to cause the latter relay to restore in order to initiate operation of the wiper set of the switch mechanism in the primary selector 441, in the manner previously explained. After the operation of the detector 2900 is completed the detector release relay R2240 operates in order to cause intermittent operation of the code pulse relay R1850, in the manner previously explained. The code pulse relay R1850 causes operation of the storage transfer switch U2820, whereby the items of record information are transmitted from the register translator 1700 to the toll ticket repeater which has been seized by the primary selector 441 at this time; whereupon the register translator 1700 is released, all in the manner previously explained.

For purpose of illustration it is assumed that the primary selector 441 responds to the first routing digit 3 to seize the toll ticket repeater 800, in the manner previously explained; and that the toll ticket repeater 800 repeats the second routing digit 2 over the trunk 907 to the toll selector 513, causing the toll selector 513 to seize the toll line 470 extending to exchange 6 zone 45. The toll ticket repeater 800 then repeats the three code digits 2, 7 and 9 over the trunk 907 and the toll line 470, whereby automatic switching apparatus in exchange 6 zone 45 operates to seize an idle toll line extending from exchange 6 zone 45 to exchange 1 zone 27 and automatic switching apparatus in exchange 1 zone 27 operates to seize an idle trunk extending from exchange 1 zone 27 to exchange 9 zone 27. Finally the toll ticket repeater 800 operates to repeat the four numerical digits 1, 2, 3 and 4 over the trunk 907 and the toll line 470, thereby to cause automatic switching apparatus in exchange 9 zone 27 to seize the line terminal terminating the subscriber line extending to the called subscriber substation therein.

As previously noted, the storage transfer switch U2820 in the register translator 1700 operates to transmit the items of record information registered in the various switches and code storage devices in the register translator 1700 to the various code storage devices S1121 to S1135, inclusive, in the toll ticket repeater 800, in the manner previously explained. At this point it is noted that the digit 0 stored in the group of WXYZ marking leads 2814 is transferred by the storage transfer switch U2820 from the register translator 1700 and is stored in the code storage device S1130 in the toll ticket repeater 800.

Now assume that the connection is established between the calling private subscriber substation TX in exchange 4 zone 84 and the called subscriber substation in exchange 9 zone 27; and that the established connection is maintained for three minutes and then released under the control of the subscriber at the calling private subscriber substation TX, all in the manner previously explained. In this event, the toll ticket repeater 800 operates in order to cause the printer controller allotter 4690 to allot an idle printer controller, such, for example, as the printer controller 4200, whereupon the finder F4210 operates to find the calling toll ticket repeater 800, all in the manner previously explained. When the printer controller 4200 is thus connected to the toll ticket repeater 800 the storage transfer switch S1110 in the toll ticket repeater 800 and the storage register switch S4220 in the printer controller 4200 operate, whereby the various items of record information stored in the toll ticket repeater 800 are transferred to the printer controller 4200 and stored in the various code storage devices S4621 to S4638, inclusive, etc. More particularly, in the present example, when the wiper 4223 of the storage register switch S4220 engages the first contact in the associated contact bank the previously mentioned circuit for energizing the winding of the special service relay R4380 is completed in view of the fact that the digit 0 is stored in the corresponding code storage device S1130 in the toll ticket repeater 800, as previously explained. When thus energized the special service relay R4380 operates to complete, at the contacts 4382, an obvious holding circuit, including the contacts 4338, for energizing the winding thereof. Also the special service relay R4380 completes, at the contacts 4381, an obvious circuit, including C4303, for energizing the winding of the special service slave relay R4520, thereby to cause the latter relay to operate; interrupts, at the contacts 4384, the normally completed path for applying ground potential to the thirty-seventh contact associated with the wiper 4812 of the record storage transfer switch R4810; and completes, at the contacts 4383, an obvious path for applying ground potential to the thirty-seventh contact associated with the wiper 4813 of the record storage transfer switch R4810.

Further the special service relay R4380 interrupts, at the contacts 4386, a further point in the previously traced circuit for energizing the winding of the control relay R4410; and completes, at the contacts 4385, an alternative circuit for energizing the magnet MM4736 of the calculator setting switch M4730. The last-mentioned circuit extends from the grounded wiper 4734 of the calculator setting switch M4730 and the engaged home contact in the associated contact bank by way of the contacts 4385 and 4737 and the magnet MM4736 to battery. When thus energized the magnet MM4736 operates intermittently, thereby to drive the wipers noted of the calculator setting switch M4730 five steps in the clockwise direction; whereupon the wiper 4734 thereof disengages the fourth contact in the associated contact bank and engages the fifth contact therein in order to interrupt the previously traced circuit for energizing the magnet MM4736, thereby positively to arrest further operation of the calculator setting switch M4730 at this time and to prepare an alternative circuit traced hereinafter for energizing the winding of the control relay R4410.

Now assuming that the rate factor digit 3 is applicable to the call between the calling private subscriber substation TX in exchange 4 zone 84 and the called subscriber substation in exchange 9 zone 27, this rate factor digit 3 has been previously selected by the rate and route switch R2310 in the register translator 1700; the complementary digit 8 of the rate factor digit 3 has been transmitted from the register translator 1700 and registered in the code storage device S1128 in the toll ticket repeater 800; and has been transferred from the code storage device S1128 in the toll ticket repeater 800 and registered in the code storage device S4621 in the printer controller 4200.

The registration of the complementary digit 8 of the rate factor digit 3 in the code storage device S4621 is effective to control the operation of the calculator selector switch T4820, whereby the wipers noted of the latter switch are driven to engage the fourth contacts in the associated contact banks; whereby the rate factor digit 3 is marked by the wipers 4825 and 4826 thereof in the associated group of WXYZ marking leads 4801 and the wipers 4827 and 4828 thereof respectively select the vertical magnet MB4927 and the rotary magnet BM4928 of the calculating switch B4920, all in the manner previously explained. At this time the transfer relay R4440 operates in order to arrest further operation of the calculator selector switch T4820 and to initiate further operation of the calculator setting switch M4730, in the manner previously explained. More particularly, the magnet MM4736 of the calculator setting switch M4730 operates and restores five additional times, thereby to drive the wipers noted of the latter switch into engagement with the tenth contacts in the associated contact banks. When the wipers noted of the calculator setting switch M4730 engage the tenth contacts in the associated contact banks the previously traced circuits for energizing the left-hand and right-hand windings stop relay R4420 are completed, thereby to cause the latter relay to operate and arrest further operation of the calculator setting switch M4730 at this time, as previously explained. It is noted that the wipers 4732 and 4733 test the contacts in the associated contact banks for grounded WXYZ conductors in the associated group of WXYZ marking leads 4623 extending to the code storage device S4623, as previously explained. In the present example, no digit is registered in the code storage device S4623 as the latter register is adapted to register the ten digit of the time duration of the established connection and it was assumed that the established connection persisted for only three minutes. In view of the foregoing explanation of the mode of operation of the calculator setting switch M4730, it will be understood that the magnet MM4736 of the calculator setting switch M4730 operates only five times after the calculator setting switch T4820 operated to select the calculating switch B4920. Hence the five operations and restorations of the magnet MM4736 of the calculator setting switch M4730 are effective to cause five corresponding operations and restorations of the vertical magnet BM4927, whereby the first and second wiper sets of the selected calculating switch B4920 are operated five steps in the vertical direction away from their normal vertical positions.

Also when the wiper 4821 of the calculator selector switch T4820 engages the fourth contact in the associated contact bank the previously traced circuit for energizing the winding of the wiper switching relay R4550 is completed, thereby to cause the latter relay to operate. Upon operating, the wiper switching relay R4550 interrupts, at the contacts 4551 etc., connections between the second wiper set, including the wipers 4921, 4922 and 4923 of the selected calculating switch B4920, and certain contacts in the contact bank associated with the wiper 4511 of the ticket printer control switch P4510; and completes, at the contacts 4452 etc., connections between the first wiper set, including the wipers 4924, 4925 and 4926 of the selected calculating switch B4920, and the contacts mentioned in the contact bank associated with the wiper 4511 of the ticket printer control switch P4510.

Also, upon operating, the stop relay R4420 completes, at the contacts 4422, the previously traced circuit for energizing the winding of the control relay R4410, thereby to cause the latter relay to operate and complete, at the contacts 4412, the previously traced holding circuit for energizing the winding thereof. Also, upon operating, the control relay R4410 interrupts, at the contacts 4411, a further point in the previously traced circuit for energizing the vertical magnet BM4927 of the selected calculating switch B4920; and completes, at the contacts 4413, the previously traced alternative circuit for energizing the magnet MM4736, whereby the latter magnet operates and restores in order to drive the wipers noted of the calculator setting switch M4730 into engagement with the eleventh contacts in the associated contact banks; whereby the previously traced holding circuit for energizing the winding of the control relay R4410 and the previously traced operating circuit for energizing the left-hand and right-hand windings of the stop relay R4420 are interrupted, whereupon the relays mentioned restore. Upon restoring, the control relay R4410 prepares, at the contacts 4411, the previously traced circuit for energizing the rotary magnet BM4928 of the selected calculating switch B4920; and, upon restoring, the stop relay R4420 recompletes, at the contacts 4421, the previously traced circuit for energizing the magnet MM4736 of the calculator setting switch M4730.

The magnet MM4736 then operates and restores three additional times in order to drive the wipers noted of the calculator setting switch M4730 into engagement with the fourteenth contacts in the associated contact banks, whereupon the previously traced circuit for energizing the left-hand and right-hand windings of the stop relay R4420 is recompleted in view of the fact that the fourteenth contacts engaged by the wipers 4732 and 4733 of the calculator setting switch M4730 terminate the marked W and Z conductors in the group of WXYZ marking leads 4624 extending to the code storage device S4624 in which the unit time digit 3 is stored at this time, as previously explained. Accordingly the stop relay R4420 operates in order to arrest further operation of the calculator setting switch M4730, as previously explained. Hence, the magnet MM4736 operated and restored three times subsequent to the restoration of the control relay R4410 explained above, whereby the rotary magnet BM4928 was operated and restored three times in order to drive the first and second wiper sets of the selected calculating switch B4920 three steps in the rotary direction away from their normal rotary positions. At this time the operated wiper switching relay R4550 selects the first wiper set, including the wipers 4924, 4925 and 4926 of the selected calculating switch B4920; and the wiper sets of the selected calculating switch B4920 occupy their 5 up 3 in positions, whereby a charge for the present call calculated upon a unit or bulk basis is established. At this point it is noted that the lower portion or first five levels of the contact banks of the various calculating switches C4900, B4920 and A4940 are utilized for establishing charges for calls calculated upon a unit or bulk basis; whereas the upper portion or the second five levels of the contact banks of the calculating switches mentioned are utilized for establishing charges for calls calculated upon a monetary basis in cents.

Upon operating, the special service slave relay R4520 slips the markings between certain of the control conductors and certain of the contacts in the contact bank associated with the wiper 4511 of the ticket printer control switch P4510. More particularly, the special service slave relay R4520 interrupts, at the contacts 4521, the normally completed connection between the forty-eighth contact in the contact bank associated with the wiper 4511 and the (C) conductor C5202; completes, at the contacts 4522, an obvious connection between the forty-eighth contact in the contact bank associated with the wiper 4511 and the (U) conductor C5203; interrupts, at the contacts 4523, the normally completed connection between the forty-first contact in the contact bank associated with the wiper 4511 and the (F) conductor C5204; and completes, at the contacts 4524, an obvious connection between the forty-first contact in the contact bank associated with the wiper 4511 and the (E) conductor C5205.

Figure 58:
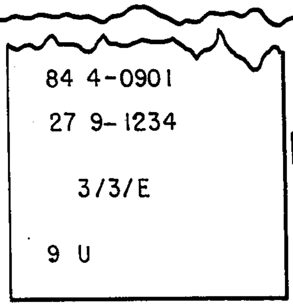
Figure 59:
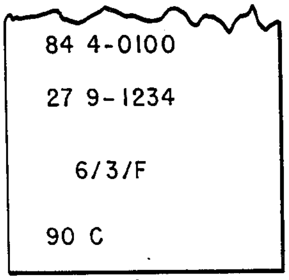
Figure 60:
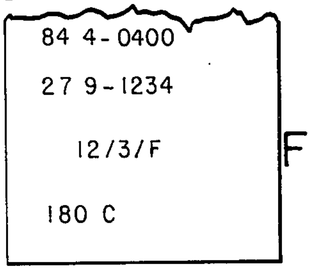

Now assume that the finder F5010 has operated to select the calling printer controller 4200, whereby the printer link 5000 is operatively connected to the printer controller 4200, in the manner previously explained. The ticket printer control switch P4510 then operates in conjunction with the ticket storage transfer switch C4230 to control the marking relays WA, XA, YA and ZA in order to govern the operation of the toll ticket printer 5230, whereby the toll ticket illustrated in Fig. 58 is produced, all in the manner previously explained. In this connection it is pointed out that the operated special service slave relay R4520 governs the ticket printer control switch P4510, whereby the information appearing in line 4 on the toll ticket, shown in Fig. 58, is printed as follows:

3/3/E and whereby the information appearing in line 5 on the toll ticket, shown in Fig. 58, is printed as follows:

9 U

The record storage transfer switch R4810 then operates to control the marking relays WB, XB, YB and ZB in order to govern the operation of the record printer 5240, whereby the fourth line on the record sheet illustrated in Fig. 55 is printed, all in the manner previously explained. In this connection it is pointed out that the operated special service relay R4380 governs the record storage transfer switch R4810, whereby the information appearing in line 4 on the record sheet, shown in Fig. 55, is printed as follows:

11-29/11-50/844-0901/279-1234/ 3/3/2/6/01/2

Accordingly, when a call is extended from a subscriber substation rendered flat rate service (the private subscriber substation TP etc. and the party subscriber substation TS1 etc.), which is to be ticketed, the ticket printer control switch P4510 controls the toll ticket printer 5230 so that the letter (F) appears in line 4 on the toll ticket and the letter (C) appears in line 5 on the toll ticket and the cost of the call is calculated on a monetary basis, as illustrated in Fig. 57; and the record storage transfer switch R4810 controls the record printer 5240 so that the numeral (1) appears in the line of printing preceding the identification of the register translator No., as illustrated in line 3 of the record sheet shown in Fig. 55. On the other hand, when a call is extended from a subscriber substation rendered extended service (the private subscriber substation TX etc.), which is to be ticketed, the ticket printer control switch P4510 controls the toll ticket printer 5230 so that the letter (E) appears in line 4 on the toll ticket and the letter (U) appears in line 5 on the toll ticket, and the cost of the call is calculated on a unit basis, as illustrated in Fig. 58; and the record storage transfer switch R4810 controls the record printer 5240 so that the numeral (2) appears in the line of printing preceding the identification of the register translator No., as illustrated in line 4 of the record sheet shown in Fig. 55.

The subsequent operation and release of the printer controller 4200 and the printer link 5000 are the same as those previously described.

*Timing of a toll call in excess of fifty minutes*

Now assume that a toll call has been completed from any calling subscriber substation in exchange 4 zone 84 to a called subscriber substation in any exchange in any zone. For example, the above-described toll call may be completed between the calling private subscriber substation TX in exchange 4 zone 84 and the called subscriber substation in exchange 9 zone 27 and routed via the primary selector 441, the toll ticket repeater 800 and the toll selector 513, all in the manner described immediately above. When the subscriber at the called subscriber substation in exchange 9 zone 27 answers the call the answer relay R940 in the toll ticket repeater 800 operates, whereby the conversational timing of the established connection is initiated. More particularly, the unit time switch U1010 times the unit minute digit of the established connection while the ten and hundred time switch D1020 times both the ten minute digit and the hundred minute digit of the established connection, all in the manner previously explained. In the event the established connection persists for a time interval of fifty minutes or more, the grounded wiper 1025 of the ten time switch D1020 engages the fifth contact in the associated contact bank and the W relay in the code storage device S1031 is operated and locked to the grounded hold conductor C889, whereby the digit 7 is stored in the code storage device S1031.

Now assume that the established connection between the calling private subscriber substation TX in exchange 4 zone 84 and the called subscriber substation in exchange 9 zone 27 persists for one hundred twenty-three minutes and is then released under the control of the subscriber at the calling private subscriber substation TX, in the manner previously explained. In this event, the toll ticket repeater 800 operates in order to cause the printer controller allotter 4600 to allot an idle printer controller, such, for example, as the printer controller 4200, whereupon the finder F4210 operates to find the calling toll ticket repeater 800, all in the manner previously explained. When the printer controller 4200 is thus connected to the toll ticket repeater 800 the storage transfer switch S1110 in the toll ticket repeater 800 and the storage register switch S4220 in the printer controller 4200 operate, whereby the various items of record information stored in the toll ticket repeater 800 are transferred to the printer controller 4200 and stored in the various code storage devices S4621 to S4638, inclusive, etc. More particularly, in the present example, when the wiper 4223 of the storage register switch S4220 engages the home contact in the associated contact bank, the previously mentioned circuit for energizing the winding of the computation stop relay R4370 is completed in view of the fact that the digit 7 is stored in the corresponding code storage device S1031 in the toll ticket repeater 800, as previously explained. When thus energized the computation stop relay R4370 operates to complete, at the contacts 4371, an obvious holding circuit, including the contacts 4338, for energizing the winding thereof. Also the computation stop relay R4370 interrupts, at the contacts 4372, the previously traced circuit for energizing the magnet MM4736 of the calculator setting switch M4730 under the control of the pulse relay R4450. Also, in the present example, the special service relay R4380 operates, whereby the previously traced alternative circuit for energizing the magnet MM4736 is completed in order to cause the latter magnet to operate and restore five times, whereby the wipers noted of the calculator setting switch M4730 are driven to engage the fifth contacts in the associated contact banks, all in the manner previously explained. At this time, further operation of the calculator setting switch M4730 is positively arrested and may not be controlled by the pulse relay R4450. Accordingly, when the calculator selector switch T4820 operates in order to select the calculating switch B4920, in the manner previously explained, the selected calculating switch B4920 is not set or operated due to the fact that the calculator setting switch M4730 may not be operated because of the operated position of the computation stop relay R4370.

Also, in the present example, the hundred digit 1, the ten digit 2 and the unit digit 3 of the time duration of the established connection, respectively marked in the groups of WXYZ marking leads 1034, 1032 and 1033 by the ten and hundred time switch D1020 and the unit time switch U1010 in the toll ticket repeater 800, are transferred and stored in the respective code storage devices S4622, S4623 and S4624 in the printer controller 4200.

Now assume that the finder F5010 has operated to select the calling printer controller 4200, whereby the printer link 5000 is operatively connected to the printer controller 4200, in the manner previously explained. The ticket printer control switch P4510 then operates in conjunction with the ticket storage transfer switch C4230 to control the marking relays WA, XA, YA and ZA in order to govern the operation of the toll ticket printer 5230, whereby a toll ticket similar to that shown in Fig. 58 is produced, all in the manner previously explained. In this connection, it is pointed out that the operated special service slave relay R4520 governs the ticket printer control switch P4510, whereby the information appearing in line 4 on the toll ticket mentioned is printed as follows:

*123/3/E*

The operated special service slave relay R4520, in conjunction with the operated computation stop relay R4370, governs the ticket printer control switch P4510, whereby the information appearing in line 5 on the toll ticket mentioned is printed as follows:

U

Thus it will be understood that, in line 5 on the toll ticket mentioned, only the letter (C) or the letter (U) appears in the present example, respectively indicating that the cost of the call is to be calculated on a monetary basis or on a unit basis, together with the indication that the established connection persisted for a time duration in excess of fifty minutes, exceeding the calculating capacity of the calculating switches C4900, B4920 and A4940. This toll ticket thus produced is ultimately received in the Billing Department wherein a clerk makes a manual calculation of the cost on the appropriate basis indicated to be assessed for the call and then prints the assessed charge on the toll ticket by the ordinary typing method.

The record storage transfer switch R4810 then operates to control the marking relays WB, XB, YB and ZB in order to govern the operation of the record printer 5240, whereby a line on the record sheet is printed, all in the manner previously explained. In the present example, it is pointed out that the line of printing mentioned on the record sheet may appear as follows:

11–29/11–50/844–0901/279–1234/123/3/2/6/01/2

The subsequent operation and release of the printer controller 4200 and the printer link 5000 are the same as those previously described.

*Toll calls from a party subscriber substation*

The extension of a toll call from a party subscriber substation, such, for example, as one of the party subscriber substations TS1, TS2, TS3 or TS4, connected to the party subscriber line 410 is initiated at the calling party subscriber substation and extended therefrom under the control of the calling device thereat, in the manner previously explained; however, the apparatus in the primary register and in the register translator operate in a slightly different manner, as explained more fully below.

Assume that a call has been initiated from one of the party subscriber substations TS1, TS2, TS3 or TS4; that the associated line switch 424 individual to the associated party subscriber line 410 has operated to seize the trunk 462 extending to the primary selector 600; and that the finder F610 has seized the conductors extending to the primary register 1200, all in the manner previously explained.

In the present example, in the event the call is initiated at the first party subscriber substation TS1, no ground impulses are transmitted from the calling device thereat over the line conductors of the party subscriber line 410 incident to the dialing of each digit thereat; in the event the call is initiated at the second party subscriber substation TS2, one ground impulse is transmitted from the cam springs 454 in the calling device thereat over the line conductors of the party subscriber line 410 incident to the dialing of each digit thereat; in the event the call is initiated at the third party subscriber substation TS3, two ground impulses are transmitted from the cam springs 456 in the calling device thereat over the line conductors of the party subscriber line 410 incident to the dialing of each digit thereat; and, finally, in the event the call is initiated at the fourth party subscriber substation TS4, three ground impulses are transmitted from the cam springs 458 in the calling device thereat over the line conductors of the party subscriber line 410 incident to the dialing of each digit thereat.

By way of example, it is pointed out that the calling device at the fourth party subscriber substation TS4 is operative to transmit, by way of the set of cam springs 458, the first ground impulse over the line conductors of the party subscriber line 410, while the set of impulse springs 457 is closed; then to transmit, by way of the set of impulse springs 457, the first impulse of the digit over the line conductors of the party subscriber line 410, while the set of cam springs 458 is open; then to transmit, by way of the set of cam springs 458, the second ground impulse over the line conductors of the party subscriber line 410, while the set of impulse springs 457 is closed; etc. The calling devices at the second party subscriber substation TS2 and at the third party subscriber substation TS3 are operative in a similar manner.

Now assuming that the call from the calling party subscriber substation TS1, TS2, TS3 or TS4 is to be extended to a called subscriber substation in exchange 9 zone 27, the subscriber at the calling party subscriber substation proceeds to dial the directory number of the called subscriber substation, the directory number of the called subscriber substation being 279–1234, for purpose of illustration.

Accordingly the subscriber at the calling party subscriber substation TS1, TS2, TS3 or TS4 proceeds to dial the first digit 2, thereby to cause the last-mentioned digit to be registered in the first code switch A1500 in the primary register 1200, in the manner previously explained. The wiper set of the switch mechanism 700 in the primary selector 600 is operated to its second vertical position in accordance with the first digit 2 and is then released at the conclusion of the last-mentioned digit, in the manner previously explained. The wiper 1503 of the first code switch A1500 engages the second contact in the associated contact bank, whereby the previously traced circuit for energizing the winding of the translate relay R1270 is completed incident to the restoration of the dial slave relay R1310 shortly following the conclusion of the first digit 2, in the manner previously explained.

Also, at the conclusion of the first digit 2, the wipers noted of the sequence switch S1630 are driven to engage the first contacts in the associated contact banks, whereby the party test relay R1440 operates as previously noted. Upon operating, the party test relay R1440 interrupts, at the contacts 1441 and 1443, the previously traced original loop circuit for energizing the upper and intermediate windings of the line relay R1450; and completes, at the contacts 1442 and 1444, the previously traced loop circuit for energizing the upper winding of the auxiliary line relay R1410 in series with the upper and lower windings of the party line relay R1420, whereby the auxiliary line relay R1410 operates and the party line relay R1420 does not operate as it is of the differential type.

The subscriber at the calling party subscriber substation TS1, TS2, TS3 or TS4 then proceeds to dial the second digit 7, thereby to cause the last-mentioned digit to be registered in the second code switch B1510 under the control of the auxiliary line relay R1410, in the manner previously explained. During the second digit 7, each time a ground impulse is transmitted over the line conductors of the party subscriber line 410 and consequently over the conductors C641 and C643 extending to the primary register 1200, the lower winding of the party line relay R1420 is energized directly across the 24 volt source of potential; while the upper winding of the party line relay R1420 is energized in series with the upper winding of the auxiliary line relay R1410 directly across the 72 volt source of potential. Accordingly it will be understood that each time ground potential is applied to the conductors C641 and C643 the energization of the lower winding of the party line relay R1420 is substantially increased, while the energization of the upper winding of the party line relay R1420 is even more substantially increased; in fact, when ground potential is applied to the conductors C641 and C643, the energization of the lower winding of the party line relay R1420 may be doubled, while the energization of the upper winding of the party line relay R1420 may be quadrupled. Accordingly it will be understood that each time ground potential is applied to the conductors C641 and C643 the upper and lower windings of the party line relay R1420 are unbalanced, causing this relay of the differential type to operate. Each time ground potential is removed from the line conductors of the party subscriber line 410 the previously traced circuit for energizing the upper winding of the auxiliary line relay R1410 in series with the upper and lower windings of the party line relay R1420 is recompleted, whereby the upper and lower windings of the party line relay R1420 are again balanced, causing this relay to restore. The application of ground potential to the line conductors of the party subscriber line 410 merely causes the upper winding of the auxiliary line relay R1410 to be energized at a somewhat higher potential, as previously explained, whereby the application of ground potential to and the removal of ground potential from the line conductors of the party subscriber line 410 do not cause the restoration of the auxiliary line relay R1410. Each time the loop circuit, including the party subscriber line 410, is interrupted the auxiliary line relay R1410 restores, in an obvious manner, and the party line relay R1420 remains restored, as both the upper and lower windings thereof are deenergized. Accordingly the auxiliary line relay R1410 follows the loop impulses transmitted by the set of impulse springs in the calling device at the calling party subscriber substation on the party subscriber line 410; and the party line relay R1420 follows the ground impulses transmitted by the set of cam springs in the calling device at the calling party subscriber substation on the party subscriber line 410. The first time the party line relay R1420 operates and restores it completes and then interrupts, at the contacts 1421, an obvious circuit, including C1287 and the contacts 1213, for energizing the lower winding of the party relay R1210; whereby the latter relay operates first partially and then fully in order to complete, at the contacts 1211, an obvious holding circuit, including the grounded hold conductor C1294, for energizing in series the upper and lower windings thereof. Also the party relay R1210 interrupts, at the contacts 1213, a further point in the previously traced original operating circuit for energizing the lower winding thereof; and prepares, at the contacts 1212, a point in an obvious circuit substantially identical to that previously traced for energizing the lower winding of the party relay R1220. Finally the party relay R1210 completes, at the contacts 1214, an obvious path for applying ground potential to the conductor C1284 extending to the first code switch A1500.

In view of the foregoing explanation of the mode of operation of the party line relay R1420 in conjunction with the party relays R1210, R1220 and R1230, under the control of the calling devices at the various party subscriber substations TS1, TS2, TS3 and TS4 connected to the party subscriber line 410, it will be understood that, in the event the call is initiated at the first party subscriber substation TS1, none of the party relays R1210, R1220 and R1230 will be operated incident to the dialing of the second code digit 7; in the event the call is initiated at the second party subscriber substation TS2, the party relay A1210 will be operated incident to the dialing of the second code digit 7; in the event the call is initiated at the third party subscriber substation TS3, the party relays R1210 and R1220 will be operated incident to the dialing of the second code digit 7; and finally, in the event the call is initiated at the fourth party subscriber substation TS4, the party relays R1210, R1220 and R1230 will be operated incident to the dialing of the second digit 7.

At the conclusion of the second digit 7, the wipers noted of the sequence switch S1630 are driven to disengage the first contacts in the associated contact banks and to engage the second contacts therein, whereby the party test relay R1440 restores. Upon restoring, the party test relay R1440 interrupts, at the contacts 1442 and 1444, the previously traced loop circuit for energizing the upper winding of the auxiliary line relay R1410 in series with the upper and lower windings of the party line relay R1420; and recompletes, at the contacts 1441 and 1443, the previously traced original loop circuit for energizing in series the upper and intermediate windings of the line relay R1450, all in the manner previously explained. Accordingly, at this time, further operation of the calling device at the calling party subscriber substation TS1, TS2, TS3 or TS4 to transmit ground impulses over the line conductors of the party subscriber line 410 is without effect as the line relay R1450 does not follow these ground impulses, but only the loop impulses transmitted over the party subscriber line 410, as previously explained. Thus it will be understood that the testing by the party line relay R1420 to determine the position of the calling party subscriber substation on the calling party subscriber line 410 is effected only during the second code digit 7.

When the wipers noted of the sequence switch S1630 engage the second contacts in the associated contact banks the previously traced circuit for energizing the winding of the start relay R1600 in the register translator allotter 1600 is completed in order to cause the latter relay to operate; whereupon the register translator allotter 1600 assigns an idle register translator, such, for example, as the register translator 1700. When the register translator 1700 is thus assigned the finder F2290 operates to connect it to the primary register 1200, in the manner previously explained. At this time the pulse relay R1350 in the primary register 1200 operates to transmit the complement 9 of the first digit 2 to the register translator 1700, whereby the first digit 2 is effectively registered in the first code switch A2400 in the register translator 1700, in the manner previously explained. Also the pulse relay R1350 effects operation of the party switch N2620 in the register translator 1700 in accordance with the operated or restored positions of the party relays R1210, R1220 and R1230 in the primary register 1200, whereby there is registered in the party switch N2620 the position of the calling subscriber substation on the associated party subscriber line 410. More particularly, in the primary register 1200, when the wiper 1502 of the first code switch A1500 engages the eleventh, twelfth and thirteenth contacts in the associated contact banks the previously traced path for applying direct ground potential to the impulse conductor C1391 is completed in the event the respective party relays R1210, R1220 and R1230 occupy their operated positions; which application of direct ground potential completes the previously traced circuit for energizing in series the windings of the light code relay R2050 and the heavy code relay R2060, whereby both of the relays mentioned operate. As previously pointed out, the heavy code relay R2060 is of the marginal type and operates only when direct ground potential is applied to the impulse conductor C1391; while the light code relay R2050 operates when either resistance ground potential or direct ground potential is applied to the impulse conductor C1391. Each time the heavy code relay R2060 operates and restores it completes and then interrupts, at the contacts 2061, the previously mentioned circuit for energizing the magnet NM2625, whereby the wipers noted of the party switch N2620 are driven additional steps in the counterclockwise direction. Thus it will be understood that, in the event the call is initiated at the respective first, second, third and fourth party subscriber substations TS1, TS2, TS3 and TS4 on the party subscriber line 410, the party switch N2620 in the register translator 1700 will be controlled by the primary register 1200, in the manner explained above; whereby the wiper 2623 of the party switch N2620 will respectively engage the first, second, third and fourth contacts in the associated contact banks respectively terminating the conductors C2641, C2642, C2643 and C2644, which conductors are adapted to be connected by the storage relay R2850 to the respective hold conductors C3401, C3402, C3403 and C3404 extending to the detector 2900.

The subscriber at the calling party subscriber substation TS1, TS2, TS3 or TS4 then proceeds to dial the third digit 9, the fourth digit 1, the fifth digit 2, the sixth digit 3 and the seventh digit 4, whereby the primary register 1200 operates to transmit the second digit 7, the third digit 9 and the fourth digit 1 registered therein to the register translator 1700 and to repeat the fifth digit 2, the sixth digit 3 and the seventh digit 4 directly to the register translator 1700 to be registered therein, all in the manner previously explained.

The operation of the register translator 1700 to register the seven digits mentioned to control the primary selector 600, to operate the succeeding switch train, to transmit the various items of record information stored therein to the toll ticket repeater utilized and to initiate operation of the detector 2900 are the same as those previously explained. For purpose of illustration, assume that the primary selector 600 operates to route the connection by way of the toll ticket repeater 800.

In view of the foregoing explanation of the mode of operation of the party switch N2620 in the register translator 1700, it will be understood that, when the detector 2900 is connected to the register translator 1700, ground potential will be applied to only one of the hold conductors C3401, C3402, C3403 and C3404, as previously noted. More particularly, in the event the call was initiated at the first party subscriber substation TS1, ground potential will be applied to the hold conductor C3401 and the detector 2900 will operate in order to detect the directory number of the connector terminal having access to the first party subscriber substation TS1, the directory number of the terminal mentioned being 0100. Similarly, in the event the call was initiated at the second party subscriber substation TS2, ground potential will be applied to the hold conductor C3402 and the detector 2900 will operate in order to detect the directory number of the connector terminal having access to the second party subscriber substation TS2, the directory number of the terminal mentioned being 0200; in the event the call was initiated at the third party subscriber substation TS3, ground potential will be applied to the hold conductor C3403 and the detector 2900 will operate in order to detect the directory number of the connector terminal having access to the third party subscriber substation TS3, the directory number of the terminal mentioned being 0300; and in the event the call was initiated at the fourth party subscriber substation TS4, ground potential will be applied to the hold conductor C3404 and the detector 2900 will operate in order to detect the directory number of the connector terminal having access to the fourth party subscriber substation TS4, the director number of the terminal mentioned being 0400.

The subsequent release of the register translator 1700 as well as the operation and subsequent release of the printer controller utilized and the printer link 5000, in conjunction with the toll ticket repeater 800, following the release of the established connection under the control of the subscriber at the calling party subscriber substation TS1, TS2, etc., is the same as those previously described. In the present example, the printer controller utilized, such, for example, as the printer controller 4200, governs the toll ticket printer 5230 to produce a toll ticket of the character of that shown in Fig. 59 in the event the present call was initiated at the calling party subscriber substation TS1 or of the character of that shown in Fig. 60 in the event the present call was initiated at the calling party subscriber substation TS4. Correspondingly, the printer controller 4200 governs the record printer 5240 to produce a line of printing on the record sheet of the character of that appearing in line 5 on the record sheet illustrated in Fig. 55, in the event the present call was initiated at the calling party subscriber substation TS1, or of the character of that appearing in line 6 on the record sheet illustrated in Fig. 55, in the event the present call was initiated at the calling party subscriber substation TS4.

*Toll calls to exchanges in adjacent zones*

In the extension of a toll call from an ordinary private subscriber substation, such, for example, as the private subscriber substation TP, or from a party subscriber substation, such, for example, as the party subscriber substation TS1, in exchange 4 zone 84, to an exchange in the adjacent zone, such, for example, as exchange 6 zone 45, the selected primary selector, such, for example, as the primary selector 600, the selected primary register, such, for example, as the primary register 1200, and the selected register translator, such, for example, as the register translator 1700, all operate in the manner previously explained, in connection with the extension of a toll call to exchange 9 zone 27. More particularly, the toll call is routed from the primary selector 600 over an idle one of the repeaters, such, for example, as the toll ticket repeater 800, and ultimately completed in exchange 6 zone 45. The various items of record information pertaining to this toll call are stored in the toll ticket repeater 800; and incident to the release of the established connection under the control of the subscriber at the calling subscriber substation in exchange 4 zone 84 an idle printer controller, such, for example, as the printer controller 4200, is selected and utilized in conjunction with the printer link 5000 to govern the toll ticket printer 5230 and the record printer 5240, all in the manner previously explained. In other words, toll calls from the calling ordinary private subscriber substation TP or from the calling party subscriber substation TS1 to a called subscriber substation in exchange 6 in the adjacent zone 45 are ticketed in the manner previously explained.

On the other hand, as previously noted, a call initiated at a calling private subscriber substation rendered extended service, such, for example, as the private subscriber substation TX, may be completed to a called subscriber substation in exchange 6 in the adjacent zone 45 as a free call, no toll ticket being produced. For example, assume that a call initiated at the calling extended service private subscriber substation TX is to be extended to a called subscriber substation in exchange 6 zone 45; that the line switch 421 individual to the private subscriber line 401 extending to the calling private subscriber substation TX has seized the trunk 461 extending to the primary selector 441; and that the finder F442 individual to the primary selector 441 has selected the conductors extending to the primary register 1200, all in the manner previously explained. The subscriber at the calling private subscriber substation TX proceeds to dial the directory number of the called subscriber substation which may be 456-1234. The first and second digits 4 and 5 are respectively registered in the first code switch A1500 and the second code switch B1510 in the primary register 1200, whereby the register translator allotter 1600 operates in order to assign an idle register translator, such, for example, as the register translator 1700; whereupon the finder F2290 connects the register translator 1700 to the primary register 1200, all in the manner previously explained. The complements 7 and 6 of the first and second digits 4 and 5 registered in the primary register 1200 are transmitted to the register translator 1700; the third and fourth digits 6 and 1 are first respectively registered in the third code switch C1520 and in the first numerical switch D1620 in the primary register 1200 and then the complements 5 and 0 thereof are transmitted to the register translator 1700; while the fifth digit 2, the sixth digit 3 and the seventh digit 4 are repeated directly by the primary register 1200 to the register translator 1700, all in the manner previously explained.

At this time, in the register translator 1700, the seven digits mentioned are effectively registered, respectively, in the first code switch A2400, the second code switch B2410, the third code switch C2500, the first numerical switch D2510, the second numerical switch E2520, the third numerical switch F2600 and the fourth numerical switch G2610; the grounded wiper 2405 of the first code switch A2400 engages the seventh contact in the associated contact bank, whereby the wiper 2334 of the composite code switch P2330 is selected; and the wiper set of the composite code switch P2330 occupies its 6 up 5 in position, in the manner previously explained. Also it is noted that, when the register translator 1700 is connected to the primary register 1200, the previously traced circuit for energizing the lower winding of the special service relay R2040 in series with the upper winding of the transfer relay R443 in the primary selector 441 is completed, whereby the special service relay R2040 operates as previously explained. Upon operating, the special service relay R2040 completes, at the contacts 2041, the previously traced holding circuit, including the grounded hold conductor C2772, for energizing the upper winding thereof; prepares, at the contacts 2042, the previously mentioned circuit for energizing the winding of the denied service relay R2010; prepares, at the contacts 2043, the previously mentioned path for short-circuiting the winding of the switch cutoff relay R1820; and completes, at the contacts 2044, the previously mentioned path for applying ground potential to the Z conductor in the group of WXYZ marking leads 2814, all in the manner previously explained.

As previously explained, after the third digit 6 has been registered in the third code switch C2500 the sequence relay R2720 operates; and after the first digit 4 has been registered in the first code switch A2400 the wipers noted of the party switch N2620 are operated away from their home positions. At this time the previously traced circuit for energizing the upper winding of the switch pulse relay R1830 is completed, thereby to cause the latter relay to operate intermittently. The intermittent operation of the switch pulse relay R1830 effects operation of the wiper set of the rate and route switch R2310 first in the vertical direction and then in the rotary direction under the joint control of the transfer relay R1930 and the composite code switch P2330, in the manner previously explained. For purpose of illustration, assuming that the engaged 6 up 5 in contact in the contact bank associated with the grounded wiper 2334 of the composite code switch P2330 is connected by way of the jumper 2351 to the 1 up 7 in contact in the contact bank associated with the wiper 2318 of the wiper set of the rate and route switch R2310, the wiper set of the rate and route switch R2310 is driven one step in the vertical direction away from its normal vertical position; whereupon the transfer relay R1930 operates, as previously explained. Upon operating, the transfer relay R1930 causes the wiper set of the rate and route switch R2310 to be driven seven steps in the rotary direction away from its normal rotary position, whereupon the stop relay R1940 operates, in the manner previously explained.

At this time the wiper set of the rate and route switch R2310 engages the 1 up 7 in contacts in the associated contact banks in order to establish a route from exchange 4 zone 84 to exchange 6 zone 45, which route includes a toll ticket repeater, whereby the present call would be ticketed in the event it were extended by the presently selected route. However, in the present example, upon operating, the stop relay R1940 completes, at the contacts 1943, the previously mentioned path for short-circuiting the winding of the switch cutoff relay R1820; this path extending from ground by way of the contacts 1943, the winding of R1820, the contacts 2043, C2391, the grounded wiper 2316 of the wiper set of the rate and route switch R2310 and the engaged 1 up 7 in contact in the associated contact bank. At this point it is noted that the above-traced path for short-circuiting the winding of the switch cutoff relay R1820 is completed, in the present example, due to the operated position of the special service relay R2040; which relay occupies its operated position only in the present example when the call is initiated at a subscriber substation in exchange 4 zone 84 which is rendered extended service and includes a primary selector in the second group, as previously explained. Accordingly, in the present example, the switch cutoff relay R1820 does not operate to arrest the operation of the switch pulse relay R1830. Hence, the switch pulse relay R1830 again operates and restores in order again to complete and then interrupt, at the contacts 1831, the previously traced circuit for energizing the rotary magnet RM2321, whereby the last-mentioned magnet again operates and restores in order to drive the wiper set of the rate and route switch R2310 an additional step in the rotary direction into engagement with the eighth contacts in the first level of the associated contact banks. Accordingly, in the present example, the switch pulse relay R1940 operates and restores once subsequent to the operation of the stop relay R1840, whereby there is completed and then interrupted, at the contacts 1832, a circuit, including the contacts 2325 of the set of switch springs RS2324, C2361 and the contacts 1942, for energizing the lower winding of the detector cut-out relay R1950. When thus energized the detector cut-out relay R1950 operates to complete, at the contacts 1951, an obvious holding circuit, including the contacts 2131, for energizing the upper winding thereof; and completes, at the contacts 1952, an obvious connection between the conductor C2372 and the conductor C2389 included in a circuit traced hereinafter for energizing the lower winding of the release relay R2210. Subsequently, when the grounded wiper 2303 of the digit sequence switch T2300 engages the twelfth contact in the associated contact bank terminating the conductor C2372 the above-mentioned circuit, including the contacts 1952 and C2389, is completed for energizing the lower winding of the release relay R2210 in order to cause the latter relay to operate. Accordingly, when the detector cut-out relay R1950 operates it renders the release of the register translator 1700 under the direct control of the digit sequence switch T2300 and independent of the operation of the storage transfer switch U2820. Also the detector cut-out relay R1950 interrupts, at the contacts 1953, a further point in the previously traced circuit for energizing the winding of the detector start relay R1760, thereby positively to present operation of the latter relay and the consequent operation of the detector 2900, in the present example. Finally the detector cut-out relay R1950 completes, at the contacts 1954, an obvious connection between the conductors C2369 and C2771, thereby to render the operation of the digit sequence switch T2300, in order to cause the digits to be transmitted from the register translator 1700, independent of the operation of the last digit send relay R1720. The last digit send relay R1720 may not be operated, in the present example, under the control of the storage transfer switch U2820, in the manner previously explained. When the grounded wiper 2316 of the wiper set of the rate and route switch R2310 disengages the 1 up 7 in contact in the associated contact bank the previously traced path for short-circuiting the winding of the switch cutoff relay R1820 is interrupted, whereby the previously traced circuit for energizing the winding of the last-mentioned relay is effectively completed. When thus energized the switch cutoff relay R1820 operates to interrupt, at the contacts 1822, the previously traced circuit for energizing the upper winding of the switch pulse relay R1830, thereby to arrest further operation of the latter relay and consequently further operation of the rate and route switch R2310. At this time the wiper set of the rate and route switch R2310 engages the 1 up 8 in contacts in the associated contact banks, whereby a route is established from exchange 4 zone 84 to exchange 6 zone 45, which excludes a toll ticket repeater and includes an ordinary repeater, as explained more fully below.

Also, upon operating, the switch cutoff relay R1820 effects operation of the pulse start relay R1710, in the manner previously explained, whereby the latter relay completes, at the contacts 1716, a circuit, including C1777, the wiper 2304 of the digit sequence switch T2300 and the engaged home contact in the associated contact bank, the wiper 2311 of the wiper set of the rate and route switch R2310 and the engaged 1 up 8 in contact in the associated contact bank and C2387, for energizing the winding of the code send relay R1740. When thus energized the code send relay R1740 operates to complete, at the contacts 1742, an obvious holding circuit, including the contacts 1719, for energizing the winding thereof; and interrupts, at the contacts 1743, the previously traced connection between the conductor C1780 and the control conductor C2382, for a purpose more fully explained hereinafter. Further the code send relay R1740 completes, at the contacts 1741, a circuit, including the grounded wiper 2303 of the digit sequence switch T2300 and the engaged home contact in the associated contact bank, C1776, the control conductor C2382 and the contacts 2306, for energizing the magnet TM2305; whereby the latter magnet operates and restores, thereby to drive the wipers noted of the digit sequence switch T2300 one step in the counterclockwise direction. When the wiper 2303 of the digit sequence switch T2300 disengages the home contact in the associated contact bank the above-traced circuit for energizing the magnet TM2305 is interrupted, thereby positively to arrest further operation of the latter magnet at this time. As previously noted, the wiper set of the rate and route switch R2310 engages the 1 up 8 in contacts in the associated contact banks, whereby the previously mentioned route for the present call between exchange 4 zone 84 and exchange 6 zone 45 is established; which route includes the three routing digits 4, 2 and 9 and the third code digit 6 registered in the third code switch C2500, in the manner previously explained. At this time the wiper 2304 of the digit sequence switch T2300 successively engages the first, second and third contacts in the associated contact bank, whereby the first, second and third routing digits 4, 2 and 9 are transmitted from the register translator 1700, in the manner previously explained. The wiper 2304 of the digit sequence switch T2300 then engages the fourth contact in the associated contact bank terminating the conductor extending to the wiper 2315 of the wiper set of the rate and route switch R2310 which engages the 1 up 8 in contact in the associated contact bank terminating the control conductor C2382, whereby the wipers noted of the digit sequence switch T2300 are immediately driven into engagement with the fifth contacts in the associated contact banks. The wiper 2303 of the digit sequence switch T2300 then successively engages the fifth and sixth contacts in the associated contact bank respectively terminating the conductors C1782 and C1781 connected to the control conductor C2382, whereby the wipers noted of the digit sequence switch T2300 are driven two additional steps in the counterclockwise direction, in the manner previously explained. The wiper 2303 then engages the seventh contact in the associated contact bank terminating the conductor C1780 which is disconnected at the contacts 1743 of the operated code send relay R1740 from the control conductor C2382, whereby the register translator 1700 transmits the third code digit 6 registered in the third code switch C2500 in view of the fact that the wiper 2304 thereof engages the seventh contact in the associated contact bank terminating the conductor C2379 extending to the third code switch C2500 at this time, all in the manner previously explained. The wiper 2304 of the digit sequence switch T2300 then successively engages the eighth, ninth, tenth and eleventh contacts in the associated contact bank, whereby the four numerical digits 1, 2, 3 and 4 are successively transmitted by the register translator 1700. The remainder of the operation of the register translator 1700 to transmit the various items of record information stored therein, as well as the ultimate release thereof and the release of the primary register 1200, are the same as those previously described.

In view of the foregoing explanation of the mode of operation of the register translator 1700, it will be understood that it operated, as described above, to transmit the three routing digits 4, 2 and 9, the third code digit 6 and the four numerical digits 1, 2, 3 and 4, all in impulse digit form over the conductor C1283 to the primary register 1200; and therefrom by way of the conductor C642 and the finder F442 to the negative line conductor of the primary selector 441. The various items of record information stored in the register translator 1700 in code form are not transmitted over the conductor C1394 to the primary register 1200 in the present example, in view of the fact that the operated detector cutout relay R1950 positively prevents operation of the detector start relay R1760 and the consequent operation of the code pulse relay R1850.

The primary selector 441 responds to the first routing digit 4 in order to select the group of trunks, including the trunk 471, extending to the group of ordinary repeaters, including the ordinary repeater 451; and then operates automatically to select an idle trunk in the group mentioned, such, for example, as the trunk 471, extending to the ordinary repeater 451. The ordinary repeater 451 receives the second routing digit 2 and repeats the same to the toll selector 511 individual thereto, whereupon the toll selector 511 responds to the second routing digit 2 to select an idle toll line in the group, including the toll line 470, extending to exchange 6 zone 45. The toll selector 511 then operates automatically to select an idle toll line, such, for example, as the toll line 470 in the group mentioned. The ordinary repeater 451 then repeats the third routing digit 9 and the third code digit 6, as well as the four numerical digits 1, 2, 3 and 4 over the toll line 470 to the switching apparatus in exchange 6 zone 45. The switching apparatus in exchange 6 zone 45 responds to the digits repeated over the toll line 470 to select the line terminal of the subscriber line extending to the called subscriber substation therein, all in accordance with conventional practice.

The release of this established connection between the calling private subscriber substation TX in exchange 4 zone 84 and the called subscriber substation in exchange 6 zone 45 is under the control of the subscriber at the calling private subscriber substation TX and is effected in the manner previously explained. However, in the present example, the call is not ticketed in view of the facts that the items of record information were not transmitted to the ordinary repeater 451 and the ordinary repeater 451 is not associated with the group of printer controllers, including the printer controller 4200, as previously explained.

*Denied toll calls*

As previously explained, in connection with calls to other exchanges in zone 84, only calls which do not require translation by a register translator may be completed under the control of the calling device at a private subscriber substation rendered denied toll service. For example, calls initiated at the denied toll service private subscriber substation TD which require translation, all toll calls, by a register translator, are intercepted at the interceptor operator position 114-117, as previously noted.

Now assume that the subscriber at the calling denied toll service private subscriber substation TD has initiated a call; that the line switch 422 individual to the associated private subscriber line 404 has seized the trunk 461 extending to the primary selector 441; and that the finder F442 individual to the primary selector 441 has seized the conductors extending to the primary register 1200, all in the manner previously described. Now assume that the subscriber at the calling denied toll service private subscriber substation TD attempts the extension of a toll call by dialing the directory number of a called subscriber substation in a remote exchange and zone, such, for example, as the called subscriber substation in exchange 9 zone 27. In this event, the first and second digits 2 and 7 dialed at the calling private subscriber substation TD are respectively registered in the first code switch A1500 and the second code switch B1510 in the primary register 1200, in the manner previously explained. Also it is noted that the calling device at the calling subscriber substation TD is of the special construction previously mentioned, whereby two ground impulses are transmitted over the private subscriber line 404 incident to each operation thereof. More particularly, when the finger wheel of this calling device is operated the set of auxiliary springs 451′ is operated first to apply ground potential and then to remove ground potential from the line conductors of the private subscriber line 404, while the set of impulse springs 450′ is closed; when the finger wheel is then released the set of impulse springs 450′ is operated to transmit the digit; and after the set of impulse springs 450′ is reclosed subsequent to the transmission of the digit the set of auxiliary springs 451′ is again operated to apply ground potential and then to remove ground potential from the line conductors of the private subscriber line 404. Hence, each time the calling device at the calling private subscriber substation TD is operated, two ground impulses are transmitted over the private subscriber line 404.

Accordingly, in the present example, during the registration of the second code digit 7 in the second code switch B1510 in the primary register 1200, the party line relay R1420 is controlled, whereby the party relays R1210 and R1220 are operated in the manner previously explained. The primary register 1200 then controls the register translator allotter 1600, whereby an idle register translator, such, for example, as the register translator 1700, is selected; whereupon the finder F2290 operates to connect the register translator 1700 to the primary register 1200, all in the manner previously explained. When the register translator 1700 is connected to the primary register 1200 the previously traced circuit for energizing the lower winding of the special service relay R2040 in the register translator 1700 in series with the upper winding of the transfer relay R443 in the primary selector 441 is completed, thereby to cause the special service relay R2040 to operate, as previously explained. Also the third code digit 9 is registered in the third code switch C1520 in the primary register 1200; the complements 9, 4 and 2 of the respective code digits 2, 7 and 9 are transmitted from the primary register 1200 and registered in the first code switch A2400, the second code switch B2410 and the third code switch C2500 in the register translator 1700, in the manner previously explained; and the party switch N2620 is operated to engage the third contact in the associated contact bank, as previously explained. When the wiper 2623 of the party switch N2620 engages the third contact in the associated contact bank the previously mentioned circuit, including C2635 and the contacts 2042 of the operated special service relay R2040, is completed for energizing the winding of the denied service relay R2010. When thus energized the denied service relay R2010 operates to complete, at the contacts 2011, an obvious path for applying ground potential to the marking conductor C2384 terminated by the 1 up 3 in contact in the contact bank associated with the wiper 2318 of the rate and route switch R2310; and completes, at the contacts 2012, an obvious circuit for energizing in series the right-hand and left-hand windings of the sequence relay R2720, whereby the latter relay operates completely immediately. Upon operating, the sequence relay R2720 completes, at the contacts 2727, the previously traced circuit for energizing the upper winding of the switch pulse relay R1830, thereby to cause intermittent operation of the latter relay at this time.

The intermittent operation of the switch pulse relay R1830 causes the wiper set of the rate and route switch R2310 to be driven to engage the 1 up 3 in contacts in the associated contact banks under the control of the transfer relay R1930 and the stop relay R1940, all in the manner previously explained. It is noted that the marking of the 1 up 3 in contact in the contact bank associated with the wiper 2318 of the wiper set of the rate and route switch R2310, due to the operated position of the denied service relay R2010, positively prevents operation of the rate and route switch R2310 under the control of the composite code switch P2330. When the wiper set of the rate and route switch R2310 engages the 1 up 3 in contacts in the associated contact banks the routing digits 1, 1 and 6 are set up to be transmitted by the register translator 1700, in the manner previously explained. Also, upon operating, the stop relay R1940 effects operation of the switch cutoff relay R1820 and the consequent operation of the digit pulse start relay R1710, as previously noted. Upon operating, the digit pulse start relay R1710 completes, at the contacts 1714, a circuit for energizing the upper winding of the detector cut-out relay R1950; this circuit extending from the grounded wiper 2316 of the wiper set of the rate and route switch R2310 and the engaged 1 up 3 in contact in the associated contact bank, C2390, the contacts 1714 and the upper winding of R1950 to battery. When thus energized the detector cut-out relay R1950 operates in order to complete, at the contacts 1951, the previously traced holding circuit for energizing the upper winding thereof and to interrupt, at the contacts 1953, the previously traced circuit for energizing the winding of the detector start relay R1760, thereby positively to prevent operation of the detector 2900 in the present example, all in the manner previously explained. Also the digit pulse start relay R1710 completes, at the contacts 1716, a circuit substantially identical to that previously traced for energizing the winding of the code send relay R1740, thereby to cause the latter relay to operate. Upon operating, the code send relay R1740 effects the transmission of the routing digits 1, 1 and 6 from the register translator 1700 to the primary selector 441, all in the manner previously explained. The wiper 2304 of the digit sequence switch T2300 then engages the fourth contact in the associated contact bank, thereby to complete a circuit, including the contacts 1716, the wiper 2315 of the wiper set of the rate and route switch R2310 and the engaged 1 up 3 in contact in the associated contact bank and C2389, for energizing the lower winding of the release relay R2210. When thus energized the release relay R2210 operates in order to effect the release of the register translator 1700 and the consequent release of the primary register 1200, all in the manner previously explained.

The primary selector 441 responds to the first routing digit 1, thereby to select an idle trunk in the group, including the trunk 509, extending to an idle special service selector, such, for example, as the trunk 509, extending to the special service selector 503. The special service selector 503 is of the drop-back type, as previously noted, and absorbs the second routing digit 1. The drop-back selector 503 then responds to the third routing digit 6 to select the corresponding third group of trunks extending to the interceptor operator position 114—117 and then operates automatically to select an idle trunk in the group mentioned. Accordingly, in the present example, the call from the denied toll service private subscriber substation TD is routed by way of the primary selector 441 and the special service selector 503 over an idle trunk in the third group of trunks extending to the interceptor operator position 114—117; which routing of the call over the idle trunk in the third group of trunks extending to the interceptor operator position 114—117 indicates to the operator thereat that the present call was intercepted due to the fact that the extension of a toll call was attempted at a private subscriber substation rendered denied toll service. The operator at the interceptor operator position 114—117 then answers the call and advises the subscriber at the calling private subscriber substation TD that the extension of toll calls under the control of the calling device thereat is not permitted. At this time the operator at the interceptor operator position 114—117 may advise the subscriber at the calling private subscriber substation TD to release the present connection and extend the call mentioned via the toll operator position 110, in the manner previously explained; or she may have suitable credit information permitting her to undertake the extension of the call directly.

The subsequent release of the primary selector 441 and the special service selector 503 may be under the control of either the subscriber at the calling private subscriber substation TD or the operator at the interceptor operator position 114—117, and is effected in accordance with conventional practice.

*Intercepting other calls*

Now assume that a call has been initiated at any subscriber substation in exchange 4 zone 84, such, for example, as the private subscriber substation TP; that the line switch 423 associated with the private subscriber line 407 extending to the calling private subscriber substation TP has seized the trunk 462 extending to the primary selector 600; and that the finder F610 individual to the primary selector 600 has seized the conductors individual to the primary register 1200. At this time the primary register 1200 is in readiness to receive the full complement of digits dialed at the calling private subscriber substation TP and indicative of either a local call requiring no translation or a call requiring translation, as previously explained. Now assume that the subscriber at the calling private subscriber substation TP dials several digits less than a full complement of digits and indicating that the call must be translated by a register translator. When the first and second code digits are respectively registered in the first code switch A1500 and in the second code switch B1510 in the primary register 1200 the register translator allotter 1600 is controlled to assign an idle register translator, such, for example, as the register translator 1700, whereupon the finder F2290 operates in order to connect the register translator 1700 to the primary register 1200. When the register translator 1700 is connected to the primary register 1200 the switching relay R2280 and the hold relay R2130 in the register translator operate, the switching relay R2280 causing operation of the timer relay R2270 every five seconds thereafter; whereby the wipers of the timer switch M2260 are advanced step by step in the counterclockwise direction one step each five seconds, all in the manner previously explained.

In the present example, the complements of the first four digits registered in the primary register 1200 are transmitted and registered in the register translator 1700 and the fifth etc. digits are repeated directly by the primary register 1200 to the register translator 1700 for registration, all in the manner previously explained. However, in the present example, in view of the fact that less than a full complement of digits is registered in the register translator 1700, the register translator 1700 cannot operate fully to transmit the necessary routing, code and numerical digits to effect the operation of the outgoing switch train to complete the desired connection. Accordingly, in the present example, the register translator transmits the routing digit, the code digit or digits and what numerical digits are registered therein, all in the manner previously explained; however, it is not released, in the manner previously explained, in view of the fact that a full complement of digits is not registered therein. Hence, the register translator 1700 is retained in its operated position after it has transmitted all of the digits possible and is retained connected to the primary register 1200 for a time interval of thirty seconds. The normal operation of the register translator 1700 requires only a fraction of the time interval mentioned; and, in the event the register translator 1700 is retained connected to the primary register 1200 for thirty seconds, the wiper 2261 of the timer switch M2260 engages the sixth contact in the associated contact bank terminating the conductor C2385 while the timer relay R2270 occupies its operated position. This application of ground potential to the conductor C2385 completes a circuit, including the contacts 2273 of the operated timer relay R2270, the contacts 1765 of the operated detector start relay R1760, C2392 and the contacts 2326 of the set of switch springs RS2324, for energizing the release magnet RM2322, whereby the latter magnet operates in order to release the wiper set of the rate and route switch R2310 in order to cause it to be returned to its normal rotary and vertical positions. When the rate and route switch R2310 is thus released the set of switch springs RS2324 is actuated, thereby to interrupt, at the contacts 2326, the above-traced circuit for energizing the release magnet RM2322, whereupon the latter magnet restores. Also when the set of switch springs RS2324 is thus actuated there is interrupted, at the contacts 2325 thereof, the previously traced multiple holding circuits for energizing the lower windings of the transfer relay R1930 and the stop relay R1940, whereupon the relays mentioned restore.

Upon restoring, the stop relay R1940 interrupts, at the contacts 1943, the previously traced circuit for energizing the winding of the switch cutoff relay R1820, thereby to cause the latter relay to restore and effect the restoration of the digit pulse start relay R1710. Upon restoring, the digit pulse start relay R1710 interrupts, at the contacts 1718, the previously traced circuit for applying ground potential to the negative line wiper 702 of the switch mechanism 700 in the primary selector 600, thereby to effect the release of the switch train ahead of the switch mechanism 700 and the consequent release of the primary selector 600, all in the manner previously explained. Also the application of ground potential to the conductor C2385 terminated by the 1 up 1 in contact in the contact bank associated with the wiper 2318 of the wiper set of the rate and route switch R2310 marks the wiper set of the last-mentioned switch for reoperation to the 1 up 1 in position. Also, upon restoring, the digit pulse start relay R1710 completes, at the contacts 1712, a circuit including C1773, the contacts 2135, C2365, the wiper 2301 of the digit sequence switch T2300 and the engaged contact in the associated contact bank and the contacts 2306, for energizing the magnet TM2305; whereby the latter magnet operates intermittently, thereby to drive the wipers noted of the digit sequence switch T2300 step by step in the counterclockwise direction back into their home positions.

When the digit sequence switch T2300 is thus released the wiper 2303 thereof reengages the home contact in the associated contact bank, thereby to recomplete the previously traced circuit for energizing the upper winding of the switch pulse relay R1830; whereupon the latter relay operates and restores intermittently. The intermittent operation of the switch pulse relay R1830 causes the wiper set of the rate and route switch R2310 to be driven to engage the 1 up 1 in contacts in the associated contact banks under the control of the transfer relay R1930 and the stop relay R1940, all in the manner previously explained. It is noted that the marking of the 1 up 1 in contact in the contact bank associated with the wiper 2318 of the wiper set of the rate and route switch R2310, due to the operated position of the timer switch M2260, positively prevents reoperation of the rate and route switch R2310 under the control of the composite code switch P2330. When the wiper set of the rate and route switch R2310 engages the 1 up 1 in contacts in the associated contact banks the routing digits 1, 1 and 4 are set up to be transmitted by the register translator 1700, in the manner previously explained. Also, upon operating, the stop relay R1940 effects operation of the switch cut-off relay R1820 and the consequent operation of the digit pulse start relay R1710, as previously noted. Upon operating, the digit pulse start relay R1710 effects operation of the detector cutout relay R1950, which latter relay operates to prevent operation of the detector start relay R1760 and the consequent operation of the detector 2900, all in the manner previously explained. Also the digit pulse start relay R1710 effects operation of the code send relay R1740, whereby the transmission of the routing digits 1, 1 and 4 from the register translator 1700 to the primary selector 600 is effected, in the manner previously explained. The wiper 2304 of the digit sequence switch T2300 then engages the fourth contact in the associated contact bank, thereby to complete the previously traced circuit for energizing the lower winding of the release relay R2210. When thus energized the release relay R2210 operates in order to effect the release of the register translator 1700 and the consequent release of the primary register 1200, all in the manner previously explained.

The primary selector 600 responds to the first routing digit 1, thereby to select an idle trunk in the group, including the trunk 509, extending to an idle special service selector, such, for example, as the trunk 509, extending to the special service selector 503. The special service selector 503 is of the drop-back type, as previously noted, and absorbs the second routing digit 1. The special service selector 503 then responds to the third routing digit 4 to select the corresponding first group of trunks extending to the interceptor operator position 114—117 and then operates automatically to select an idle trunk in the group mentioned. Accordingly, in the present example, the call from the private subscriber substation TP is routed by way of the primary selector 600 and the special service selector 503 over an idle trunk in the first group of trunks extending to the interceptor operator position 114—117; which routing of the call over the idle trunk in the first group of trunks extending to the interceptor operator position 114—117 indicates to the operator thereat that the present call was intercepted, due to the fact that the subscriber at a calling subscriber substation failed to dial a full complement of digits, within the previously mentioned thirty-second time interval after a register translator was seized, indicative of a called zone, exchange and line terminal extending to a called subscriber substation so that the connection could be completely set up by the register translator utilized. The operator at the interceptor operator position 114—117 then answers the call and advises the subscriber at the calling private subscriber substation TP that he did not dial a full complement of digits identifying the directory number of the called subscriber substation. At this time the operator at the interceptor operator position 114—117 may advise the subscriber at the calling private subscriber substation TP to release the present connection and again attempt the extension of the toll call; or she may undertake the extension of the call directly.

The subsequent release of the primary selector 600 and the special service selector 503 may be under the control of either the subscriber at the calling private subscriber substation TP or the operator at the interceptor operator position 114—117 and is effected in accordance with conventional practice.

Again assume that a call has been initiated at any subscriber substation in exchange 4 zone 84, such, for example, as the private subscriber substation TP; that the line switch 423 associated with the private subscriber line 407 extending to the calling private subscriber substation TP has seized the trunk 462 extending to the primary selector 600; and that the finder F610 individual to the primary selector 600 has seized the conductors individual to the primary register 1200. At this time the primary register 1200 is in readiness to receive the directory number of the called subscriber substation. Now assume that the subscriber at the calling private subscriber substation TP dials the directory number of the called subscriber substation. When the first and second code digits are registered in the primary register 1200 the register translator allotter 1600 is controlled to assign an idle register translator, such, for example, as the register translator 1700, whereupon the finder F2290 operates in order to connect the register translator 1700 to the primary register 1200. When the register translator 1700 is connected to the primary register 1200 the primary register 1200 operates to transmit the complements of the first four digits registered therein to the register translator 1700 and to repeat directly the remainder of the numerical digits to the register translator 1700, all in the manner previously explained.

When the digits mentioned are registered in the register translator 1700 the composite code switch P2330 and the rate and route switch R2310 are operated, as previously explained. The digit sequence switch T2300 is then controlled in order to begin the transmission of the routing digits established by the operated position of the rate and route switch R2310, all in the manner previously explained. After the first routing digit has been transmitted the digit stop relay R1910 operates in order to effect operation of the special service cutoff relay R1810; and shortly thereafter the digit stop relay R1910 restores in order to effect operation of the detector start relay R1760. Upon operating, the detector start relay R1760 initiates operation of the detector 2900, all in the manner previously explained. In the event the detector 2900 fails to detect the line terminal of the calling private subscriber substation TP after two cycles of operation thereof and consequently two attempts, in the manner previously explained, ground potential is applied to the conductor C3301 extending to the register translator 1700; thereby to complete the previously traced circuit for energizing the winding of the detector failure relay R2250, whereupon the latter relay operates.

Upon operating, the detector failure relay R2250 completes, at the contacts 2252, the previously traced holding circuit, including the contacts 2137, for energizing the winding thereof; and interrupts, at the contacts 2251, the previously traced circuit for energizing the winding of the detector test relay R2230 in the register translator 1700 in series with the winding of the stop relay R3220 in the detector 2900, whereby the relays mentioned restore. Upon restoring, the stop relay R3220 effects the release of the detector 2900; and, upon restoring, the detector test relay R2230 effects the restoration of the storage relay R2850, all in the manner previously explained. Also, upon operating, the detector failure relay R2250 completes, at the contacts 2253, the previously traced circuit for energizing the release magnet RM2322, whereby the latter magnet operates in order to release the wiper set of the rate and route switch R2310 and to cause it to be returned to its normal rotary and vertical positions, as previously explained. When the rate and route switch R2310 is thus released the set of switch springs RS2324 is actuated, whereby the tansfer relay R1930 and the stop relay R1940 are restored; the restoration of the stop relay R1940 effecting the restoration of the switch cutoff relay R1820 and the consequent restoration of the digit pulse start relay R1710, all in the manner previously explained. Upon restoring, the digit pulse start relay R1710 causes the digit sequence switch T2300 to be released, whereupon the wipers thereof are returned to their home positions; and effects the release of the primary selector 600, all in the manner previously explained. Also, upon restoring, the digit pulse start relay R1710 effects restoration of the detector start relay R1760 and the special service cutoff relay R1810. Upon restoring, the detector start relay R1760 recompletes, at the contacts 1764, the previously traced circuit for energizing the upper winding of the switch pulse relay R1830, whereby the latter relay again operates intermittently. Further, upon operating, the detector failure relay R2250 completes, at the contacts 2254, an obvious path for applying ground potential to the conductor C2383 terminated by the 1 up 2 in contact in the contact bank associated with the wiper 2318 of the wiper set of the rate and route switch R2310.

The intermittent operation of the switch pulse relay R1830 causes the wiper set of the rate and route switch R2310 to be driven to engage the 1 up 2 in contacts in the associated contact banks under the control of the transfer relay R1930 and the stop relay R1940, all in the manner previously explained. It is noted that the marking of the 1 up 2 in contact in the contact bank associated with the wiper 2318 of the wiper set of the rate and route switch R2310, due to the operated position of the detector failure relay R2250, positively prevents reoperation of the rate and route switch R2310 under the control of the composite code switch P2330. When the wiper set of the rate and route switch R2310 engages the 1 up 2 in contacts in the associated contact banks the routing digits 1, 1 and 5 are set up to be transmitted by the register translator 1700, in the manner previously explained. Also, upon operating, the stop relay R1940 effects operation of the switch cutoff relay R1820 and the consequent operation of the digit pulse start relay R1710, as previously noted. Upon operating, the digit pulse start relay R1710 effects operation of the detector cutout relay R1950, which latter relay operates to prevent reoperation of the detector start relay R1760 and the consequent reoperation of the detector 2900, all in the manner previously explained. Also the digit pulse start relay R1710 effects operation of the code send relay R1740, whereby the transmission of the routing digits 1, 1 and 5 from the register translator 1700 to the primary selector 600 is effected, in the manner previously explained. The wiper 2304 of the digit sequence switch T2300 then engages the fourth contact in the associated contact bank, thereby to complete the previously traced circuit for energizing the lower winding of the release relay R2210. When thus energized the release relay R2210 operates in order to effect the release of the register translator 1700 and the consequent release of the primary register 1200, all in the manner previously explained.

The primary selector 600 responds to the first routing digit 1, thereby to select an idle trunk in the group, including the trunk 509, extending to an idle special service selector, such, for example, as the trunk 509, extending to the special service selector 503. The special service selector 503 is of the drop-back type, as previously noted, and absorbs the second routing digit 1. The special service selector 503 then responds to the third routing digit 5 to select the corresponding second group of trunks extending to the interceptor operator position 114—117 and then operates automatically to select an idle trunk in the group mentioned. Accordingly, in the present example, the call from the private subscriber substation TP is routed by way of the primary selector 600 and the special service selector 503 over an idle trunk in the second group of trunks extending to the interceptor operator position 114—117; which routing of the call over the idle trunk in the second group of trunks extending to the interceptor operator position 114—117 indicates to the operator thereat that the present call was intercepted due to the failure of the detector 2900 to detect the line terminal of the calling subscriber substation. The operator at the interceptor operator position 114—117 then answers the call and may then advise the subscriber at the calling private subscriber substation TP to release the present connection and again attempt the extension of the toll call; or she may undertake the extension of the call directly.

The subsequent release of the primary selector 600 and the special service selector 503 may be under the control of either the subscriber at the calling private subscriber substation TP or the operator at the interceptor operator position 114—117 and is effected in accordance with conventional practice.

Again assume that a call has been initiated at any subscriber substation in exchange 4 zone 84, such, for example, as the private subscriber substation TP; that the line switch 423 associated with the private subscriber line 407 extending to the calling private subscriber substation TP has seized the trunk 462 extending to the primary selector 600; and that the finder F610 individual to the primary selector 600 has seized the conductors individual to the primary register 1200. At this time the primary register 1200 is in readiness to receive the directory number of the called subscriber substation. Now assume that the subscriber at the calling private subscriber substation TP dials as the directory number of the called subscriber substation two or three code digits which in fact do not identify any called zone and exchange; in other words, the subscriber at the calling private subscriber substation TP has dialed a nonassigned directory number. When the first and second code digits are registered in the primary register 1200 the register translator allotter 1600 is controlled to assign an idle register translator, such, for example, as the register translator 1700; whereupon the finder F2290 operates in order to connect the register translator 1700 to the primary register 1200. When the register translator 1700 is connected to the primary register 1200 the primary register 1200 operates to transmit the complements of the first four digits registered therein to the register translator 1700 and to repeat directly the remainder of the numerical digits to the register translator 1700, all in the manner previously explained.

The complements of the three code digits are respectively registered in the first code switch A2400, the second code switch B2410 and the third code switch C2500; the first code switch A2400 selects a wiper of the wiper set of the composite code switch P2330 in accordance with the complement of the first routing digit; and the wiper set of the composite code switch P2330 is operated, respectively, in the vertical and rotary directions in accordance with the complements of the second and third code digits, all in the manner previously explained. Hence, at this time, one of the wipers of the wiper set of the composite code switch P2330 is selected and the wiper set of this switch occupies a particular vertical and rotary position. However, the selection of the particular wiper of the wiper set of the composite code switch P2330, in conjunction with the particular vertical and rotary positions thereof, does not correspond to any assigned code. Accordingly there is no marking, by way of the jumper 2351, between the contact in the contact bank engaged by the selected wiper of the wiper set of the composite code switch P2330 and a contact in the contact bank associated with the wiper 2318 of the wiper set of the rate and route switch R2310.

In the present example, the wiper set of the rate and route switch R2310 is operated to engage the 10 up 10 in contacts in the associated contact banks under the control of the transfer relay R1930 and the stop relay R1940 in view of the fact that no contact in the contact bank associated with the wiper 2318 of the wiper set of the rate and route switch R2310 is marked with ground potential, except the 10 up 10 in contact in the contact bank mentioned. The digit sequence switch T2300 is then controlled in order to begin the transmission of the routing digits established by the operated position of the rate and route switch R2310, all in the manner previously explained.

When the wiper set of the rate and route switch R2310 engages the 10 up 10 in contacts in the associated contact banks the routing digits 1, 1 and 7 are set up to be transmitted by the register translator 1700, in the manner previously explained. Also, upon operating, the stop relay R1940 effects operation of the switch cutoff relay R1820 and the consequent operation of the digit pulse start relay R1710, as previously noted. Upon operating, the digit pulse start relay R1710 effects operation of the detector cutout relay R1950; which latter relay operates to prevent operation of the detector start relay R1760 and the consequent operation of the detector 2900, all in the manner previously explained. Also the digit pulse start relay R1710 effects operation of the code send relay R1740, whereby the transmission of the routing digits 1, 1 and 7 from the register translator 1700 to the primary selector 600 is effected, in the manner previously explained. The wiper 2304 of thedigit sequence switch T2300 then engages the fourth contact in the associated contact bank, thereby to complete the previously traced circuit for energizing the lower winding of the release relay R2210. When thus energized the release relay R2210 operates in order to effect the release of the register translator 1700 and the consequent release of the primary register 1200, all in the manner previously explained.

The primary selector 600 responds to the first routing digit 1, thereby to select an idle trunk in the group, including the trunk 509, extending to an idle special service selector, such, for example, as the trunk 509, extending to the special service selector 503. The special service selector 503 is of the drop-back type, as previously noted, and absorbs the second routing digit 1. The special service selector 503 then responds to the third routing digit 7 to select the corresponding fourth group of trunks extending to the interceptor operator position 114—117 and then operates automatically to select an idle trunk in the group mentioned. Accordingly, in the present example, the call from the private subscriber substation TP is routed by way of the primary selector 600 and the special service selector 503 over an idle trunk in the fourth group of trunks extending to the interceptor operator position 114—117; which routing of the call over the idle trunk in the fourth group of trunks extending to the interceptor operator position 114—117 indicates to the operator thereat that the present call was intercepted due to the fact that a subscriber at a calling subscriber substation dialed a directory number, including a code portion which is non-assigned. The operator at the interceptor operator position 114—117 then answers the call and advises the subscriber at the calling private subscriber substation TP that he did not dial the directory number of the called subscriber substation, as listed in the telephone directory. At this time the operator at the interceptor operator position 114—117 may advise the subscriber at the calling private subscriber substation TP to release the present connection and again attempt the extension of the toll call; or she may undertake the extension of the call directly.

The subsequent release of the primary selector 600 and the special service selector 503 may be under the control of either the subscriber at the calling private subscriber substation TP or the operator at the interceptor operator position 114—117 and is effected in accordance with conventional practice.

*Conclusions*

From the foregoing it is apparent that an automatic telephone system is provided, which comprises improved automatic recording apparatus operative to record, without the aid of an operator, given particulars of certain calls in the system for which special charges are made, regardless of whether the calls are originated at private or party subscriber substations; improved switching apparatus for setting up the calls and for collecting the items of record information to be recorded; improved calculating apparatus, wherein the charges are automatically assessed on a basis, either a monetary basis or a unit call basis, consistent with the type of service which is rendered the subscriber substation against which the charge is assessed; improved apparatus for selectively controlling the automatic recording apparatus, whereby both a toll ticket individual to a call and an appropriate entry upon a common record sheet are produced; and improved apparatus for effecting the interception of toll calls initiated under certain operating conditions.

The apparatus and circuit arrangements in the telephone system, whereby the switching apparatus is controlled to establish charges for telephone connections in accordance with the time duration and the destination of the connections and whereby the recorders included in the system are controlled to produce records of the various items of information pertaining to the telephone connections, are claimed in the parent application, Serial No. 453,799, filed August 6, 1942. The apparatus and circuit arrangements in the telephone system, whereby the various registers control the switching apparatus in order to set up connections and to store items of information for recording purposes, are claimed in a copending divisional application, Serial No. 51,681, filed September 29, 1948. The apparatus and circuit arrangements in the telephone system, whereby the switching apparatus is automatically controlled to intercept calls in response to certain operating conditions, are claimed in a copending divisional application, Serial No. 51,682, filed September 29, 1948. The apparatus and circuit arrangements in the telephone system, whereby the identity of the calling party line is automatically registered, are claimed in a copending divisional application, Serial No. 711,509, filed November 22, 1946.

While one embodiment of the invention has been disclosed, it will be understood that various modifications may be made therein which are within the true spirit and scope of the invention.

What is claimed is:

1. In a telephone system including a large group of lines, a detector having access to said group of lines and comprising cycle apparatus operative progressively through X steps during a single cycle, Y test units, switching apparatus, means for initiating operation of said cycle apparatus, means responsive to the operation of said cycle apparatus through one cycle for operating said switching apparatus progressively to subdivide said group of lines into X subgroups upon the corresponding X steps of a single cycle of said cycle apparatus and to subdivide each of the subgroups into Y divisions and to connect the Y divisions to corresponding ones of said Y test units, means governed when the division including a sought line is connected to one of said test units for operating said one test unit and for arresting operation of said cycle apparatus, means governed by the arrested step of said cycle apparatus and the particular operated one of said test units for respectively identifying the subgroup and the included division including said sought line, means for releasing said cycle apparatus and said one operated test unit and for initiating reoperation of said cycle apparatus, means responsive to the operation of said cycle apparatus through one cycle for reoperating said switching apparatus progressively to subdivide the identified division into X subdivisions upon the corresponding X steps of a single cycle of said cycle apparatus and to subdivide each of the subdivisions into Y individual lines and to connect the Y individual lines to corresponding ones of said Y test units, means governed when said sought line is reconnected to one of said test units for reoperating said one test unit and for rearresting operation of said cycle apparatus, means governed by the rearrested step of said cycle apparatus and the particular reoperated one of said test units for respectively identifying the subdivision including said sought line and the particular position of said sought line therein, a device operative to indicate a failure of said detector, and means controlled in the event that the identity of the subgroup and the included division of the sought line or the identity of the subdivision and the particular position of the sought line is not established either by the operation or by the reoperation of said cycle apparatus through a given number of cycles for arresting further operation thereof and for operating said device.

2. In a telephone system including a large group of lines, a detector having access to said group of lines and comprising cycle apparatus operative progressively through X steps during a single cycle, Y test units, switching apparatus, means for initiating operation of said cycle apparatus, means responsive to the operation of said cycle apparatus through one cycle for operating said switching apparatus progressively to subdivide said group of lines into X subgroups upon the corresponding X steps of a single cycle of said cycle apparatus and to subdivide each of the subgroups into Y divisions and to connect the Y divisions to corresponding ones of said Y test units, means governed when the division including a sought line is connected to one of said test units for operating said one test unit and for arresting operation of said cycle apparatus, means governed by the arrested step of said cycle apparatus and the particular operated one of said test units for respectively identifying the subgroup and the included division including said sought line, a device operative to indicate a failure of said detector, and means controlled in the event that the identify of the subgroup and the included division of the sought line is not found during the operation of said cycle apparatus through a given number of cycles for arresting further operation thereof and for operating said device.

3. In a telephone system including a large group of lines, a detector having access to said group of lines and comprising cycle apparatus operative progressively through X steps during a single cycle, Y test units, switching apparatus, means for initiating operation of said cycle apparatus, means responsive to the operation of said cycle apparatus through one cycle for operating said switching apparatus progressively to subdivide said group of lines into X subgroups upon the corresponding X steps of a single cycle of said cycle apparatus and to subdivide each of the subgroups into Y individual lines and to connect the Y individual lines to corresponding ones of said Y test units, means governed when a sought line is connected to one of said test units for operating said one test unit and for arresting operation of said cycle apparatus, means governed by the arrested step of said cycle apparatus and the particular operated one of said test units for respectively identifying the subgroup including said sought line and the particular position of said sought line therein, a device operative to indicate a failure of said detector and means controlled in the event that the identity of the subgroup including the sought line and the particular position of the sought line in the subgroup is not established during the operation of said cycle apparatus through a given number of cycles for arresting further operation thereof and for operating said device.

4. In a telephone system including a large group of lines, each of the lines in said group having a designation individual thereo, a detector having access to said group of lines and comprising apparatus operable cyclically in first and second stages, means for initiating cyclic operation of said apparatus in said first stage, means normally controlled during the first cycle of operation of said apparatus in said first stage for detecting a first portion of the designation of a sought line and for arresting cyclic operation of said apparatus in said first stage and for initiating cyclic operation of said apparatus in said second stage, means normally controlled during the first cycle of operation of said apparatus in said second stage for detecting a second portion of the designation of said sought line and for arresting cyclic operation of said apparatus in said second stage, a device operative to indicate a failure of said detector to detect the designation of a sought line, and means controlled in the event said apparatus fails to detect said first portion or said second portion of the designation of a sought line during the operation of said apparatus through a given number of cycles either in said first stage or in said second stage for arresting further cyclic operation of said apparatus and for operating said device.

5. In a telephone system including a large group of lines, each of the lines in said group having a designation individual thereto, a detector having access to said group of lines and comprising apparatus operable cyclically in first and second stages, means for initiating cyclic operation of said apparatus in said first stage, first test means operative during the cyclic operation of said apparatus in said first stage for detecting a first portion of the designation of a sought line and for arresting cyclic operation of said apparatus in said first stage and for initiating cyclic operation of said apparatus in said second stage, second test means operative during the cyclic operation of said apparatus in said second stage for detecting a second portion of the designation of said sought line and for arresting cyclic operation of said apparatus in said second stage, a device operative to indicate a failure of said detector to detect either the first portion or the second portion of the designation of a sought line, and means controlled in the event said apparatus fails to detect said first portion or said second portion of the designation of a sought line during the operation of said apparatus through a given number of cycles either in said first stage or in said second stage for arresting further cyclic operation of said apparatus and for operating said device.

6. In a telephone system including a large group of lines, each of the lines in said group having a designation individual thereto, a detector having access to said group of lines and comprising apparatus operable cyclically in first and second stages, means for initiating cyclic operation of said apparatus in said first stage, first test means operative during the cyclic operation of said apparatus in said first stage for detecting a first portion of the designation of a sought line and for arresting cyclic operation of said apparatus in said first stage and for initiating cyclic operation of said apparatus in said second stage, a device, means responsive jointly to operation of said apparatus through a fixed number of cycles in said first stage and by failure of said first test means to detect said first portion of the designation of said sought line for operating said device, means responsive to operation of said apparatus through a given number of cycles in said first stage subsequent to operation of said device for arresting further cyclic operation of said apparatus and for producing an indication of the failure of said detector to detect the designation of said sought line, means responsive to operation of said first test means for releasing said device in the event it is operated, second test means operative during the cyclic operation of said apparatus in said second stage for detecting a second portion of the designation of said sought line and for arresting cyclic operation of said apparatus in said second stage, means responsive jointly to operation of said apparatus through a fixed number of cycles in said second stage and by failure of said second test means to detect said second portion of the designation of said sought line for operating said device, means responsive to operation of said apparatus through a given number of cycles in said second stage subsequent to operation of said device for arresting further cyclic operation of said apparatus and for producing an indication of the failure of said detector to detect the designation of said sought line, and means responsive to operation of said second test means for releasing said device in the event it is operated.

7. In a telephone system including a large group of lines, each of the lines in said group having a designation individual thereto, a detector having access to said group of lines and comprising cyclically operable apparatus, means for initiating cyclic operation of said apparatus, test means operative during the cyclic operation of said apparatus for detecting the designation of a sought line and for arresting cyclic operation of said apparatus, a device, means responsive jointly to operation of said apparatus through a fixed number of cycles and by failure of said test means to detect the designation of a sought line for operating said device, and means responsive jointly to operation of said apparatus through a given number of cycles subsequent to operation of said device and by failure of said test means to detect the designation of a sought line for arresting cyclic operation of said apparatus and for producing an indication of the failure of said detector to detect the designation of said sought line.

JOHN E. OSTLINE.

REFERENCES CITED

The following references are of record in the file of this patent:

UNITED STATES PATENTS

| Number | Name | Date |
|---|---|---|
| 2,344,612 | Hartley | Mar. 21, 1944 |
| 2,356,519 | Hubbard | Aug. 22, 1944 |
| 2,379,221 | Espenschied | June 26, 1945 |